(12) United States Patent
Veillette

(10) Patent No.: US 9,621,457 B2
(45) Date of Patent: Apr. 11, 2017

(54) SYSTEM AND METHOD FOR IMPLEMENTING MESH NETWORK COMMUNICATIONS USING A MESH NETWORK PROTOCOL

(71) Applicant: Trilliant Networks, Inc., Redwood City, CA (US)

(72) Inventor: Michel Veillette, Waterloo (CA)

(73) Assignee: Trilliant Networks, Inc., Redwood City, CA (US)

( * ) Notice: Subject to any disclaimer, the term of this patent is extended or adjusted under 35 U.S.C. 154(b) by 463 days.

(21) Appl. No.: 14/182,047

(22) Filed: Feb. 17, 2014

(65) Prior Publication Data

US 2014/0226667 A1 Aug. 14, 2014

Related U.S. Application Data

(62) Division of application No. 12/554,135, filed on Sep. 4, 2009, now Pat. No. 8,699,377.
(Continued)

(51) Int. Cl.
*H04L 12/28* (2006.01)
*H04L 12/721* (2013.01)
(Continued)

(52) U.S. Cl.
CPC .............. *H04L 45/72* (2013.01); *H04L 45/34* (2013.01); *H04L 45/42* (2013.01); *H04L 45/44* (2013.01); *H04L 45/48* (2013.01); *H04L 45/52* (2013.01); *H04L 63/123* (2013.01); *H04W 40/005* (2013.01); *H04W 40/12* (2013.01); *H04W 40/22* (2013.01); *H04W 40/246* (2013.01); *H04W 40/28* (2013.01); *H04W 48/18* (2013.01); *H04W 8/02* (2013.01); *H04W 84/18* (2013.01)

(58) Field of Classification Search
USPC ...................... 370/389, 395.2, 252, 282, 406
See application file for complete search history.

(56) References Cited

U.S. PATENT DOCUMENTS

| 4,132,981 A | 1/1979 | White |
| 4,190,800 A | 2/1980 | Kelly, Jr. et al. |

(Continued)

FOREIGN PATENT DOCUMENTS

| EP | 578041 B1 | 11/1999 |
| EP | 663746 B1 | 1/2003 |

(Continued)

OTHER PUBLICATIONS

Ball et al., "Reliability of packet switching broadcast radio networks", Circuits and Systems, IEEE Transactions on, vol. 23, Issue 12, pp. 806-813, Dec. 1976.
(Continued)

*Primary Examiner* — John Pezzlo
(74) *Attorney, Agent, or Firm* — Moser Taboada

(57) ABSTRACT

The following describes data structures, communication protocol formats and process flows for controlling and facilitating secure communications between the nodes of a mesh network, such as utility meters and gateway nodes comprising a utility network. The enabled processes include association, information exchange, route discovery and maintenance and the like for instituting and maintaining a secure mesh network.

4 Claims, 81 Drawing Sheets

Related U.S. Application Data

(60) Provisional application No. 61/094,116, filed on Sep. 4, 2008.

(51) Int. Cl.

| | | |
|---|---|---|
| *H04L 12/717* | (2013.01) | |
| *H04L 12/753* | (2013.01) | |
| *H04L 12/781* | (2013.01) | |
| *H04L 29/06* | (2006.01) | |
| *H04W 40/00* | (2009.01) | |
| *H04W 40/12* | (2009.01) | |
| *H04W 40/22* | (2009.01) | |
| *H04W 40/24* | (2009.01) | |
| *H04W 40/28* | (2009.01) | |
| *H04W 48/18* | (2009.01) | |
| *H04J 1/16* | (2006.01) | |
| *H04W 8/02* | (2009.01) | |
| *H04W 84/18* | (2009.01) | |

(56) References Cited

U.S. PATENT DOCUMENTS

| | | |
|---|---|---|
| 4,204,195 A | 5/1980 | Bogacki |
| 4,254,472 A | 3/1981 | Juengel et al. |
| 4,322,842 A | 3/1982 | Martinez |
| 4,396,915 A | 8/1983 | Farnsworth et al. |
| 4,425,628 A | 1/1984 | Bedard et al. |
| 4,638,314 A | 1/1987 | Keller |
| 4,644,320 A | 2/1987 | Carr et al. |
| 4,749,992 A | 6/1988 | Fitzemeyer et al. |
| 4,792,946 A | 12/1988 | Mayo |
| 4,939,726 A | 7/1990 | Flammer et al. |
| 5,007,052 A | 4/1991 | Flammer |
| 5,056,107 A | 10/1991 | Johnson et al. |
| 5,077,753 A | 12/1991 | Grau, Jr. et al. |
| 5,079,768 A | 1/1992 | Flammer |
| 5,115,433 A | 5/1992 | Baran et al. |
| 5,117,422 A | 5/1992 | Hauptschein et al. |
| 5,130,987 A | 7/1992 | Flammer |
| 5,138,615 A | 8/1992 | Lamport et al. |
| 5,159,592 A | 10/1992 | Perkins |
| 5,216,623 A | 6/1993 | Barrett et al. |
| 5,276,680 A | 1/1994 | Messenger |
| 5,311,581 A | 5/1994 | Merriam et al. |
| 5,400,338 A | 3/1995 | Flammer, III |
| 5,430,729 A | 7/1995 | Rahnema |
| 5,432,507 A | 7/1995 | Mussino et al. |
| 5,453,977 A | 9/1995 | Flammer, III et al. |
| 5,459,727 A | 10/1995 | Vannucci |
| 5,463,777 A | 10/1995 | Bialkowski et al. |
| 5,465,398 A | 11/1995 | Flammer |
| 5,467,345 A | 11/1995 | Cutler, Jr. et al. |
| 5,471,469 A | 11/1995 | Flammer, III et al. |
| 5,479,400 A | 12/1995 | Dilworth et al. |
| 5,488,608 A | 1/1996 | Flammer, III |
| 5,515,369 A | 5/1996 | Flammer, III et al. |
| 5,515,509 A | 5/1996 | Rom |
| 5,528,507 A | 6/1996 | McNamara et al. |
| 5,544,036 A | 8/1996 | Brown, Jr. et al. |
| 5,553,094 A | 9/1996 | Johnson et al. |
| 5,570,084 A | 10/1996 | Ritter et al. |
| 5,572,528 A | 11/1996 | Shuen |
| 5,596,722 A | 1/1997 | Rahnema |
| 5,608,721 A | 3/1997 | Natarajan et al. |
| 5,608,780 A | 3/1997 | Gerszberg et al. |
| 5,623,495 A | 4/1997 | Eng et al. |
| 5,659,300 A | 8/1997 | Dresselhuys et al. |
| 5,673,252 A | 9/1997 | Johnson et al. |
| 5,696,501 A | 12/1997 | Ouellette et al. |
| 5,717,718 A | 2/1998 | Rowsell et al. |
| 5,719,564 A | 2/1998 | Sears |
| 5,726,644 A | 3/1998 | Jednacz et al. |
| 5,727,057 A | 3/1998 | Emery et al. |
| 5,737,318 A | 4/1998 | Melnik |
| 5,740,366 A | 4/1998 | Mahany et al. |
| 5,748,104 A | 5/1998 | Argyroudis et al. |
| 5,757,783 A | 5/1998 | Eng et al. |
| 5,758,331 A | 5/1998 | Johnson |
| 5,761,083 A | 6/1998 | Brown, Jr. et al. |
| 5,767,790 A | 6/1998 | Jovellana |
| 5,774,660 A | 6/1998 | Brendel et al. |
| 5,812,531 A | 9/1998 | Cheung et al. |
| 5,822,309 A | 10/1998 | Ayanoglu et al. |
| 5,844,893 A | 12/1998 | Gollnick et al. |
| 5,874,903 A | 2/1999 | Shuey et al. |
| 5,880,677 A | 3/1999 | Lestician |
| 5,892,758 A | 4/1999 | Argyroudis |
| 5,894,422 A | 4/1999 | Chasek |
| 5,896,097 A | 4/1999 | Cardozo |
| 5,898,387 A | 4/1999 | Davis et al. |
| 5,898,826 A | 4/1999 | Pierce et al. |
| 5,901,067 A | 5/1999 | Kao et al. |
| 5,903,566 A | 5/1999 | Flammer, III |
| 5,914,672 A | 6/1999 | Glorioso et al. |
| 5,914,673 A | 6/1999 | Jennings et al. |
| 5,920,697 A | 7/1999 | Masters et al. |
| 5,926,531 A | 7/1999 | Petite |
| 5,933,092 A | 8/1999 | Ouellette et al. |
| 5,953,371 A | 9/1999 | Rowsell et al. |
| 5,956,339 A | 9/1999 | Harada et al. |
| 5,963,146 A | 10/1999 | Johnson et al. |
| 5,963,457 A | 10/1999 | Kanoi et al. |
| 5,974,236 A | 10/1999 | Sherman |
| 5,986,574 A | 11/1999 | Colton |
| 5,987,011 A | 11/1999 | Toh |
| 5,991,806 A | 11/1999 | McHann, Jr. |
| 6,014,089 A | 1/2000 | Tracy et al. |
| 6,018,659 A | 1/2000 | Ayyagari et al. |
| 6,026,133 A | 2/2000 | Sokoler |
| 6,028,522 A | 2/2000 | Petite |
| 6,044,062 A | 3/2000 | Brownrigg et al. |
| 6,058,355 A | 5/2000 | Ahmed et al. |
| 6,061,609 A | 5/2000 | Kanoi et al. |
| 6,073,169 A | 6/2000 | Shuey et al. |
| 6,075,777 A | 6/2000 | Agrawal et al. |
| 6,078,785 A | 6/2000 | Bush |
| 6,084,867 A | 7/2000 | Meier |
| 6,088,659 A | 7/2000 | Kelley et al. |
| 6,097,703 A | 8/2000 | Larsen et al. |
| 6,108,699 A | 8/2000 | Moiin |
| 6,118,269 A | 9/2000 | Davis |
| 6,122,603 A | 9/2000 | Budike, Jr. |
| 6,124,806 A | 9/2000 | Cunningham et al. |
| 6,134,587 A | 10/2000 | Okanoue |
| 6,137,423 A | 10/2000 | Glorioso et al. |
| 6,150,955 A | 11/2000 | Tracy et al. |
| 6,169,979 B1 | 1/2001 | Johnson |
| 6,172,616 B1 | 1/2001 | Johnson et al. |
| 6,195,018 B1 | 2/2001 | Ragle et al. |
| 6,218,953 B1 | 4/2001 | Petite |
| 6,233,327 B1 | 5/2001 | Petite |
| 6,239,722 B1 | 5/2001 | Colton et al. |
| 6,240,080 B1 | 5/2001 | Okanoue et al. |
| 6,246,677 B1 | 6/2001 | Nap et al. |
| 6,246,689 B1 | 6/2001 | Shavitt |
| 6,249,516 B1 | 6/2001 | Brownrigg et al. |
| 6,298,053 B1 | 10/2001 | Flammer, III et al. |
| 6,300,881 B1 | 10/2001 | Yee et al. |
| 6,304,556 B1 | 10/2001 | Haas |
| 6,311,105 B1 | 10/2001 | Budike, Jr. |
| 6,338,087 B1 | 1/2002 | Okanoue |
| 6,362,745 B1 | 3/2002 | Davis |
| 6,363,057 B1 | 3/2002 | Ardalan et al. |
| 6,366,217 B1 | 4/2002 | Cunningham et al. |
| 6,369,719 B1 | 4/2002 | Tracy et al. |
| 6,369,769 B1 | 4/2002 | Nap et al. |
| 6,373,399 B1 | 4/2002 | Johnson et al. |
| 6,396,839 B1 | 5/2002 | Ardalan et al. |
| 6,400,949 B1 | 6/2002 | Bielefeld et al. |
| 6,407,991 B1 | 6/2002 | Meier |
| 6,415,330 B1 | 7/2002 | Okanoue |
| 6,430,268 B1 | 8/2002 | Petite |

(56) References Cited

U.S. PATENT DOCUMENTS

| | | |
|---|---|---|
| 6,437,692 B1 | 8/2002 | Petite et al. |
| 6,457,054 B1 | 9/2002 | Bakshi |
| 6,480,497 B1 | 11/2002 | Flammer, III et al. |
| 6,480,505 B1 | 11/2002 | Johansson et al. |
| 6,492,910 B1 | 12/2002 | Ragle et al. |
| 6,509,841 B1 | 1/2003 | Colton et al. |
| 6,522,974 B2 | 2/2003 | Sitton |
| 6,535,498 B1 | 3/2003 | Larsson et al. |
| 6,538,577 B1 | 3/2003 | Ehrke et al. |
| 6,553,355 B1 | 4/2003 | Arnoux et al. |
| 6,577,671 B1 | 6/2003 | Vimpari |
| 6,606,708 B1 | 8/2003 | Devine et al. |
| 6,618,578 B1 | 9/2003 | Petite |
| 6,618,772 B1 | 9/2003 | Kao et al. |
| 6,628,764 B1 | 9/2003 | Petite |
| 6,633,823 B2 | 10/2003 | Bartone et al. |
| 6,636,894 B1 | 10/2003 | Short et al. |
| 6,650,249 B2 | 11/2003 | Meyer et al. |
| 6,653,945 B2 | 11/2003 | Johnson et al. |
| 6,657,552 B2 | 12/2003 | Belski et al. |
| 6,665,620 B1 | 12/2003 | Burns et al. |
| 6,671,635 B1 | 12/2003 | Forth et al. |
| 6,681,110 B1 | 1/2004 | Crookham et al. |
| 6,681,154 B2 | 1/2004 | Nierlich et al. |
| 6,684,245 B1 | 1/2004 | Shuey et al. |
| 6,691,173 B2 | 2/2004 | Morris et al. |
| 6,697,331 B1 | 2/2004 | Riihinen et al. |
| 6,710,721 B1 | 3/2004 | Holowick |
| 6,711,166 B1 | 3/2004 | Amir et al. |
| 6,711,409 B1 | 3/2004 | Zavgren, Jr. et al. |
| 6,714,787 B2 | 3/2004 | Reed et al. |
| 6,718,137 B1 | 4/2004 | Chin |
| 6,725,281 B1 | 4/2004 | Zintel et al. |
| 6,728,514 B2 | 4/2004 | Bandeira et al. |
| 6,747,557 B1 | 6/2004 | Petite et al. |
| 6,747,981 B2 | 6/2004 | Ardalan et al. |
| 6,751,445 B2 | 6/2004 | Kasperkovitz et al. |
| 6,751,455 B1 | 6/2004 | Acampora |
| 6,751,672 B1 | 6/2004 | Khalil et al. |
| 6,772,052 B1 | 8/2004 | Amundsen et al. |
| 6,775,258 B1 | 8/2004 | Van Valkenburg et al. |
| 6,778,099 B1 | 8/2004 | Meyer et al. |
| 6,785,592 B1 | 8/2004 | Smith et al. |
| 6,798,352 B2 | 9/2004 | Holowick |
| 6,801,865 B2 | 10/2004 | Gilgenbach et al. |
| 6,826,620 B1 | 11/2004 | Mawhinney et al. |
| 6,829,216 B1 | 12/2004 | Nakata |
| 6,829,347 B1 | 12/2004 | Odiaka |
| 6,831,921 B2 | 12/2004 | Higgins |
| 6,836,737 B2 | 12/2004 | Petite et al. |
| 6,839,775 B1 | 1/2005 | Kao et al. |
| 6,842,706 B1 | 1/2005 | Baraty |
| 6,845,091 B2 | 1/2005 | Ogier et al. |
| 6,859,186 B2 | 2/2005 | Lizalek et al. |
| 6,865,185 B1 | 3/2005 | Patel et al. |
| 6,885,309 B1 | 4/2005 | Van Heteren |
| 6,891,838 B1 | 5/2005 | Petite et al. |
| 6,900,738 B2 | 5/2005 | Crichlow |
| 6,904,025 B1 | 6/2005 | Madour et al. |
| 6,904,385 B1 | 6/2005 | Budike, Jr. |
| 6,909,705 B1 | 6/2005 | Lee et al. |
| 6,914,533 B2 | 7/2005 | Petite |
| 6,914,893 B2 | 7/2005 | Petite |
| 6,946,972 B2 | 9/2005 | Mueller et al. |
| 6,954,814 B1 | 10/2005 | Leach |
| 6,963,285 B2 | 11/2005 | Fischer et al. |
| 6,967,452 B2 | 11/2005 | Aiso et al. |
| 6,970,434 B1 | 11/2005 | Mahany et al. |
| 6,970,771 B1 | 11/2005 | Preiss et al. |
| 6,975,613 B1 | 12/2005 | Johansson |
| 6,980,973 B1 | 12/2005 | Karpenko |
| 6,982,651 B2 | 1/2006 | Fischer |
| 6,985,087 B2 | 1/2006 | Soliman |
| 6,995,666 B1 | 2/2006 | Luttrell |
| 6,999,441 B2 | 2/2006 | Flammer, III et al. |
| 7,009,379 B2 | 3/2006 | Ramirez |
| 7,009,493 B2 | 3/2006 | Howard et al. |
| 7,010,363 B2 | 3/2006 | Donnelly et al. |
| 7,016,336 B2 | 3/2006 | Sörensen |
| 7,020,701 B1 | 3/2006 | Gelvin et al. |
| 7,042,368 B2 | 5/2006 | Patterson et al. |
| 7,046,682 B2 | 5/2006 | Carpenter et al. |
| 7,053,767 B2 | 5/2006 | Petite et al. |
| 7,054,271 B2 | 5/2006 | Brownrigg et al. |
| 7,062,361 B1 | 6/2006 | Lane |
| 7,064,679 B2 | 6/2006 | Ehrke et al. |
| 7,072,945 B1 | 7/2006 | Nieminen et al. |
| 7,079,810 B2 | 7/2006 | Petite et al. |
| 7,089,089 B2 | 8/2006 | Cumming et al. |
| 7,102,533 B2 | 9/2006 | Kim |
| 7,103,511 B2 | 9/2006 | Petite |
| 7,106,044 B1 | 9/2006 | Lee, Jr. et al. |
| 7,119,713 B2 | 10/2006 | Shuey et al. |
| 7,126,494 B2 | 10/2006 | Ardalan et al. |
| 7,135,850 B2 | 11/2006 | Ramirez |
| 7,135,956 B2 | 11/2006 | Bartone et al. |
| 7,137,550 B1 | 11/2006 | Petite |
| 7,143,204 B1 | 11/2006 | Kao et al. |
| 7,145,474 B2 | 12/2006 | Shuey et al. |
| 7,170,425 B2 | 1/2007 | Christopher et al. |
| 7,185,131 B2 | 2/2007 | Leach |
| 7,188,003 B2 | 3/2007 | Ransom et al. |
| 7,197,046 B1 | 3/2007 | Hariharasubrahmanian |
| 7,200,633 B2 | 4/2007 | Sekiguchi et al. |
| 7,209,840 B2 | 4/2007 | Petite et al. |
| 7,215,926 B2 | 5/2007 | Corbett et al. |
| 7,222,111 B1 | 5/2007 | Budike, Jr. |
| 7,230,544 B2 | 6/2007 | Van Heteren |
| 7,231,482 B2 | 6/2007 | Leach |
| 7,248,181 B2 | 7/2007 | Patterson et al. |
| 7,248,861 B2 | 7/2007 | Lazaridis et al. |
| 7,250,874 B2 | 7/2007 | Mueller et al. |
| 7,251,570 B2 | 7/2007 | Hancock et al. |
| 7,263,073 B2 | 8/2007 | Petite et al. |
| 7,271,735 B2 | 9/2007 | Rogai |
| 7,274,305 B1 | 9/2007 | Luttrell |
| 7,274,975 B2 | 9/2007 | Miller |
| 7,277,027 B2 | 10/2007 | Ehrke et al. |
| 7,277,967 B2 | 10/2007 | Kao et al. |
| 7,289,887 B2 | 10/2007 | Rodgers |
| 7,295,128 B2 | 11/2007 | Petite |
| 7,301,476 B2 | 11/2007 | Shuey et al. |
| 7,304,587 B2 | 12/2007 | Boaz |
| 7,308,370 B2 | 12/2007 | Mason, Jr. et al. |
| 7,312,721 B2 | 12/2007 | Mason, Jr. et al. |
| 7,315,257 B2 | 1/2008 | Patterson et al. |
| 7,317,404 B2 | 1/2008 | Cumeralto et al. |
| 7,321,316 B2 | 1/2008 | Hancock et al. |
| 7,324,453 B2 | 1/2008 | Wu et al. |
| 7,327,998 B2 | 2/2008 | Kumar et al. |
| 7,346,463 B2 | 3/2008 | Petite et al. |
| 7,348,769 B2 | 3/2008 | Ramirez |
| 7,349,766 B2 | 3/2008 | Rodgers |
| 7,362,709 B1 | 4/2008 | Hui et al. |
| 7,366,113 B1 | 4/2008 | Chandra et al. |
| 7,379,981 B2 | 5/2008 | Elliott et al. |
| 7,397,907 B2 | 7/2008 | Petite |
| 7,406,298 B2 | 7/2008 | Luglio et al. |
| 7,411,964 B2 | 8/2008 | Suemura |
| 7,427,927 B2 | 9/2008 | Borleske et al. |
| 7,451,019 B2 | 11/2008 | Rodgers |
| 7,457,273 B2 | 11/2008 | Nakanishi et al. |
| 7,468,661 B2 | 12/2008 | Petite et al. |
| 7,487,282 B2 | 2/2009 | Leach |
| 7,495,578 B2 | 2/2009 | Borleske |
| 7,498,873 B2 | 3/2009 | Opshaug et al. |
| 7,505,453 B2 | 3/2009 | Carpenter et al. |
| 7,512,234 B2 | 3/2009 | McDonnell et al. |
| 7,515,571 B2 | 4/2009 | Kwon et al. |
| 7,516,106 B2 | 4/2009 | Ehlers et al. |
| 7,522,540 B1 | 4/2009 | Maufer |
| 7,522,639 B1 | 4/2009 | Katz |
| 7,539,151 B2 | 5/2009 | Demirhan et al. |
| 7,545,285 B2 | 6/2009 | Shuey et al. |

(56) References Cited

U.S. PATENT DOCUMENTS

| | | |
|---|---|---|
| 7,548,826 B2 | 6/2009 | Witter et al. |
| 7,548,907 B2 | 6/2009 | Wall et al. |
| 7,554,941 B2 | 6/2009 | Ratiu et al. |
| 7,562,024 B2 | 7/2009 | Brooks et al. |
| 7,586,420 B2 | 9/2009 | Fischer et al. |
| 7,599,665 B2 | 10/2009 | Sinivaara |
| 7,602,747 B2 | 10/2009 | Maksymczuk et al. |
| 7,609,673 B2 | 10/2009 | Bergenlid et al. |
| 7,613,147 B2 | 11/2009 | Bergenlid et al. |
| 7,623,043 B2 | 11/2009 | Mizra et al. |
| 7,626,967 B2 | 12/2009 | Yarvis et al. |
| 7,650,425 B2 | 1/2010 | Davis et al. |
| 7,676,231 B2 | 3/2010 | Demirhan et al. |
| 7,680,041 B2 | 3/2010 | Johansen |
| 7,729,496 B2 | 6/2010 | Hacigumus |
| 7,756,538 B2 | 7/2010 | Bonta et al. |
| 7,814,322 B2 | 10/2010 | Gurevich et al. |
| 7,847,706 B1 | 12/2010 | Ross et al. |
| 2001/0005368 A1 | 6/2001 | Rune |
| 2001/0038342 A1 | 11/2001 | Foote |
| 2001/0046879 A1 | 11/2001 | Schramm et al. |
| 2002/0012358 A1 | 1/2002 | Sato |
| 2002/0013679 A1 | 1/2002 | Petite |
| 2002/0031101 A1 | 3/2002 | Petite et al. |
| 2002/0066095 A1 | 5/2002 | Yu |
| 2002/0110118 A1 | 8/2002 | Foley |
| 2002/0120569 A1 | 8/2002 | Day |
| 2002/0174354 A1 | 11/2002 | Bel et al. |
| 2002/0186619 A1 | 12/2002 | Reeves et al. |
| 2003/0001640 A1 | 1/2003 | Lao et al. |
| 2003/0001754 A1 | 1/2003 | Johnson et al. |
| 2003/0033394 A1 | 2/2003 | Stine |
| 2003/0037268 A1 | 2/2003 | Kistler |
| 2003/0050737 A1 | 3/2003 | Osann |
| 2003/0112822 A1 | 6/2003 | Hong et al. |
| 2003/0117966 A1 | 6/2003 | Chen |
| 2003/0122686 A1 | 7/2003 | Ehrke et al. |
| 2003/0123481 A1 | 7/2003 | Neale et al. |
| 2003/0156715 A1 | 8/2003 | Reeds et al. |
| 2003/0229900 A1 | 12/2003 | Reisman |
| 2003/0233201 A1 | 12/2003 | Horst et al. |
| 2004/0008663 A1 | 1/2004 | Srikrishna et al. |
| 2004/0031030 A1 | 2/2004 | Kidder et al. |
| 2004/0034773 A1 | 2/2004 | Balabine et al. |
| 2004/0056775 A1 | 3/2004 | Crookham et al. |
| 2004/0066310 A1 | 4/2004 | Ehrke et al. |
| 2004/0077341 A1 | 4/2004 | Chandranmenon et al. |
| 2004/0082203 A1 | 4/2004 | Logvinov et al. |
| 2004/0100953 A1 | 5/2004 | Chen et al. |
| 2004/0113810 A1 | 6/2004 | Mason et al. |
| 2004/0117788 A1 | 6/2004 | Karaoguz et al. |
| 2004/0125776 A1 | 7/2004 | Haugli et al. |
| 2004/0138787 A1 | 7/2004 | Ransom et al. |
| 2004/0140908 A1 | 7/2004 | Gladwin et al. |
| 2004/0157613 A1 | 8/2004 | Steer et al. |
| 2004/0183687 A1 | 9/2004 | Petite et al. |
| 2004/0185845 A1 | 9/2004 | Abhishek et al. |
| 2004/0210544 A1 | 10/2004 | Shuey et al. |
| 2005/0004916 A1* | 1/2005 | Miller ............... H04L 29/12113 |
| 2005/0026569 A1 | 2/2005 | Lim et al. |
| 2005/0027859 A1 | 2/2005 | Alvisi et al. |
| 2005/0030968 A1 | 2/2005 | Rich et al. |
| 2005/0033967 A1 | 2/2005 | Morino et al. |
| 2005/0055432 A1 | 3/2005 | Rodgers |
| 2005/0058144 A1 | 3/2005 | Ayyagari et al. |
| 2005/0065742 A1 | 3/2005 | Rodgers |
| 2005/0122944 A1 | 6/2005 | Kwon et al. |
| 2005/0136972 A1 | 6/2005 | Smith et al. |
| 2005/0172024 A1 | 8/2005 | Cheifot et al. |
| 2005/0201397 A1 | 9/2005 | Petite |
| 2005/0243867 A1 | 11/2005 | Petite |
| 2005/0250487 A1 | 11/2005 | Miwa et al. |
| 2005/0251403 A1 | 11/2005 | Shuey |
| 2005/0257215 A1 | 11/2005 | Denby et al. |
| 2005/0270173 A1 | 12/2005 | Boaz |
| 2005/0276243 A1 | 12/2005 | Sugaya et al. |
| 2005/0286440 A1 | 12/2005 | Strutt et al. |
| 2006/0028355 A1 | 2/2006 | Patterson et al. |
| 2006/0055432 A1 | 3/2006 | Shimokawa et al. |
| 2006/0056363 A1 | 3/2006 | Ratiu et al. |
| 2006/0056368 A1 | 3/2006 | Ratiu et al. |
| 2006/0077906 A1 | 4/2006 | Maegawa et al. |
| 2006/0087993 A1 | 4/2006 | Sengupta et al. |
| 2006/0098576 A1 | 5/2006 | Brownrigg et al. |
| 2006/0098604 A1 | 5/2006 | Flammer et al. |
| 2006/0111111 A1 | 5/2006 | Ovadia |
| 2006/0136667 A1 | 6/2006 | Vaswani et al. |
| 2006/0140135 A1 | 6/2006 | Bonta et al. |
| 2006/0146717 A1 | 7/2006 | Conner et al. |
| 2006/0158347 A1 | 7/2006 | Roche et al. |
| 2006/0161310 A1 | 7/2006 | Lal |
| 2006/0167784 A1 | 7/2006 | Hoffberg |
| 2006/0184288 A1 | 8/2006 | Rodgers |
| 2006/0215583 A1 | 9/2006 | Castagnoli |
| 2006/0215673 A1 | 9/2006 | Olvera Hernandez |
| 2006/0217936 A1 | 9/2006 | Mason et al. |
| 2006/0230276 A1 | 10/2006 | Nochta |
| 2006/0271244 A1 | 11/2006 | Cumming et al. |
| 2006/0271678 A1 | 11/2006 | Jessup et al. |
| 2006/0274792 A1 | 12/2006 | Abhishek et al. |
| 2007/0001868 A1 | 1/2007 | Boaz |
| 2007/0013547 A1 | 1/2007 | Boaz |
| 2007/0019598 A1 | 1/2007 | Prehofer |
| 2007/0036353 A1 | 2/2007 | Reznik et al. |
| 2007/0057767 A1 | 3/2007 | Sun et al. |
| 2007/0060147 A1 | 3/2007 | Shin et al. |
| 2007/0063868 A1 | 3/2007 | Borleske |
| 2007/0085700 A1 | 4/2007 | Walters et al. |
| 2007/0087756 A1 | 4/2007 | Hoffberg |
| 2007/0103324 A1 | 5/2007 | Kosuge et al. |
| 2007/0109121 A1 | 5/2007 | Cohen |
| 2007/0110024 A1 | 5/2007 | Meier |
| 2007/0120705 A1 | 5/2007 | Kiiskila et al. |
| 2007/0136817 A1 | 6/2007 | Nguyen |
| 2007/0139220 A1 | 6/2007 | Mirza et al. |
| 2007/0143046 A1 | 6/2007 | Budike |
| 2007/0147268 A1 | 6/2007 | Kelley et al. |
| 2007/0169074 A1 | 7/2007 | Koo et al. |
| 2007/0169075 A1 | 7/2007 | Lill et al. |
| 2007/0169080 A1 | 7/2007 | Friedman |
| 2007/0177538 A1 | 8/2007 | Christensen et al. |
| 2007/0177576 A1 | 8/2007 | Johansen et al. |
| 2007/0177613 A1 | 8/2007 | Shorty et al. |
| 2007/0189249 A1 | 8/2007 | Gurevich et al. |
| 2007/0200729 A1 | 8/2007 | Borleske et al. |
| 2007/0201504 A1 | 8/2007 | Christensen et al. |
| 2007/0204009 A1 | 8/2007 | Shorty et al. |
| 2007/0205915 A1 | 9/2007 | Shuey et al. |
| 2007/0206503 A1 | 9/2007 | Gong et al. |
| 2007/0206521 A1 | 9/2007 | Osaje |
| 2007/0207811 A1 | 9/2007 | Das et al. |
| 2007/0210933 A1 | 9/2007 | Leach |
| 2007/0211636 A1 | 9/2007 | Bellur et al. |
| 2007/0239477 A1 | 10/2007 | Budike |
| 2007/0248047 A1 | 10/2007 | Shorty et al. |
| 2007/0248065 A1* | 10/2007 | Banerjea ............... H04L 45/26 370/338 |
| 2007/0257813 A1 | 11/2007 | Vaswani et al. |
| 2007/0258508 A1 | 11/2007 | Werb et al. |
| 2007/0263647 A1 | 11/2007 | Shorty et al. |
| 2007/0265947 A1 | 11/2007 | Schimpf et al. |
| 2007/0266429 A1 | 11/2007 | Ginter et al. |
| 2007/0271006 A1 | 11/2007 | Golden et al. |
| 2007/0276547 A1 | 11/2007 | Miller |
| 2008/0018492 A1 | 1/2008 | Ehrke et al. |
| 2008/0024320 A1 | 1/2008 | Ehrke et al. |
| 2008/0031145 A1 | 2/2008 | Ethier et al. |
| 2008/0032703 A1 | 2/2008 | Krumm et al. |
| 2008/0037569 A1 | 2/2008 | Werb et al. |
| 2008/0042874 A1 | 2/2008 | Rogai |
| 2008/0046388 A1 | 2/2008 | Budike, Jr. |
| 2008/0048883 A1 | 2/2008 | Boaz |
| 2008/0051036 A1 | 2/2008 | Vaswani et al. |
| 2008/0063205 A1 | 3/2008 | Braskich et al. |

(56) References Cited

U.S. PATENT DOCUMENTS

| | | |
|---|---|---|
| 2008/0068217 A1 | 3/2008 | Van Wyk et al. |
| 2008/0068994 A1 | 3/2008 | Garrison Stuber et al. |
| 2008/0068996 A1 | 3/2008 | Clave et al. |
| 2008/0086560 A1 | 4/2008 | Monier et al. |
| 2008/0089314 A1 | 4/2008 | Meyer et al. |
| 2008/0095221 A1 | 4/2008 | Picard |
| 2008/0097782 A1 | 4/2008 | Budike, Jr. |
| 2008/0107034 A1 | 5/2008 | Jetcheva et al. |
| 2008/0117110 A1 | 5/2008 | Luglio et al. |
| 2008/0129538 A1 | 6/2008 | Vaswani et al. |
| 2008/0130535 A1 | 6/2008 | Shorty et al. |
| 2008/0130562 A1 | 6/2008 | Shorty et al. |
| 2008/0132185 A1 | 6/2008 | Elliott et al. |
| 2008/0151795 A1 | 6/2008 | Shorty et al. |
| 2008/0151824 A1 | 6/2008 | Shorty et al. |
| 2008/0151825 A1 | 6/2008 | Shorty et al. |
| 2008/0151826 A1 | 6/2008 | Shorty et al. |
| 2008/0151827 A1 | 6/2008 | Shorty et al. |
| 2008/0154396 A1 | 6/2008 | Shorty et al. |
| 2008/0159213 A1 | 7/2008 | Shorty et al. |
| 2008/0165712 A1 | 7/2008 | Shorty et al. |
| 2008/0170511 A1 | 7/2008 | Shorty et al. |
| 2008/0177678 A1 | 7/2008 | Di Martini et al. |
| 2008/0180274 A1 | 7/2008 | Cumeralto et al. |
| 2008/0181133 A1 | 7/2008 | Thubert et al. |
| 2008/0183339 A1 | 7/2008 | Vaswani et al. |
| 2008/0186202 A1 | 8/2008 | Vaswani et al. |
| 2008/0186203 A1 | 8/2008 | Vaswani et al. |
| 2008/0187001 A1 | 8/2008 | Vaswani et al. |
| 2008/0187116 A1 | 8/2008 | Reeves et al. |
| 2008/0189415 A1 | 8/2008 | Vaswani et al. |
| 2008/0189436 A1 | 8/2008 | Vaswani et al. |
| 2008/0204272 A1 | 8/2008 | Ehrke et al. |
| 2008/0205355 A1 | 8/2008 | Liu et al. |
| 2008/0224891 A1 | 9/2008 | Ehrke et al. |
| 2008/0225737 A1 | 9/2008 | Gong et al. |
| 2008/0238714 A1 | 10/2008 | Ehrke et al. |
| 2008/0238716 A1 | 10/2008 | Ehrke et al. |
| 2008/0272934 A1 | 11/2008 | Wang et al. |
| 2008/0310311 A1 | 12/2008 | Flammer et al. |
| 2008/0310377 A1 | 12/2008 | Flammer et al. |
| 2008/0317047 A1* | 12/2008 | Zeng ............... H04L 45/00 370/401 |
| 2009/0003214 A1 | 1/2009 | Vaswani et al. |
| 2009/0003232 A1 | 1/2009 | Vaswani et al. |
| 2009/0003243 A1 | 1/2009 | Vaswani et al. |
| 2009/0003356 A1 | 1/2009 | Vaswani et al. |
| 2009/0010178 A1 | 1/2009 | Tekippe |
| 2009/0034418 A1 | 2/2009 | Flammer, III et al. |
| 2009/0034419 A1 | 2/2009 | Flammer, III et al. |
| 2009/0034432 A1 | 2/2009 | Bonta et al. |
| 2009/0043911 A1 | 2/2009 | Flammer et al. |
| 2009/0046732 A1 | 2/2009 | Pratt, Jr. et al. |
| 2009/0055032 A1 | 2/2009 | Rodgers |
| 2009/0068947 A1 | 3/2009 | Petite |
| 2009/0077405 A1 | 3/2009 | Johansen |
| 2009/0079584 A1 | 3/2009 | Grady et al. |
| 2009/0082888 A1 | 3/2009 | Johansen |
| 2009/0096605 A1 | 4/2009 | Petite et al. |
| 2009/0102737 A1 | 4/2009 | Birnbaum et al. |
| 2009/0115626 A1 | 5/2009 | Vaswani et al. |
| 2009/0134969 A1 | 5/2009 | Veillette |
| 2009/0135716 A1 | 5/2009 | Veillette |
| 2009/0135824 A1* | 5/2009 | Liu ............... H04L 45/02 370/392 |
| 2009/0135843 A1 | 5/2009 | Veillette |
| 2009/0161594 A1 | 6/2009 | Zhu et al. |
| 2009/0167547 A1 | 7/2009 | Gilbert |
| 2009/0168846 A1 | 7/2009 | Filippo, III et al. |
| 2009/0175238 A1 | 7/2009 | Jetcheva et al. |
| 2009/0179771 A1 | 7/2009 | Seal et al. |
| 2009/0235246 A1 | 9/2009 | Seal et al. |
| 2009/0243840 A1 | 10/2009 | Petite et al. |
| 2009/0245270 A1 | 10/2009 | Van Greunen et al. |
| 2009/0262642 A1 | 10/2009 | Van Greunen et al. |
| 2009/0267792 A1 | 10/2009 | Crichlow |
| 2009/0285124 A1 | 11/2009 | Aguirre et al. |
| 2009/0303972 A1 | 12/2009 | Flammer, III et al. |
| 2009/0315699 A1 | 12/2009 | Satish et al. |
| 2009/0319672 A1 | 12/2009 | Reisman |
| 2009/0320073 A1 | 12/2009 | Reisman |
| 2010/0037069 A1 | 2/2010 | Deierling et al. |
| 2010/0037293 A1 | 2/2010 | Stjohns et al. |
| 2010/0040042 A1 | 2/2010 | Van Greunen et al. |
| 2010/0060259 A1 | 3/2010 | Vaswani et al. |
| 2010/0061350 A1 | 3/2010 | Flammer, III |
| 2010/0073193 A1 | 3/2010 | Flammer, III |
| 2010/0074176 A1 | 3/2010 | Flammer, III et al. |
| 2010/0074304 A1 | 3/2010 | Flammer, III |

FOREIGN PATENT DOCUMENTS

| | | |
|---|---|---|
| EP | 812502 B1 | 8/2004 |
| EP | 740873 B1 | 12/2005 |
| JP | 10070774 A | 3/1998 |
| JP | 10135965 A | 5/1998 |
| WO | WO-9512942 A1 | 5/1995 |
| WO | WO-9610307 A1 | 4/1996 |
| WO | WO-0054237 A1 | 9/2000 |
| WO | WO-0155865 A1 | 8/2001 |
| WO | WO-0126334 A9 | 5/2002 |
| WO | WO-03015452 A3 | 5/2003 |
| WO | WO-2005091303 A1 | 9/2005 |
| WO | WO-2006059195 A1 | 6/2006 |
| WO | WO-2007015822 A1 | 2/2007 |
| WO | WO-2007132473 A1 | 11/2007 |
| WO | WO-2008033514 A2 | 3/2008 |
| WO | WO-2008033287 A3 | 6/2008 |
| WO | WO-2008092268 A1 | 8/2008 |
| WO | WO-2008027457 A3 | 12/2008 |
| WO | WO-2008038072 A3 | 4/2009 |

OTHER PUBLICATIONS

Kahn et al., "Advances in packet radio technology", Proceedings of the IEEE, vol. 66, Issue 11, pp. 1468-1496, Nov. 1978.

Shoch et al., "Interconnecting local networks via the Packet Radio Network", Proceeding SIGCOMM '79 Proceedings of the sixth symposium on Data communications, pp. 153-158, 1979.

Sunshine, "Addressing Problems in Multi-Network Systems", Proceedings of INFOCOM 1982, IEEE 1982, pp. 12-18, Apr. 1981.

Postel, "Transmission Control Protocol", Sep. 1981.

Hinden et al., "The DARPA Internet Gateway", DARPA RFC 823, Sep. 1982.

Shacham et al., "Dynamic Routing for Real-Time Data Transport in Packet Radio Networks", Proceedings of INFOCOM 1982, IEEE 1982, pp. 152-158, 1982.

MacGregor et al., "Multiple Control Stations in Packet Radio Networks", 1982 IEEE Military Communications Conference, vol. 3, pp. 10.3-1-10.3-5, Oct. 1982.

Brayer, "Implementation and performance of survivable computer communication with autonomous decentralized control", Communications Magazine, IEEE, vol. 21, Issue 4, pp. 34-41, Jul. 1983.

Hahn et al., "Packet radio network routing algorithms: A survey", Communications Magazine, IEEE, vol. 22, Issue 11, pp. 41-47, Nov. 1984.

Tobagi et al., "Packet Radio and Satellite Networks", IEEE Communications Magazine, vol. 22, Issue 11, pp. 24-40, Nov. 1984.

Shacham et al., "Future Directions in Packet Radio Technology", Proc. of the IEEE INFOCOM, 1985 at 93, Mar. 1985.

Jubin, "Current Packet Radio Network Protocols", Proc. of the IEEE Infocom1985 at 86, pp. 86-92, Mar. 1985.

Tornow, "Functional Summary of the DARPA SURAP1 Network", DARPA, Sep. 1986.

Shacham et al., "Packet Radio Networking", Telecommunications, vol. 20, Issue 9, pp. 42-48, Sep. 1986.

Garcia-Luna-Aceves, "A Fail-Safe Routing Algorithm for Multihop Packet-Radio Networks", IEEE INFOCOM '86, pp. 434-443, 1986.

Shacham et al., "Future Directions in Packet Radio Architectures and Protocols", Proc. of the IEEE, vol. 75, Issue 1, pp. 83-99, Jan. 1987.

(56) References Cited

OTHER PUBLICATIONS

Jubin et al., "The DARPA Packet Radio Network Protocols", Proc. of the IEEE, vol. 75, Issue 1, pp. 21-32, Jan. 1987.
Leiner et al., "Issues in Packet Radio Network Design", Proceedings of the IEEE, vol. 75, Issue 1, pp. 6-20, Jan. 1987.
Davies et al., "The Application of Packet Switching Techniques to Combat Net Radio", Proceedings of the IEEE, vol. 75, Issue 1, pp. 43-55, Jan. 1987.
Shacham et al., "Network Control and Data Transport for C3I Applications", Military Communications Conference—Crisis Communications: The Promise and Reality, 1987. MILCOM 1987. IEEE, vol. 2, pp. 0633-0638, Oct. 1987.
Lewis et al., "Packet-Switching Applique for Tactical VHF Radios", Military Communications Conference—Crisis Communications: The Promise and Reality, 1987. MILCOM 1987. IEEE, vol. 2, pp. 0449-0455, Oct. 1987.
Shacham et al., "A Packet Radio Network for Library Automation", Military Communications Conference—Crisis Communications: The Promise and Reality, 1987. MILCOM 1987. IEEE, vol. 2, pp. 0456-0462, Oct. 1987.
Lynch et al., "Packet Radio Networks", Bergamon Press, pp. 259-274, 1987.
Bruninga, "USN, A Worldwide Packet Radio Network", Signal, vol. 42, Issue 10, pp. 221-230, Jun. 1988.
Garcia-Luna-Aceves, "Routing Management in Very Large-Scale Networks", North-Holland, Future Generations Computer Systems, vol. 4, Issue 2, pp. 81-93, Sep. 1986.
Frank, "Transmission of IP Datagrams Over NET/ROM Networks", Proc. of the ARRL 7th Computer Networking Conference 1988 at 65, 1988.
Zander et al., "The SOFTNET Project: A Retrospect", Electrotechnics, 1988. Conference Proceedings on Area Communication, Eurocon 88, 8th European Conference on, pp. 343-345, Jun. 1988.
Garcia-Luna-Aceves, "A Minimum-hop Routing Algorithm Based on Distributed Information", Computer Networks and ISDN Systems, vol. 16, Issue 5, pp. 367-382, May 1989.
Carlisle, "Edison's NetComm Project", Rural Electric Power Conference, 1989. Papers Presented at the 33rd Annual Conference, B5/1-B5/4, pp. B5/1-B5/4, 1989.
Harrison, "Microwave Radio in the British TeleCom Access Network", Second IEE National Conference on Telecommunications, Conference Publication No. 300, pp. 208-213, 1989.
Beyer, "Accomplishments of the DARPA SURAN Program", Military Communications Conference, 1990. MILCOM '90, Conference Record, A New Era. 1990 IEEE, vol. 2, pp. 855-862, 1990.
Rustad et al., "New Radio Networks for Tactical Communication", IEEE Journal on Selected Areas in Communications, vol. 8, Issue 5, pp. 713-727, Jun. 1990.
Hamilton et al., "Optimal routing in multihop packet radio networks", INFOCOM '90, Ninth Annual Joint Conference of the IEEE Computer and Communication Societies. The Multiple Facets of Integration. Proceedings, IEEE, vol. 2, pp. 389-396, Jun. 1990.
Hubner et al., "A Distributed Multihop Protocol for Mobile Stations to Contact a Stationary Infrastructure", Telecommunications, 1991. Third IEE Conference on, pp. 204-207, Mar. 1991.
Cohen et al., "Addressing and Routing in a Local Wireless Network", IEEE INFOCOM, 1992.
Tamtomo, "A prototype of TCP/IP-based InterNet-PRNet for land information networks and services", Department of Surveying Engineering, University of New Brunswick, Jan. 25, 1993.
Jiménez-Cedeño, "Centralized Packet Radio Network: A Communication Approach Suited for Data Collection in a Real-Time Flash Flood Prediction System", Proceeding SAC '93 Proceedings of the 1993 ACM/SIGAPP symposium on Applied computing: states of the art and practice, pp. 709-713, 1993.
Johnson, "Mobile Host Internetworking Using IP Loose Source Routing", Carnegie Mellon University CMU-CS-93-128, DARPA, pp. 1-14, Feb. 1993.
Dadej et al., "Interconnected mobile radio networks—a step towards integrated multimedia military communications", Networks, 1993. International Conference on Information Engineering '93. 'Communications and Networks for the Year 2000', Proceedings of IEEE Singapore International Conference on, vol. 1, pp. 152-156 Sep. 1993.
Perkins et al., "Mobility Support in IPv6", Sep. 22, 1994.
Perkins et al., "Highly Dynamic Destination-Sequences Distance-Vector Routing (DSDV) for Mobile Computer", ACM SIGCOMM Computer Communication Review, vol. 24, Issue 4, pp. 234-244, Oct. 1994.
Johnson et al., "Route Optimization in Mobile IP", Nov. 28, 1994.
Perkins et al., "A Mobile Networking System Based on Internet Protocol", IEEE Personal Communications, IEEE 1994, pp. 32-41, 1994.
Wahhab, "Multi-Path Routing Protocol for Rapidly Deployable Radio Networks", Thesis submitted to the Department of Electrical Engineering and Computer Science of the University of Kansas, pp. 1-59, 1994.
Mak et al., "Design Considerations for Implementation of Large Scale Automatic Meter Reading Systems", IEEE Transactions on Power Delivery, vol. 10, Issue 1, pp. 97-103, Jan. 1995.
Hortos, "Application of Neural Networks to the Dynamic Spatial Distribution of Nodes within an Urban Wireless Network", SPIE, 2492, Applications and Science of Artificial Neural Networks, Apr. 6, 1995.
Gerla et al., "Multicluster, Mobile, Multimedia Radio Network", Wireless Networks 1, pp. 255-265, 1995.
Johnson et al., "Routing in Ad Hoc Networks of Mobile Hosts", Workshop on Mobile Computing Systems and Applications, pp. 158-163, 1995.
Eng et al., "Bahama: A Broadband Ad-Hoc Wireless ATM Local-Area Network", IEEE International Conference on Communications, vol. 2, pp. 1216-1223, Jun. 1995.
Eng et al., "BAHAMA: A Broadband Ad-Hoc Wireless ATM Local-Area Network", IEEE International Conference on Communications, ICC '95 Seattle, 'Gateway to Globalization', vol. 2, pp. 1216-1223, Jun. 1995.
Johnson et al., "Routing in Ad Hoc Networks of Mobile Hosts", IEEE, pp. 158-163, 1995.
Johnson et al., "Protocols for Adaptive Wireless and Mobile Networking", IEEE Personal Communications, pp. p. 34-42, Feb. 1996.
Alwan, et al., "Adaptive Mobile Multimedia Networks", IEEE Personal Communications, pp. 34-51, Apr. 1996.
Toh et al., "A Novel Distributed Routing Protocol to Support Ad-Hoc Mobile Computing", Conference Proceedings of the 1996 IEEE Fifteenth Annual International Phoenix Conference on Computers and Communications, pp. 480-486, 1996.
Chen et al., "Route Optimization and Locations Updates for Mobile Hosts", Proceedings of the 16.sup.th ICDCS, pp. 319-326, 1996.
Hall, "Tactical Internet System Architecture for the Task Force XXI", IEEE, pp. 219-230, 1996.
Johnson et al., "Dynamic Source Routing in Ad Hoc Wireless Networks", The Kluwer International Series in Engineering and Computer Science vol. 353, pp. 153-181, 1996.
Cleveland, "Performance and Design Considerations for Mobile Mesh Networks", Military Communications Conference, 1996. MILCOM '96, Conference Proceedings, IEEE, vol. 1, pp. 245-249, Oct. 1996.
Corson et al., "Architectural Considerations for Mobile Mesh Networking", IEEE MILCOM 96, vol. 1, pp. 225-229, Oct. 1996.
Schulman et al., "SINCGARS Internet Controller—Heart of the Digitized Battlefield", Proceedings of the 1996 Tactical Communications Conference, pp. 417-421, 1996.
Katz et al., "The Case for Wireless Overlay Networks" Electrical Engineering and Computer Science Department, University of California, Berkeley, 1996.
Broch et al., "The Dynamic Source Routing Protocol for Mobile Ad Hoc Networks", Mar. 13, 1998.

(56) References Cited

OTHER PUBLICATIONS

Broch et al., "A Performance Comparison of Multi-Hop Wireless Ad Hoc Network Routing Protocols" Proceedings of the Fourth Annual ACM/IEEE International Conference in Mobile Computing and Networking (MobiCom '98), Dallas, Texas, pp. 85-97, Oct. 1998.
Broch et al., "Supporting Hierarchy and Heterogeneous Interfaces in Multi-Hop Wireless Ad Hoc Networks", Proceedings of the Fourth International Symposium on Parallel Architectures, Algorithms, and Networks (I-SPAN '99), pp. 370-375, Jun. 1999.
Privat, "A System-Architecture Viewpoint on Smart Networked Devices" Microelectronic Engineering, vol. 54, pp. 193-197, Dec. 2000.
Jonsson et al., "MIPMANET—Mobile IP for Mobile Ad Hoc Networks," MobiHOC 2000, First Annual Workshop on Mobile and Ad Hoc Networking and Computing, pp. 75-85, 2000.
Hubaux et al., "Towards Mobile Ad-Hoc WANs: Terminodes," 2000 IEEE, Wireless Communications and Networking Conference, WCNC, vol. 3, pp. 1052-1059, 2000.
Lee, "Ricocheting Bluetooth," 2nd International Conference on Microwave and Millimeter Wave Technology Proceedings, ICMMT 2000, pp. 432-435, 2000.
Lilja, "Mobile Energy Supervision," Twenty-second International Telecommunications Energy Conference, 2000 INTELEC, pp. 707-712, 2000.
Parkka, et al., "A Wireless Wellness Monitor for Personal Weight Management", Proceedings of the 2000 IEEE EMBS International Conference on Information Technology Applications in Biomedicine, pp. 83-88, 2000.
Miklos et al., "Performance Aspects of Bluetooth Scatternet Formation," First Annual Workshop on Mobile and Ad Hoc Networking and Computing, MobiHOC 2000, pp. 147-148, 2000.
Kapoor et al., "Multimedia Support Over Bluetooth Piconets," First Workshop on Wireless Mobile Internet, pp. 50-55, Jul. 2001.
Sung-Yuan, "The Embedded Bluetooth CCD Camera," TENCON, Proceedings of the IEEE Region 10 International Conference on Electrical and Electronic Technology, vol. 1, pp. 81-84, Aug. 2001.
Lim, "Distributed Services for Information Dissemination in Self-Organizing Sensor Networks", Journal of the Franklin Institute, vol. 338, Issue 6, pp. 707-727, Sep. 2001.
Meguerdichian et al., "Localized Algorithms in Wireless Ad-Hoc Networks: Location Discovery and Sensor Exposure", ACM Symposium on Mobile Ad Hoc Networking & Computing, MobiHOC 2001, pp. 106-116, Oct. 2001.
Lilakiatsakun et al., "Wireless Home Networks Based on a Hierarchical Bluetooth Scatternet Architecture", Proceedings of the Ninth IEEE International Conference on Networks, pp. 481-485, Oct. 2001.
Jha et al., "Universal Network of Small Wireless Operators (UNSWo)", Proceedings of the First IEEE/ACM International Symposium on Cluster Computing and the Grid, pp. 626-631, 2001.
Perkins et al., "Ad Hoc On-Demand Distance Vector (AODV) Routing," Network Working Group Internet Draft, XX, Nov. 9, 2001.
Younis et al., "Energy-Aware Routing in Cluster-Based Sensor Networks," Modeling, Analysis and Simulation of Computer and Telecommunications Systems, 10.sup.th IEEE Proceedings on Mascots, Oct. 2002.
"AMRON Technologies Successfully Deploys Advanced Metering Solution for C&I Customers Using Bluetooth", Sep. 2, 2004.
"Exclusive Distributors of Dynamic Virtual Metering", Utility Intelligence, 2004-2005.
"Request for Proposal for Smart Metering Services", Hydro One Networks, Inc., Mar. 4, 2005.
"AMRON Meter Management System".
Reexamination U.S. Appl. No. 90/008,011, filed Jul. 24, 2006.
Leis, "TCP/IP Protocol Family", Apr. 3, 2006.
"The Trilliant AMI Solution", Trilliant Networks, RFP SCP-07003, Mar. 22, 2007.
Culler et al., "Routing Requirements for Low Power and Lossy Networks", IETF Standard-Working-Draft, Internet Engineering Task Force, IETF, CH, No. 1, pp. 1-12, Jul. 7, 2007.
Baumann et al., "Routing Packets Into Wireless Mesh Networks," Wireless and Mobile Computing, Networking and Communications, 2007, WIMOB 2007, Third IEEE International Conference, Piscataway, NJ, Oct. 8, 2007.
Vasseur et al., "Overview of Existing Routing Protocols for Low Power and Lossy Networks," draft-levis-rl2n-overview-protocols-02.txt, IETF Standard-Working-Draft, Internet Engineering Task Force, IETF, Ch, No. 2, Nov. 17, 2007.
"ZigBee Smart Energy Profile Specification," ZigBee Profile 0x0109, Revision 14, Document 075356r14, May 29, 2008.
International Search Report and Written Opinion for Application No. PCT/US08/13020, dated Jan. 9, 2009.
International Search Report and Written Opinion for Application No. PCT/US08/13016, dated Jan. 9, 2009.
International Search Report and Written Opinion for Application No. PCT/US08/13030, dated Jan. 9, 2009.
International Search Report and Written Opinion for Application No. PCT/US08/13023, dated Jan. 12, 2009.
International Search Report and Written Opinion for Application No. PCT/US08/13019, dated Jan. 12, 2009.
International Search Report and Written Opinion for Application No. PCT/US08/13025, dated Jan. 13, 2009, 7 pp.
International Search Report and Written Opinion for Application No. PCT/US08/13024, dated Jan. 13, 2009, 9 pp.
International Search Report and Written Opinion for Application No. PCT/US08/13028, dated Jan. 15, 2009.
International Search Report and Written Opinion for Application No. PCT/US08/13021, dated Jan. 15, 2009.
International Search Report and Written Opinion for Application No. PCT/US08/13022, dated Jan. 27, 2009.
International Search Report and Written Opinion for Application No. PCT/US08/13018, dated Jan. 30, 2009.
International Search Report and Written Opinion for Application No. PCT/US08/13029, dated Feb. 2, 2009.
International Search Report and Written Opinion for Application No. PCT/US08/13027, dated Feb. 9, 2009, 6 pp.
International Search Report and Written Opinion for Application No. PCT/US08/13026, dated Feb. 24, 2009.
International Search Report and Written Opinion for Application No. PCT/US08/12161, dated Mar. 2, 2009.
International Search Report and Written Opinion for Application No. PCT/US08/13017, dated Mar. 18, 2009.
International Search Report and Written Opinion for Application No. PCT/US08/13032, dated May 12, 2009, 14 pp.
International Search Report and Written Opinion for Application No. PCT/US09/05008, dated Oct. 22, 2009, 8 pp.
International Search Report for Application No. PCT/US10/26956, dated May 19, 2010, 2 pp.
Supplementary European Search Report for Application No. EP 08 85 1132, dated Dec. 6, 2010, 9 pp.
Supplementary European Search Report for Application No. EP 08 85 1927, dated Dec. 22, 2010, 10 pp.
Supplementary European Search Report for Application No. EP 08 85 1869, dated Dec. 30, 2010, 7 pp.
Supplementary European Search Report for Application No. EP 08 85 3052, dated Mar. 18, 2011, 10 pp.
Supplementary European Search Report for Application No. EP 08 85 2992, dated Mar. 23, 2011, 6 pp.
Supplementary European Search Report for Application No. EP 08 85 1560, dated Mar. 24, 2011, 9 pp.

* cited by examiner

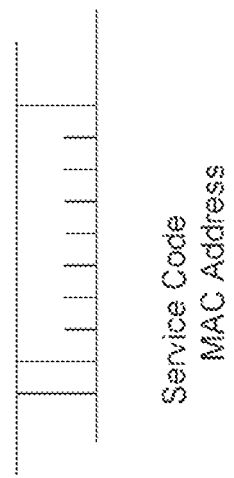

Service Code
Secure Node
Secondary Network
Device Type
Receiver On When Idle
Information Reported
Keep Alive Period
MAC address SMIB Write Toggle
Node Key-1 Write Toggle
Node Key-0 Write Toggle
Node Key-1 Write Toggle
Maintenance Key-1 Write Toggle
Maintenance Key-0 Write Toggle
Current Node Key ID
Current Mesh Key ID
Current Maintenance Key ID
Secondary Node Key Allowed
Secondary Mesh Key Allowed
Secondary Maintenance Key
Optical extension, see description bellow

FIG. 55

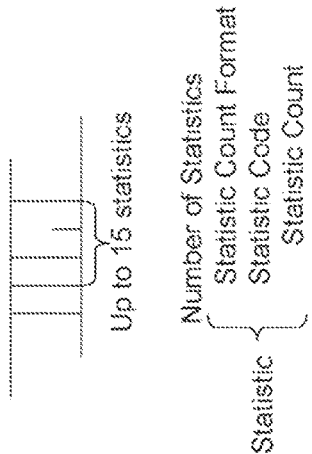

FIG. 57

Up to 8 groups
Number Of Group Addresses
Group Address

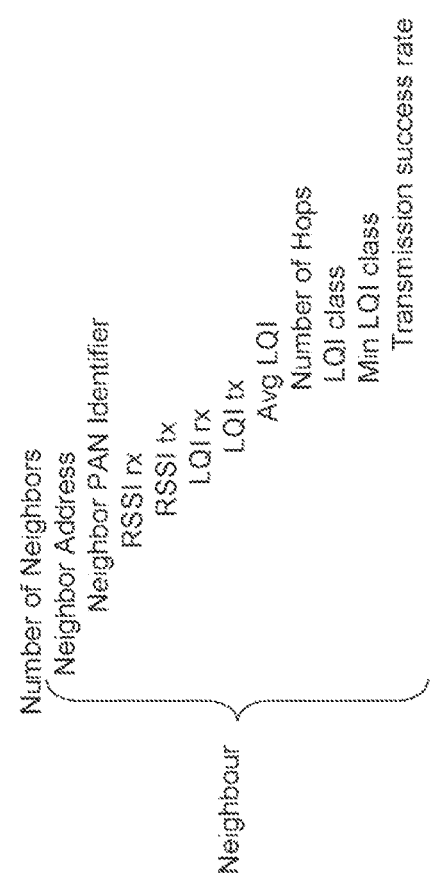

FIG. 59

Up to 15 statistics
Number of Statistics
Statistic Count Format
Statistic Code
Statistic Count

FIG. 56

Up to (MAX_HOPS−1)
Number of Hop
Hop PAN identifier
Hop Addresses

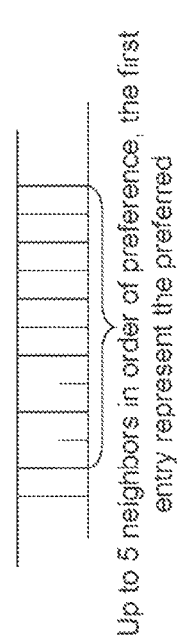

FIG. 58

Up to 5 neighbors in order of preference, the first entry represent the preferred Number of Neighbors
Neighbor Address
Neighbor PAN Identifier
RSSI rx
RSSI tx
LQI rx
LQI tx
Avg LQI
Number of Hops
LQI class
Min LQI class
Transmission success rate Neighbour

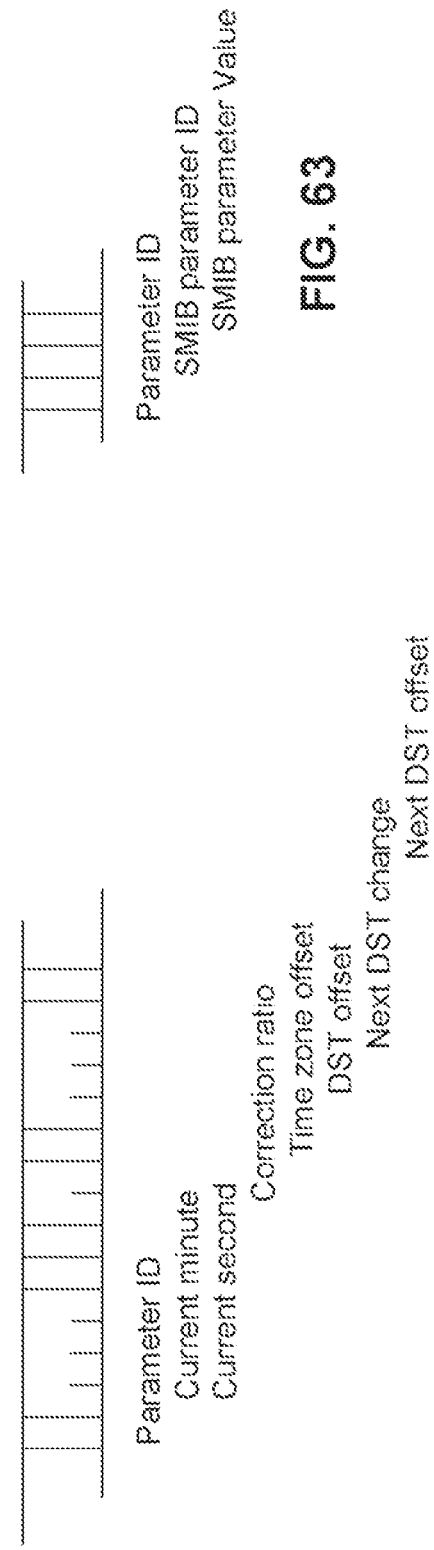

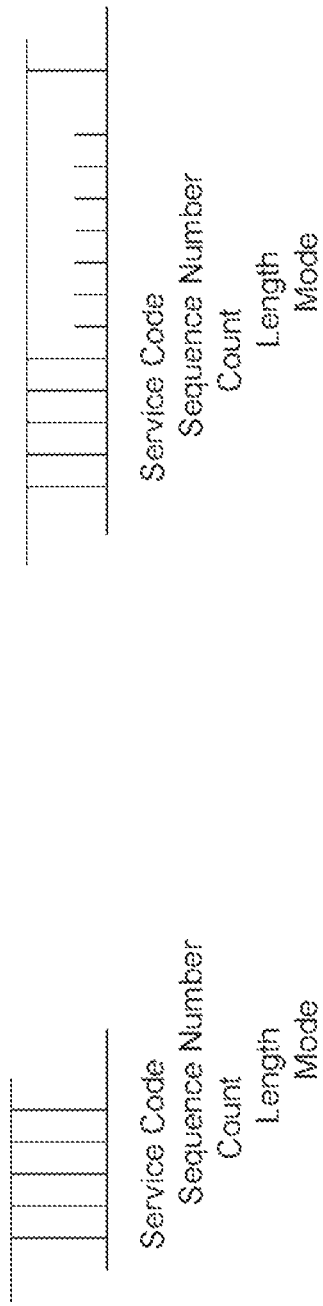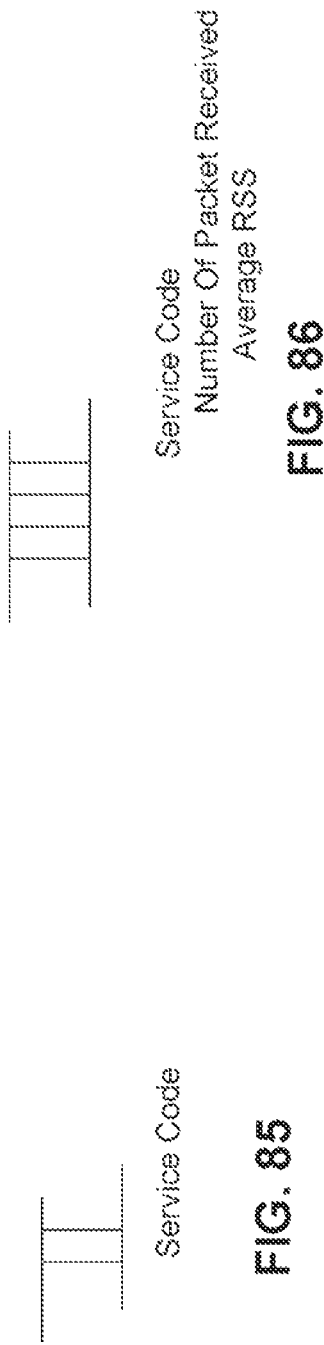

FIG. 89 — Network Name
FIG. 90 — Security Enable Flag, Owner Field Length, Firmware version, Firmware revision, Owner, Bar code id

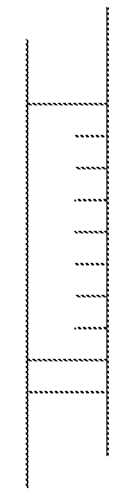
FIG. 92
FIG. 93
FIG. 94
FIG. 95

SYSTEM AND METHOD FOR IMPLEMENTING MESH NETWORK COMMUNICATIONS USING A MESH NETWORK PROTOCOL

CROSS-REFERENCE TO RELATED APPLICATIONS

The present application claims the benefit of U.S. provisional patent application Ser. No. 61/094,116 entitled "Message Formats and Processes for Communication Across a Mesh Network," filed Sep. 4, 2008 which is incorporated herein by reference in its entirety.

The present application hereby references and incorporates by reference each of the following United States patent applications:

Ser. No. 12/275,236 entitled "Point-to-Point Communication Within a Mesh Network", filed Nov. 21, 2008;

Ser. No. 12/275,305 entitled "Transport Layer and Model For an Advanced Metering Infrastructure (AMI) Network," filed Nov. 21, 2008;

Ser. No. 12/275,237 entitled "System and Method For Application Layer Time Synchronization Without Creating a Time Discrepancy or Gap in Time", filed Nov. 21, 2008;

Ser. No. 12/275,238 entitled "Communication and Message Route Optimization and Messaging in a Mesh Network," filed Nov. 21, 2008;

Ser. No. 12/275,242 entitled "Collector Device and System Utilizing Standardized Utility Metering Protocol," filed Nov. 21, 2008;

Ser. No. 12/275,251 entitled "Power-Conserving Network Device For Advanced Metering Infrastructure", filed Nov. 21, 2008;

Ser. No. 12/275,252 entitled "Method and System For Creating and Managing Association and Balancing of a Mesh Device in a Mesh Network", filed Nov. 21, 2008;

Ser. No. 12/275,257 entitled "System and Method for Operating Mesh Devices in Multi-Tree Overlapping Mesh Networks," filed Nov. 21, 2008; and Ser. No. 61/094,144 entitled "Framework For Implementing Mesh Network Layers", filed Sep. 4, 2008.

BACKGROUND OF THE INVENTION

Field of the Invention

This invention pertains generally to a protocol layer for facilitating the creation and maintenance of a secure mesh network. More particularly, preferred embodiments of the invention describe data structures, communication protocol formats and process flows for controlling and facilitating secure communications between the nodes of a mesh network, such as utility meters and gateway devices comprising a utility network.

Summary of the Background Art

A mesh network is a wireless network configured to route data between nodes within a network. It allows for continuous connections and reconfigurations around broken or blocked paths by retransmitting messages from node to node until a destination is reached. Mesh networks differ from other networks in that the component parts can all connect to each other via multiple hops. Thus, mesh networks are self-healing: the network remains operational when a node or a connection fails.

Advanced Metering Infrastructure (AMI) or Advanced Metering Management (AMM) are systems that measure, collect and analyze utility usage, from advanced devices such as electricity meters, gas meters, and water meters, through a network on request or a predefined schedule. This infrastructure includes hardware, software, communications, customer associated systems and meter data management software. The infrastructure collects and distributes information to customers, suppliers, utility companies and service providers. This enables these businesses to either participate in, or provide, demand response solutions, products and services. Customers may alter energy usage patterns from normal consumption patterns in response to demand pricing. This improves system load and reliability.

A meter may be installed on a power line, gas line, or water line and wired into a power grid for power. Newly installed meters may associate with a specified network identifier entered by a user during installation. Alternatively, the user may initiate an association window during which a meter may associate with a nearby mesh network.

SUMMARY OF THE INVENTION

In accordance with an embodiment of the present invention, a method of associating a device to a mesh network is described. The method includes selecting a network for association including: requesting, by the device, neighbor information from neighboring devices which may belong to one or more networks, receiving, at the device from one or more neighboring devices, neighbor information for each of the one or more neighboring devices, applying an association ratio algorithm to the received neighbor information to determine which of the one or more networks to select for association. The method further includes selecting a router within the selected network through which to proxy messages by applying a preferred route ratio algorithm; sending a network association request from the device through the router to a network coordinator; and at the network coordinator, performing one of the following in response to the network association request: validating the association request with an association response message which includes the short address for this device, or not responding to the network association request. The method further includes constructing, at the device, an initial neighborhood table.

In accordance with another embodiment of the present invention, a process for routing data frames from a first node to a second node within a network is described. The process includes: a tree routing sub-process, a source routing sub-process, a temporary routing sub-process and a mesh routing sub-process. The particular sub-process for routing a data frame from the first node the second nodes is selected in accordance with the following logic executed on a processor: if the data frame has a source route header the source routing sub-process is selected; if there is an entry for the target address in a temporary routing table, the temporary routing sub-process is selected; if the second node is a coordinator node, the tree routing sub-process is selected; and if the second node is not a coordinator node, the mesh routing sub-process is selected.

In accordance with another embodiment of the present invention, a process for discovering a route from a first node to a second node in a mesh network is described. The process includes broadcasting by the first node a route request message that is propagated across multiple nodes within the mesh network. The propagation follows a processor implemented process at the multiple nodes, including accepting a route request at a receiving node if (i) no previous received route request message had the same request ID, and (ii) the route request message is received through a link with a minimum LQI class at least equal to the requested one; identifying the receiving node as a route candidate if the route request message is accepted by an intermediate node; the route request is re-broadcasted. If the route request message is accepted the second node; sending a route reply message from the second node through the identified route candidate back to the first node to establish a static bidirectional route within the mesh network between the first node and the second node.

In accordance with a further embodiment of the present invention, a process for upgrading a route from a first node to a second node in a mesh network is described. The process includes: accepting a route request at a receiving node for upgrading the route if a route candidate already exists for the request ID, the request was received through a link with a minimum LQI class at least equal to the requested one and the request was received through a better link than the prior received one. These determinations are made according to the following sets of conditions: (i) the receiving node is a neighbor, the route request is received from a neighbor and a resulting route length is shorter; (ii) the receiving node is not a neighbor, the route request is received from a neighbor and a resulting route length is shorter or equal to existing route length; (iii) the receiving node is not a neighbor, the route request is received from a non-neighbor and a resulting route length is shorter. If the conditions are not met, the route request is rejected.

In accordance with a further embodiment of the present invention, a process for requesting a route from a first node to a second node within a mesh network is described. The process includes: transmitting a route request message to a pre-determined coordinator node, wherein the route request message includes a long address for the second node; constructing at the coordinator node a route through one or more routing nodes from the first node to the second node; and transmitting a response to the route request message to the first node including the route to the second node, wherein the route includes an assigned short address for the second node.

In accordance with a further embodiment of the present invention, a data structure for securing data frames transmitted in a single hop within a mesh network from a first node to a second node is described. The data structure includes a data link layer (DLL) security header located after a service-type octet when a predetermined security header flag is selected within the service-type octet. The DLL security header including: a first set of bits containing a portion of a transmitted nonce count; a bit following the first set of bits containing a key identifier (ID), wherein the key ID selects a current version of a key used for calculating a message integrity check (MIC); and a second set of bits containing the MIC.

In accordance with a further embodiment of the present invention, a process for validating integrity of message data transmitted in a single hop from a first node to a second node within a mesh network is described. The process including: checking at a processor of the second node the 23 least significant bits (0-22) of a count transmitted from the first node against a last authenticated count; if the transmitted count value is greater than the last authenticated count, combining at a processor of the second node, the 23 least significant bits (0-22) with the 17 most significant bits (23-39) of the last authenticated count to form a revised count; if the transmitted count value is lower than the last authenticated count, incrementing the value of bits 23 through 29 by one before combining at a processor of the second node, the 23 least significant bits (0-22) with the 17 most significant bits (23-39) of the last authenticated count to form a revised count; calculating at the processor of the second node a message integrity check (MIC) value using the revised count and pre-selected key; if the calculated MIC value equals a received MIC value, then the message data integrity is validated.

In accordance with a further embodiment of the present invention, a data structure for securing data frames transmitted in multiple hops using multiple nodes across a mesh network. The data structure including a network security header located after a data link layer (DLL) security layer within a mesh header. The network security header including: a first set of bits containing a network count; a bit following the first set of bits containing a network key identifier (ID); and a second set of bits containing a network message integrity check (MIC).

In accordance with a further embodiment of the present invention, a process for validating integrity of a data frame transmitted in multiple hops using multiple nodes across a mesh network. The process including: receiving a data frame at a receiver node, wherein the data frame includes a network security header including a network count, a network key identifier (ID) and a message integrity check (MIC); processing an identifier (ID) for an originating node that originated the data frame and a source field address to determine if the data frame was received from a coordinator node or a non-coordinator node; if the data frame was received from a coordinator node, the network key ID selects a node key for determining verification; if the data frame was received from a non-coordinator node, the network key ID selects a mesh key for determining verification. Further, when the received data frame is a request, a nonce is a combination of at least the network count, the originating node ID and an originating node address and the receiving node verifies the integrity of the frame by: adding a 0 to the network field to make a 40 bit field; calculating the received MIC using either the node key or the mesh key as identified by the network key ID; comparing the transmitted MIC with the received MIC, wherein the data frame is verified if the transmitted MIC is equal to the received MIC. And when the received data frame is a response, the network count is combined with the identifier and address for the target of the data frame and the originating node ID and an originating node address and the receiving node compares a network count in the response with a network count in the request, wherein the data frame is verified if the response network count is equal to the request network count.

BRIEF DESCRIPTION OF THE FIGURES

The following figures are intended to be read in conjunction with the specification set forth herein.

FIG. 54 shows a Frame format: Keep Alive Initiate in accordance with an embodiment of the present invention.

FIG. 55 shows a Frame format: Keep Alive Request in accordance with an embodiment of the present invention.

FIG. 56 shows a Frame format: Keep Alive Request: Optional extension: Trace Route in accordance with an embodiment of the present invention.

FIG. 57 shows a Frame format: Keep Alive Request: Optional extension: Multicast Group Addresses in accordance with an embodiment of the present invention.

FIG. 58 shows a Frame format: Keep Alive Request: Optional extension: Neighbors information in accordance with an embodiment of the present invention.

FIG. 59 shows a Frame format: Keep Alive Request: Optional extension: Statistics in accordance with an embodiment of the present invention.

FIG. 60 shows a Frame format: Keep Alive Response in accordance with an embodiment of the present invention.

FIG. 61 shows a Frame format: Keep Alive Response: Parameter list member: Current time in accordance with an embodiment of the present invention.

FIG. 62 shows a Frame format: Keep Alive Response: Parameter list member: Statistics in accordance with an embodiment of the present invention.

FIG. 63 shows a Frame format: Keep Alive Response: Parameter list member. SMIB parameter update in accordance with an embodiment of the present invention.

FIG. 83 shows a Frame format: Frame Reception Rate Test Init in accordance with an embodiment of the present invention.

FIG. 84 shows a Frame format: Frame Reception Rate Test Data in accordance with an embodiment of the present invention.

FIG. 85 shows a Frame format: Frame Reception Rate Test End in accordance with an embodiment of the present invention.

FIG. 86 shows a Frame format: Frame Reception Rate Test Result in accordance with an embodiment of the present invention.

FIG. 89 shows a Frame format: Local Broadcast: Payload Content ID 1 in accordance with an embodiment of the present invention.

FIG. 90 shows a Frame format: Local Broadcast: Payload Content ID 2 in accordance with an embodiment of the present invention.

FIG. 92 shows a Frame format: Range Test Request in accordance with an embodiment of the present invention.

FIG. 93 shows a Frame format: Range Test Response in accordance with an embodiment of the present invention.

FIG. 94 shows a Frame format: Range Test Initiate in accordance with an embodiment of the present invention.

FIG. 95 shows a Frame format: Range Test Result in accordance with an embodiment of the present invention.

DETAILED DESCRIPTION OF THE INVENTION

Figure 1:
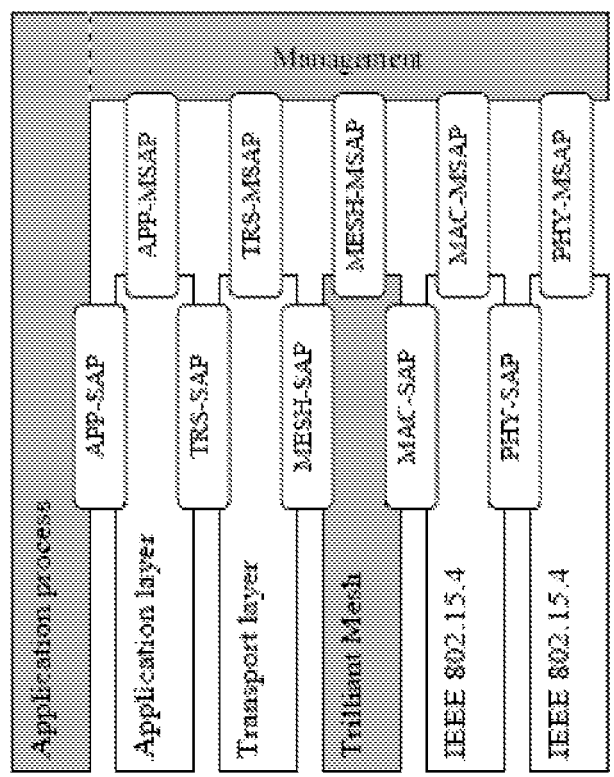
FIG. 1 shows a SecureMesh (SM) Architecture in accordance with an embodiment of the present invention.

The following charts of terms and acronyms are intended to define the frequently used terms in the context of the preferred embodiments of the present invention. The definitions provided are not intended to define the entire scope of the term. One skilled in the art appreciates the various alternatives and variations that are clearly within the scope of the invention as described.

Glossary of Terms:

Association Router—Router selected by a Node which is not yet a member of the network, to act as a proxy to send the Node's association request.

Child—In the context of tree routing, all Routers in single-hop radio frequency (RF) contact with a reference Router, with a hop count greater than the hop count of that reference. In the context of End Devices, a Child refers to an End Device of a specific Router through which it sends and receives messages.

Dedicated Router—A router manually configured to associate to a specific network to guarantee that the network covers a specific geographical region.

Device Key—A key unique to the device. The initial device key is assigned by its manufacturer and is unchangeable. A database for device IDs and initial Device Keys is made available to the system owner and is installed in the network's Configuration Host. A Device Key generated by a Configuration Host should be known only to the Configuration Host and the device. Device Keys are used only for securing Application Layer communication between the Configuration Host and the device. As such, they are not directly part of the SM protocol, which encompasses only the data link layers.

Frame—A data-link layer message.

Key ID—Keys are updated from time to time; the specific generation of key is identified within this specification with a single bit Key ID, which is the low-order (even/odd) bit of the actual key generation count.

Key Type—Each key type has a specific usage, scope and is associated to a specific management process. This specification supports three Key types: the Maintenance Key, the Mesh Key and the Node Key.

Maintenance Key—This key is shared by all the devices in all PANs that are administered by a single Configuration Host. The Maintenance Key is used for Association Request/Response messages and maintenance device point-to-point-secured communication messages. The Maintenance Key can be factory-assigned or is assigned by the Configuration Host; it can be updated by a Coordinator.

Mesh Key—This key is used for all DLL MIC calculations, except those secured by the Maintenance Key. It is also used for the Network MIC when the message is broadcast through the mesh or when the Network Security is used for device-to-device communication. The Mesh Key is common throughout a PAN, and to all interconnected PANs that are configured to support inter-PAN communications. The Mesh Key is assigned and updated by the Coordinator.

Network Name—Name assigned to a mesh network. Network names are typically assigned using a dot separated hierarchy with the first level representing all mesh networks forming a single AMI network. The typical format of a network name is "utility.area.coordinatorID".

Node Key—A unique key assigned to a device and used for secure communication between the Coordinator(s) and the device. It is primarily used for the Network MIC header calculation and for encrypting keys distributed by the Coordinator. The Node Key is initially assigned by the Configuration Host but it can be updated by either the Configuration Host or the Coordinator.

Node Type—Refers to the class of SM Node: Coordinator ($=11_b$), Router ($=10_b$), or End Device ($=01_b$).

Originator Count—The Originator Count, Orig. Count, is used as the nonce in the Network Security Header. Its value is the same as the Source Count value at the time the message is originated.

Parent—In the context of tree routing, all Routers that have a direct RF link with a reference Router and that have a hop count less than the hop count of that reference Router. In the context of an End Device, the Router used to send and receive messages on behalf of this End Device.

Frame—A network layer message that can traverse one or many hops.

SM Coordinator—Referenced within this document as Coordinator; this Node responsible for initializing the network, accepting association requests and assigning unique short addresses.

SM End Device—Referenced within this document as End Device; this Node is not capable of routing messages and can communicate only through its Parent. An End Device can be either always be listening or wake up periodically to synchronize with its Parent in order to minimize energy.

SM Node—Refers to a Node independently of its Node Type.

SM Router—Referenced within this document as Router; this Node is capable of managing routes and routing messages.

Sibling—In the context of tree routing, all Routers that have a direct RF link with a reference Router with a hop count equal to the hop count of that reference Router.

Sleeping End Device—A Sleeping End Device reduces it average power consumption by turning itself off for periods of time. It requires a Parent to store frames for it while it is sleeping. A Sleeping End Device cannot be used for routing.

Source Count—The Source Count, also referenced as Src. Count, is used as the nonce in the DLL Security Header. The Source Count is incremented with every message transmitted by the device.

Acronyms:

DLL—Data Link Layer, the data link layer provides device-to-device networking services in conjunction with the IEEE 802.15.4 MAC. For the SM system the DLL provides hop-by-hop security.

LQI—Link Quality Indicator a value based on the signal strength and other quality aspects of the received signal.

LQI class—Link quality between two Nodes expressed as four different classes: Good ($=11_b$), Normal ($=10_b$), Poor ($=01_b$) and No Connectivity ($=00_b$).

PAN—Personal Area Network, the IEEE 802.15.4 name for one of its networks, whether for personal use or not.

RSSI—Received Signal Strength Indication in dBm.

Figure 2:
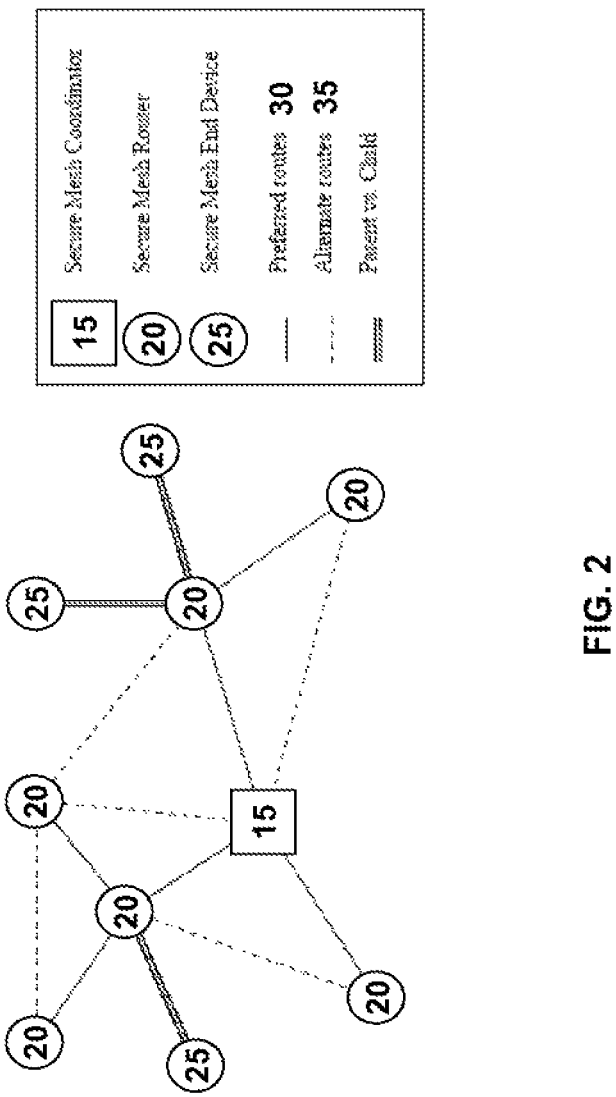
FIG. 2 shows an SM Example Topology in accordance with an embodiment of the present invention.

The following describes the message formats and the processes implemented by the SecureMesh protocol (hereafter "SM protocol") within a SecureMesh network (hereafter "SM network"). Referring to FIG. 1, the SM protocol in conjunction with the IEEE 802.15.4 MAC layer implement the Open Systems Interconnection ("OSI") Data-link. An exemplary SM network topology is shown in FIG. 2 and is composed of a coordinator 15, routers 20 and end devices 25 (generically referred to as "nodes"). The preferred routes 30 between routers 20 create a tree for which the root is the coordinator 15. Each node can be a member of trees of different adjacent networks, though any single network has only a single coordinator. A SM network may include non routing nodes called end devices which are associated to a preferred parent through which messages are sent and received. The SM protocol also supports routing of messages using alternate routes 35 when a preferred parent fails; this process is called local repair. In the preferred embodiments of the present invention, the nodes typically include utility meters and related devices, but the invention is not limited as such.

The transmission of messages between nodes defined by the SM protocol is governed by the following rules: (1) Fields are transmitted in their order of definition, from left to right when represented in a frame format diagram (see, for example, FIGS. 3-5), or from top (first) to bottom (last) when listed in a table; (2) All multi-octet fields are transmitted least significant octet first (little Endean); (3) Binary or string fields are transmitted serially starting at index zero. For backward compatibility reasons, short and long addresses can be configured as multi-octet fields transmitted least significant octet first, as specified by IEEE 802.15.4, or as binary fields transmitted serially. The transmission order of the addresses is controlled by the configuration parameter ADDRESS_TX_ORDER.

A critical process to SM network formation is the association process. The association process is used by nodes to become a member of an SM network or to evaluate their current association state. The association process incorporates the following primary functions: selection of a PAN; selection of an association router to proxy messages; association with the coordinator and the reception of a short address assignment; and construction of the initial neighborhood table.

As a first step in the association process, each device (referred to as a node once associated) must be commissioned with the network's node key and the network's maintenance key prior to associating with a network. The key commissioning process for a particular device is determined by the device's application. For example, the device may be configured at manufacturing, or by a maintenance tool, or through the Service Request and Service Response messages described in below. A quick summary of the association process is described, with a follow-on detailed description. A Neighbor Info Request is transmitted on each channel to locate and get information about neighbor nodes and neighbor SM networks. All nodes receiving the Neighbor Info Request respond with a Neighbor Info Response. A particular SM network is selected based on an Association Ratio algorithm, discussed further below. An Association Router, which is a member of the selected SM network, is selected based on the Preferred Route Ratio algorithm, also discussed below. An Association Request is transmitted to the selected Association Router by the requesting device. When the Association Router is not the Coordinator, the Association Request is repackaged and forwarded in the form of an Association Confirmation Request message to the Coordinator, using tree routing. If the Association Confirmation Request is received and validated, the Coordinator sends back the assigned short address in an Association Confirmation Response message, which is then repackaged and sent to the device as an Association Response message. Similarly, when the Coordinator receives the Association Request directly, it returns its response directly in an Association Response.

In the specific case of a successful association (i.e. the Association Status within the Association Response is set to successful), the Node sends a Neighbor Exchange message with the Immediate Broadcast Requested option set (discussed below) on the just associated SM network. As a result, this causes surrounding neighbors to broadcast a Neighbor Exchange message using a pseudo-random period within NEIGHBOR_EX_RND_PERIOD, thus allowing the Node to populate its Neighborhood Table right away.

Figure 3:
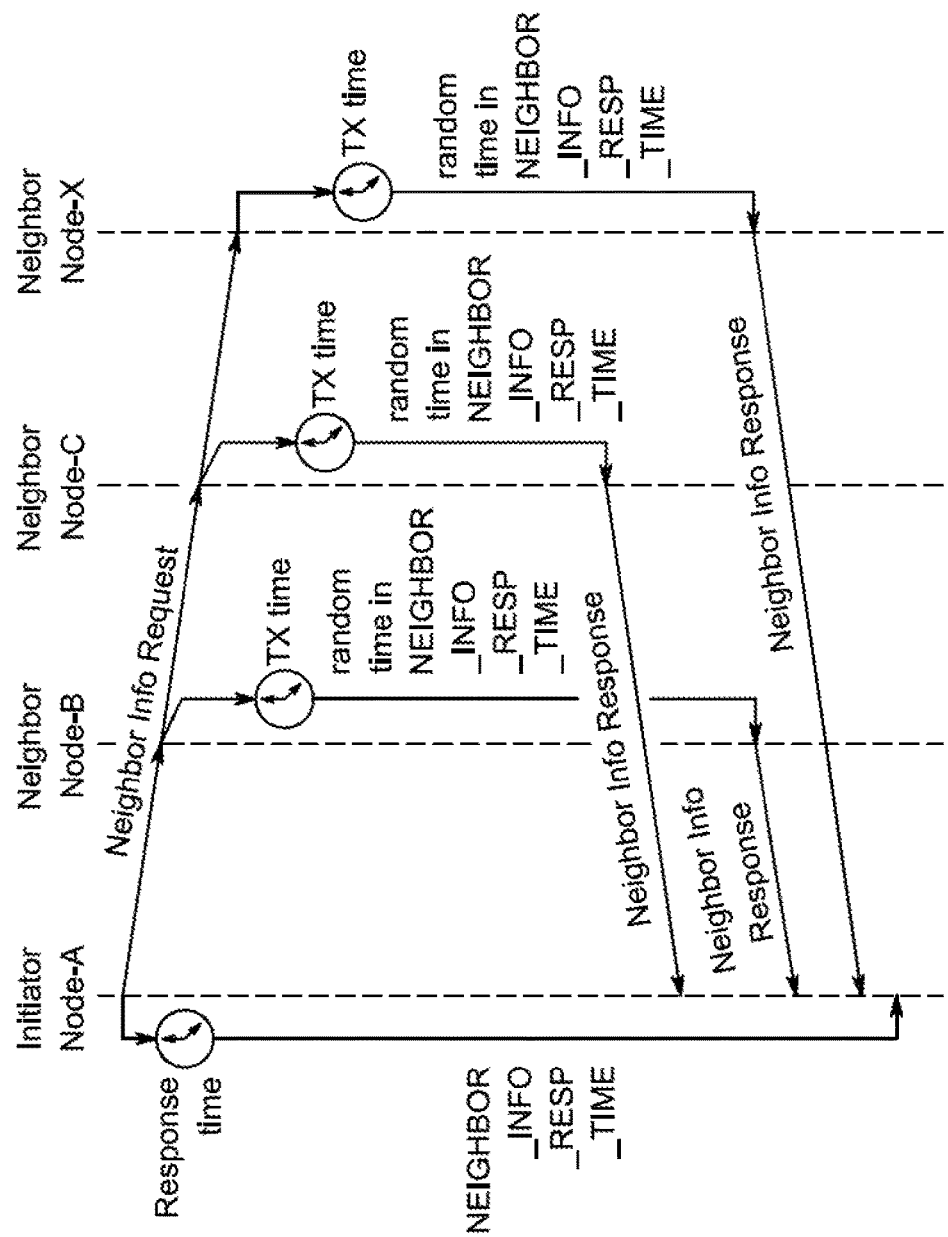
FIG. 3 shows a Neighbor Information Request Process in accordance with an embodiment of the present invention.

Device association is started with the neighbor information request process shown in FIG. 3. Node-A initiates the process with a Neighbor Info Request that is broadcasted on a channel and received by other Nodes in the neighborhood that are listening to that channel. Each Node receiving the message responds at a pseudo-random time in the interval given by the parameter NEIGHBOR_INFO_RESP_TIME. The IEEE 802.15.4 MAC, known to those skilled in the art and described in numerous publicly available documents, resolves most collisions that occur due to Nodes selecting the same response time. Node-A waits for the interval NEIGHBOR_INFO_RESP_TIME to receive all Neighbor Info Response messages from its neighbors. Once the Node has received neighbor(s) information, it can start the association process.

Figure 4:
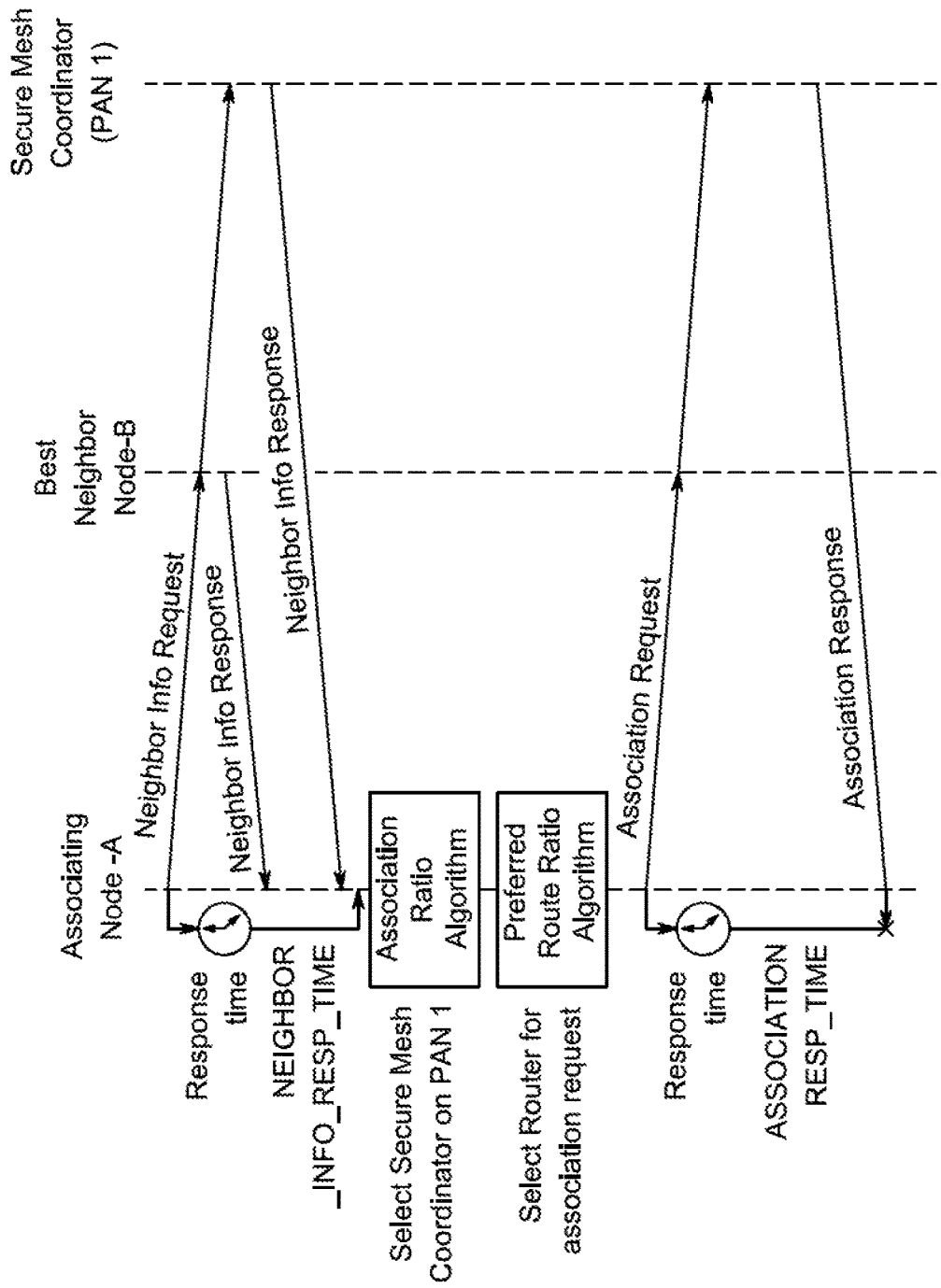
FIG. 4 shows an Association Process in accordance with an embodiment of the present invention.

In FIG. 4, Node-A is in the neighborhood of the Coordinator for PAN 1. As it receives Neighbor Info Response messages, it uses the Association Ratio algorithm and the Preferred Route Ratio algorithm to select PAN 1 and the Coordinator for PAN 1 as its Parent. In this case it sends its Association Request directly to the Coordinator and gets the Association Response back. Node-A expects to get a response back within a time period established by the ASSOCIATION_RESP_TIME parameter. This process is repeated on each available channel.

Figure 5:
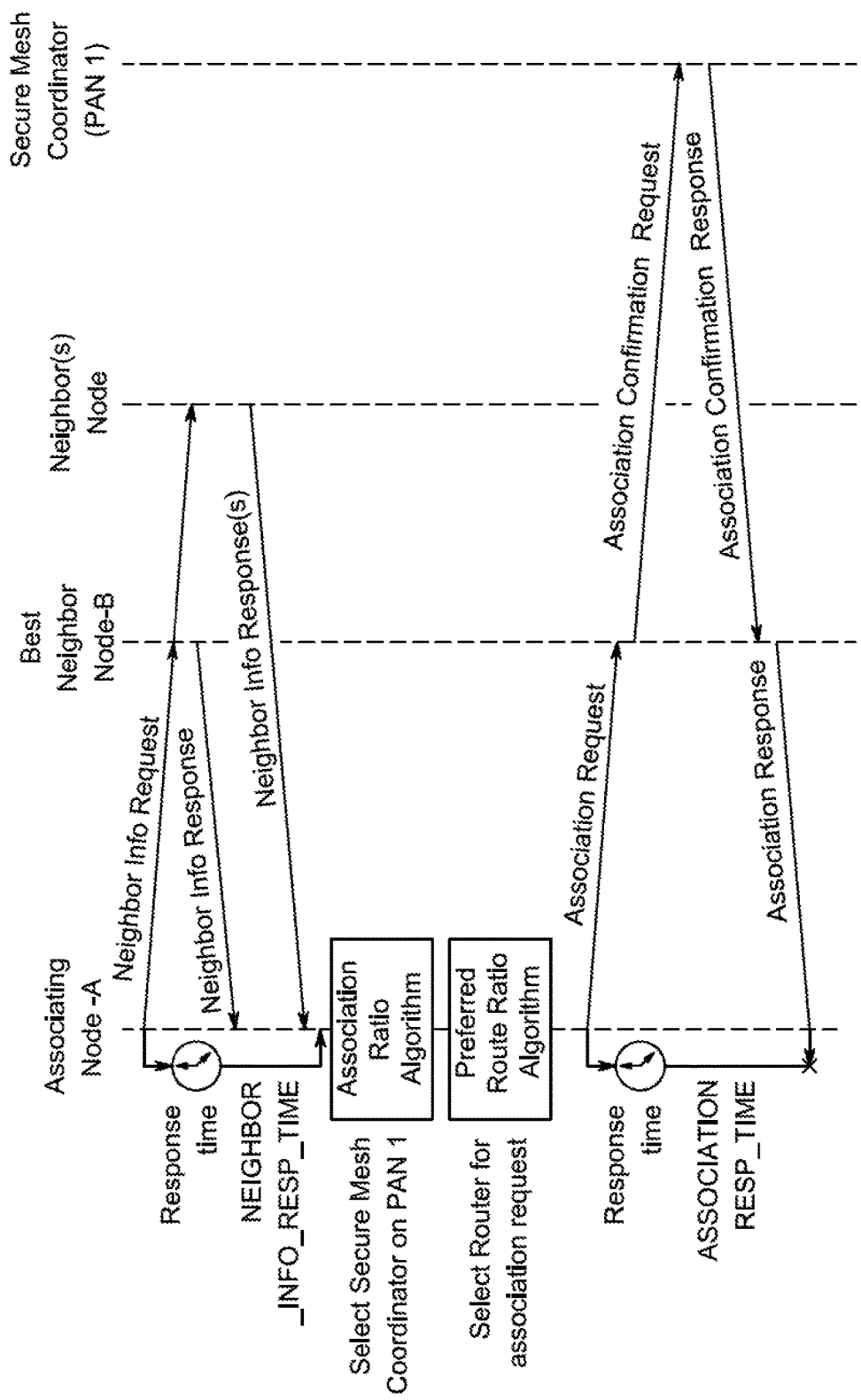
FIG. 5 shows an Association Confirmation Process in accordance with an embodiment of the present invention.

If the associating Node is not in the neighborhood of the Coordinator, it uses a neighbor to proxy the Association Request. FIG. 5 shows this proxy process. Node-A receives a number of Neighbor Info Response messages. It uses the Association Ratio algorithm and the Preferred Route Ratio algorithm to select the Coordinator for PAN 1 and Node-B as its best neighbor for the PAN. Node-A then sends Node-B the Association Request message and starts its response timer set with the value defined by ASSOCIATION_RESP_TIME. Node-B takes Node-A's request and generates an Association Confirmation Request message to the Coordinator. The Coordinator responds with the Association Confirmation Response message to Node-B and Node-B sends the Association Response message to Node-A.

As mentioned previously, the association process described in this section is also used by a network member to re-evaluate its association status. This action is performed every ASSOCIATION_EVAL_PERIOD and is intended to determine if the network member should remain on the same SM network or if it should migrate to another one. The Node will change its network membership (i.e. complete its association process on another network) only if the resulting Association Ratio represents an improvement compared to its current Association Ratio. The required improvement must be equal or better than the ASSOCIATION_EVAL_M-IN_IMPROVEMENT. If it is not the case, the Node maintains its membership on the current network and the whole process stops immediately.

Figure 6:
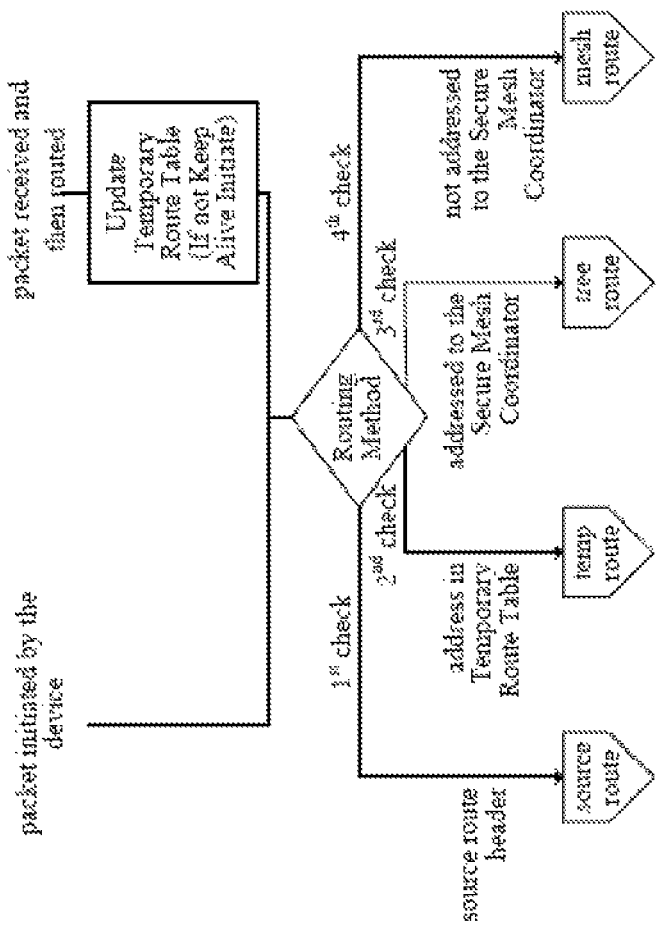
FIG. 6 shows Route Selection Processing in accordance with an embodiment of the present invention.

The mesh layer (see FIG. 1) routes frames to the target addresses by one of four processes: Tree Routing, Source Routing, Temporary Routing or Mesh Routing using combinations of the Neighborhood Table, Routing Table, and Temporary Route Table. The route selection processing facilitated by the mesh layer is shown in FIG. 6. The frame either arrives as a frame initiated by the Node (device) or as a received frame to be routed by the Node. Routed frames have an entry created in the Temporary Routing Table to allow subsequent traffic in the reverse direction using the reverse route. The routing process used for the frame is selected based on the following logic:

If the frame has a source route header it is sent to the Source Routing process.
If there is an entry for the target address in the Temporary Routing Table, the Temporary Routing process is used.
If the frame's target address is the Coordinator, the Tree Routing process is used.
If the frame's target address is not the Coordinator, the Mesh Routing Table process is used.

Figure 7:
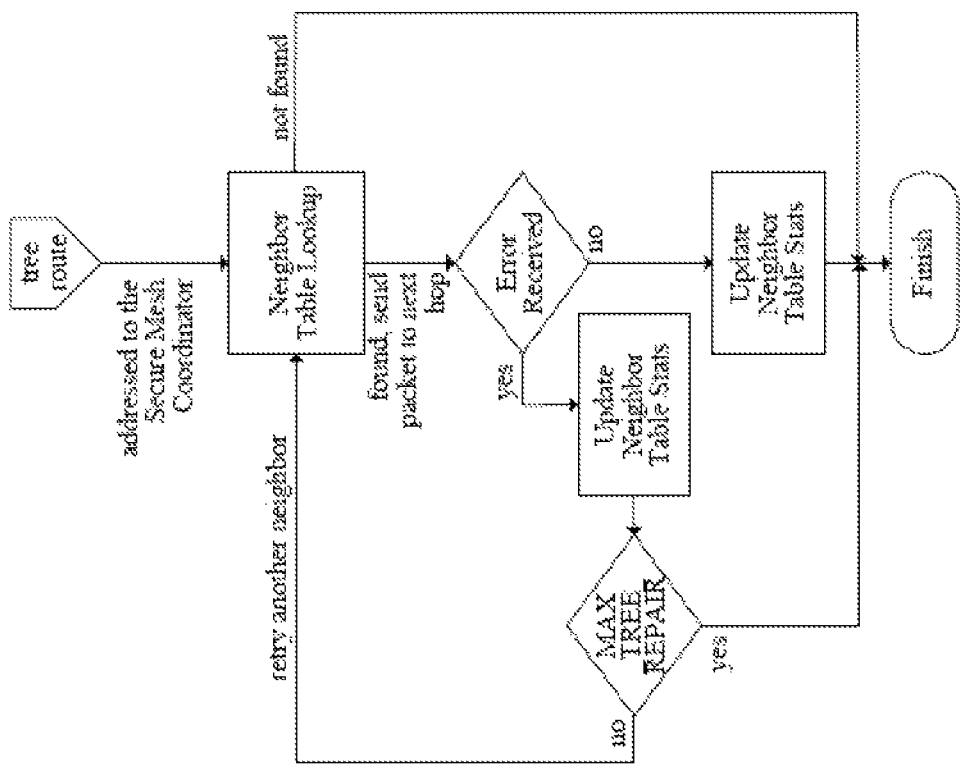
FIG. 7 shows Tree Routing Processing in accordance with an embodiment of the present invention.

Tree routing is the preferred routing method when a Node initiates communications that target the Coordinator. Tree routing uses the Neighborhood Table to find a route to the Coordinator as shown in FIG. 7. The device selects the neighbor entry with the Preferred Parent Flag set in the Neighborhood Table. If transmission to the preferred parent does not succeed, the device attempts to select another Parent in the Neighborhood Table (e.g., an entry that has a hop-count value less than the device's hop-count value), preferably ordering the selection on the device's Preferred Route Ratio value. If there are no Parent entries left to try, the device looks for a Sibling entry (e.g., an entry that has the same number of hops to the Coordinator), preferably ordered based on the device's Preferred Route Ratio value. The device will try entries in the Neighborhood Table until it has reached the MAX_TREE_REPAIR limit or until the Neighborhood Table is exhausted. To avoid multiple lateral transmissions through Siblings, a flag in the mesh header called Sibling flag is set when transmitting to a Sibling. Frames received with the Sibling flag set can be routed only through a Parent.

Figure 8:
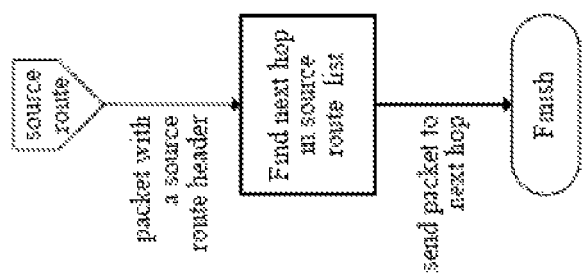
FIG. 8 shows Source Routing Processing in accordance with an embodiment of the present invention.

Referring to FIG. 8, source routing is the preferred routing method when communications initiated from the Coordinator targets a specific Node. The Coordinator can also use the broadcast address as the target address at the end of the source route list to send a message to all the Nodes that are the neighbors of the last explicitly-addressed device. Source addressing is also used for communication between any two Nodes if the originator knows the entire route between them. This node-to-node source route is determined by a Route Request to the target Node with the Trace Route Flag set, or by a Route Establishment Request sent to the Coordinator asking for a route to the target Node. The source routing process sends a frame with the complete route embedded in the frame header. The Node receiving a source-routed frame finds its address in the route list and uses the next address in the list as the next destination hop for the frame. A temporary return route is created when a source-routed frame is received by each Node on the path, so that upstream frames can be routed using the Temporary Routing Table.

Figure 9:
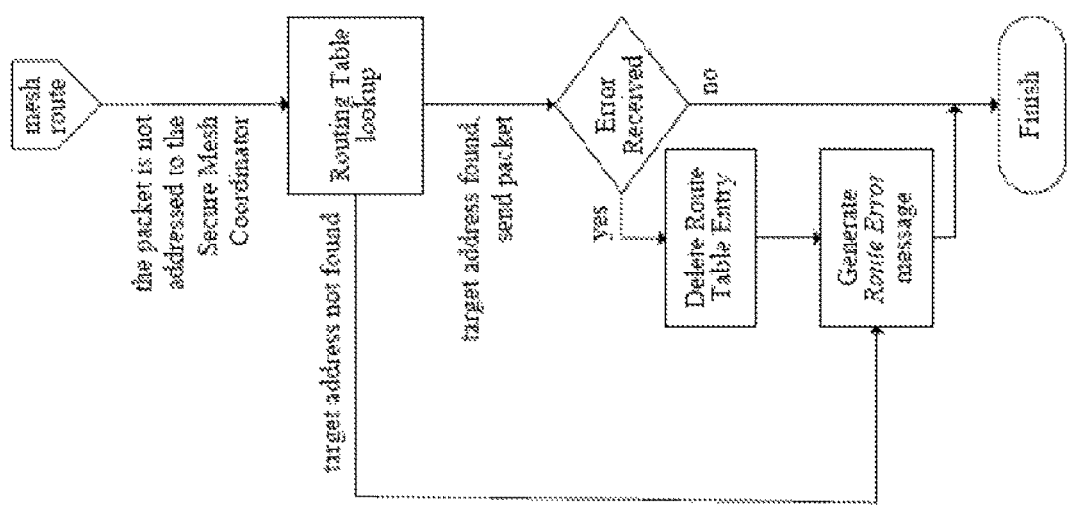
FIG. 9 shows Mesh Routing Processing in accordance with an embodiment of the present invention.

Unlike tree routing, which can only be used to reach the Coordinator, mesh routing can reach any Node on the network. Routes are established using the Route Discovery process which is described later. The routes are stored in a Route Table, whose entries contain the next hop for the target address. A route remains valid until a Node tries unsuccessfully to use it or a Route Error message is received deleting the Route Table entry. A Node that cannot send a frame to the Node listed in the Route Table generates a Route Error message and deletes the entry from its Route Table. The oldest Route Table entry may also be deleted when a Node needs space in its Route Table for a new entry. The use of mesh routing should be limited because of the overhead it imposes on the network. This method is used only when more preferred methods such as tree and source routing fail. Referring to FIG. 9, the mesh routing process looks up the target address in the Route Table. If the target address is found, the frame is sent to the designated Node. An error is generated when the MAC layer ACK is not received after repeated attempts or a Route Error message is received. In either case the route entry is removed from the Route Table and a Route Error message is broadcast to all neighbors. A Route Error message is also generated if the target address is not found in the Route Table.

Figure 10:
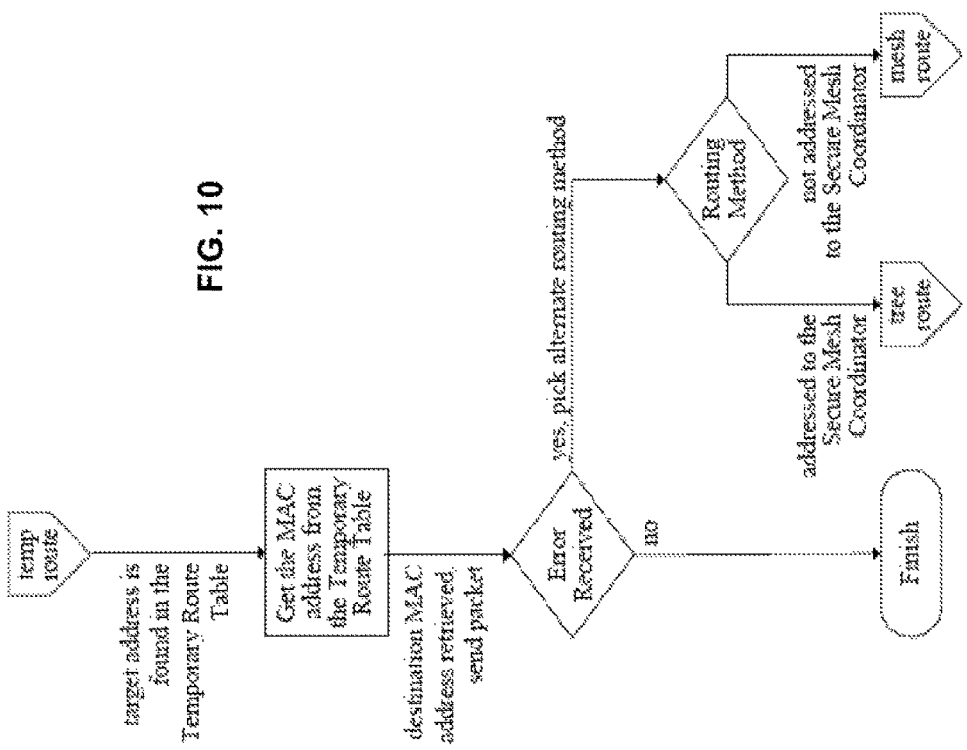
FIG. 10 shows Temporary Routing Processing in accordance with an embodiment of the present invention.

Every time a mesh frame is forwarded, no matter the routing method used with the exception of the Temporary routing itself, the forwarding Node creates a temporary route entry to the originator in the Temporary Routing Table. This allows the destination Node to quickly send a reply, even if it didn't previously know the route to the originator Node. This route expires after a period of time determined by TEMP_ROUTE_TO parameter. The Temporary Route Table takes precedence over the Neighborhood Table and the Route Table. Referring to FIG. 10, the Temporary Route Table is accessed and the MAC destination address associated with the mesh layer target address is selected. The frame is then transmitted. If the MAC fails to transmit a frame, the Error Received condition is true and the Node tries to send the frame by an alternative route using Tree Routing or Mesh Routing.

Figure 11:
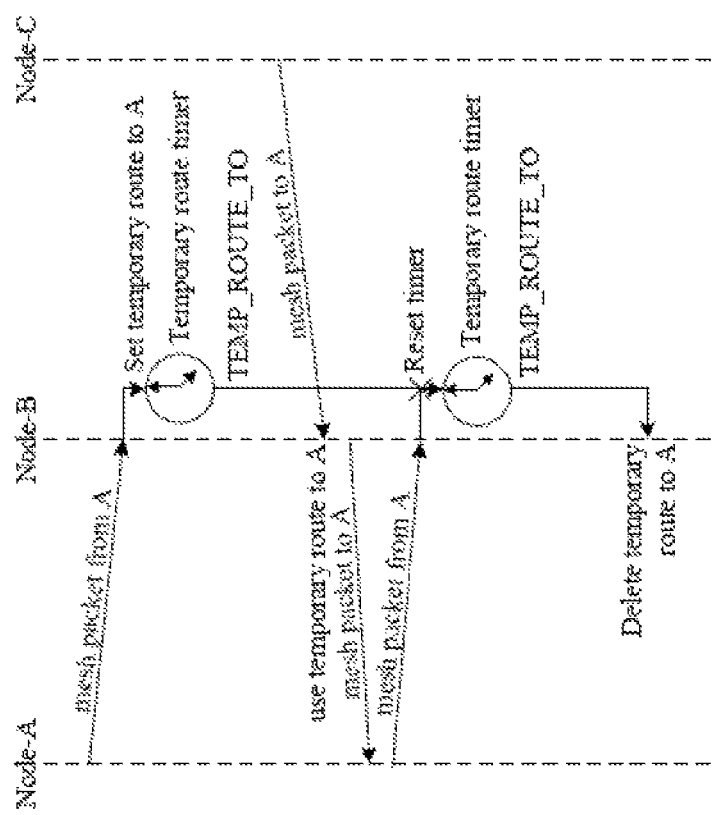
FIG. 11 shows Temporary Routing in accordance with an embodiment of the present invention.

In FIG. 11, a mesh message from Node A sets the temporary return route in the table of Node B. A mesh message from Node C to Node A is routed to Node B. Node B's temporary return route to Node A has not expired and so it uses the route to send the message to Node A. Sometime later another mesh message from Node A restarts the temporary route expiration timer. After the time, TEMP_ROUTE_TO, no new messages from Node A arrive and Node B deletes the temporary return route to Node A. The number of temporary return routes that can be stored is limited. If the limit is reached, the oldest temporary return route is deleted when a new temporary return route is created.

A route discovery process is performed when a Node needs to create or trace a new route within the mesh network. It consists of a mesh broadcast of a Route Request message which is propagated through the network based on Route Request Acceptance Conditions. Once received by the target Node, a Route Reply message is returned to the originator leading to the creation of a new static route in both directions.

Initially, Route Request acceptance conditions are verified by each Node receiving a Route Request message. This verification algorithm allows a Router to forward or stop the propagation of a Route Request. When acceptance conditions are satisfied, the Router from which the Route Request message was received is keep as a Route Candidate. A Route Candidate can be replaced based on Route Request acceptance conditions during the mute discovery process to improve routing. Route Candidates are used at the end of the route discovery process when the Route Reply message is sent back to the originator. A Route Request is accepted as the first Route Candidate if it meets all of the following conditions:

No previous received request had the same Request ID; and

The request is received through a link with a minimum LQI class (defined later) at least equal to the requested one. For compatibility reasons, Route Requests received from non-neighbor Nodes are accepted if the requested minimum LQI class is "Unreliable link."

A Route Request is accepted for Route Candidate upgrade if it meets all of the following conditions:

A Route Candidate already exists for this request ID; and

The request was received through a link with a minimum LQI class at least equal to the requested one. For compatibility reasons, Route Requests received from non-neighbor Nodes are accepted if the requested minimum LQI class is one (Unreliable link); and The request was received through a better link than the prior received one, as determined by one of the three cases summarized below:

TABLE 1

Route Candidate upgrades conditions

| Conditions | Case #1 | Case #2 | Case #3 |
|---|---|---|---|
| Current Route Candidate is a . . . | Neighbor | Non-Neighbor | Non-Neighbor |
| Route Request received from a . . . | Neighbor | Neighbor | Non-Neighbor |
| The new Route Candidate length is . . . | Shorter | Shorter or Equal | Shorter |

Figure 12:
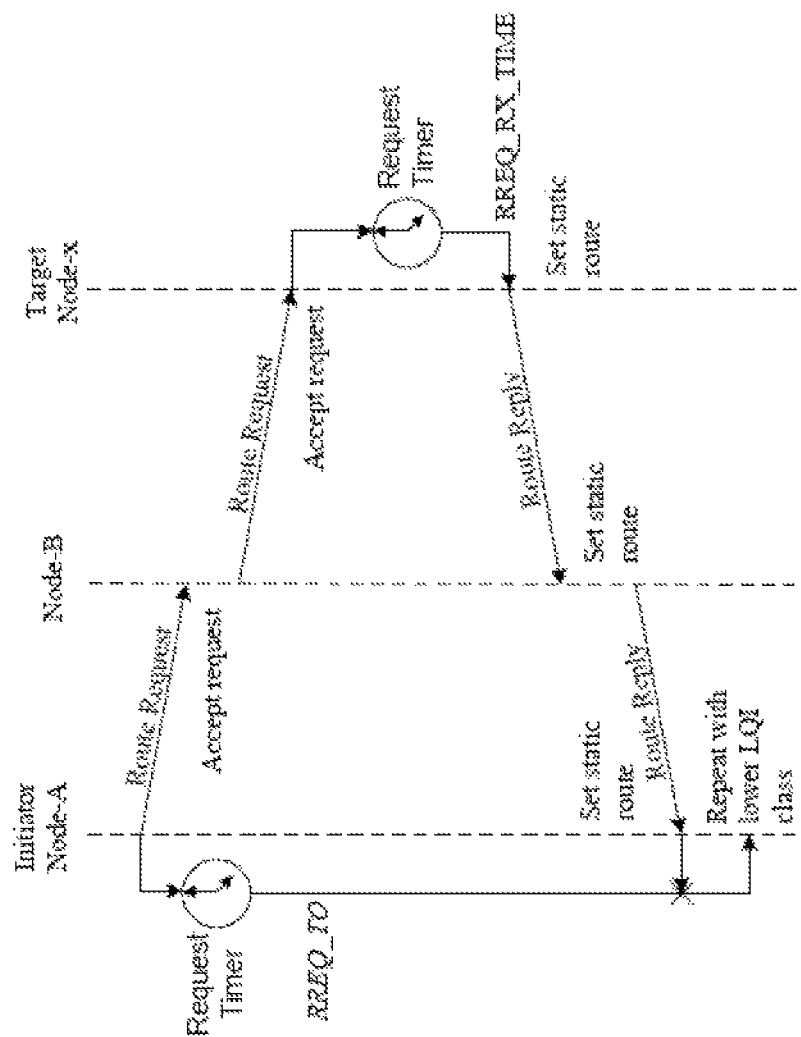
FIG. 12 shows Route Discovery, a complete process with no Route Candidate upgrade, in accordance with an embodiment of the present invention.
Figure 13:
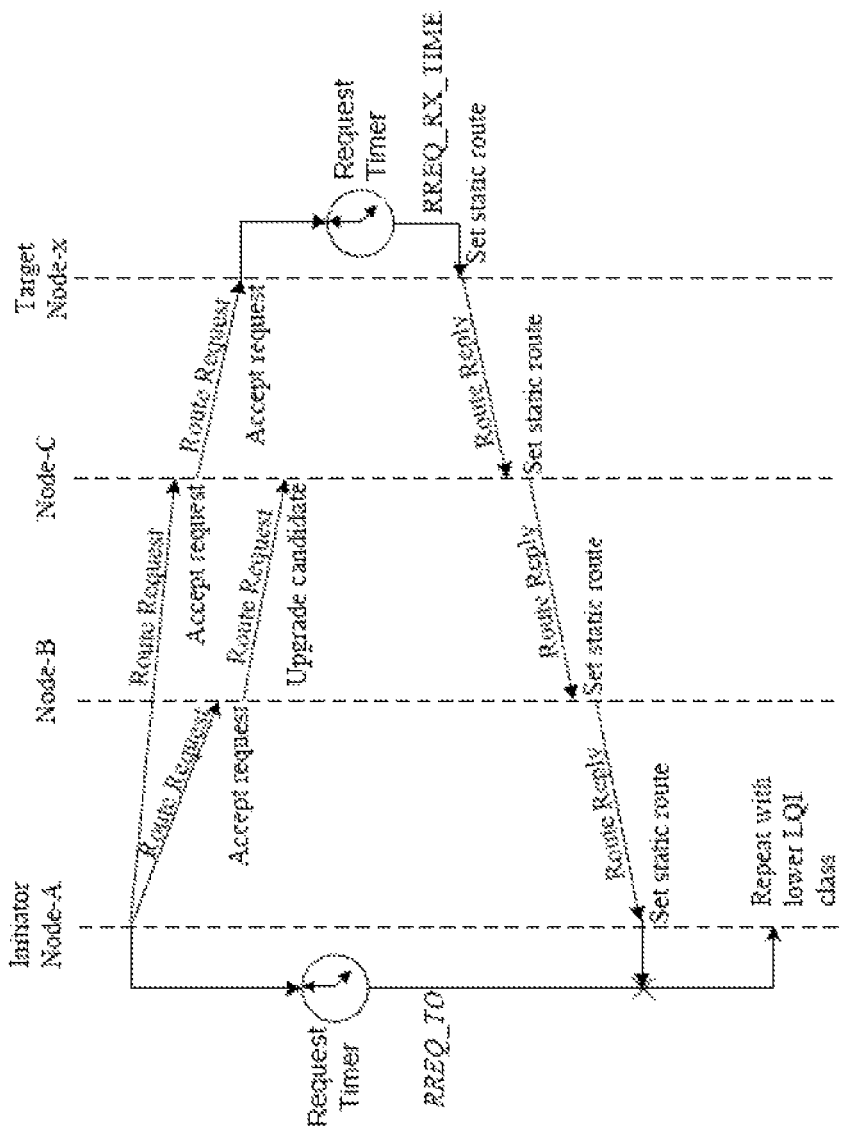
FIG. 13 shows Route Discovery, a complete process with Route Candidate upgrade, in accordance with an embodiment of the present invention.

The overall route discovery process is summarized in FIG. 12 which illustrates the simplest case, i.e., without any Route Candidate upgrade. The effect of a Route Candidate upgrade is shown in FIG. 13, in which the return path is updated during the route discovery process. The originator broadcasts a Route Request with a minimum LQI class of "Reliable link."

Every Router receiving the Route Request accepts or rejects the request based on conditions discussed above. If the Route Request is accepted as a first route candidate and the Router is not the target destination, it creates a route candidate to the originator and rebroadcasts the Route Request. If the Router is the target destination, it starts a timer of RREQ_RX_TIME milliseconds and creates a route candidate to the originator.

If the Route Request is accepted for a route candidate upgrade, the Node upgrades its route candidate without re-broadcasting the Route Request. At the expiration of the timer that was initialized to RREQ_RX_TIME, the destination Node converts its route candidate into a static route and sends a Route Reply to the Next Hop of the route just created. Each Node receiving a Route Reply converts its route candidate into a static route to the originator. It also creates a static route entry to the destination. The Route Reply is then forwarded to the originator. If the originator does not receive a Route Reply after the RREQ_TO timeout period (700 ms by default), it broadcasts a second Route Request with a minimum LQI class set to "Average link." If this second attempt fails, the originator tries a third and last attempt with a minimum LQI class set to "Unreliable link." If the three attempts of broadcasting a Route Request fail, an error is returned to the upper layer. FIG. 12 illustrates the Route Discovery process with no Route Candidate upgrade.

FIG. 13 illustrates the Route Discovery process with Route Candidate upgrade. If the trace route option is set in the Route Request message, the target Node will set the trace route option in the Route Reply message. In this case, intermediary Routes create a temporary route instead of a static route and the route is recorded in the Route Reply message. The originator of the request can subsequently use the temporary route or source routing to reach the destination. Each Route Request is identified by a unique combination formed by the originator's short address and the Request ID. It is then possible to identify a Route Request already received from another Node.

Figure 14:
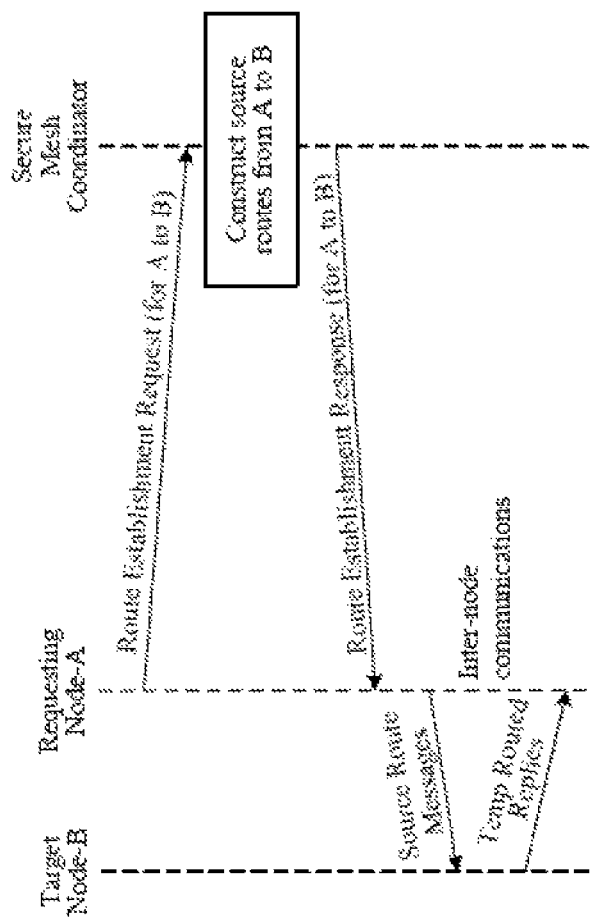
FIG. 14 shows Route Establishment in accordance with an embodiment of the present invention.

Referring to FIG. 14, Route Establishment is a process in which a Node asks the Coordinator for a source route to another Node. The originator Node uses the target's 8-octet long address in its request. The Coordinator constructs a route using its current knowledge of the SM network. The Neighbor information contained in the periodic Keep Alive Request messages sent by Nodes is a prime source of information used by the Coordinator to construct routes. The Route Establishment response contains the source route to the target and the target's assigned short address. A route established from Node-A to Node-B is used for one-way communication. When Node-A sends a message to Node-B that requires a reply, Node-B uses the temporary route set up along the route by Node-A's message.

Figure 15:
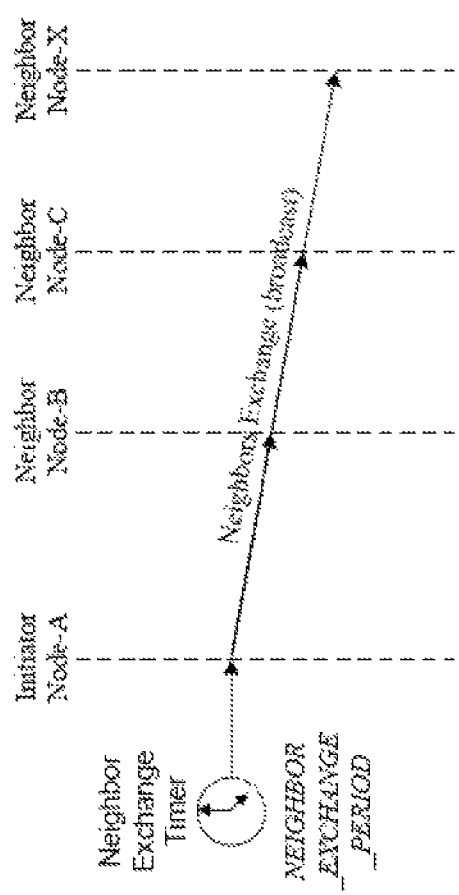
FIG. 15 shows a Neighbor Information Exchange in accordance with an embodiment of the present invention.

The neighbor exchange process is performed by all Nodes on a periodic basis. The Neighbors Exchange process is used to update neighbor information and routing tables. Each Node in the network generates a periodic Neighbors Exchange message. All Nodes receiving the request update their Neighborhood Table. FIG. 15 shows one Neighbor Information Exchange broadcast message transmitted by Node-A, which is received by Nodes B, C and X.

An LQI measure is taken each time a Neighbors Exchange is received. The value "LQI rx" in the Neighborhood Table is updated according to Table 2.

TABLE 2

| Calculation of "LQI rx" | |
| --- | --- |
| Measured LQI > "LQI rx" in the table | LQI_HIGH_FACTOR of the "LQI rx" present in the table plus (1-LQI_HIGH_FACTOR) of the measured LQI of received message |
| Measured LQI < "LQI rx" in the table | LQI_LOW_FACTOR of the "LQI rx" present in the table plus (1-LQI_LOW_FACTOR) of the measured LQI of received message |
| Neighbors Exchanged missed for the first and second time | Keep the LQI present in the table |
| Neighbors Exchanged missed for the third or further time | Keep LQI_MISSED_EX_FACTOR of the LQI present in the table |
| Neighbors Exchanged missed for the 5th time | Entry disable in the table |

These rules tend to keep the "LQI rx" in the Neighborhood Table high even if a particular LQI measurement is lower or if a single Neighbors Exchange is missed. This is intentional.

Tree optimization is a recurrent process performed by all Nodes to ensure the network's optimal performance. The preferred route toward the Coordinator is re-evaluated after each Neighbors' Exchange message is received. To avoid tree instability, the "Avg LQI" factor is omitted for tree optimization; it is used only at association when a Node selects its initial preferred route. Only one route change is allowed per 6 cycles of NEIGHBORS_EXCHANGE_PERIOD to provide enough time for the information to propagate in the network. This delay limits the rate at which Child Nodes change their route when the route quality improves.

Each Node on the network shall report its presence to the Coordinator from time to time using Keep Alive Request messages to maintain its association status. The reporting period is determined by the CHECKPOINT_PERIOD and is typically set to be one hour. The period between Keep Alive messages should be constant as specified by the Keep Alive Period field within the Keep Alive Request message. The Coordinator flags a Node as Non Responding if this Node fails to communication with it within the Keep Alive Period. If the Coordinator has not received a Keep Alive Request or a Power Event message in a specified time, it removes the device from is registration table. The Coordinator's timeout period for Keep Alive Request/Power Event messages can be as long as 90 days. The Checkpoint process is also used to: trace the latest tree route for subsequent requests using source routing; send network management information such as network statistics and neighborhood information; allow configuration of mesh layer parameters controlled centrally; and provide a window of opportunity for the upper layer batch traffic.

Figure 16:
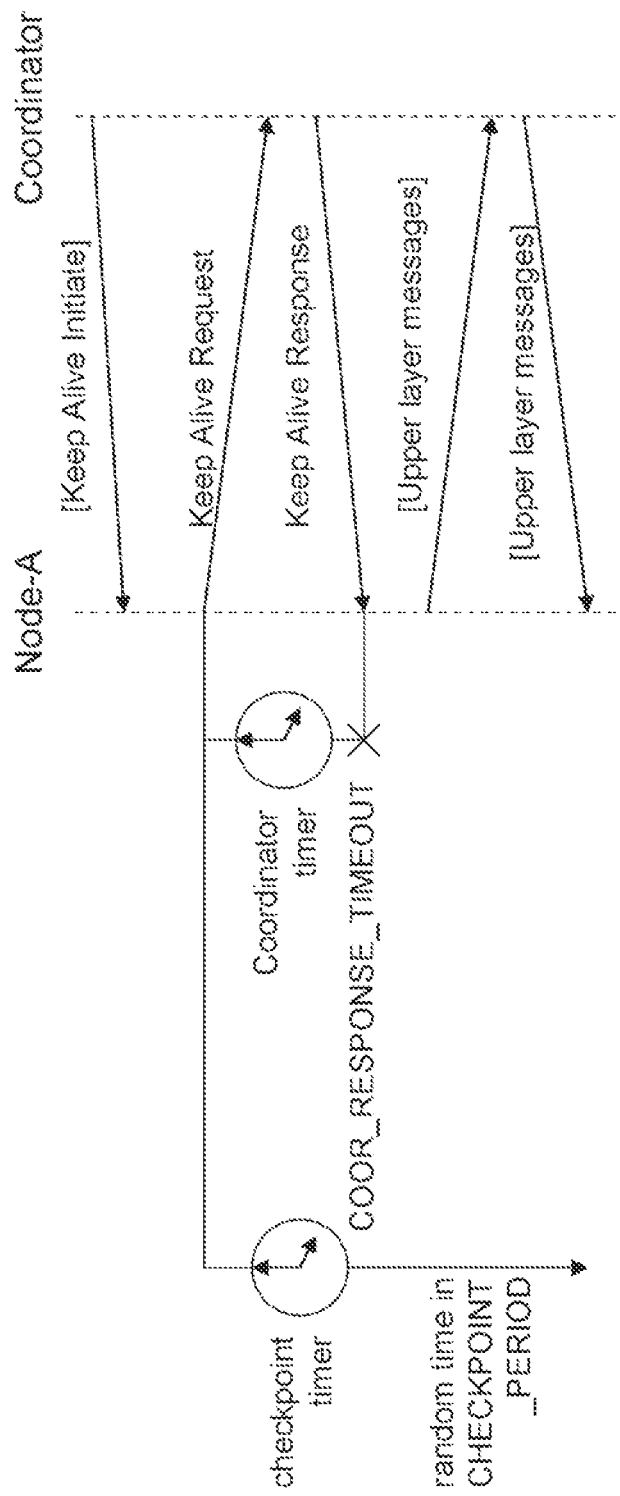
FIG. 16 shows a Checkpoint in accordance with an embodiment of the present invention.

The Checkpoint is initiated autonomously by each Node. Checkpoint reporting by each Node is distributed pseudo-randomly within the CHECKPOINT_PERIOD. If the Coordinator needs to have better control over timing of the traffic generated on the network, it can send a Keep Alive Initiate request prior to the autonomous transmission of the Keep Alive Request. The Keep Alive Initiate request relies on the routing information of the previous Keep Alive Request. If this information is out of date, the subsequent autonomous Keep Alive Request sent by the Node will reestablish a valid route. It is important to note that a Keep Alive Initiate request does not create an entry in the Temporary Route table, thereby allowing the subsequent Keep Alive Request to trace the currently optimized tree route. In FIG. 16, Node A sends a Keep Alive Request frame to the Coordinator as triggered by expiration of its CHECKPOINT_PERIOD timer. The Coordinator receives the request and sends a Keep Alive Response frame. The originator Node does not retry the request if it does not receive a reply. After a successful reception of the Keep Alive Response, or timeout of a watchdog timer preset to the value of the parameter COORD_RESPONSE_TIMEOULT, upper layers are notified so they can start exchanging information if needed.

There are three security services provided by the SM network and protocol: privacy, authentication and authorization. Initially, though not all data transmitted throughout the SM network has to be kept private, there are instances where the data sent should be encrypted to protect it from discovery. For example, security key configuration information needs to be kept private. Additionally, data is authenticated in two ways. First the data's integrity is checked to make sure that it has not been changed when transmitted through the network. Data integrity is verified from the source to the destination through one or more hops in the mesh network. Like the data, the address is protected from being changed undetectably. If the key used to protect that address is unique to the source, then the authentication verifies the integrity of the source address and that the stated sender originated the message frame. Further, the operations in messages have permission requirements associated with them. Devices originating messages have authorizations configured in the SM network that give the devices the permission to perform operations that match the permission requirements.

The SM network protocol provides security for management frames routed through the mesh. These routed frames may span more than one hop and therefore need end-to-end security. The security features used by the SM network protocol are authentication and authorization. The mesh layer operations do not require privacy, other than for the transmission of security keys, where the privacy is provided by encrypting the transported keys. The SM protocol provides data link security services for hop-by-hop message transmissions. The SM data-link protocol provides data and source authentication for each hop taken by the message. It also provides operation authorization for local communication with maintenance devices. This security level also provides replay protection for all local and routed communication. Table 3 summarizes the implemented security mechanisms in accordance with a preferred embodiment of the present invention, the behavior of data link and network level counters and the key type used for each message type. For each message type in Table 3, the security method and key specified must be used or the receiver rejects the entire message.

TABLE 3

Security Counter and Key type Summary

| | Data link layer security | | | | Network layer security | | | |
|---|---|---|---|---|---|---|---|---|
| | Security | Counter sent | When received | Key type | Security | Counter sent | When received | Key type |
| Route discovery | | | | | | | | |
| Route Request | MIC-32 | Src. count | >last (n) | S | None | | | |
| Route Reply | MIC-32 | Src. count | >last (n) | S | None | | | |
| Route Error | MIC-32 | Src. count | >last (n) | S | None | | | |
| Routed services | | | | | | | | |
| Data transfer | MIC-32 | Src. count | >last (n) | S | None | | | |
| Power Event | MIC-32 | Src. count | >last (n) | S | None | | | |
| Ping Request | MIC-32 | Src. count | >last (n) | S | None | | | |
| Ping Response | MIC-32 | Src. count | >last (n) | S | None | | | |
| Keep Alive Initiate | MIC-32 | Src. count | >last (n) | S | MIC-32 | Orig. count | [>last] | N |
| Keep Alive Request | MIC-32 | Src. count | >last (n) | S | MIC-32 | Orig. count | [>last] | N |
| Keep Alive Response | MIC-32 | Src. count | >last (n) | S | MIC-32 | Orig. count | [>last] | N |
| Service Forwarding request | MIC-32 | Src. count | >last (n) | S | MIC-32 | Orig. count | [>last] | N |
| Service Forwarding response | MIC-32 | Src. count | >last (n) | S | MIC-32 | Reflection | =sent | N |
| Association Confirmation Request | MIC-32 | Src. count | >last (n) | S | MIC-32 | Orig. count | [>last] | N |
| Association Confirmation Response | MIC-32 | Src. count | >last (n) | S | MIC-32 | Reflection | =sent | N |
| Route Establishment Request | MIC-32 | Src. count | >last (n) | S | MIC-32 | Orig. count | [>last] | N |
| Route Establishment Response | MIC-32 | Src. count | >last (n) | S | MIC-32 | Reflection | =sent | N |
| Non routed services | | | | | | | | |
| Neighbor Info Request | None | | | | None | | | |
| Neighbor Info Response (Src count, Ticket) | None | | | | None | | | |
| Service Request | None | | | | None | | | |
| Service Response | None | | | | None | | | |
| Association Request | MIC-32 | Ticket | >last (rc) | M | MIC-32 | Orig. count | any | N |
| Association Response | MIC-32 | Src. count | >last (rc) | M | MIC-32 | Reflection | =sent | N |
| Neighbors Exchange | MIC-32 | Src. count | >last (n) | S | None | | | |
| End Device Data Request | MIC-32 | Src. count | >last (ed) | S | None | | | |
| End Device Data Response | MIC-32 | Src. count | >last (n) | S | None | | | |
| Multicast data transfer | | | | | | | | |
| Mesh Multicast | MIC-32 | Src. count | >last (rc) | S | None | | | |
| Point to point communication | | | | | | | | |
| Local Broadcast Request | None | | | | None | | | |
| Local Broadcast Response (Src count, Ticket) | None | | | | None | | | |
| End Device Node Present (Src count, Ticket) | None | | | | None | | | |
| Local Data Transfer | None | | | | None | | | |
| Range Test Request | MIC-32 | Ticket | >last (rc) | M | None | | | |
| Range Test Response | MIC-32 | Src. count | >last (rc) | M | None | | | |
| Range Test Initiate | MIC-32 | Ticket | >last (rc) | M | None | | | |
| Range Test Result | MIC-32 | Src. count | >last (rc) | M | None | | | |
| Frame Reception Rate Test Init | MIC-32 | Ticket | >last (rc) | M | None | | | |
| Frame Reception Rate Test Data | MIC-32 | Ticket | >last (rc) | M | None | | | |
| Frame Reception Rate Test End | MIC-32 | Ticket | >last (rc) | M | None | | | |
| Frame Reception Rate Test Result | MIC-32 | Src. count | >last (rc) | M | None | | | |

Figure 17:
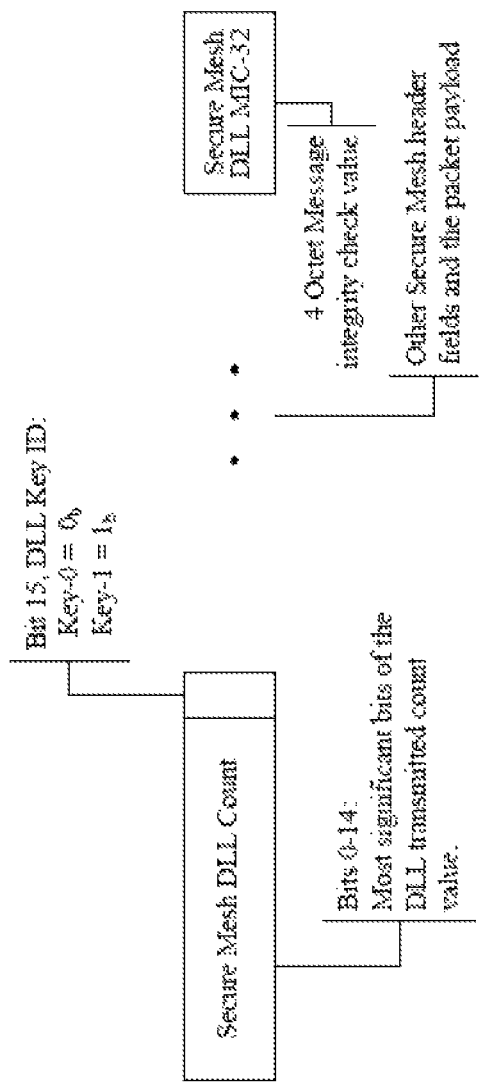
FIG. 17 shows a DLL Security Header in accordance with an embodiment of the present invention.

In Table 3, the following define the behavior of the counters sent: "Src. count" is the value of the current counter of the sender of the frame (Single Hop); "Orig. count" is the value of the current counter of the originator of the frame within the mesh network; "Reflection" is the response use of the value of the counter received in the request; "Ticket" is the Counter provided by a Router for use by Nodes before they are associated and for maintenance devices that communicate with the device using point-to-point messages. The nonce is created by concatenating full five octet ticket with the long address of the Router providing this ticket. Also in Table 3, the following define the behavior of the counters received. The "[>last]" means the recipient of the frame, may accepts any counter value, playback rejection is not required since playback is already verified by the DLL security at each hop. Optionally, if the recipient has the memory to store the previously received counts it may reject frames where the count is not greater than the stored count. The "=sent" means the counter received must be equal to the counter sent in the request. The ">last (n)" means the counter received must be greater than the RX Source DLL Nonce Count value maintained in the Neighborhood Table. The Neighbor Info Response frame initializes the RX Source DLL Nonce Count in the Neighborhood Table. The periodic Neighbor Exchange message maintains its currency in the absence of regular traffic between the two devices. The ">last (ed)" means the counter received must be greater than the last RX Source DLL Nonce Count value maintained in the End Device Table. The periodic End Device Data Request message maintains its currency. And the ">last (rc)" means the counter received must be greater than the last RX Source DLL Nonce Count value temporary maintained for a selected Node and acquired in the Neighbor Info Response or Local Broadcast Response. The "last" counts are initial-header to select the security key and set the nonce used in the crypto calculation. The DLL Security header is an optional field, following the Service Type octet, that is present when the DLL Security Header Flag in the Service Type octet is set (=1b), as defined herein. The format of the DLL Security header is shown in FIG. 17. The first fifteen bits (0 . . . 14) of the DLL Security header contains a portion of the transmitted nonce count. Bit 15 is the DLL Key ID that selects the current version of the key used to calculate the DLL MIC. This Key ID is used to coordinate the key used during a key change process by explicitly identifying which key was used in generating the DLL MIC.

Figure 18:
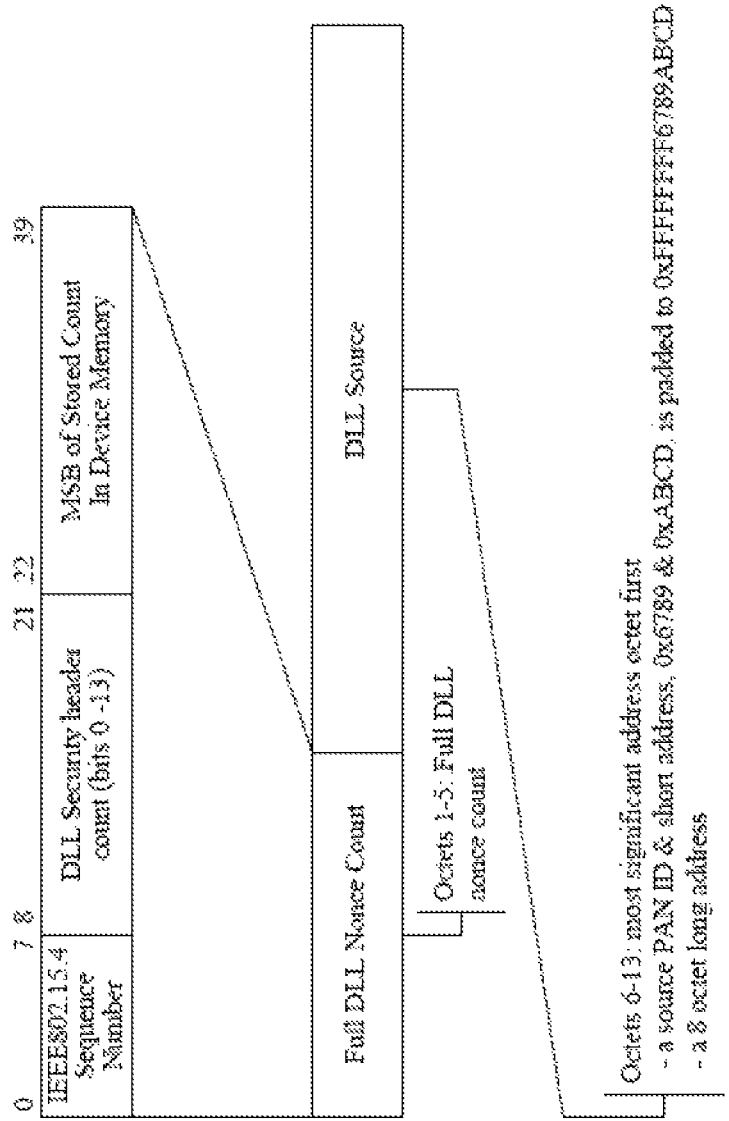
FIG. 18 shows an SM DLL Nonce in accordance with an embodiment of the present invention.

The MIC-32 data authentication calculation uses the calculation process described in the IEEE 802.15.4:2006 standard. The SM DLL nonce used for the MIC calculation is shown in FIG. 18. The DLL nonce used in the MIC calculation is thirteen octets. The DLL Security nonce combines the full DLL nonce count and the MAC layer source address used by the transmitting device. The Full DLL Nonce Count is five octets long, which ensures that its value does not repeat, within the lifetime of a key, at the frame transmission rates of SM devices. The address used in the MAC nonce is either the 8-octet long EUI address, or the 2-octet source PAN ID plus the 2-octet short address prefixed by four octets of all ones. The Full DLL Nonce Count can be based on either the Source counter or the Ticket counter.

TABLE 4

DLL Nonce Counters

| DLL Counter Type | Source counter | Ticket counter |
|---|---|---|
| Count Range | 0000000000 to EFFFFFFFFF | E000000000 to FFFFFFFFFF |
| Use | Used as the transmitted count by devices associated with a network | Used as the transmitted count by devices not associated with a network, devices associating with the network or handheld devices communicating using the point-to-point messages |
| Message Transmitter | Count incremented with each transmission Stored in non-volatile memory and never reset | Count incremented with each transmission For the associated devices, the Ticket is acquired in the Neighbor Info Response. For the associating devices, Ticket is acquired in the Local Broadcast Response or End Device Node Present messages The last authenticated value is stored only while communicating with a selected device |
| Message Receiver | For the associated devices, the count value is acquired in the Neighbor Info Response or Neighbors Exchange messages. The last authenticated count is stored in the Neighborhood Table For the non associated devices, the count value is acquired in the Local Broadcast Response or End Device Node Present messages. The last authenticated value is stored only while communicating with a selected device Accepts received counts > stored count | Accepts received counts > stored ticket Stores last authenticated count in the Maintenance Table |
| Nonce Address | MAC source long address, or 0xFFFFFFFF padding and MAC source PAN ID and short address | MAC long address of the device that provided the ticket | ized to zero in the tables and then updated with the first authenticated reception. The following letters are used in Table 3 to define the key type used by each message type. "N" is (private) Node Key; "S" is Shared Mesh Key; and "M" is (shared) Maintenance key.

The SM protocol provides a DLL Security service with data and source authentication using a message integrity check mechanism (MIC-32) as described in Annex B of IEEE 802.15.4:2006 which is incorporated herein by reference in its entirety. DLL security uses the SM DLL Security This process is used for all message types using the Source Counter as listed in the summary table in Table 3. The five octets (bits 0-39) of the Full DLL Nonce Count are constructed using the following algorithm: The least significant octet (bits 0-7) of the transmitted nonce count is the IEEE 802.15.4 MAC header sequence number. The next 15 bits come from bits 0 through 14 of the DLL Security header's SM DLL Count. Together the 23 bits of the transmitted count forms the least significant bits of the counter portion of the SM DLL nonce. The receiver checks the least significant 23 bits of the transmitted count against the last authenticated RX Source DLL Nonce Count. In the case of an End Device, the last authenticated RX Source DLL Nonce Count represent the Source Count acquired using a Neighbor Info Request and maintained in the End Device Table. In the case of mesh messages excluding the Association Request, the last authenticated RX Source DLL Nonce Count represents the Source Count acquired using a Neighbor Info Request and maintained in the Neighborhood Table. The Neighborhood Table entry is selected using the source PAN ID and MAC address of the received message. In the case of an Association Request or of point to point messages, the last authenticated RX Source DLL Nonce Count represents the Source Count acquired using a Neighbor Info Response, a Local Broadcast Response or an End Device Node Present received and maintained temporarily for a selected Node. If the transmitted count value is greater than the last authenticated RX Source DLL Nonce Count, then the transmitted counter bits (0-22) are combined with the most significant bits (23-39) of the last authenticated RX Source DLL Nonce Count to form the Full DLL Nonce Count. However, the transmitted count is assumed to have rolled over if the transmitted count value is less than the value of the corresponding bits in the last authenticated RX Source DLL Nonce Count. When this is the case the value in bits 23 through 39 of the last authenticated RX Source DLL. Nonce Count is incremented by one before it is combined with the transmitted bits to form the Full DLL Nonce Count. The MIC-32 is calculated using the Mesh key generation specified by the DLL Key ID. The selected key and the Secure Full Mesh DLL Nonce are used to calculate the DLL MIC-32 value. If the calculated MIC-32 equals the transmitted MIC-32, then the message data integrity is validated and the message has not been received previously. In this case the last authenticated RX Source DLL Nonce Count is updated to the value of the Full DLL Nonce Count used in the MIC calculation.

The SM DLL security nonce ticket counter process is used for all message types using the Ticket Counter as listed in the summary table in Table 3. This process is used for the secured non-routed DLL communications employed by Association Request/Response messages and by point-to-point messages. For these messages at least one of the MAC addresses has a long 8-octet format, the Maintenance Key is used, and the process is modified. The DLL Key ID selects the appropriate Maintenance Key and nonce count. The following algorithm is used to calculate the MIC. The five octets (bits 0-39) of the Full DLL Nonce Count are constructed using the following algorithm: the least significant octet (bits 0-7) of the IEEE 802.15.4 MAC header sequence number is combined with bits 0 through 14 of the DLL Security header. Together they form the 23 bits of the transmitted count bits of the DLL nonce count.

The Ticket field in the Maintenance Key Table contains the last authenticated count received. The receiver checks the least significant 23 bits from the table and compares them to the transmitted count. If the transmitted count value is greater than the value in the corresponding bits of Ticket then the transmitted counter bits (0-22) are combined with the most significant bits (23 . . . 39) of the Ticket to form the Full DLL Nonce Count. However, if the transmitted count value is less than the value of the corresponding bits in the Ticket, rollover of the transmitted count value is inferred. When this is the case the value in bits 23 through 39 of the Ticket is incremented by one before it is combined with the transmitted bits to form the Full DLL Nonce Count. The MIC-32 is calculated using the key specified by the Maintenance Key selected by the DLL Key ID and the Full DLL Nonce Count. If the calculated MIC-32 equals the transmitted MIC-32, then the data integrity is validated and the message has not been received previously. In that case only, the Full DLL Nonce Count is stored in the Ticket Count of the Maintenance Key Table.

Figure 19:
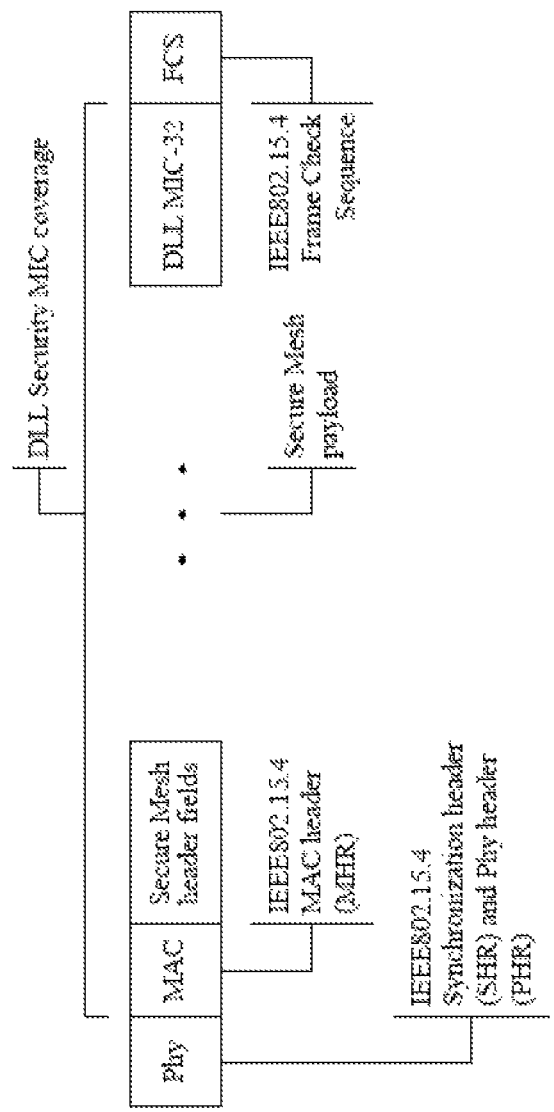
FIG. 19 shows a DLL Security MIC Coverage in accordance with an embodiment of the present invention.

The DL Security header MIC covers the SM message starting with the IEEE 802.15.4 Frame Control octet and continuing on through to the end of the payload. As shown in FIG. 19, the IEEE 802.15.4 physical layer preamble and the Frame Check Sequence are not part of the DLL Security calculation.

Figure 20:
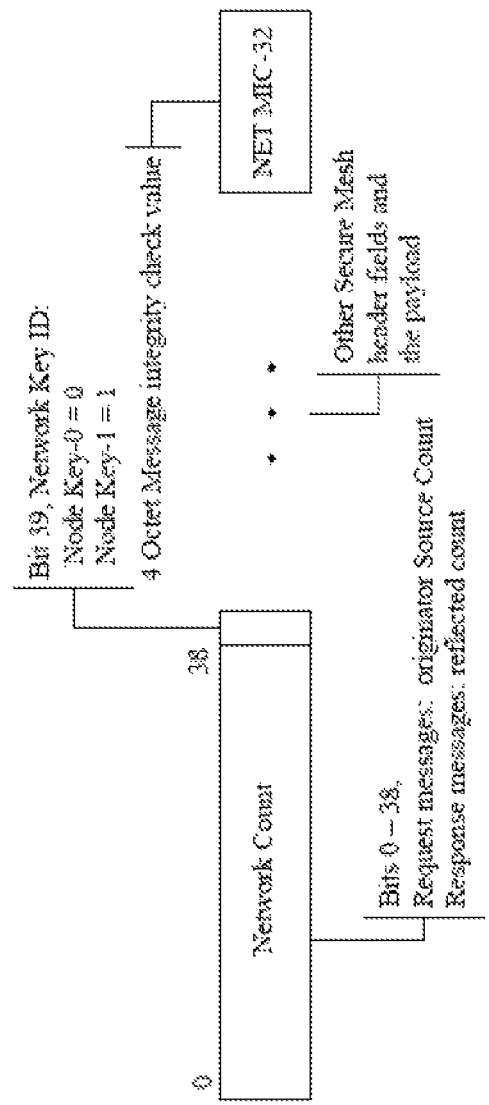
FIG. 20 shows a Network Security Header in accordance with an embodiment of the present invention.

The DLL Security header provides security for data authentication and operation authorization of SM messages that can travel one hop. The SM network security header provides end-to-end security for frames, which can travel multiple hops. When present, the network security header provides authentication of data that is not dependent on trusting the intermediate routing devices. The network security header controls security for that portion of the SM frame that does not change as it is routed through the network. The network security header is present when the Originator Network Security Header flag is set as defined in the common mesh header described below The network security header is shown in FIG. 20. It is located in the SM header after the DLL Security header. The network security NET MIC-32 field is located at the end of the frame, before the DLL MIC-32 field and the IEEE 802.15.4 FCS field (see FIG. 22). When the Network Security header is present, the receiver's SM application layer security process uses the Originator PAN ID and source address field of the received frame to determine if the frame is from the Coordinator or some other device. The Node Keys stored in the Node Key Table are used for communicating with the Coordinator. The Mesh Keys in the Neighborhood Table are used to communicate with other devices. For frames received from the Coordinator, bit 39 of the Network Security Header specifies the network Key ID, selecting Node Key-0 or Node Key-1. For frames received from other devices, the bit selects Mesh Key-0 or Mesh Key-1.

Routed messages are typically request/response messages. The response messages reflect the value of the Network Count in the request. Messages that require reflected counts are listed in Table 3.

Figure 21:
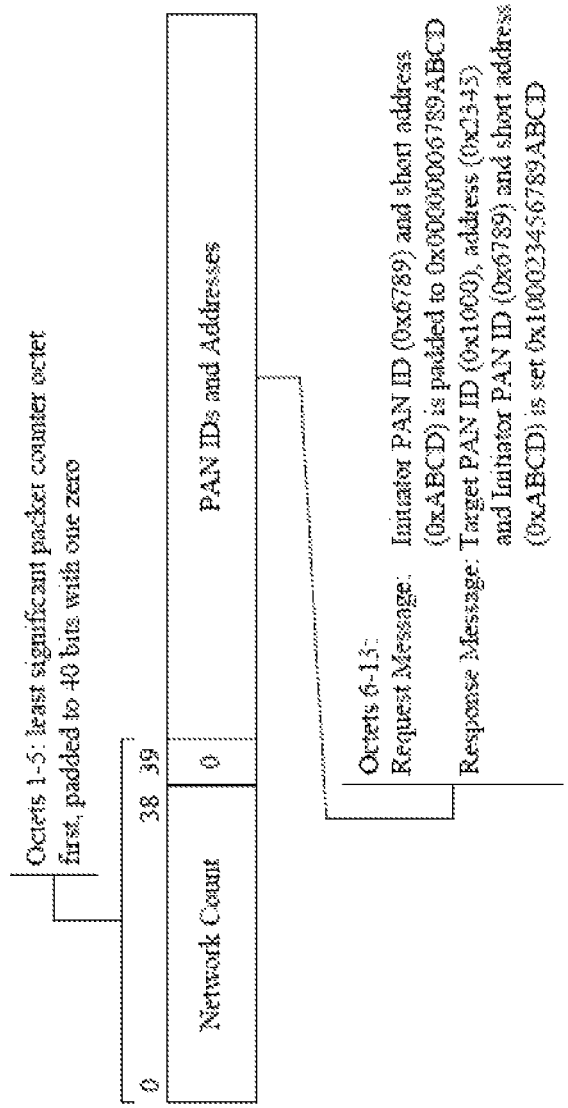
FIG. 21 shows a Network Security Nonce in accordance with an embodiment of the present invention.

The SM network layer nonce is 13 octets long. Its structure is shown in FIG. 21. When the message is a request, the combination of the Network Count, the Originator PAN ID and Address padded with zeros ensures the uniqueness of the nonce. When the message is a response the Network Count is reflected and it is combined with the Target PAN ID and address and the Originator PAN ID and address. Devices receiving request messages use the Network Count to verify the integrity of the payload data and optionally check for repeated count values to reject already received responses. Devices receiving responses to request messages check that the Network Count equals that in the request message. If it does not, the message is rejected. Response frames with repeated Network Count values also are rejected.

The SM Network MIC-32 is authenticated using the following algorithm. First, the 39 bits of the Network Count is taken from the Network Security Header and padded with a zero to make a 40 bit field. This forms the counter portion of the network nonce. Next, the MIC-32 is calculated using the key specified by the Network Security header Key ID, using the Node Key for communications with the Coordinator and the Mesh Key for communications with other devices.

Figure 22:
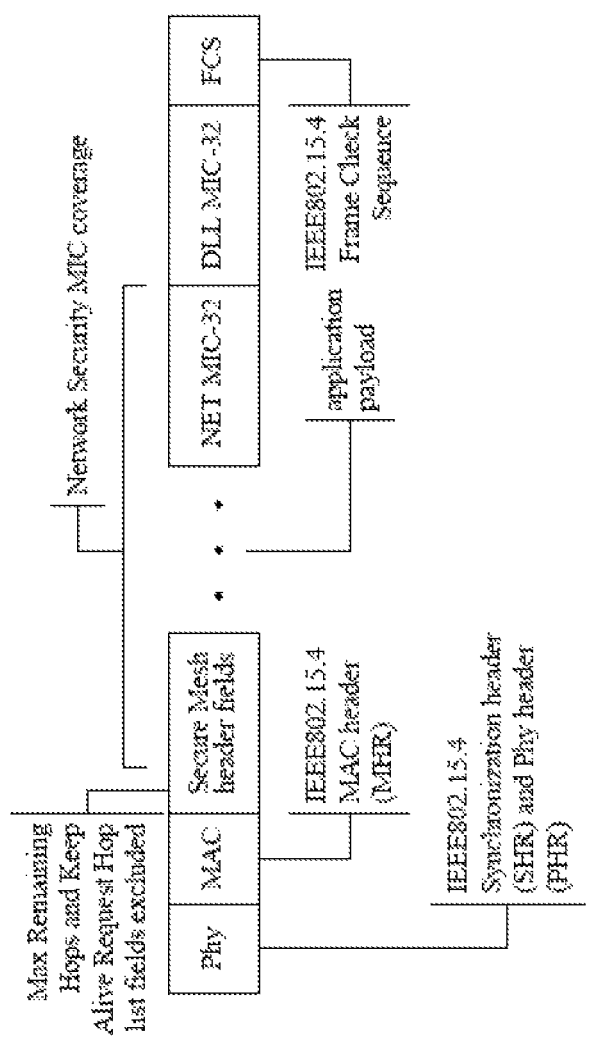
FIG. 22 shows Network Security MIC Coverage in accordance with an embodiment of the present invention.

If the calculated MIC-32 equals the transmitted MIC-32, then the data integrity of the received frame is validated. The coverage of the Network Security header MIC is shown in FIG. 22. The Network MIC-32 provides authentication for almost all the SM frame's header field and payload. The portion of the SM frame's header field that is not covered by the Network MIC is the Max Remaining Hops field, which is decremented for each hop. Keep Alive Request messages have a second exception to the Network MIC-32 coverage: their Hop Addresses and Number of Hops fields. As with the DLL, having two key in each of the Mesh Key Table and Node Key Table entries allows the Coordinator to set up new keys for devices without causing Network Security header MIC errors.

Figure 23:
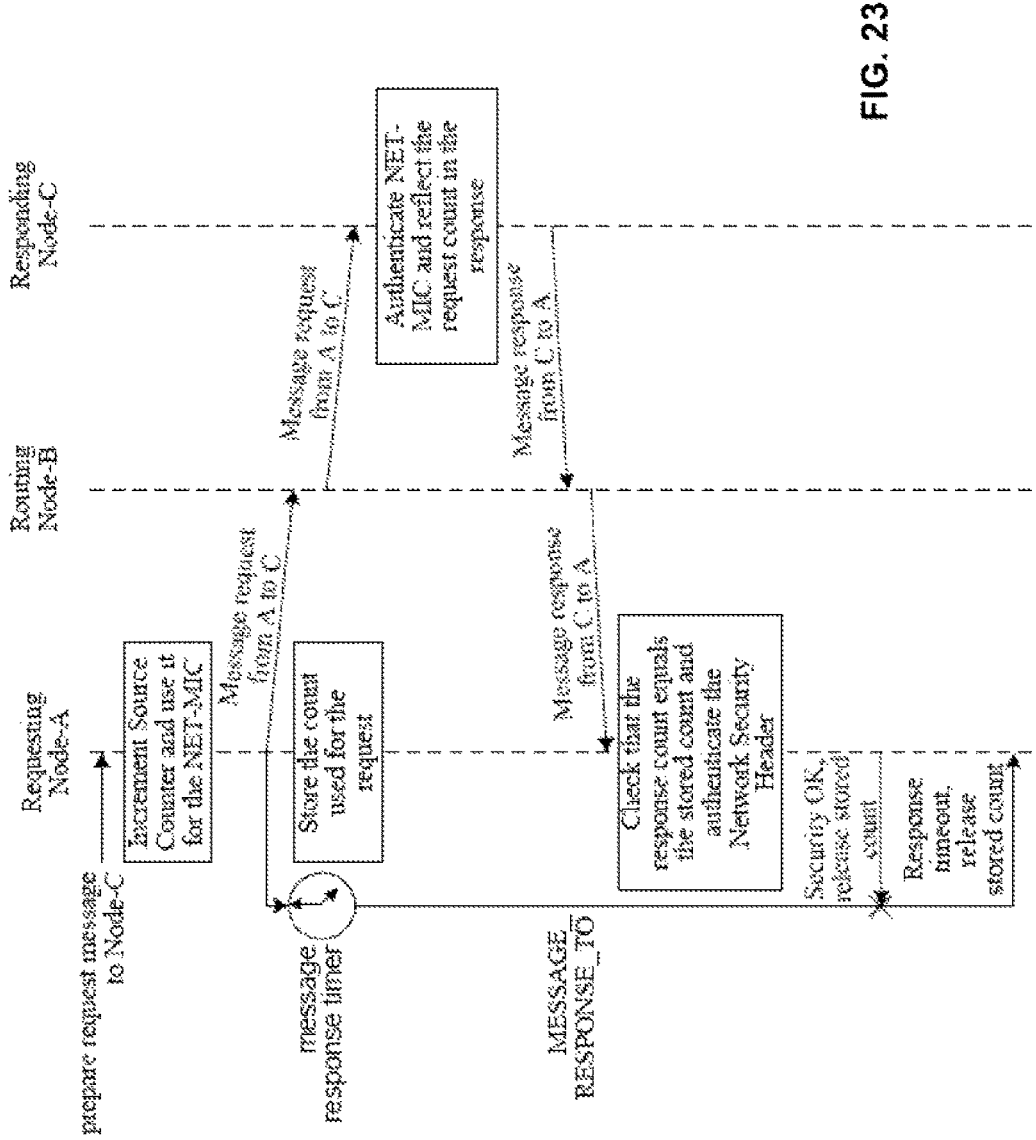
FIG. 23 shows a Network Security Process in accordance with an embodiment of the present invention.

The SM network security process used for transmitting a message with a Network Security header is shown in FIG. 23. Node-A prepares a request message for transmission by incrementing its source transmission counter and calculating the Network MIC. It then formats the request frame with the full five octet source transmission count in the Network Security header and transmits the message through Node-B to Node-C. Node-A stores the count used and starts a message response timer with a timeout set to MESSAGE_RESPONSE_TO. Node-C receives the request message and authenticates the Network Security header. Node-C prepares a response to Node-A using the same count value it received in the request. Node-A receives the response and checks that the count value is the same as what it transmitted. Node-A releases the stored count and stops the message response timer if the stored count is the same as the response count and the Network Security header is authenticated. If the tests fail and no other valid response frame is received in the timeout period, Node-A fails the request/response process and releases the stored count value. Messages transmitted between the Coordinator and a device that employ the Network Security header use the Node Key assigned to the device. Messages transmitted between devices that have a Network Security header use the Mesh Key.

New devices associating with a network must be configured with the Node Key and Maintenance Key. This configuration may be done by the manufacture as a custom process for a purchaser, by a maintenance tool prior to association or over the network using the Service messages described further herein. Keys transported over the network must be encrypted for confidentiality. When sent in Service Response and Service Forwarding messages, the keys are generated by the Configuration Host and encrypted using the device's Device Key before being placed in the message payload. The Coordinator and the routing devices forward the encrypted keys without knowing the Device Key, so they are unable to eavesdrop on the value of the new key. This configuration process is between the device's application and the Configuration Host application. It is not part of the overall mesh protocol. An outline of the device application to configuration host application configuration process is presented here for informational purposes. The new device uses a Service Request message to talk to the Configuration Host. The outgoing Service Request message contains a Service MIC in the payload that is calculated using the manufacturer-supplied Device Key. (This Service MIC is not the DLL or Network MIC.) The routing device forwards the payload in a Service Forwarding message and the Coordinator sends the message to the Configuration Host. The routing device and the Coordinator do not have the Device Key and so they do not decode the MIC. The Configuration Host uses a well known Server ID (=0) in the Service Request message. The Configuration Host looks up the 8-octet device MAC address and finds the Device Key in its database. If the MIC is OK it authenticates the new device. The Configuration Host sends a message to all Coordinators in the network that sets up a unique Node Key associated with the 8-octet device MAC address. This is a symmetric secret key that will be used for all secure communications between the Coordinators and the new device. In preferred embodiments, Node Key-0 and Node Key-1 are set to the same value to avoid key synchronization problems as the system starts. This same value practice holds for the Maintenance Key-0 and Maintenance Key-1 values as well. After sending the Node key to the Coordinators, the Configuration Host sends a response to the new device using a Service Forwarding Response or Service Response message, where the message payload contains the unique Node Key and the shared Maintenance Key, both encrypted by the new Node's Device Key. This response is sent back to the new device. The new device decrypts the Node Key and the shared Maintenance Key and stores them under the appropriate Key ID.

A device that is newly introduced to a SM network has only a single cryptographic key: its factory-assigned permanent Device key, which is unique to the device. Before the device can participate in the SM network, the device must be commissioned with the network's Maintenance and Mesh keys, together with a device-unique Node key and a second system-assigned device-unique Device key. This commissioning may be made over the network itself, by direct wireless messaging to the device from a proximate commissioning device, or through some extra-protocol means, such as a direct connection to the device.

The Maintenance, Mesh and Node keys are used to authenticate messaging within the SM. Node keys are used to authenticate and encrypt end-to-end network management messaging within the SM. The permanent Device key is used only to authenticate the newly introduced device to the SM network and to protect the system-assigned Device key when it is sent in response to the newly introduced Node. The system-assigned Device key is then used to protect the device's Node key and the shared Maintenance key when they are distributed to the Node. In subsequent messages, the device's Node key is used to protect the Mesh key whenever it is distributed to the Node. Receipt of a message that authenticates under the permanent Device key zeroizes all other keys, setting them to a "keyNotDefined" status, which restores a device's key state to that when it left the factory. This action protects the network against an attacker that has compromised the device's permanent Device key, perhaps by gaining access to the database of all permanent Device keys that exist at key repository, or to the subset database of Device keys of purchased devices that was delivered to the system owner.

Figure 24:
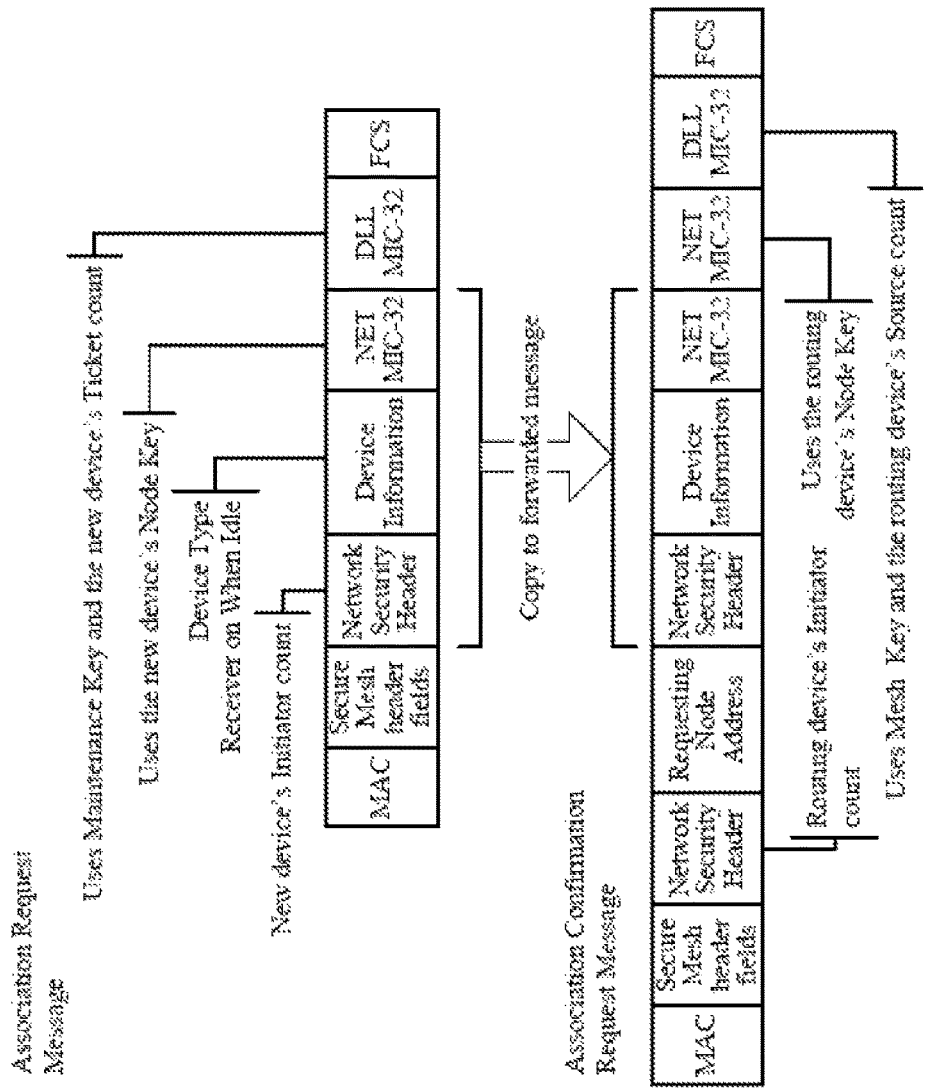
FIG. 24 shows Association Request Security in accordance with an embodiment of the present invention.
Figure 25:
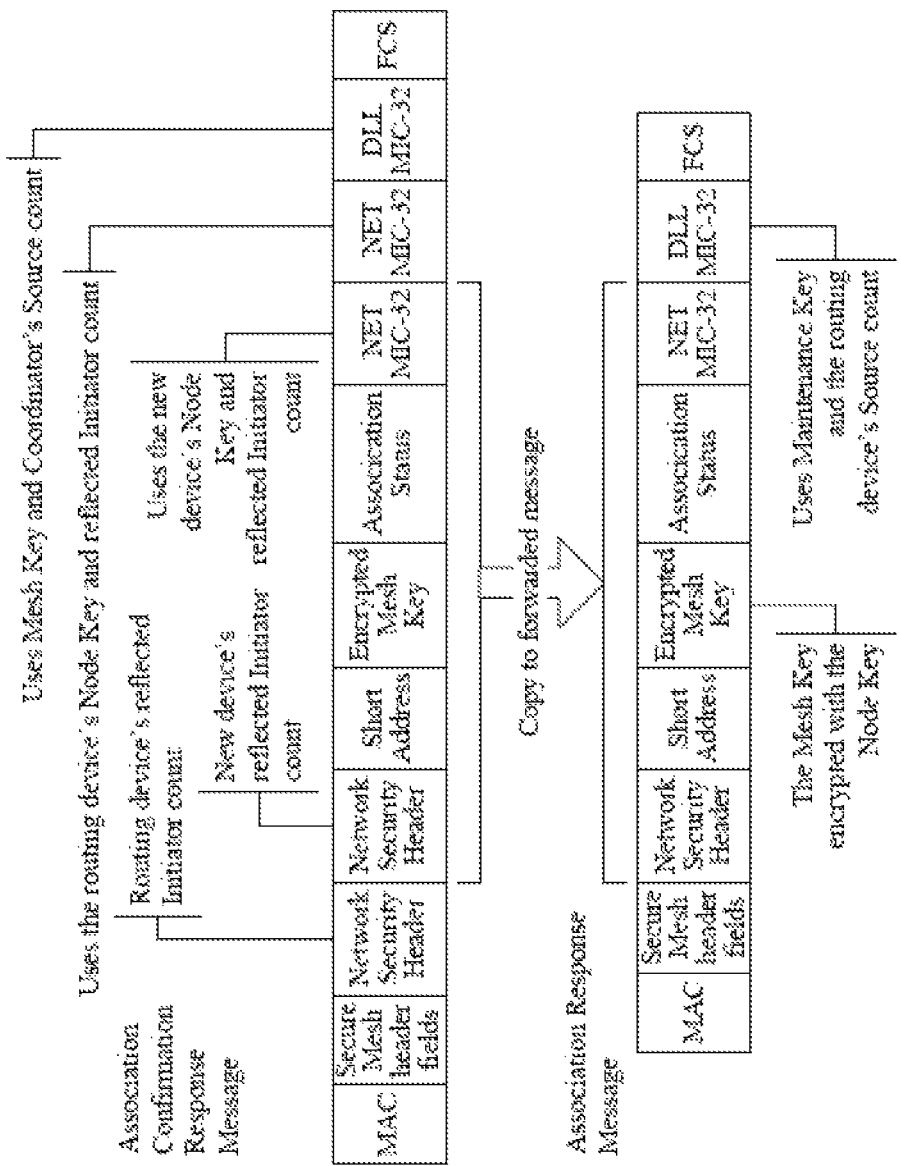
FIG. 25 shows Association Response Security in accordance with an embodiment of the present invention.

A secure association between a device and a Coordinator uses the Association Request and Association Response messages that employ the DLL MIC and Network MIC. The associating device uses the Maintenance Key Ticket count value for the DLL MIC and the Node Key and Originator count value for the Network MIC. The routing forwards the Association Request payload to the Coordinator in the Association Confirmation Request message. The payload also includes the 8-octet MAC address of the new device. This forwarding process is shown in FIG. 24. The Coordinator validates the Association Confirmation Request message DLL Security header and Network Security header. It then validates the embedded Network Security header constructed by the new device using the new device's Node ID and the Originator count in the Network Security header. The Coordinator looks up the Node ID using the 8-octet address in the Association Confirmation Request message in a data base that has been configured by a process outside the scope of the mesh protocol. For valid association requests the Coordinator constructs an Association Confirmation Response message. The message payload has the assigned short address of the new device, the Mesh Key Security Header, the Encrypted Mesh Key and the Mesh Key MIC32. The Mesh Key is encrypted using the new device's Node Key version as specified in the Mesh Key Security Header. The Coordinator constructs a Network Security header and that calculates the Network MIC using the Coordinator's reflected count in the new device's Network Security header and the new device's Node Key. This Network Header is carried as the payload of the Association Confirmation Response message shown in FIG. 25.

The Mesh Key Security Header follows the same format as the 40-bit Network Security control word shown in FIG. 20 with the Reflected Count Flag set to 0. The routing device that forwards the association response to the new device takes the payload of the Association Confirmation Response message and generates the Association Response message using the Maintenance Key and the router's Source count value to calculate the DLL MIC. The new device decrypts the Mesh Key using the Node Key with the Key ID specified in the Encrypted Key Security Header, it then verifies the Mesh Key MIC32 and stores the Mesh Key. Devices that change the primary Coordinator with which they are associated follow the same procedure as new devices. They use the same Association and Association Confirmation messages and the same Node Key and Maintenance Key.

Preferred embodiments of the present invention institute key rotation practices; changing the security keys periodically or when a security event has occurred. The mesh keys used by a device are the Node Key, the Maintenance Key and the Mesh Key. The Coordinator changes these keys using the Keep Alive process and messages.

Each device maintains two versions of each of these keys: Node Key-0, Node Key-1, Maintenance Key-0, Maintenance Key-1, Mesh Key-0 and Mesh Key-1. Each message sent has Key IDs in the DLL Security header and Network Security header that indicate which key is being used. In between key changes all the devices use only one version of each key for transmission and reception. The Coordinator writes the new key to the appropriate key and key version of each device. When the update process is finished and verified at most or all relevant devices, the Coordinator signals the devices to start using the new key for transmission. After all the devices are using the new key for transmission, the Coordinator deactivates the old key for reception.

Figure 26:
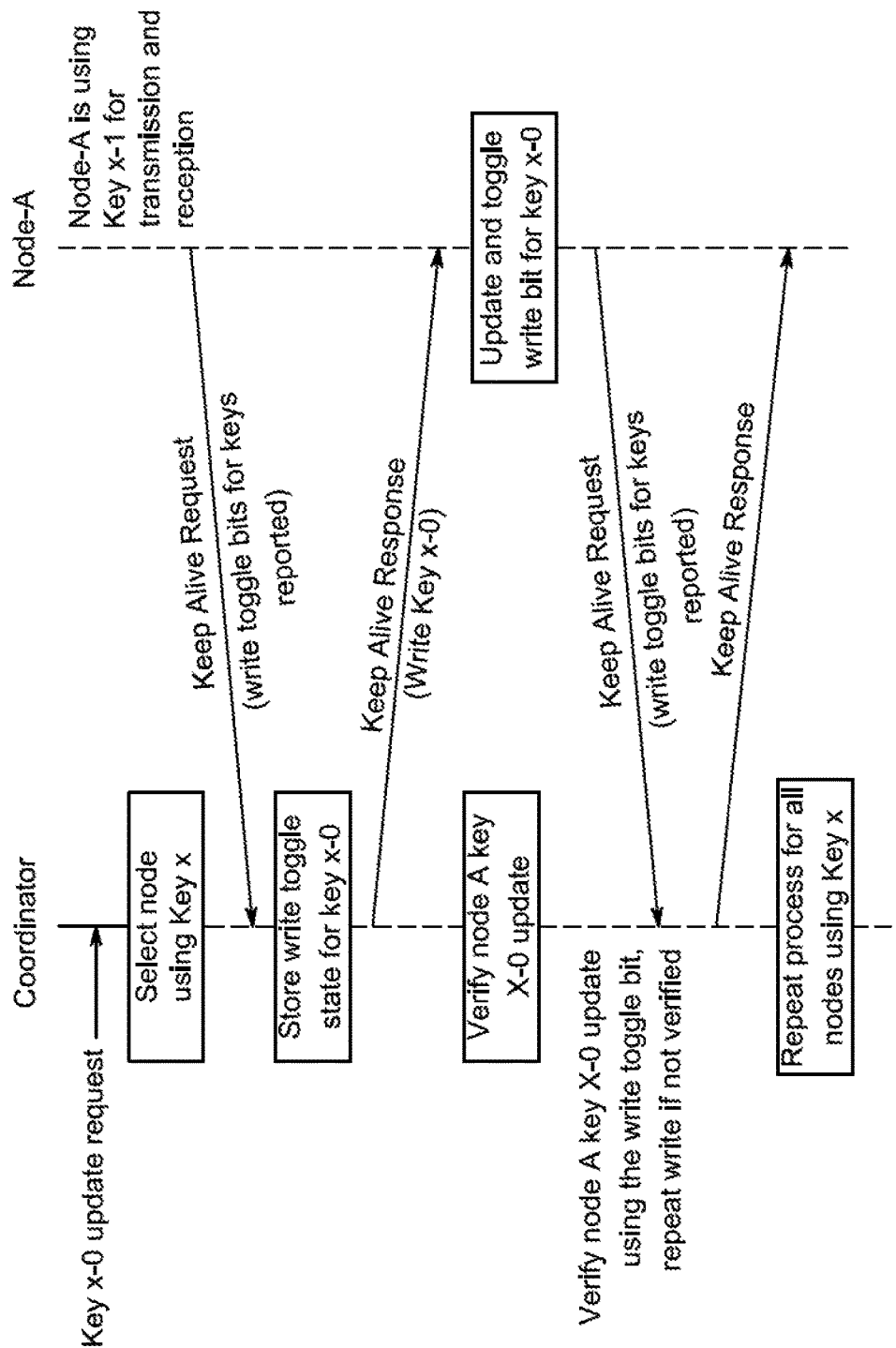
FIG. 26 shows Security Key Updates in accordance with an embodiment of the present invention.

The Coordinator starts an update of a key by getting the current state of the current Write Key Toggle Bit associated with the key. It does this by waiting for a Keep Alive Request message from a device with the key as shown in FIG. 26. The Keep Alive Request message from the device contains the Write Key Toggle State field that tells it current status of the toggle bits for each key. The Coordinator then sends the key update using the Write Key parameter option in the Keep Alive Response message. The Coordinator verifies that the key has been updated by reading the change in state of the selected key's Write Key Toggle Bit in the next Keep Alive Request. The process is repeated if the key has not been changed.

Eventually, all (or almost all) the devices have both the new key and the old key. Only the old key is used for transmission, but either the new key or the old key can be used for reception. The reception key selection is controlled by the DLL Security Header and the Network Security Header.

Figure 27:
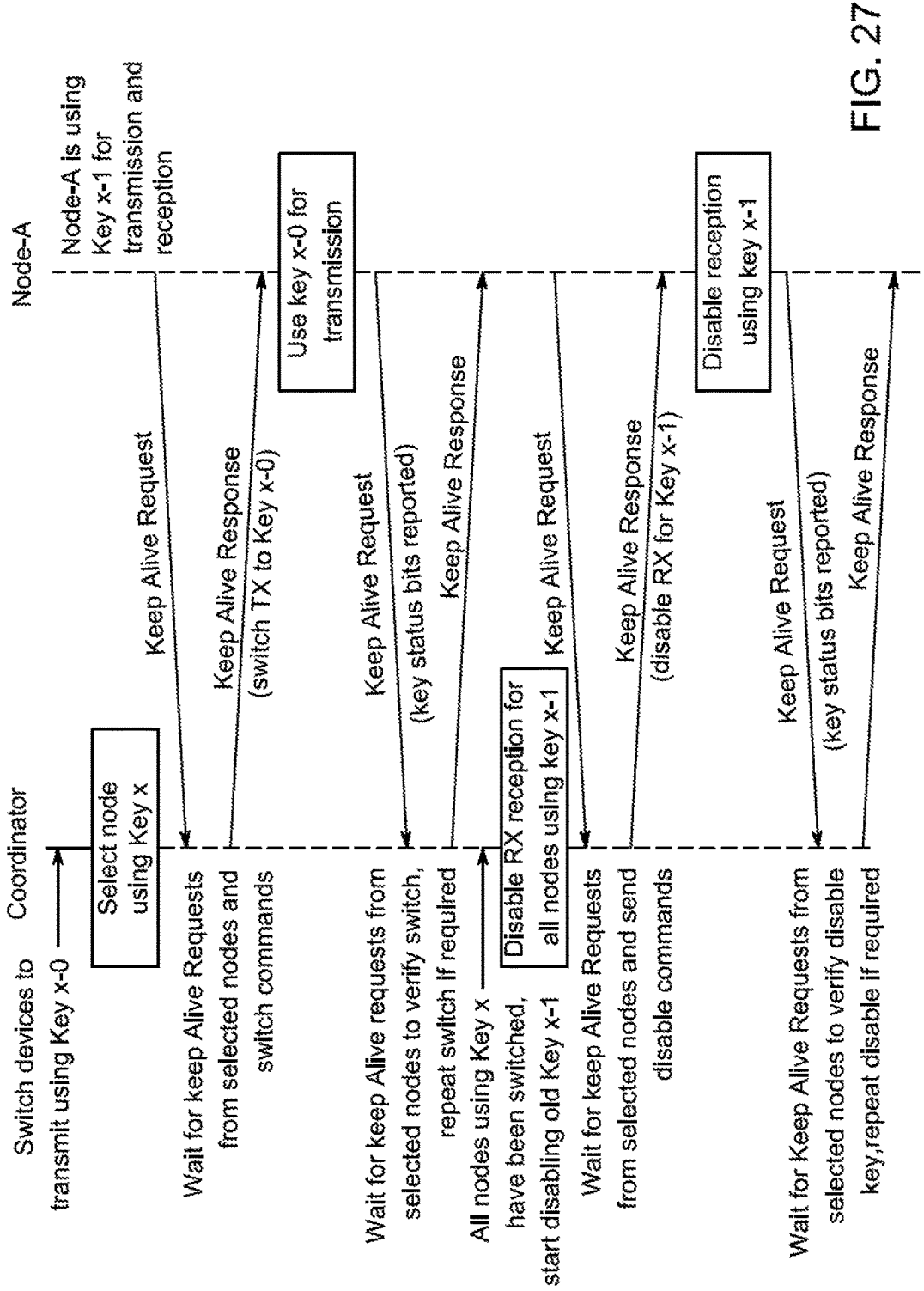
FIG. 27 shows Key Switching and Key Deactivation in accordance with an embodiment of the present invention.

After all devices using the key have been updated and verified, the Coordinator tells the devices to start using the new key for transmission. The Coordinator waits for a Keep Alive Request message from a node using the new key as shown is FIG. 27. In the Keep Alive Response message, the Coordinator commands the node to switch to the new key for transmission. The switch is confirmed in the next Keep Alive Request message received from the device. After all the devices using the new key have switched, the Coordinator deactivates the old key by waiting for a Keep Alive Request and then sending a Keep Alive Response containing the appropriate key deactivate command. The Coordinator verifies the deactivation in the next Keep Alive Request received from the device. This process is used to update Node Keys, Maintenance Keys, and Mesh Keys. The Process for changing a generic Key x, version 0, is depicted in FIG. 26. Note that only the Coordinator is allowed to originate a Keep Alive Response message with key control commands in it.

Figure 28:
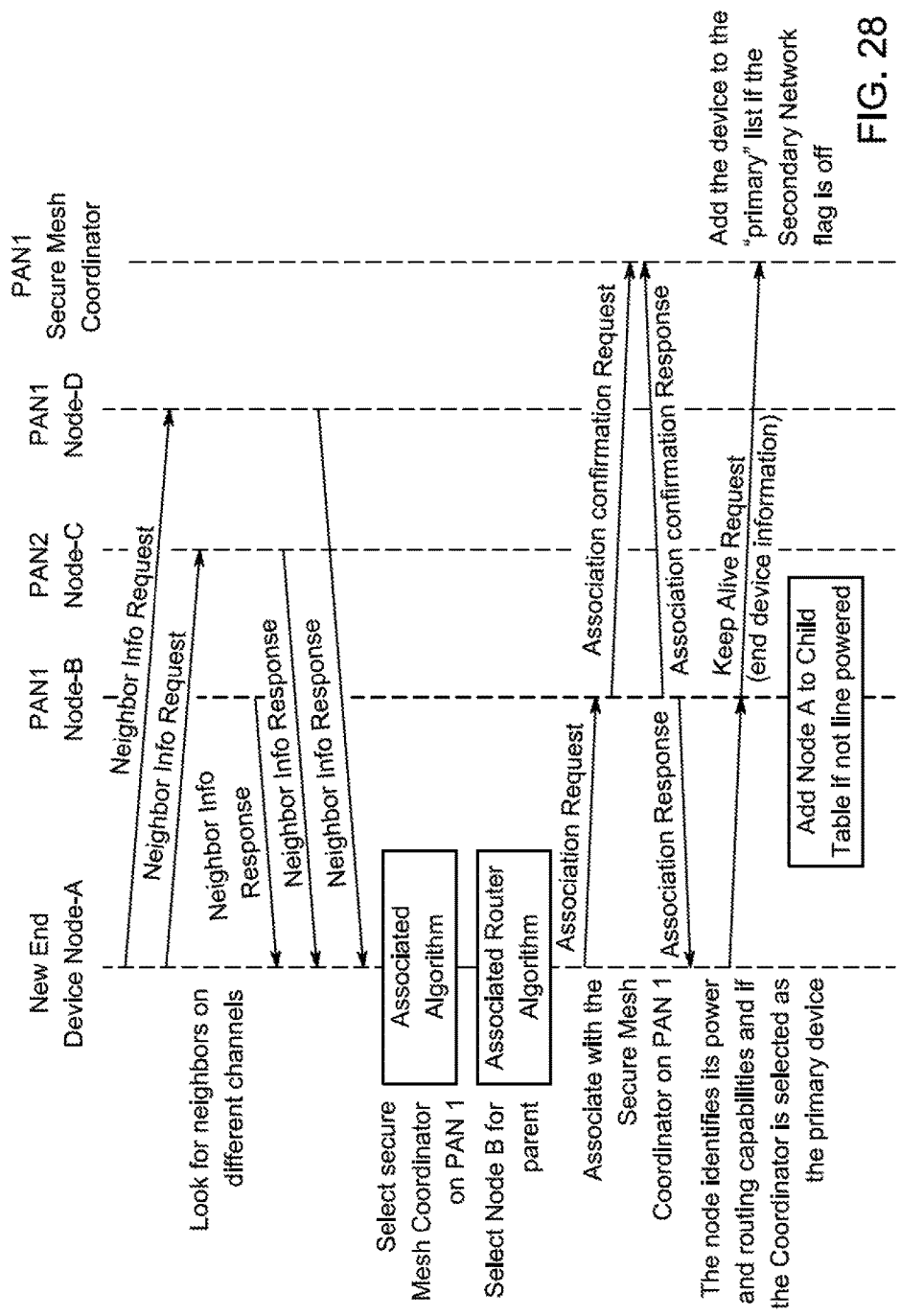
FIG. 28 shows End Device Association in accordance with an embodiment of the present invention.

An End Device's association to the network is similar to that of a regular Node (see Association). The only difference is that after the End Device has selected a Coordinator, it usually also needs to choose a Router to help with message forwarding. FIG. 28 shows a new End Device, Node-A, requesting neighbor information and receiving. In this example there are two PANs and three neighbors. Based on the Association Ratio algorithm, Node-A selects the Coordinator on PAN 1. It also selects Node-B as its Parent using the Parent Selection algorithm. Node-A then sends Node-B an Association Request message, which Node-B converts to an Association Confirmation Request message addressed to the Coordinator. The Coordinator sends the Association Confirmation Response message back to Node-B. Node-B then sends the Association Response message to Node-A. Node-B adds Node-A to its End Device Table after receiving a Keep-Alive Request message from Node-A with the "Device Type" set to End Device type and the Receiver On When Idle bit reset (to off). This first Keep-Alive Request message also carries the Multicast Group Addresses list which is captured by Node-B for future filtering and forwarding of Multicast messages. The Coordinator receives the Keep Alive Request message. A Parent can remove a Node form its End Device Table if it has not received any Keep Alive Request messages from this Node for a period exceeding 24 hours.

Figure 29:
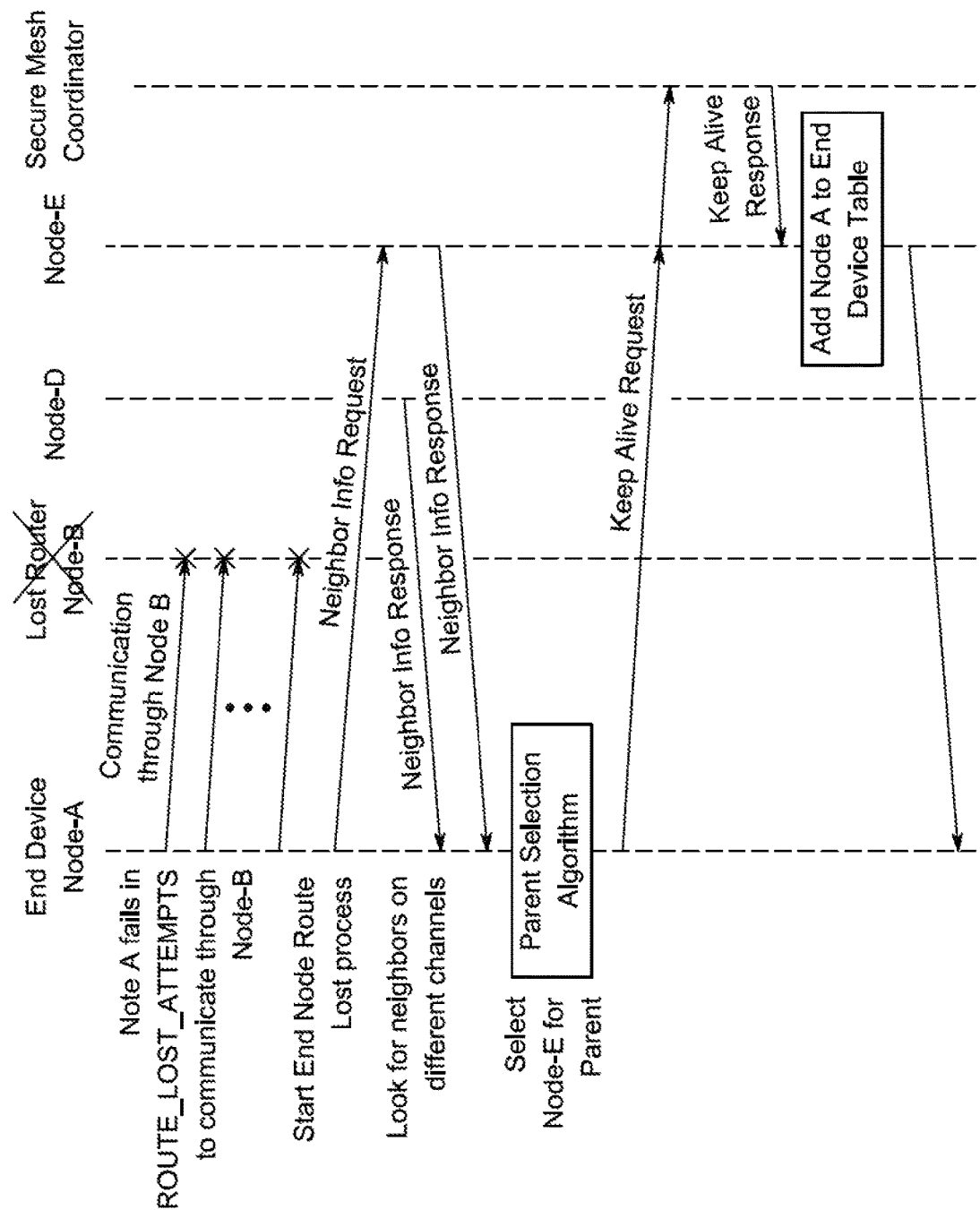
FIG. 29 shows End Device Parent Lost in accordance with an embodiment of the present invention.

When an End Device loses connectivity with its Parent (i.e. after a number of unsuccessful attempts to communicate determined by the ROUTE_LOST_ATTEMPTS parameter), it tries to find another Router on the same network. The End Device sends a Neighbor Info Request on the current channel and uses the Parent Selection algorithm to choose its new Parent. Then it sends a Keep Alive Request to inform both the Parent and the Coordinator of this change. The processes of re-associating with the Coordinator and a new neighbor are shown in FIG. 29. The End Device, Node-A, fails to communicate through Node-B and, after a number (ROUTE_LOST_ATTEMPTS) of attempts it broadcasts a Neighbor Info Request to Nodes on the same channel and PAN. It then selects the best neighbor with which to associate. In this case Node-E is selected. It then sends a Keep Alive Request message to the Coordinator though Node-E. The Coordinator returns a Keep Alive Response message.

Figure 30:
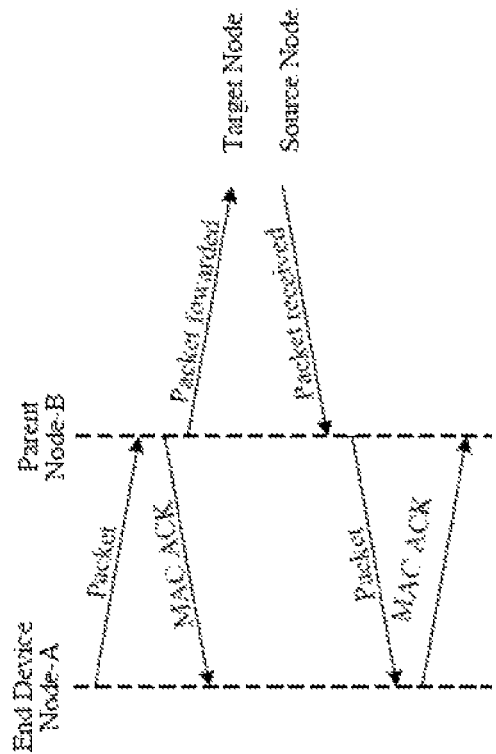
FIG. 30 shows Communication with a Sleeping End Device in accordance with an embodiment of the present invention.

Message forwarding with a non-sleeping End Device is done as soon as received. Referring to FIG. 30, a Non-sleeping End Device advertises its presence to its Parent and to the Coordinator in both the Association Request and the Keep Alive Request messages. In both of these messages, the Device Type field is set to End Device type and the Receiver On When Idle is set.

In the case of transmission by the Sleeping End Device, the Parent allows the End Device to return to sleep as soon as the transmission acknowledgment (802.15.4 ACK MAC-PDU) for the message is received. All frames sent to a Sleeping End Device (unicast, multicast and broadcast) are buffered by its Parent and transmitted to it when it is awake. If a response is expected, a Sleeping End Device wakes up every RESP_SLEEP_PERIOD until the expected response is received. If no response is expected the Sleeping End Device sleeps for the interval SLEEP_CHECK_PERIOD. The Sleeping End Device wakes up periodically at each SLEEP_CHECK_PERIOD to check for buffered frames. It also wakes up when it has a message to transmit. When it wakes up with a message to transmit it first checks for buffered frames before it transmits its own message.

Figure 31:
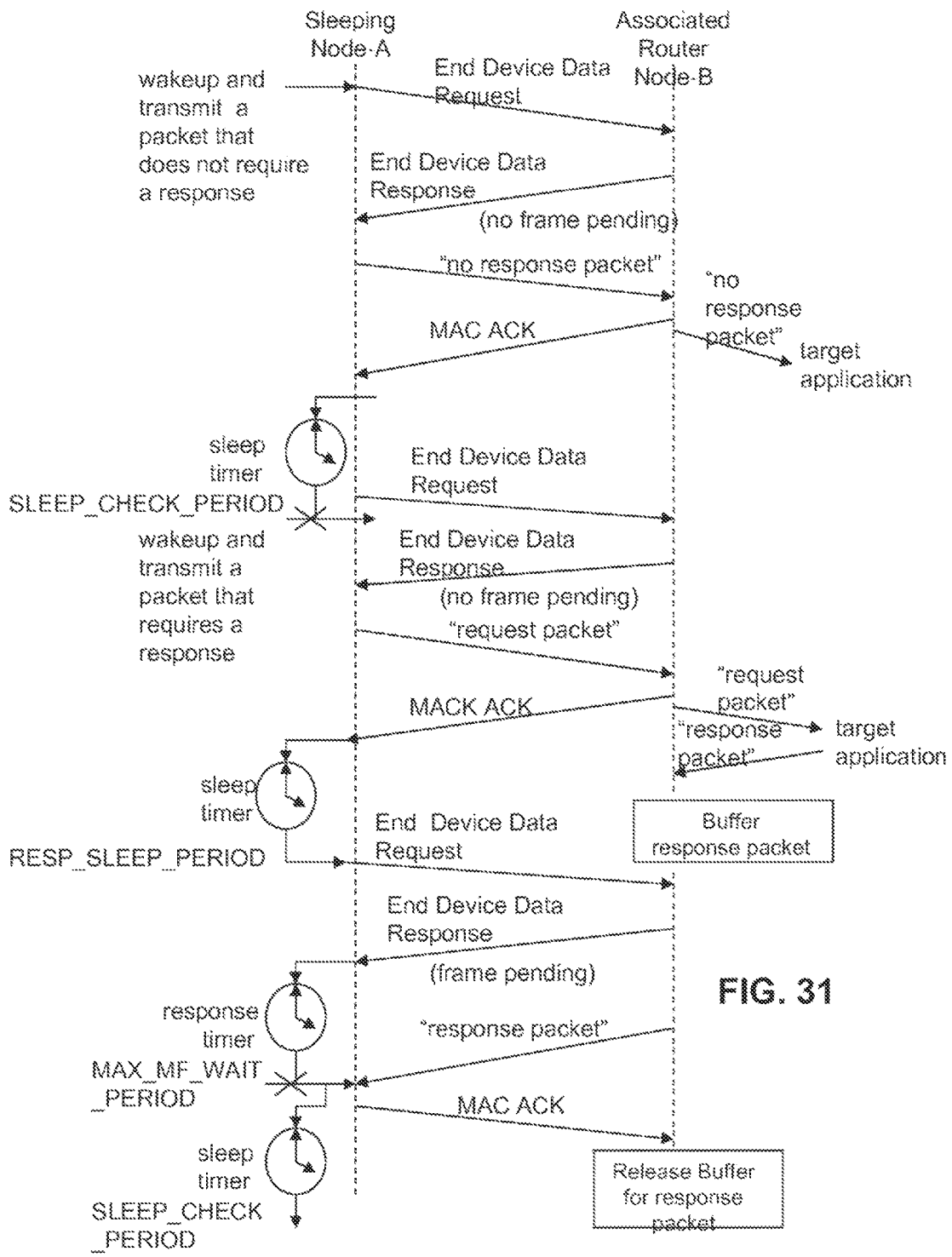
FIG. 31 shows Sleeping End Device Message Forwarding in accordance with an embodiment of the present invention.

The Sleeping End Device frame forwarding process is illustrated in FIG. 31. The sleeping Node-A wake ups and checks for any frames buffered in Node-B by sending an End Device Data Request message. Node B replies with an End Device Response message with the "no Frame Pending" status that tells Node-A there are no frames buffered. Node-A then transmits a frame that does not require a response to a target application through its Parent, Node-B. Node-A waits for an ACK MAC-PDU from Node-B and then goes to sleep for SLEEP_CHECK_PERIOD. This sleep is interrupted when Node-A wakes up to transmit another frame. The new frame is a request that requires a response from the target. The request frame is routed to the target by Node-B. When Node-A receives the MAC level ACK from Node-B, it restarts its sleep timer with a duration set to the value of RESP_SLEEP_PERIOD. Node-B forwards the request frame to the target application that then generates a response frame. Node-B receives and buffers the response frame for Node-A which is sleeping. Node-A wakes at the end of the time period and sends Node-B an End Device Data Request message and receives an End Device Response message with the Frame Pending bit set. Node-A waits for the stored frame for a maximum duration of MAX_MF_WAIT. If it does not receive a frame during this time interval, it resends the End Device Data Request message. In FIG. 31, Node-B sends the response frame in its buffer to Node-A before the MAX-MF_WAIT_PERIOD. Node-A sends Node-B an ACK MAC-PDU and goes back to sleep with the timer duration set to the value of SLEEP_CHECK_PERIOD. Node-B releases the buffer when it receives the ACK MAC-PDU from Node-A.

Figure 32:
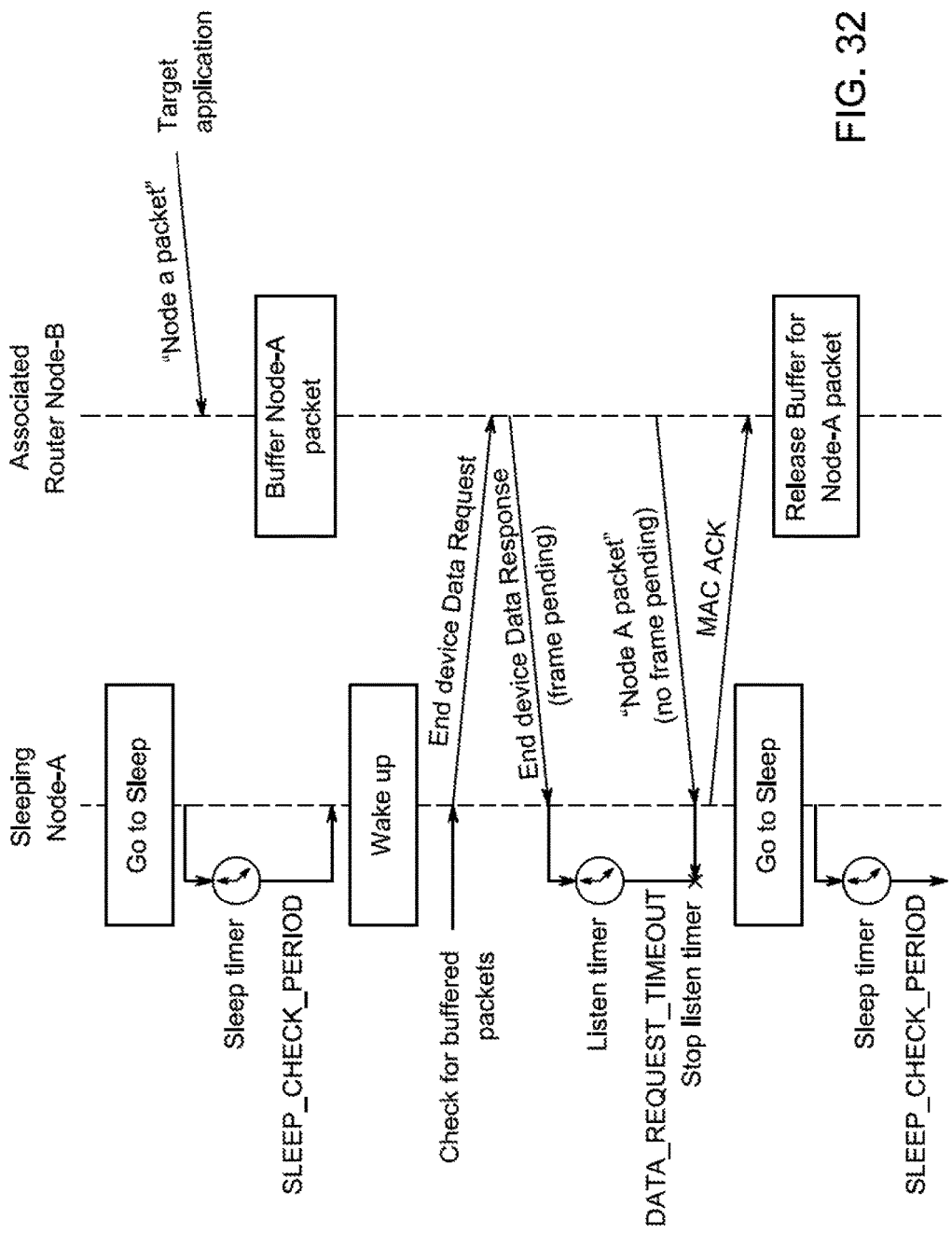
FIG. 32 shows Sleeping End Device Checkpoint Frame Reception in accordance with an embodiment of the present invention.
Figure 33:
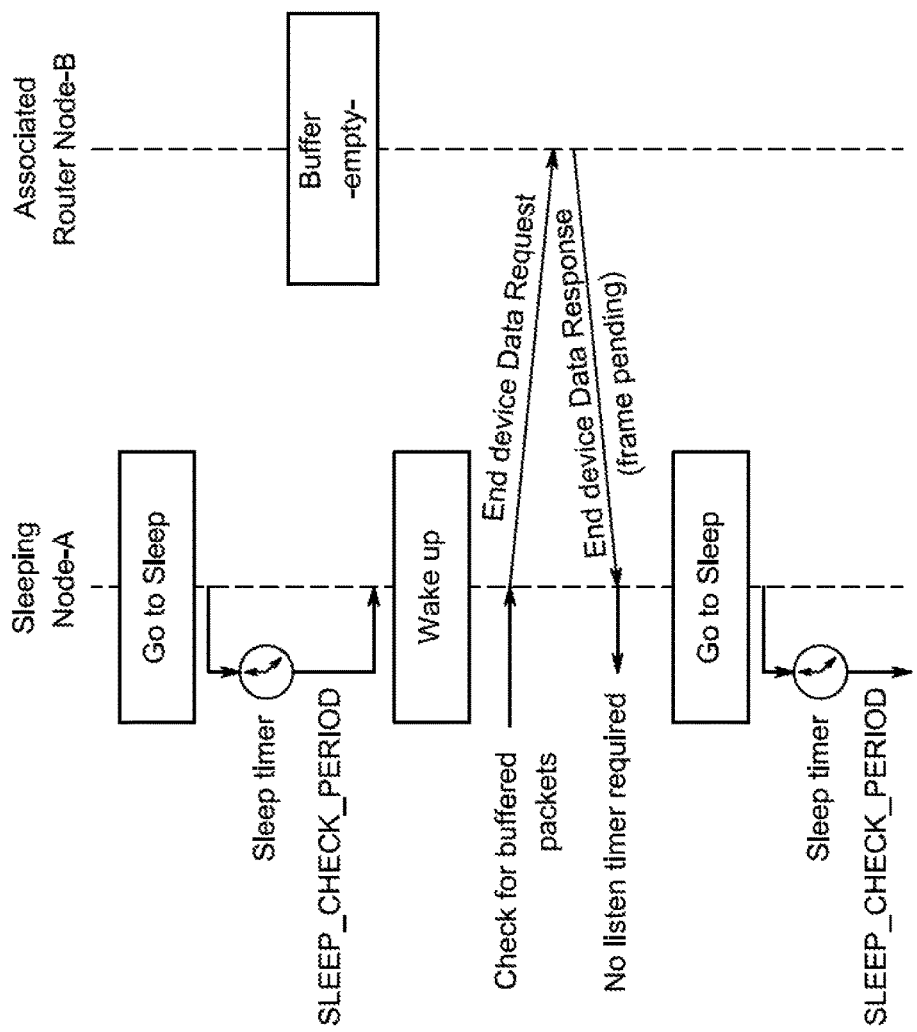
FIG. 33 shows Sleeping End Device Checkpoint—No Frame in accordance with an embodiment of the present invention.

Sleeping End Device wakeups periodically to verify a message is pending. Each SLEEP_CHECK_PERIOD the Sleeping End Device sends an End Device Data Request frame to its Parent and waits a predefined time, DATA_REQUEST. TIMEOUT, listening for pending frames before returning to sleep. FIGS. 32 and 33 show the Sleeping End Device Checkpoint process. In FIG. 32 a message is received for Sleeping End Device, Node-A, and buffered by the Parent Node-B. Node-A wakes when its Checkpoint timer expires. It sends an End Device Data Request message to Node-B and receives an End Device Data Response message with the frame-pending bit set. Node-A then starts its listen timer with a duration of DATA_REQUEST_TIMEOUT and listens for a frame from Node-B. Node-B sends the buffered frame to Node-A, which stops the listen timer. The frame does not have the frame-pending bit set, which tells Node A that there are no more frames to receive. Node-A sets the Checkpoint timer with the duration CHECKPOINT_PERIOD and goes back to sleep. Node-B releases the buffer when it receives the ACK MAC-PDU frame from Node-A.

In FIG. 33, Node-A wakes up when its Checkpoint timer expires. In this case Node-B has no frame stored for Node-A, so when Node-A sends the End Device Data Request message Node-B's replying End Device Data Response message does not have the frame-pending bit set. Node-A sets its Checkpoint timer with the CHECKPOINT_PERIOD and goes back to sleep.

Figure 34:
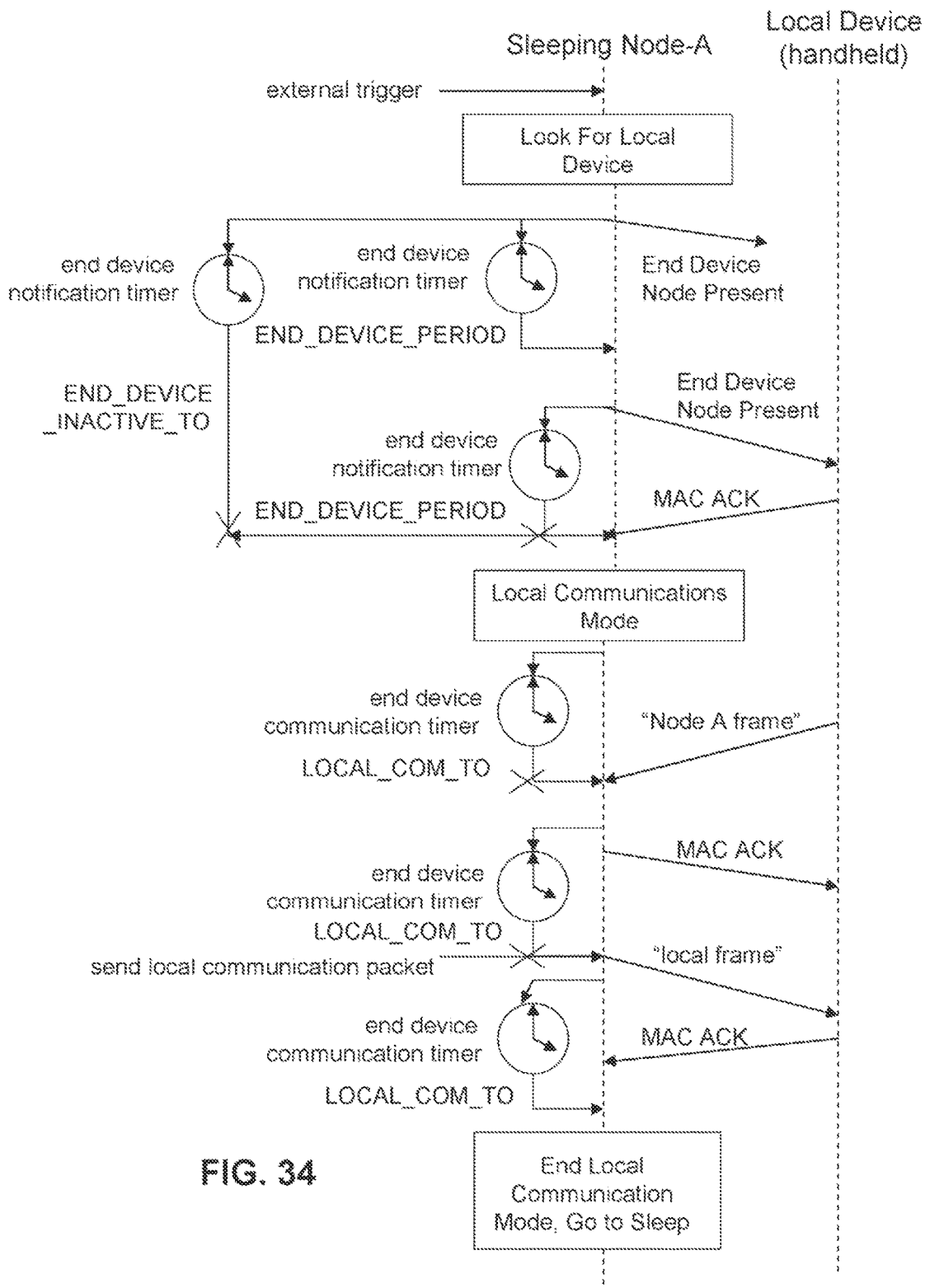
FIG. 34 shows Sleeping End Device Local Communications in accordance with an embodiment of the present invention.

This process exemplified in FIG. 34 is used to initiate a point-to-point communication with a Sleeping End Device. Typical applications for this type of communication are between a handheld device and a sleeping End Device and occur during installation, operation, and maintenance processes. A physical trigger (button, reed switch+magnet) initiates Local Communication. This sets the Sleeping End Device in local communication mode. The Sleeping End Device then sends an End Device Node Present message with a periodicity of END_DEVICE_PERIOD and listens for the interval END_DEVICE_WAIT for any command sent in response. This process stops and the Sleeping End Device goes to sleep if it has not communicated with a local device in the interval determined by the END_DEVICE_INACTIVITY_TO parameter. Once a communication is initiated with a local device, the Sleeping End Device stays in the local communication mode for the time interval determined by the END_DEVICE_INACTIVE_TO parameter after each frame is received or transmitted.

In FIG. 34, a Sleeping End Device, Node-A, receives an external trigger that puts it in a mode where it looks for a local device with which to communicate. It transmits an End Device Node Present frame and starts two timers. The first timer is the end device notification timer, END_DEVICE_PERIOD, which determines how long the Sleeping End Device listens for a response to the notification message. The second timer is the end device notification process timer. It determines how long the Sleeping End Device remains in the state where it is looking for a local device. In FIG. 34. Node-A sends one End Device Node Present message that is not heard by the local device. After the end device notification timer expires, it sends a second End Device Node Present message that triggers a second response by the local device. The ACK MAC-PDU from the local device terminates the two timers and puts Node-A in the local communication mode. In this mode Node-A starts the end device communication timer that is set with a duration specified by the LOCAL_COM_TO parameter. During the first timer period the local device sends Node-A a frame that resets the timer. During the second timer period Node-A initiates a frame of its own to the local device. This transmitted frame also resets the timer. There is no communication during the third period other than the ACK MAC-PDU from the local device. The ACK MAC-PDU does not reset the timer, which then expires, causing Node-A to exit from the local communication mode.

The concept of Dedicated Routers allows the deployment of multiple Coordinators at the same physical location. This approach consists of deploying multiple Routers, possibly with directional antennae, where each Router is dedicated to a specific mesh network/Coordinator. A Dedicated Router has the following specific behavior: a Dedicated Router is associated to a specific Network Name and is manually configured with this name and a Dedicated Router can associate only to the Coordinator or another Dedicated Router; it is not allowed to associate with a normal (non-dedicated) Router. This restriction is imposed to avoid the situation where a Dedicated Router works for some time until its environment changes in such a way that it is no longer capable of establishing a route to its Coordinator. For the computation of the association ratio, a Dedicated Router is seen as a no-hop-distant device similar to a Coordinator. This guarantees that surrounding devices will prefer the Dedicated Router over other Routers for their association. Dedicated Router sets the Dedicated Router Flag in the Neighbor Info Response message. Nodes receiving Neighbor Info Response message with the Dedicated Router Flag set shall consider it to be as a no-hop-distant device when computing its Association Ratio.

The following mechanisms are provided to control the flow of messages on the network and to provide some control on message latency. Most traffic is either sent from or to the Coordinator. Message latency is directly affected by the way the Coordinator manages this traffic. Internally, the Coordinator orders messages based on the importance of the associated task and the notion of priority implemented by the application layer. In the case of the ANSI C12.22 application layer, this notion of priority takes the form of the URGENT flag carried in the Calling AE Qualifier element. To control traffic flow in the reverse direction, the protocol allows the Coordinator to control the timing of the Checkpoint process at each Node. To do this, the Coordinator sends a Keep Alive Initiate message to each Node before the end of that node's CHECKPOINT_PERIOD. Frames routed within the mesh network have an Urgent flag, which when set permits the Router to reorder outbound frames when there are other frames of lesser priority in the transmit queue. Nodes are not permitted to use the entire network capacity for any extended period of time. In the network protocol, this throttling is provided by a single-frame transmission window with an end-to-end acknowledgment.

A mesh forwarding process is required for support services that are used before a Node has associated with a network. This forwarding process allows the unassociated Node to communicate with service hosts such as commissioning or location tracking hosts on a LAN or WAN segment. The commissioning process is implemented by the application. The secure mesh protocol does not determine how commissioning is done, but it does support over-the-network commissioning using the Service and Service Forwarding messages. When used, these messages convey the Node Key and Maintenance Key that will be used by the device so that it is able to run the Association processes. Alternatively, the device could be commissioned with these keys during manufacturing.

Figure 35:
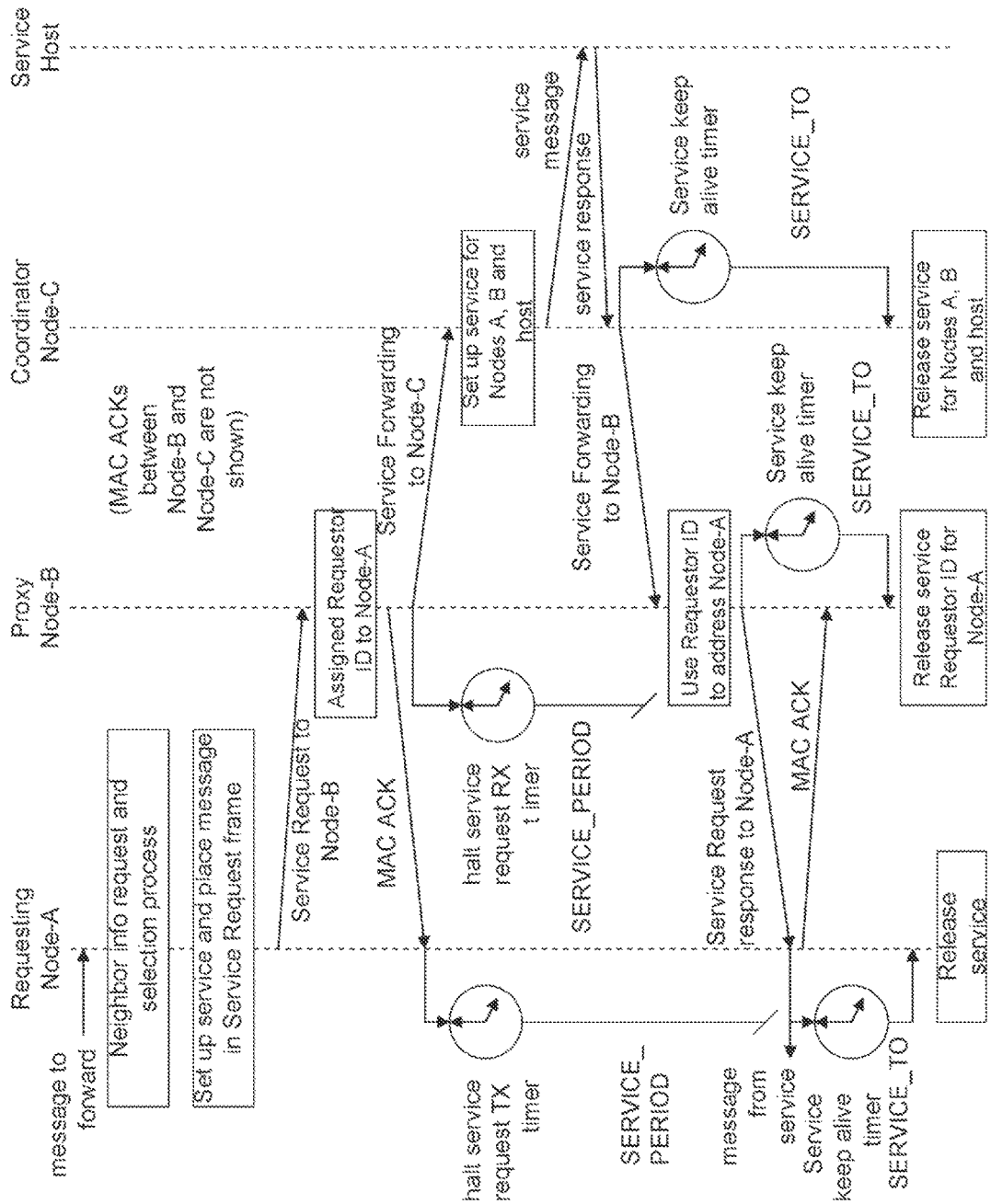
FIG. 35 shows a Forwarding Service in accordance with an embodiment of the present invention.

The forwarding process is illustrated in FIG. 35. The requesting device issues a Neighbor Info Request frame and listens for Neighbor Info Response frames. This is the same process used when the device associates with the network. The neighbor information process is shown in FIG. 3. The device uses the Association Algorithm to pick the neighbor to use as a proxy for service message forwarding. The requesting device, Node-A, places the service message in a Service Request frame addressed to the selected neighbor, Node-B. The Service Request frame identifies the service the message is to go to in the mesh header in the "Server" field. The Service Request frame is then transmitted to Node-B. Node-A starts a "halt service request timer" when the MAC ACK is received from Node-B. This timer is set with the parameter SERVICE_PERIOD that prevents Node-A from sending more service frames until the timer has expired.

Node-B recognizes the Service Request frame from its "service type" and "service code" fields. It processes the frame by assigning the forwarding process for Node-A a "Requestor id" value and sending the contained information to the Coordinator in a Service Forwarding frame. Node-B starts a "halt service request RX timer" when it successfully transmits the Service Forwarding frame. The timer is set with the SERVICE_PERIOD parameter. While the timer is active, Node-B does not accept additional Service Request frames from any Node, including from Node-A.

The SERVICE_PERIOD timeout set by both Node-A and Node-B is cancelled as soon the service host accepts servicing the request as indicated by an appropriate service reply. The SERVICE_PERIOD timeout is reestablished for each new Service Request frame that is sent.

The Coordinator receives the Service Forwarding frame from Node-B. It registers the "Requestor ID" value and Node-B's address. The Coordinator sends the service message contained in the Service Forwarding frame to the service host identified in the "Server Requested" field. When the service host responds, the Coordinator puts the service message in a Service Forwarding Reply frame and addresses it to Node-B. The Coordinator also fills in the "Requestor id" value for Node-A. The Coordinator sets a "Service keep-alive timer" that will release the forwarding process if it is inactive for the duration SERVICE_TO. Releasing the forwarding process for Node-A removes the Node-A's "Requestor id" from memory.

Node-B receives the Service Forwarding frame from the Coordinator and looks up the "Requestor id" to identify Node-A as the destination. The receipt of the Service Forwarding frame sets Node-B's "Service keep-alive timer" for the duration SERVICE . . . TO. If the timer expires before another Service Forwarding frame is received for Node-A, the Node-A "Requestor id" is released. Node-B constructs the Service Requestor response frame and sends it to Node-A.

Node-A receives the Service Requestor response frame and extracts the host's service message. The receipt of the Service Requestor response frame sets Node-A's "Service keep alive timer" for the duration SERVICE_TO. If Node-A does not receive another host message in this time, it times out the service-request process. If later there is another message generated to a host, the service-request process is restarted from the beginning with a new Neighbor Info Request frame.

Every Node in the mesh network can notify the Coordinator rapidly after it loses power or when the power is restored. The performance goal for the process is to have most Nodes notify the Coordinator within one minute after their status changes. Those Nodes that take longer should not exceed the three minutes of backup power provided by the Nodes implementing the Power Outage Routing option as advertised by the Neighbors Exchange service. The system load induced by this process is a critical consideration because every Node may need to communicate in a very short time. Power event report aggregation and low overhead tree routing are employed to reduce the amount of system communication capacity used for this reporting.

Figure 36:
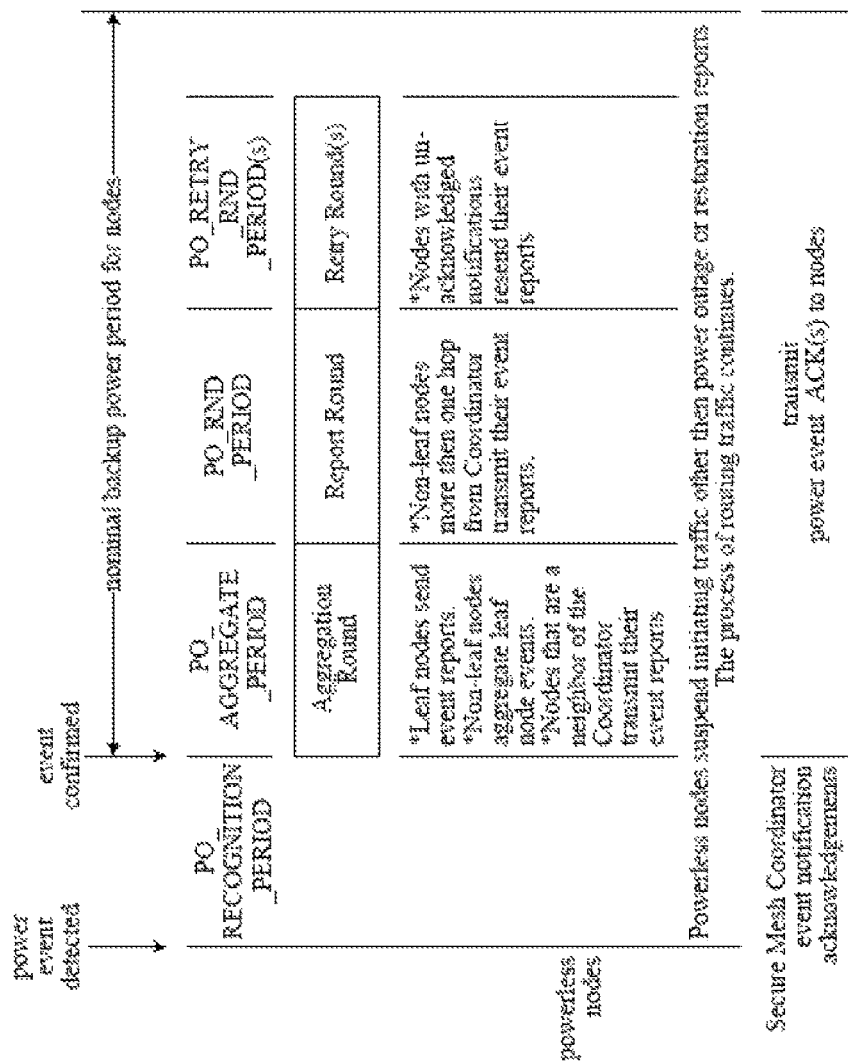
FIG. 36 shows Power Event Notifications from Nodes in accordance with an embodiment of the present invention.

FIG. 36 shows the overall process used by a Node to report a power event. The process starts with a Node detecting a power event and waiting to make sure it is not a transient. For an event to be reported, it has to last more than the time defined by the PO_RECONGNITION_PERIOD parameter.

Any Node that has a power event that passes this transient-suppression test goes into the PO_AGGREGATE_PERIOD round. The leaf Nodes—Nodes without any Children in their Neighborhood Table—and first hop Nodes report their event in this round. To distribute these transmissions more uniformly, each reporting Node transmits at a pseudo-randomly-chosen time within the interval whose duration is PO_AGGREGATE_PERIOD. Nodes receiving events during this interval aggregate these events for later transmission. At the end of the PO_AGGREGATE_PERIOD round, Nodes enter the PO_RND_PERIOD round. Event Nodes that have event reports to send schedule transmission at a pseudo-randomly chosen time within this interval. During this interval, non-aggregating Nodes are free to piggyback their event report to any of the Power Event Report frames that they may route; however, aggregating Nodes must initiate their own Power Event Report frame since the eventual acknowledgment they receive for the forwarded aggregated event reports needs to be broadcast to the aggregator's neighbor Nodes.

The Coordinator receives power event reports and sends acknowledgements. These event acknowledgements follow a source route constructed from the entries in the Power Event Report. Because of this, the acknowledgement message follows the reverse route of the report and confirms the reception to each Node reporting an event. When the target Node is not the last Nodes in the reporting list within the Power Event Report, the target address is set to the broadcast address (=0xFFFF). The broadcast address allows leaf Nodes to be acknowledged using a broadcast at the end of the source route path. Reporting Nodes that do not receive an acknowledgement from the Coordinator at the end of the PO_RND_PERIOD round enter into a PO_RETRY_RND_PERIOD round.

Each such Node schedules a transmission time pseudo-randomly within the following interval of duration PO_RETRY_RND_PERIOD. This round is repeated until the event report is acknowledged or the backup power is exhausted. Nodes acknowledged prior to a scheduled power event reporting transmission do not initiate that transmission, even if they had entered into the retry round. Nodes reporting a power event do not initiate any Data Transfer messaging of their own while they are in any of the power event reporting rounds. All event Nodes continue to route the messages they receive.

Figure 37:
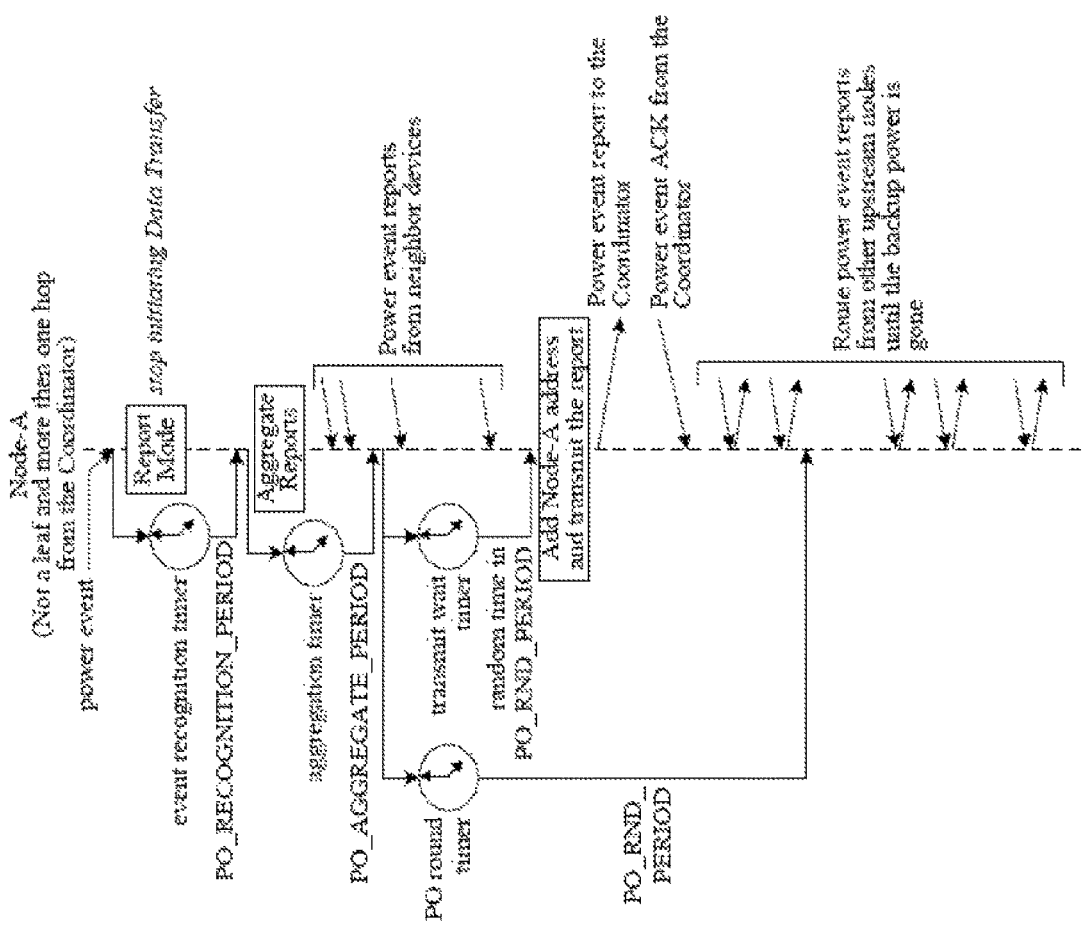
FIG. 37 shows a Multi-Hop Non-Leaf Node Report in accordance with an embodiment of the present invention.

FIG. 37 shows an example of the power outage reporting for a non-leaf Node that is multiple hops away from the Coordinator. Node-A detects a power outage and waits for the time given by PO_RECOGNITION_PERIOD to confirm that the outage is not a transient. Node-A stops initiating Data Transfer messages and does not resume until power is restored. After the recognition interval, Node-A waits for an interval given by the parameter PO_AGGREGATION_PERIOD to collect events from neighboring Nodes. While in the aggregation state, Node-A does not forward Power Event Report frames to the Coordinator unless the message contains event reports from multiple Nodes. At the end of the aggregation state, Node-A enters into the PO_RND_PERIOD round. Node-A delays for a pseudo-randomly chosen time within the interval of duration PO_RND_PERIOD before sending a Power Event Report frame. If Node-A needs to route a Power Event Report frame during this delay and has no events aggregated, it piggybacks its own report and sends the resulting frame to the next hop.

At the end of the delay, if Node-A was not able to piggyback its event, it initiates its own Power Event Report frame including any additional aggregated events.

After sending or piggybacking its event report, Node-A expects an acknowledgment from the Coordinator. In FIG. 37, Node-A receives this acknowledgement and so it does not enter into a retry state at the end of the current round. Even though Node-A does not go into a retry round, it continues to route messages until its backup power is exhausted.

Figure 38:
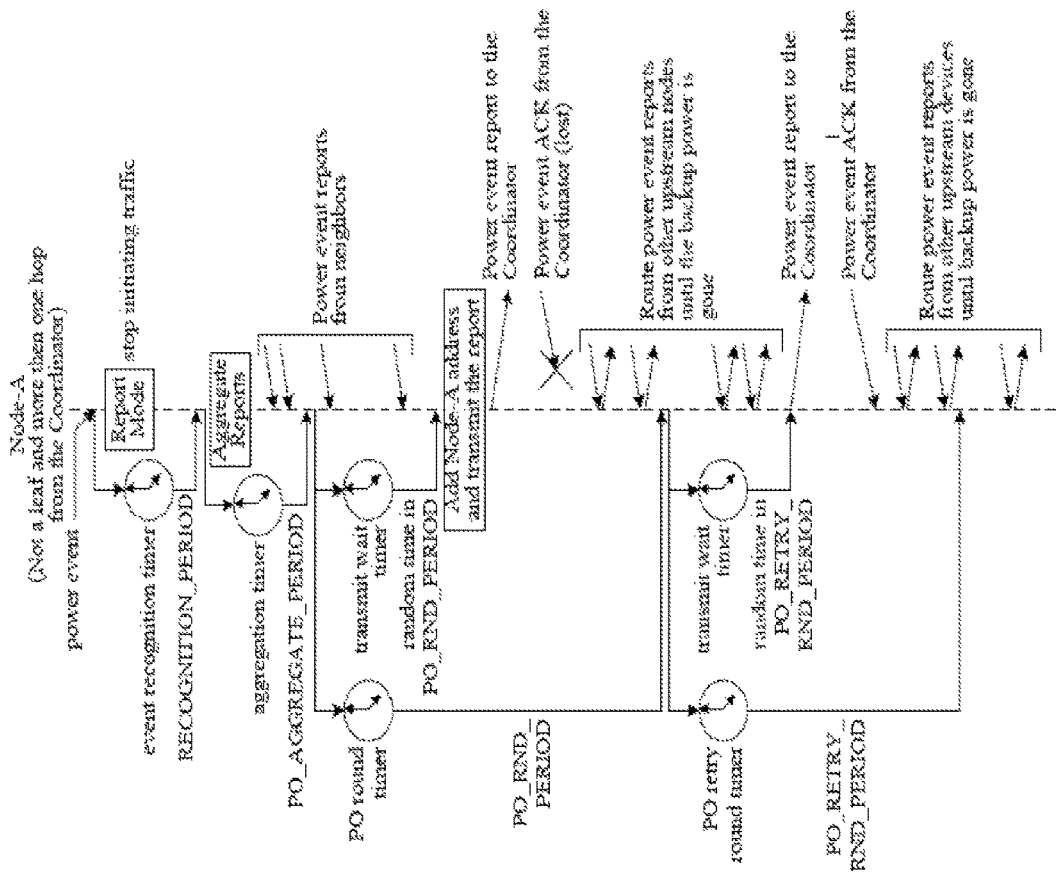
FIG. 38 shows a Retry Power Event Report in accordance with an embodiment of the present invention.

FIG. 38 depicts the process in which Node-A fails to get an acknowledgement for a power event report and has to retransmit the report. The actions taken by Node-A are the same as those in the failure-free case shown in FIG. 37 until the acknowledgement from the Coordinator is lost in the PO_RND_PERIOD round.

At the end of the round, Node-A goes into a retry round. The retry round lasts for the time determined by the PO_RETRY_RND_PERIOD parameter. Node-A selects its retry transmit time pseudo-randomly within the period and resends a power event report containing its address. Node-A does not have to originate a retry frame if it has an opportunity to add its event report to a routed Power Event Report frame while in the retry round.

Figure 39:
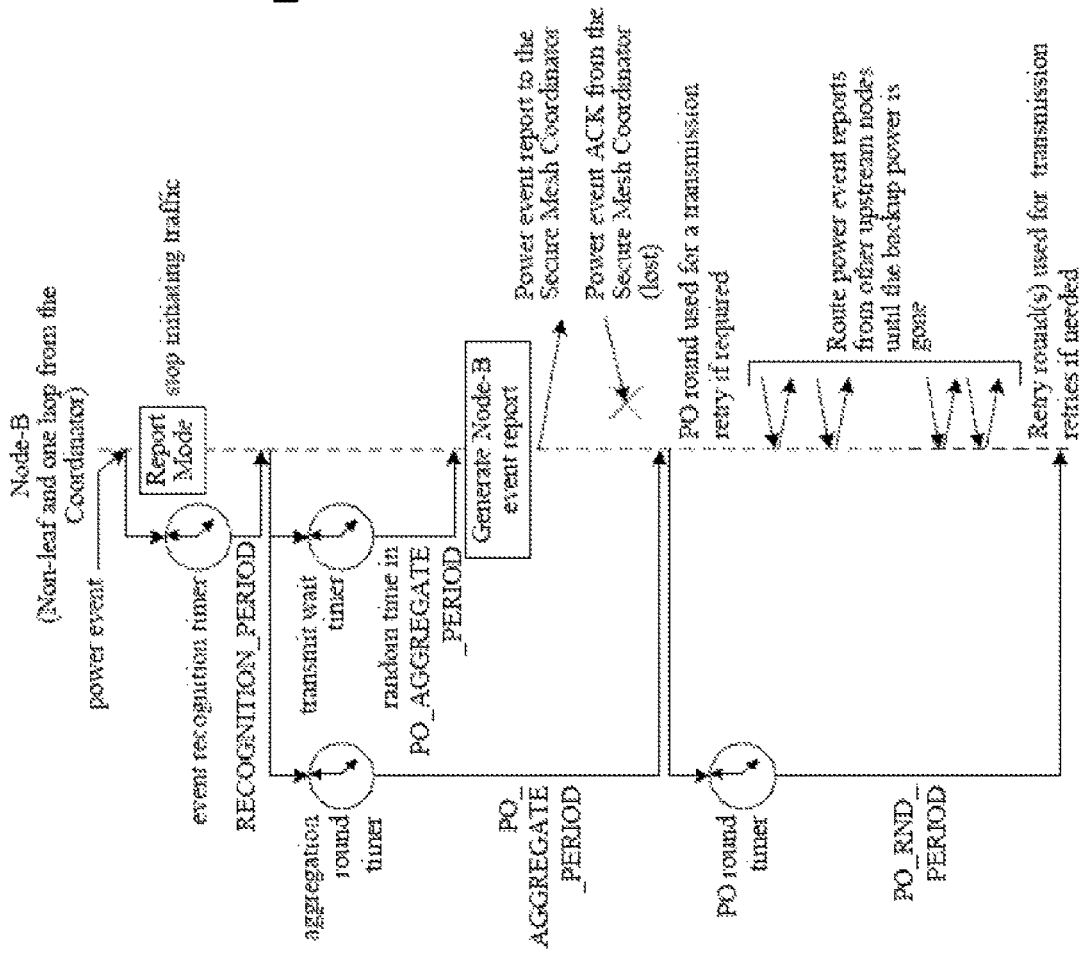
FIG. 39 shows a One Hop Non-Leaf Node Report in accordance with an embodiment of the present invention.

An example of power event reporting for a Node that is one hop from the Coordinator is shown in FIG. 39. Node-B is a neighbor of the Coordinator. One-hop Nodes can transmit their reports to the Coordinator in the PO_AGGREGATE_PERIOD round. Node-B transmits the power event report after a pseudo-randomly-chosen delay and receives an acknowledgement. If the acknowledgement were not received, the Node would retransmit the event report in the following PO_RND_PERIOD round.

Figure 40:
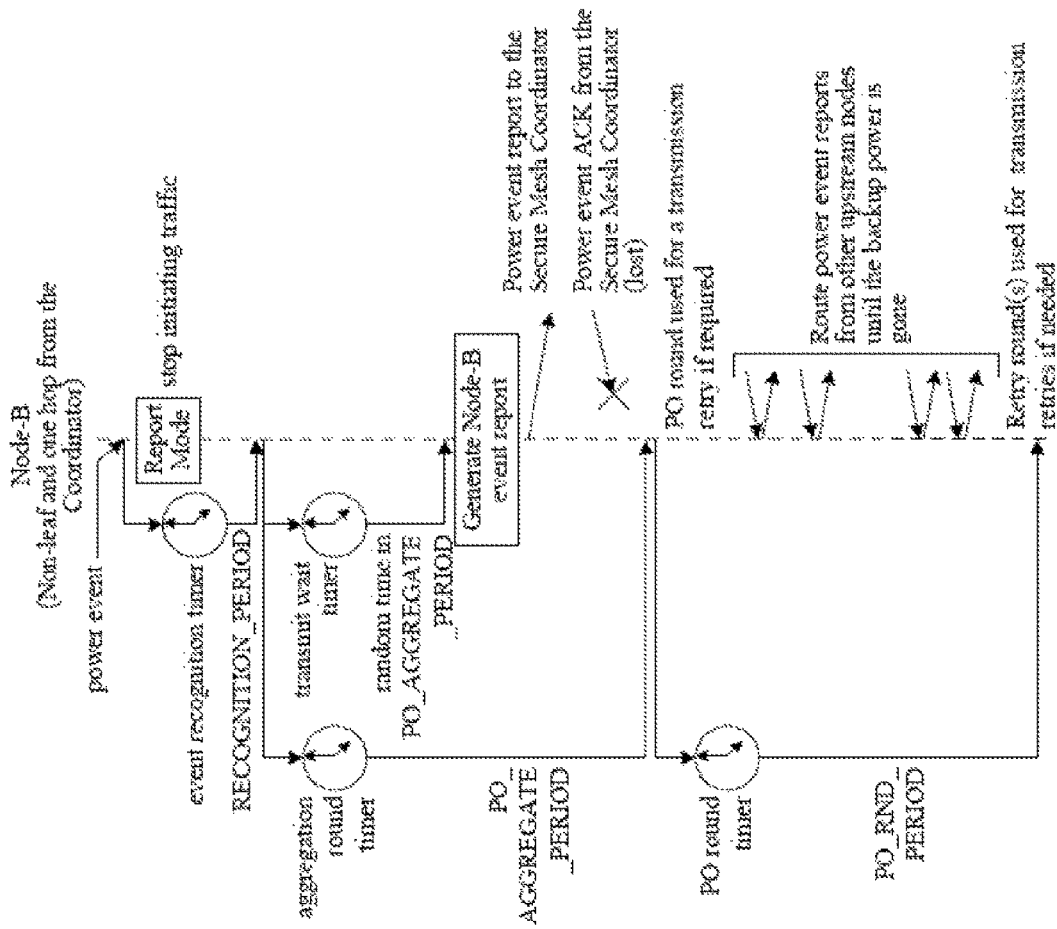
FIG. 40 shows a Leaf Node Power Event Report in accordance with an embodiment of the present invention.

Leaf Nodes transmit their reports during the PO_AGGREGATE_PERIOD round. FIG. 40 shows a typical leaf Node power event reporting process. A Leaf Node, Node-C, chooses a pseudo-random time within the interval of duration PO_AGGRETATE_PERIOD to transmit its power event report. The acknowledgement for this report may not be received until near the end of the interval of duration PO_RND_PERIOD. In this case Node-C receives the acknowledgement and its power event reporting process is completed. If an acknowledgement is not received, Node-C enters an interval of duration PO_RETRY_RND_PERIOD and retransmits the event report. This continues until Node-C runs out of backup power or an acknowledgement is received.

Tree routing is normally used to send power outage/restoration event notification frames. Mesh routing may also be used as an alternate method if the Node has been waiting to send its event for more than the time set by the parameter POWER_REPORT_WAIT.

Power restoration reporting uses the same process and messaging as power outage reporting, except that the parameters PO_RND_PERIOD and PO_RETRY_RND_PERIOD are replaced by the parameters PR_RND_PERIOD and PR_RETRY_RND_PERIOD. For Nodes that are members of overlapping networks, power outage and power restoration notifications may be done to any of the registered networks. Different Coordinators are selected in round-robin fashion at each attempt of reporting a notification. Attempts to send power restoration notifications are repeated up to the duration RESTORATION_TIMEOUT. Nodes that are not members of overlapping networks initiate an Association process after waiting an interval whose duration is RESTORATION_TIMEOUT. After a successful Association, the associating Nodes do not need to send Power Event Report messages since the Association process itself sets the Coordinator's state for the Node to "Alive."

A mesh multicast service is used to send application level information to a group of Nodes that share the same group address. A group address is a 2-octet short address within the range 0x3000 to 0x3FFF. Group addresses are well known or configured, with well known addresses assigned from address 0x3FFF and decreasing while configured addresses are assigned from address 0x3000 and increasing. The mesh layer does not provide services to configure group addresses; such assignment needs to be made by the application layer from a centralized location such as the Coordinator.

A Mesh multicast service consists of a local broadcast by the originator of the multicast message. Each Router receiving this message verifies: that the message has been received from an authenticated Node listed in its Neighborhood table; and that the message Originator address and Request ID do not match those of a previously processed message. The Router then verifies that the Target Address matches one of its own group addresses. If a match is found, the message is propagated to the Router's upper layers for processing. The Router also determines whether the Target Address matches a group address of its child End Devices. If so, the message is sent to each child End Device having a matching group address. A copy of the message is saved for each Sleeping End Device with a matching group address.

Child-group-addresses are acquired by a Parent Router by inspecting the first Keep Alive Request message sent by each child End Device after the End Device chooses or changes its primary parent. Routers do not forward group-addressed frames to End Devices for which they are not primary parents.

Multicast Data Transfer frames with a Max Remaining Hops field greater than one are re-broadcast. To re-broadcast a message the Router first decrements the Max Remaining Hops field and broadcasts the resulting message to its own neighbors. Duplicate multicast messages are ignored based on the messages' Originator address and Request ID as specified previously.

The Max Remaining Hops field can be used to limit the region for which a multicast is sent. To target all Nodes within the network, a Coordinator should set the Max Remaining Hops field to the value MAX_HOPS. To achieve the same result for frames from a different source, a non-Coordinator Node should set the Max Remaining Hops field to twice the value MAX_HOPS. All SM nodes in a group have the well known group address shown in Table 5.

TABLE 5

Well known group addresses

| Address | Group |
| --- | --- |
| 0x3FFF | All SecureMesh Nodes |

Figure 41:
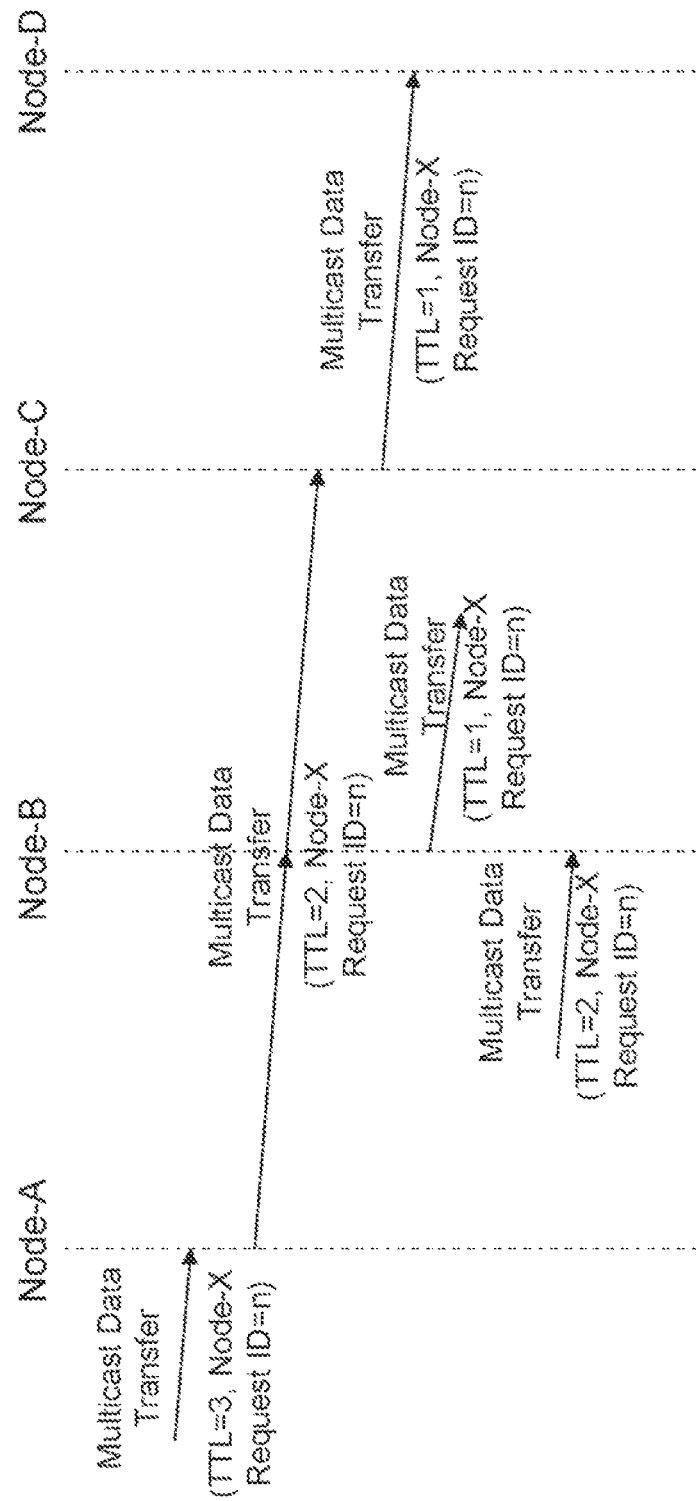
FIG. 41 shows a Mesh Multicast in accordance with an embodiment of the present invention.

A simple example of the mesh multicast process is shown in FIG. 41. Node-X initiated the multicast data transfer, which progressed through the mesh network until it reached Node-A and Node-B, where Node-A is a neighbor of Node-B and Node-C, and Node-C is a neighbor of Node-D, but Node-B is not a neighbor of Node-C. Node-A receives the Multicast Data Transfer frame and checks the Originator Address and Request ID. Because it appears to be a previously-unreceived multicast frame and the value of the Max Remaining Hops field is greater than one, Node-A forwards the frame after decrementing the value of the Max Remaining Hops field. The forwarded frame goes to Node-B and Node-C. Both Node-B and Node-C also forward the frame to their neighbors. The frame forwarded by Node-C goes to Node-D where it is not re-forwarded because the value of the Max Remaining Hops field in the received frame equals one. At a later time, Node-B receives the multicast frame via another route. This duplicate frame carries the same Originator Address and Request ID as the prior frame, so it is discarded and not forwarded.

The local communication process is used to initiate point-to-point communication between two Nodes that may not already be part of the same mesh network. Typical applications that use this type of communication are installation, operation and maintenance activities and walk-by reading of Nodes using a handheld reader. Local communications use the Node's long 8-octet IEEE EUI-64 address rather than its short 2-octet address. In the cases of walk-by communication with targeted devices that are not sleeping, the handheld device issues the Local Broadcast Request frame to initiate local communication. From the responses to this local broadcast, the handheld device can build a table of local devices that are awake, where each table entry includes the following information about the responding Node: long and short addresses;

PAN IDs; Device Class information; and optionally Network Name, security flag, VERSION, OWNER, and BAR_CODE_ID.

From this resulting acquired table of device information, the user can select the device with which to communicate. There are two local communication options: 1) local data transfers that use the application level services using Local Data Transfer frames, and 2) RF link measurements using the Range Test Request and Range Test Response frames.

Figure 42:
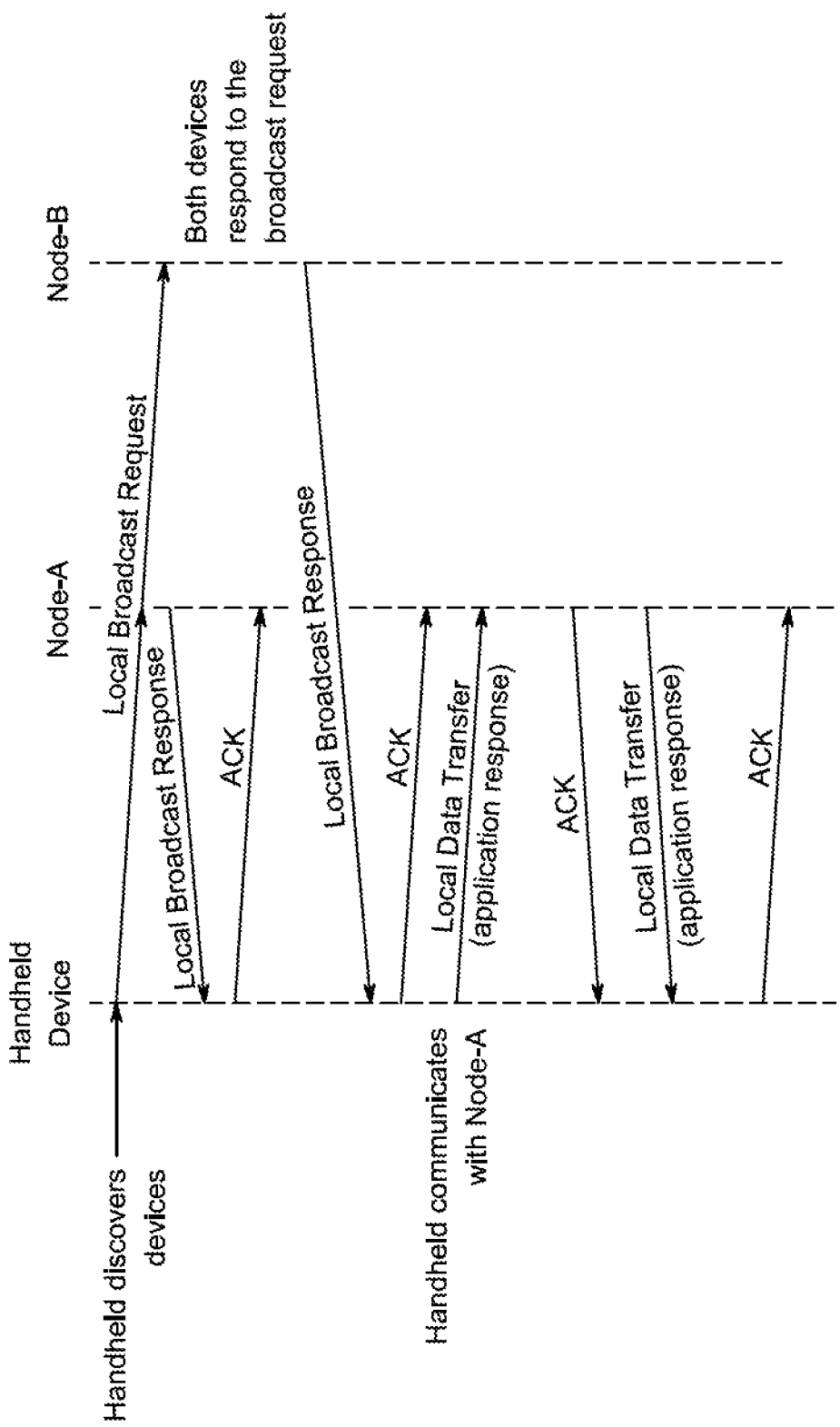
FIG. 42 shows a Local Communication in accordance with an embodiment of the present invention.

FIG. 42 shows a typical local communication sequence. The handheld device discovers the local nodes by transmitting a Local Broadcast Request frame. This message is answered by Node-A and Node-B. The handheld application selects Node-A and sends it a Local Data Transfer frame that executes an application service such as a read operation. Node-A responds with a Local Data Transfer frame containing the application response. All frames except the first broadcast frame are acknowledged with MAC-level ACKs.

The Range Test process uses the local communication Range Test Request and Range Test Response frames. The Range Test Request command frame is used to check whether Node is reachable in the local communication mode. The Range Test Response frame reports the signal strength as recorded by the responder in the forward direction. The signal strength of the response is measured by the range test originator to determine signal strength in the return direction. The Range Test Initiate and Range Initiate Result frames can be used to request one Node to perform a range test with a different Node and to report the test results to the requester. A typical example of this function is for a handheld test tool to request a Router to do a range test with an End Device.

Figure 43:
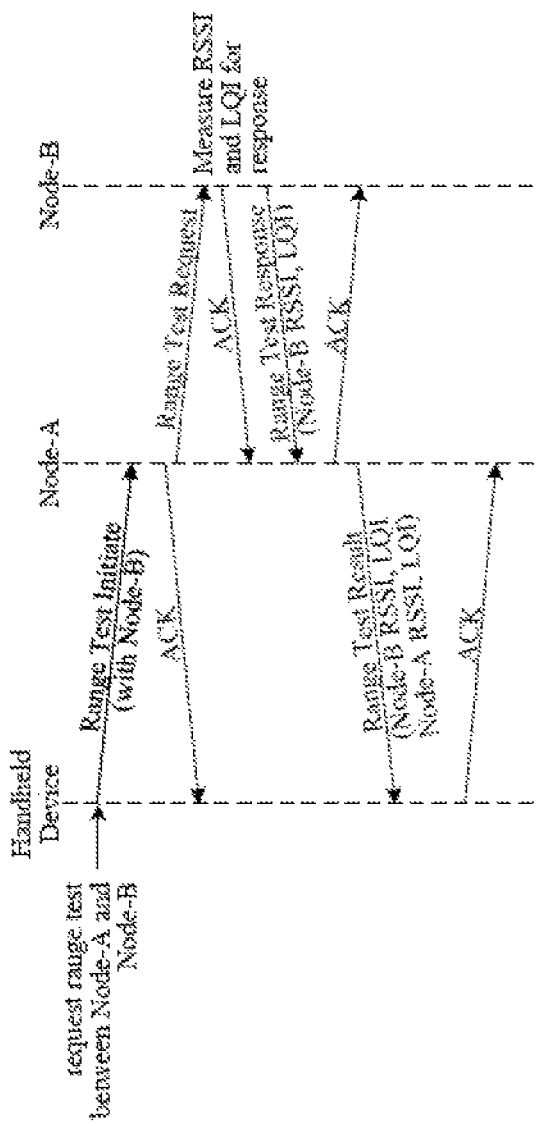
FIG. 43 shows a Range Test in accordance with an embodiment of the present invention.

FIG. 43 shows this process, where a handheld device requests Node-A to perform a range test with Node-B. The Range Test Initiate sent to Node-A tells it to send a Range Test Request to Node-B. Node-B receives the request and records its modem's RSSI and LQI values as measured during request frame reception. Node-B then sends a Range Test Response to Node-A, which records its modem's RSSI and LQI values as measured during response frame reception. Node-A then sends a Range Test Result to the handheld device, reporting the RSSI and LQI values for both the Range Test Request and Range Test Response frames between Node-A and Node-B.

The FRR test is used to evaluate the one-way link quality between a sender and a receiver. Theses two Nodes need to be able to reach each other directly. The sender sends a configurable number of frames in local communications mode to the receiver. At the end of the test, the receiver sends a result frame to the sender. This frame contains the FRR and the average LQI for received frames. A frame reception rate session consists of: the transmission of the Frame Reception Rate Test Init message; multiple transmission of the Frame Reception Rate rest Data messages; the transmission of the Frame Reception Rate Test End message; and the reception of the Frame Reception Rate Test Result message.

With the exception of the Frame Reception Rate Test Data messages, Frame Reception Rate Test control messages are transmitted with MAC layer acknowledgment and retry. In the case of a MAC layer transmission failure, such control messages are re-transmitted up to a maximum of FRR_T-EST_RETRY times.

Figure 44:
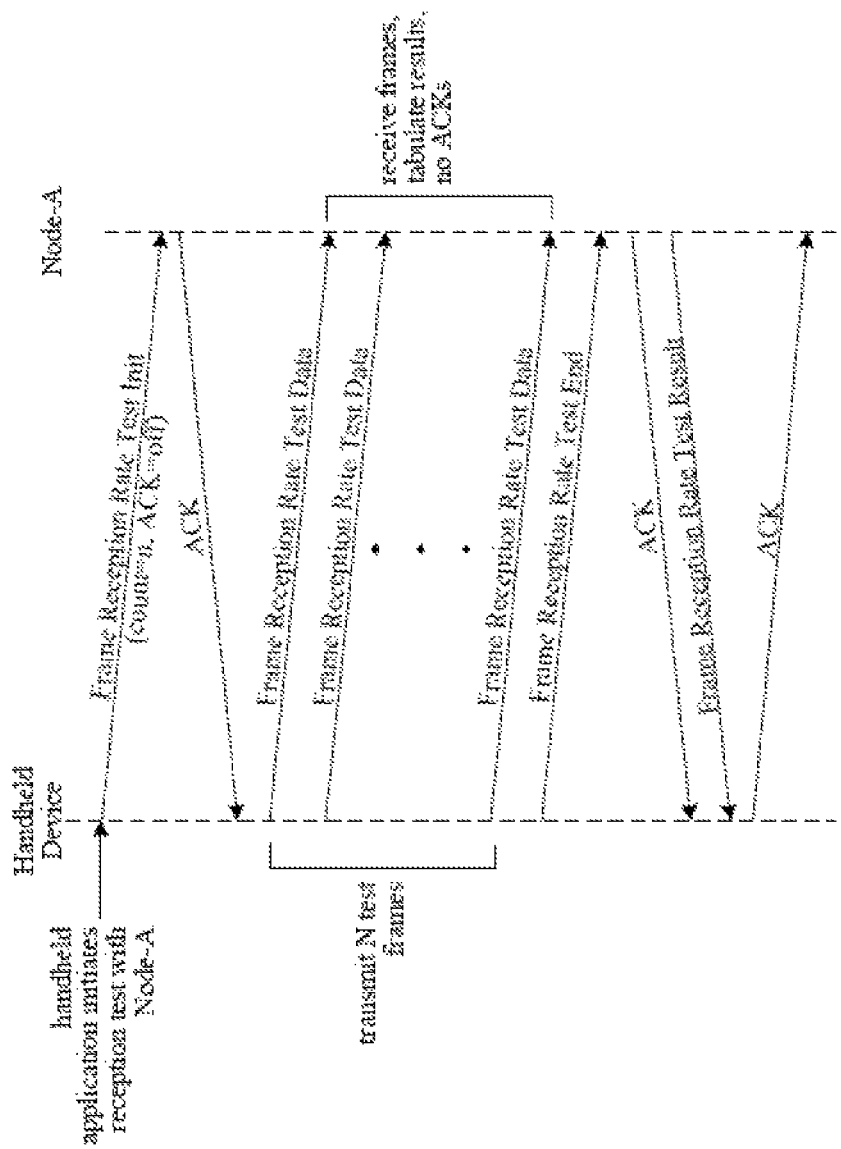
FIG. 44 shows a Frame Reception Rate Test in accordance with an embodiment of the present invention.

An example of the frame reception rate test process is shown in FIG. 44. A handheld initiates the test in this example by sending the Frame Reception Rate Test Init message to Node-A. The test is set to send N test frames without acknowledgements. The handheld starts sending the first of the N test frames to Node-A after it receives the ACK from Node-A for the test-initializing message. The Frame Reception Rate Test End message is sent after the N test frames. The test end message is acknowledged by Node-, which then sends the Frame Reception Rate Test Result v to the testing handheld.

The ping command is used to check whether a Node is reachable through the mesh network, and to determine and trace the routes used for each direction of communication. The Ping frame tests the ability of a device to reach a Node that is more than one hop distant, since testing of the first hop is provided by Range Test commands. A Ping Request can be used by a Coordinator to determine whether a device that is awake is reachable in the intervals between Keep Alive Requests. The Ping Request frame can be used with any type of routing. As the frame traverses each Node, the RSSI and LQI values measured during frame reception are noted. Both values are added to the frame before it is forwarded. The addressed receiving device processes the Ping Request frame, converts it to a Ping Response frame, and sends that response back to the originating device. The RSSI and LQI values measured during frame reception on the return path are appended to those accumulated as the Ping Request frame traversed its forward path.

Figure 45:
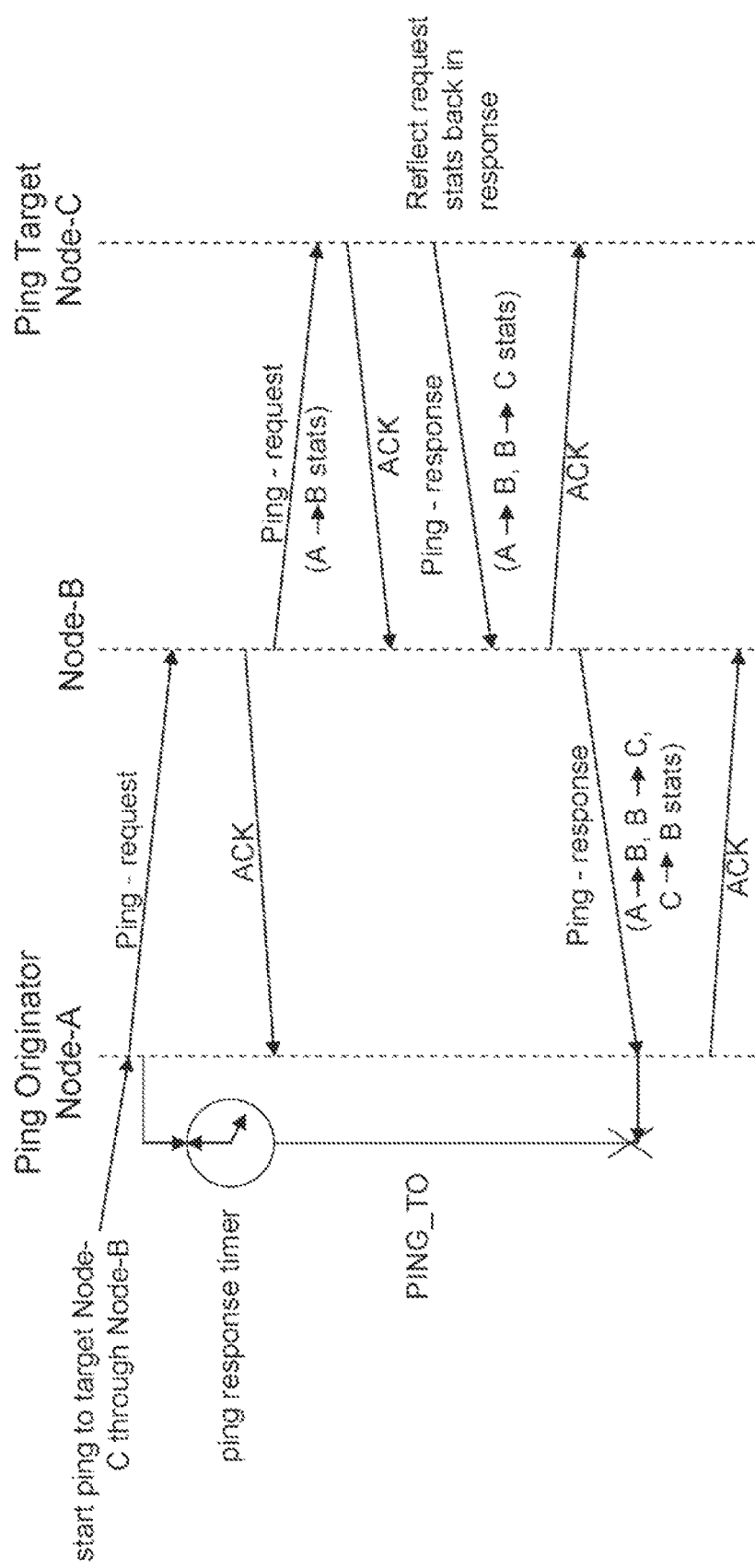
FIG. 45 shows a Ping in accordance with an embodiment of the present invention.

In FIG. 45, Node A initiates a Ping Request message targeting Node-C. The frame within the Ping Request message is routed through Node-B. Node-B updates the frame data by incrementing the hop count, and appending its 2-octet address, the measured RSSI and the observed LQI to the Ping Request frame's accumulated data before forwarding the frame to Node-C. Node C converts the received Ping Request frame to a Ping Response frame and sends it to Node-A. When the Ping Response frame arrives at Node-A, it contains the path traversed by the request and response frames and the measured RSSI and observed LQI values noted at each hop.

The SM frame structure is presented so that the leftmost or first-described field is transmitted or received first. Except for octet arrays, all multi-octet fields are transmitted or received least significant octet first. To maintain compatibility with the IEEE 802 standards, addresses and PAN identifiers are considered octet arrays and are transmitted unaltered, which is equivalent to transmitting them most significant octet first when viewed as multi-octet fields.

Each frame described in this document includes MAC layer fields, which are documented within the mesh layer to provide the context on which the mesh layer operates. The MAC and mesh layers are tightly coupled, so that information required by the mesh layer that is already present at the MAC layer is not duplicated. Descriptions of the MAC layer fields are provided in this subsection so that they need not be duplicated in the description of each mesh-layer frame format. More information on these fields can be found in the IEEE 802.15.4:2006 standard, which is the controlling specification for the MAC protocol and is incorporated herein by reference in its entirety.

TABLE 6

| MAC Layer Fields | | |
|---|---|---|
| Field Name | Data type | Description |
| Frame Control | Unsigned 16 bits | See sub fields below: |
| Frame Type | Bits 2-0 | One of the following frame types:<br>0 = Beacon<br>1 = Data<br>2 = MAC acknowledgment<br>3 = MAC command |
| Security Enabled | Bool 3 | Set if the frame is cryptographically protected by the MAC layer as specified in IEEE 802.15.4: 2006. This bit is reset in the SM protocol. |
| Frame Pending | Bool 4 | Set if the Router sending the frame has additional data frames to send to the targeted End Device following the current transfer. If another frame is pending, the End Device retrieves it by sending another Data Request command to the acknowledging Router. |
| Ack. Request | Bool 5 | Specifies whether an acknowledgment is required from the recipient device on receipt of a data or MAC command frame. |
| Intra-PAN | Bool 6 | Specifies whether the MAC frame is to be sent within the same PAN (intra-PAN) or to another PAN (inter-PAN). When set and both destination and source addresses are present, the frame contains only the destination PAN identifier field. |

TABLE 6-continued

MAC Layer Fields

| Field Name | Data type | Description |
| --- | --- | --- |
| Destination Addressing Mode | Bits 11-10 | Specifies the presence and format of the destination address:<br>0 = PAN identifier and address not present.<br>2 = 2-octet short address present.<br>3 = 8-octet EUI-64 extended address present. |
| Source Addressing Mode | Bits 15-14 | Specifies the presence and format of the source address:<br>0 = PAN identifier and address not present.<br>2 = 2-octet short address present.<br>3 = 8-octet EUI-64 extended address present. |
| Sequence Number | Unsigned 8 bits | Specifies a unique sequence identifier for the frame. When the SM MAC Header Flag is 0: for a data, acknowledgment, or MAC command frame, the sequence number field is used to match an acknowledgment frame to the data or MAC command frame as specified in the IEEE 802.15.4: 2006 standard. When the SM MAC Header Flag is set to 1: the Sequence Number is the least significant octet of the MAC nonce counter, |
| Destination PAN Identifier | Binary 2 octets | Specifies the unique PAN identifier of the intended recipient of the frame. A value of 0xFFFF in this field is the broadcast PAN identifier, which is accepted as a valid PAN identifier by all devices currently listening to the channel. Presence of this field is defined by the Destination Addressing Mode field. |
| Destination Address | Binary 2 octets | Specifies the address of the intended recipient of the frame. A value of 0xFFFF in this field represents the broadcast short address, which is accepted as a valid short address by all devices currently listening to the channel. Presence and content of this field is defined by the Destination Addressing Mode field. |
| Source PAN Identifier | Binary 2 octets | Specifies the unique PAN identifier of the originator of the frame. This field is included only if the Source Addressing Mode and Intra-PAN subfields of the frame control field are nonzero and zero, respectively. |
| Source Address | Binary 2 octets | Specifies the address of the originator of the frame. Presence and content of this field is defined by the Source Addressing Mode field. |
| FCS | Unsigned 16 bits | 2-octet ITU-T CRC as specified by IEEE 802.15.4, without the initial preset or final complementation typical of a frame check sequence (e.g., as in IEEE 802.3). |

Bits 4 to 6 of the first octet of the Mesh header are called the Service type. This field defines the structure of the next of the mesh header and the general behavior of a group of messages. With the exception of the Data Transfer frame, the subsequent header prefix contains a field called Service Code which defines the specific message format for the last of the mesh header. Table 7 enumerates all defined combinations of Service Type and Service Code.

TABLE 7

Defined Service Type and Service Code Combinations

| Service | Service Type | Service Code |
| --- | --- | --- |
| Data transfer | | |
| Data Transfer | 0 | <none> |
| Route discovery | | |
| Route Request | 1 | 1 |
| Route Reply | 1 | 2 |
| Route Error | 1 | 3 |
| Routed services | | |
| Association Confirmation Request | 2 | 0 |
| Association Confirmation Response | 2 | 1 |
| Keep Alive Initiate | 2 | 3 |
| Keep Alive Request | 2 | 4 |
| Keep Alive Response | 2 | 5 |
| Route Establishment Request | 2 | 6 |
| Route Establishment Response | 2 | 7 |
| Power Event Report Notification | 2 | 8 |
| Power Event Report Acknowledgment | 2 | 9 |
| Ping Request | 2 | 10 |
| Ping Response | 2 | 11 |
| Service Forwarding Request | 2 | 12 |
| Service Forwarding Response | 2 | 13 |
| Non routed service | | |
| Association Request | 3 | 0 |
| Association Response | 3 | 1 |
| Neighbor Info Request | 3 | 2 |
| Neighbor Info Response | 3 | 3 |
| Neighbors Exchange | 3 | 4 |
| End Device Data Request | 3 | 5 |
| End Device Data Response | 3 | 6 |
| Service Request | 3 | 7 |
| Multicast data transfer | | |
| Mesh Multicast | 4 | <none> |
| Point to point communication | | |
| Local Data Transfer | 5 | 0 |
| Frame Reception Rate Test Init | 5 | 1 |
| Frame Reception Rate Test Data | 5 | 2 |
| Frame Reception Rate Test End | 5 | 3 |
| Frame Reception Rate Test Result | 5 | 4 |
| Local Broadcast Request | 5 | 20 |
| Local Broadcast Response | 5 | 21 |
| End Device Node Present | 5 | 22 |

TABLE 7-continued

Defined Service Type and Service Code Combinations

| Service | Service Type | Service Code |
|---|---|---|
| Range Test Request | 5 | 30 |
| Range Test Response | 5 | 31 |
| Range Test Initiate | 5 | 32 |
| Range Test Result | 5 | 33 |

The following table defines which message is implemented for the supported devices.

TABLE 8

Message supported per Node Type

| Message | End point | Coordi-nator | Rout-er | End Device | Hand-held |
|---|---|---|---|---|---|
| Data transfer | Originator | Y | Y | Y | |
| | Target | Y | Y | Y | |
| Mesh Multicast | Originator | Y | Y | Y | |
| | Target | Y | Y | Y | |
| End Device Data Request | Originator | | | Y | |
| | Target | | Y | | |
| End Device Data Response | Originator | | | Y | |
| | Target | | Y | | |
| Association Request | Originator | | Y | Y | |
| | Target | Y | | | |
| Association Response | Originator | Y | | | |
| | Target | | Y | Y | |
| Association Confirmation Request | Originator | | Y | | |
| | Target | Y | | | |
| Association Confirmation Response | Originator | Y | | | |
| | Target | | Y | | |
| Neighbor Info Request | Originator | | Y | Y | |
| | Target | | Y | | |
| Neighbor Info Response | Originator | | Y | | |
| | Target | | Y | Y | |
| Neighbors Exchange | Originator | | Y | Y | |
| | Target | | Y | Y | |
| Route Request | Originator | | Y | Y | |
| | Target | | Y | Y | |
| Route Reply | Originator | | Y | Y | |
| | Target | | Y | Y | |
| Route Error | Originator | | Y | Y | |
| | Target | | Y | Y | |
| Keep Alive Initiate | Originator | | Y | | |
| | Target | | | Y | |
| Keep Alive Request | Originator | | | Y | Y |
| | Target | Y | | | |
| Keep Alive Response | Originator | | Y | | |
| | Target | | | Y | Y |
| Route Establishment Request | Originator | | Y | Y | |
| | Target | Y | | | |
| Route Establishment Response | Originator | | Y | | |
| | Target | | Y | Y | |
| Power Event Report | Originator | | Y | Y | |
| | Target | Y | | | |
| Ping Request | Originator | | Y | Y | |
| | Target | | Y | Y | |
| Ping Response | Originator | | Y | Y | |
| | Target | | Y | Y | |
| Service Request | Originator | | Y | Y | |
| | Target | | Y | Y | |
| Service Forwarding | Originator | | Y | Y | |
| | Target | | Y | | |
| Local Broadcast Request | Originator | | | | Y |
| | Target | | Y | Y | Y |
| Local Broadcast Response | Originator | | Y | Y | Y |
| | Target | | | | Y |
| End Device Node Present | Originator | | Y | Y | |
| | Target | | | | Y |
| Local Data Transfer | Originator | | Y | Y | Y |
| | Target | | Y | Y | Y |
| Frame Reception | Originator | | | | Y |
| Rate Test Init | Target | | Y | Y | |
| Frame Reception | Originator | | | | Y |
| Rate Test Data | Target | | Y | Y | Y |
| Frame Reception | Originator | | | | Y |
| Rate Test End | Target | | Y | Y | Y |
| Frame Reception | Originator | | Y | Y | |
| Rate Test Result | Target | | | | Y |
| Range Test Request | Originator | | | | Y |
| | Target | | Y | Y | Y |
| Range Test Response | Originator | | Y | Y | Y |
| | Target | | | | Y |
| Range Test Initiate | Originator | | | | Y |
| | Target | | Y | Y | Y |
| Range Test Result | Originator | | Y | Y | Y |
| | Target | | | | Y |

Figure 46:
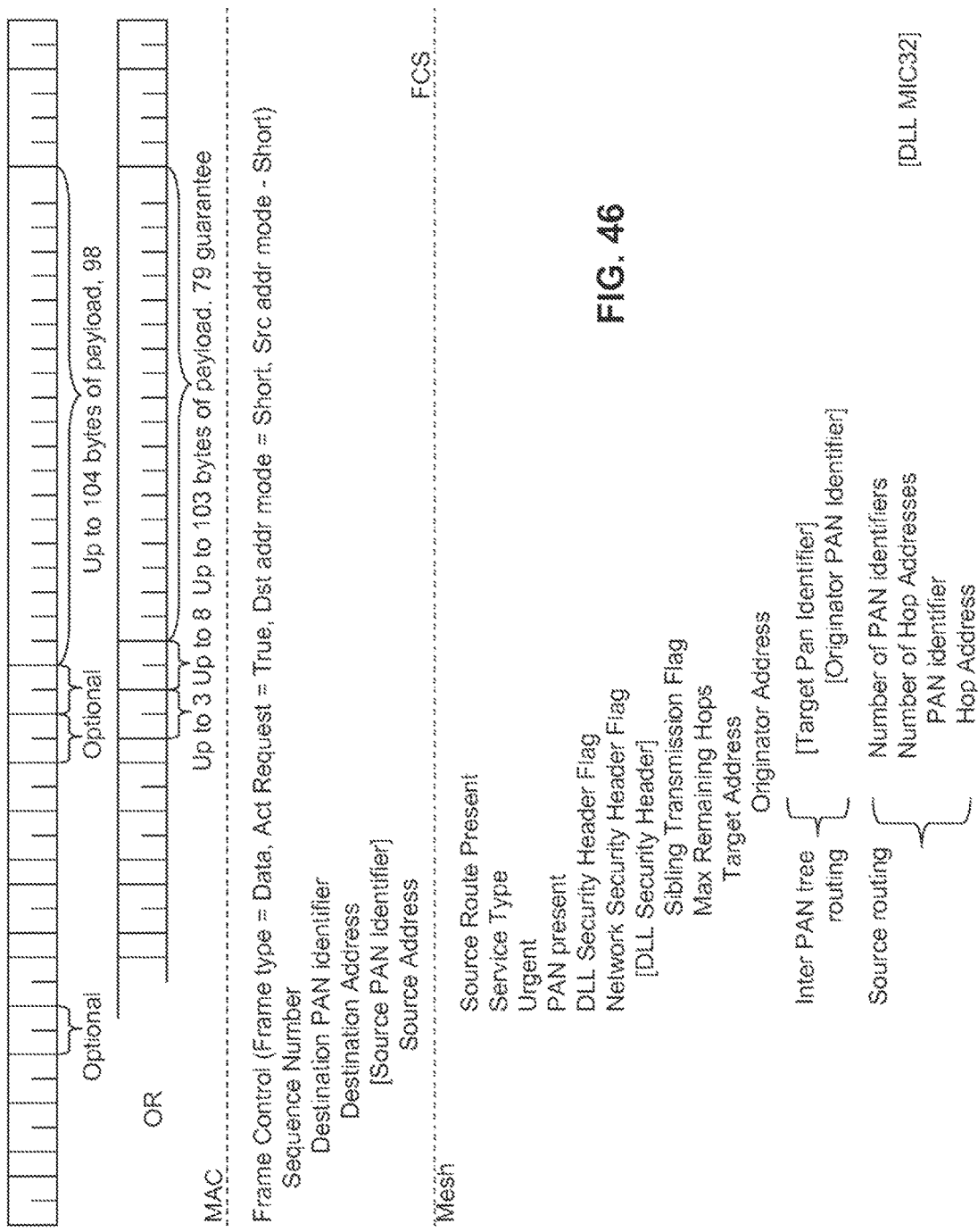
FIG. 46 shows a Frame format: Data transfer in accordance with an embodiment of the present invention.

This message frame format shown in FIG. 46 is used to transport upper layers information for all requests and responses.

TABLE 9

Fields (Tree and Mesh routing)

| Field Name | Data type | Description |
|---|---|---|
| Common MAC layer fields | | See description herein. |
| | Unsigned 8 bits | See sub fields below: |
| Source Route Present | Bool 7 | Reset |
| Service Type | Bits 6-4 | Set to 0 |
| Urgent | Bool 3 | Set when the message is urgent and should be forwarded immediately before any other less-urgent pending transmission. |
| PAN present | Bool 2 | Set when the Target PAN Identifier and the Originator PAN Identifier are added to the frame to identify the network of the target Node. |
| DLL Security Header Flag | Bool 1 | Set when the DLL Security Header follows this octet |
| Network Security Header Flag | Bool 0 | Reset, no Network Security Header follows |
| [DLL Security Header] | Unsigned 16 bits | See description herein. |
| | Unsigned 8 bits | See sub fields below: |
| Sibling Transmission | Bool 7 | Set when a frame is transmitted using tree routing and if a local repair is done though a Sibling instead of a Parent. Only one Sibling transmission is allowed per tree level; when a Node receives a frame with this flag set, it can only route this frame to one of its Parents. |
| Max Remaining Hops | Unsigned bits 6-0 | Set to MAX_HOPS by the originator of this message and decremented each time a message is routed. The message is discarded and not forwarded when this value reaches zero and the next hop does not match the Final Destination Address. |
| Target Address | Binary 2 octets | Short address of the final target (Router or End Device) of this message. |
| Originator Address | Binary 2 octets | Short address of the originator (Router or End Device) of this message. |
| Target PAN Identifier | Binary 2 octets | PAN identifier of the target Node as identified by the Target Address field. |
| Originator PAN Identifier | Binary 2 octets | PAN identifier of the originator Node as identified by the Originator Address field. |

TABLE 9-continued

Fields (Tree and Mesh routing)

| Field Name | Data type | Description |
|---|---|---|
| Payload | Multi-octet | Upper layer information. |
| [DLL MIC32] | Binary 4 octets | See description herein. |

TABLE 10

Fields (Source routing)

| Field Name | Data type | Description |
|---|---|---|
| Common MAC layer fields | | See description herein. |
| | Unsigned 8 bits | See sub fields below: |
| Source Route Present | Bool 7 | Set |
| Service Type | Bits 6-4 | Set to 0 |
| Urgent | Bool 3 | Set when the message is urgent and should be forwarded immediately before any other less-urgent pending transmission. |
| PAN present | Bool 2 | Reset for source routed messages. |
| DLL Security Header Flag | Bool 1 | Set when the DLL Security Header follows this octet |
| Network Security Header Flag | Bool 0 | Reset, no Network Security Header follows |
| [DLL Security Header] | Unsigned 16 bits | See description herein. |
| | Unsigned 8 bits | See sub fields below: |
| Sibling Transmission | Bool 7 | Reset |
| Max Remaining Hops | Unsigned bits 0-6 | Set by the Originator to the value of the Number of Hops field and decremented at each hop. This field is used to index to the next hop in the Hop Addresses list. This field is set to zero when the next hop corresponds to the Target Address. |
| Target Address | Binary 2 octets | Short address of the final target (Router or End Device) of this message. Bits 15-14 define the network membership:<br>0 = The Node is part of the network with the PAN identifier specified by the first entry in the PAN Identifiers list.<br>1 = The Node is part of the network with the PAN identifier specified by the second entry in the PAN Identifiers list.<br>2 = The Node is part of the network with the PAN identifier as specified by the third entry in the PAN Identifiers list.<br>3 = The Node is part of a network which is not listed in the PAN Identifiers list. When this option is used, the frame can be routed to the incorrect Node in the following circumstances:<br>More than four networks exist within the same geographical area<br>Multiple Neighbors exist with the same short address but on non-listed networks. |
| Originator Address | Binary 2 octets | Short address of the originator (Router or End Device) of this message. Bits 15-14 define the PAN identifier of the network of which the target Node is a member. See the Hop Addressesfield (following) for more information on these 2 bits. |
| | Unsigned 8 bits | See sub fields below: |
| Number of PAN identifiers | Bits 7-6 | Defines the number of entries in the PAN identifiers field. |
| Number of Hops Addresses | Bits 3-0 | Number of Addresses in Hop Addresses list. Source routing is used when the Target device is more than one hop away. Therefore the Number of hops is at least one. |
| PAN Identifiers | Array of Binary 2 octets | List of Network identifiers. Bits 15-14 of the different short addresses specified within this frame reference this list. Each short address is explicitly associated with one of the three specified PAN Identifiers, or none of them. |
| Hop Addresses | Array of Binary 2 octets | Short address of each Node responsible for routing this message. Bits 15-14 define network membership of the Node as described by the PAN identifiers field. |
| Payload | Multi-octet | Upper layer information. |
| [DLL MIC32] | Binary 4 octets | See description herein. |

Figure 47:
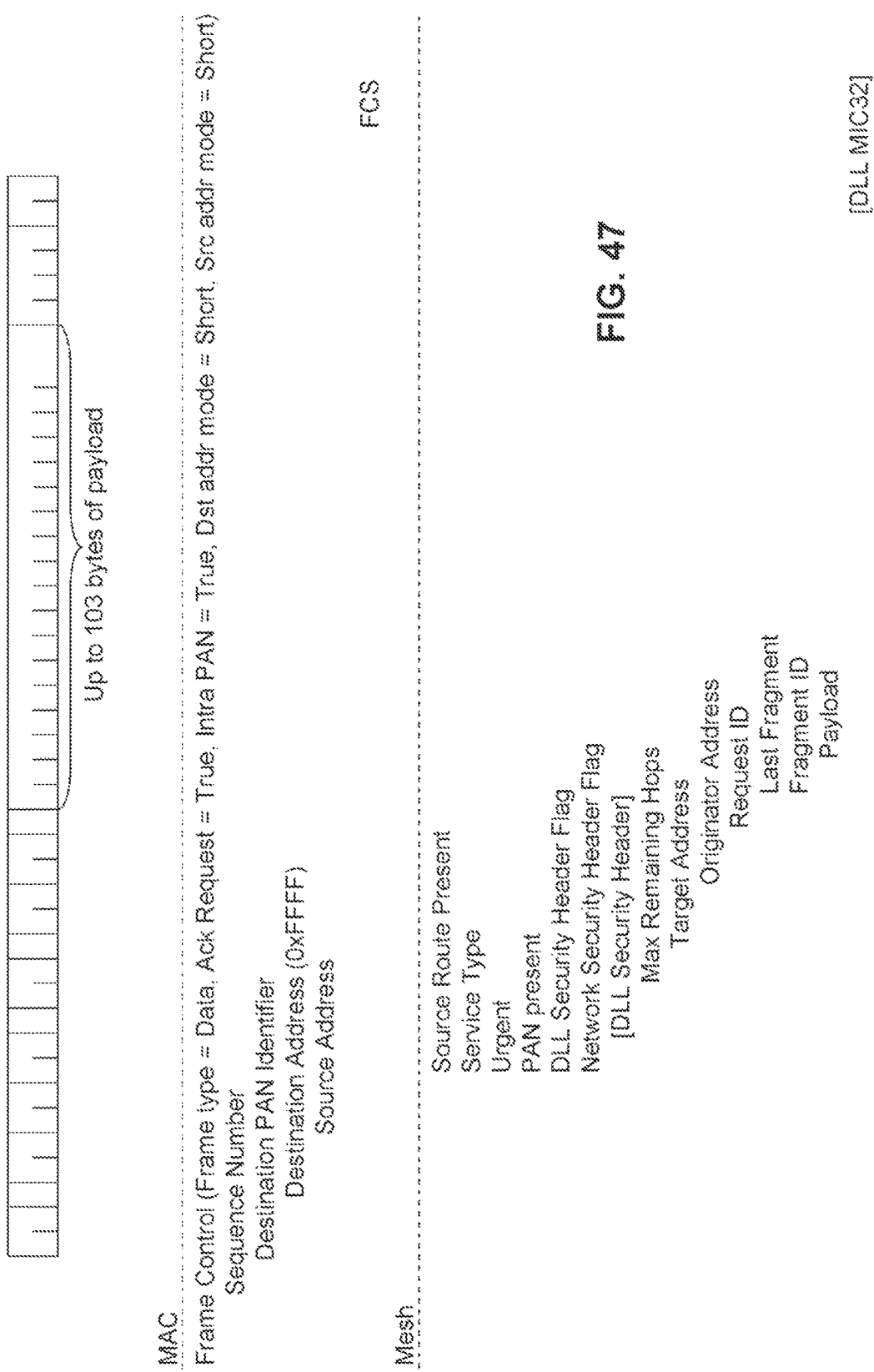
FIG. 47 shows a Frame format: Mesh Multicast in accordance with an embodiment of the present invention.

The mesh multicast message format set forth in FIG. 47 facilitates multicast of application data to a group of Nodes within a mesh network. Group addresses need either to be pre-assigned or assigned by an upper layer. This layer does not provide services to remotely assign group address to Nodes.

TABLE 11

Mesh Multicast Frame Fields

| Field Name | Data type | Description |
|---|---|---|
| Common MAC layer fields | | See description herein. |
| | Unsigned 8 bits | See sub fields below: |
| Source Route Present | Bool 7 | Reset |
| Service Type | Bits 6-4 | Set to 4 |
| Urgent | Bool 3 | Set when the message is urgent and should be forwarded immediately before any other pending transmission. |
| PAN present | Bool 2 | Reset |
| DLL Security Header Flag | Bool 1 | Set when the DLL Security Header follows this octet |
| Network Security Header Flag | Bool 0 | Reset, no Network Security Header follows |
| [DLL Security Header] | Unsigned 16 bits | See description in section _____. |
| Max Remaining Hops | Unsigned 8 bits | Set by the originator and decremented each time the message is re-broadcast. The initial value represents the maximum number of router hops from the originator that this message will reach. To ensure the message will reach all Nodes on the network, this value should be set to MAX_HOPS if the originator is the Coordinator or two time MAX_HOPS if the originator is a Node. |
| Target Address | | Address of the group targeted. |
| Originator Address | Binary 2 octets | Short address of the originator (Router or End Device) of this message. |
| Request ID | Unsigned 8 bits | Unique number used to eliminate duplicated message during a broadcast storm. |
| | Unsigned 8 bits | |
| Last Fragment | Bit 7 | Flag which indicate the last fragment of a fragmented multicast. |

TABLE 11-continued

Mesh Multicast Frame Fields

| Field Name | Data type | Description |
| --- | --- | --- |
| Fragment ID | Bits 0 to 6 | When a multicast is fragmented, each fragment has a unique fragment number from 0 to n where n represent the last fragment which is identified by Last Fragment flag set to true. |
| Payload | Multi-octet | Upper layer data. |
| [DLL MIC32] | Binary 4 octets | See description herein. |

Figure 48:
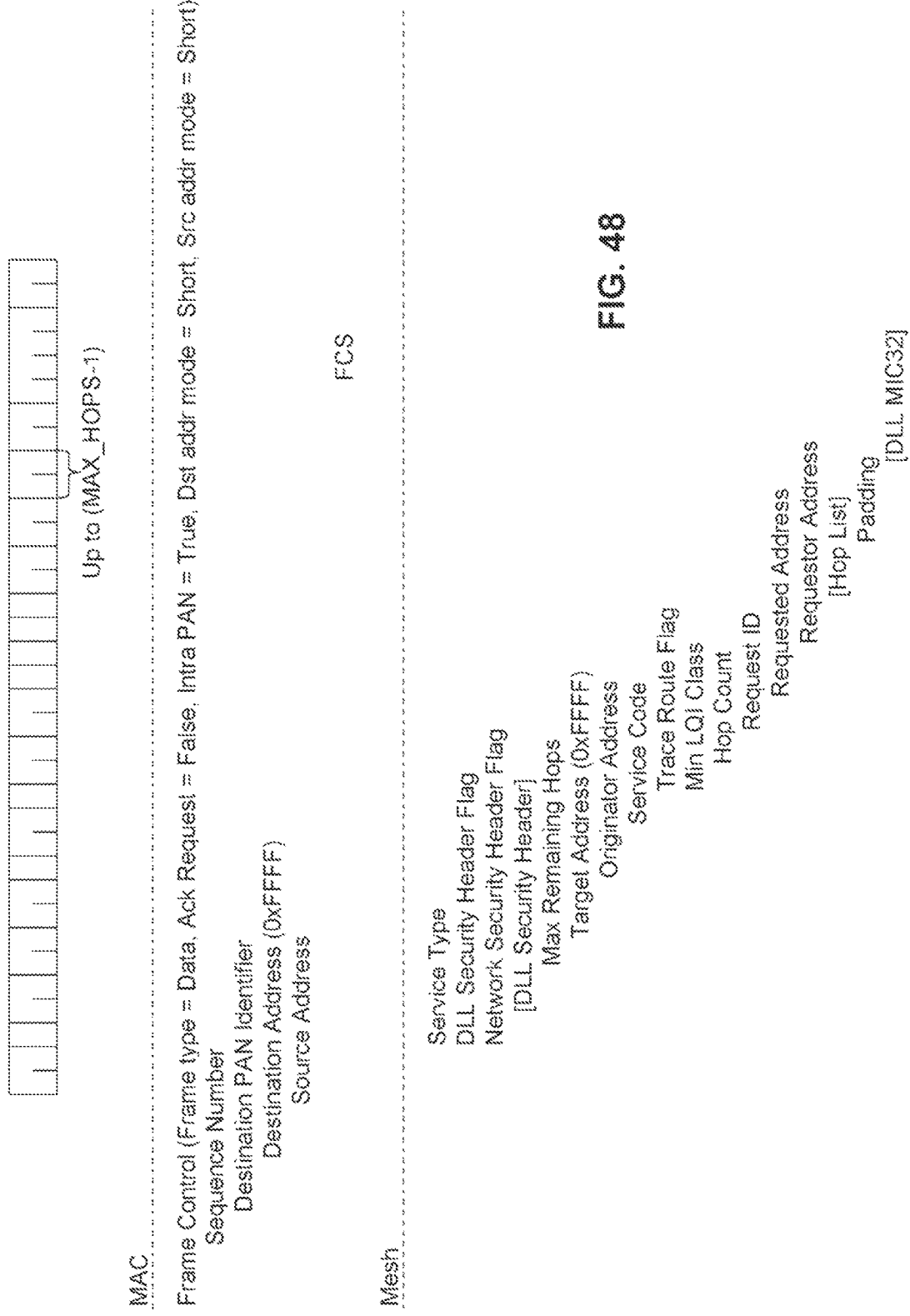
FIG. 48 shows a Frame format: Route Request in accordance with an embodiment of the present invention.

The route request message is used to create a route to a target Node for peer to peer communication between two Nodes using mesh routing. The route request message format is shown in FIG. 48.

TABLE 12

Route Request Frame Fields

| Field Name | Data type | Description |
| --- | --- | --- |
| Common MAC layer fields | | See description herein. |
| | Unsigned 8 bits | See sub fields below: |
| Service Type | Bits 6-4 | Set to 1 |
| DLL Security Header Flag | Bool 1 | Set when the DLL Security Header follows this octet |
| Network Security Header Flag | Bool 0 | Reset, no Network Security Header follows |
| [DLL Security Header] | Unsigned 16 bits | See description in section 5.8.1. |
| Max Remaining Hops | Unsigned 8 bits | See description in section 6.4. |
| Target Address | Binary 2 octets | Broadcast address (0xFFFF) |
| Originator Address | Binary 2 octets | Address of the originator of this Route Request. |
| Service Code | Unsigned 8 bits | Set to 1. |
| | Unsigned 8 bits | See sub fields below: |
| Trace Route Flag | Bool 0 | When set, the response contains the list of hops used to route to the target Node. When this option is used, the network is not updated with the routing information; Routers do not create a route in their routing table. |
| Min LQI Class | Bits 2-1 | Used to set a minimum link quality for each hop of the requested route. Before accepting this request, each Node validate that the LQI class corresponding to the Node from which this message have been received is better or equal to the value of this field. |
| Hop Count | Unsigned 8 bits | Use to count the number of hops from the Requestor Address. Initially sent with a value of zero and incremented each time this request is received and re-broadcast. |
| Request ID | Unsigned 8 bits | Unique number used to eliminate duplicated message during the broadcast storm. |
| Requested Address | Binary 2 octets | Node for which a route is requested. |
| Requestor Address | Binary 2 octets | Originator of this Route Request. |
| Hop List | Array of Binary 2 octets | Address of each Node routing this message. The size of this list is Hop Count minus one. Present if the Trace Route Flag is set. |

TABLE 12-continued

Route Request Frame Fields

| Field Name | Data type | Description |
| --- | --- | --- |
| Padding | Binary 2 octets | For backward compatibility. |
| DLL MIC32 | Binary 4 octets | See description herein. |

Figure 49:
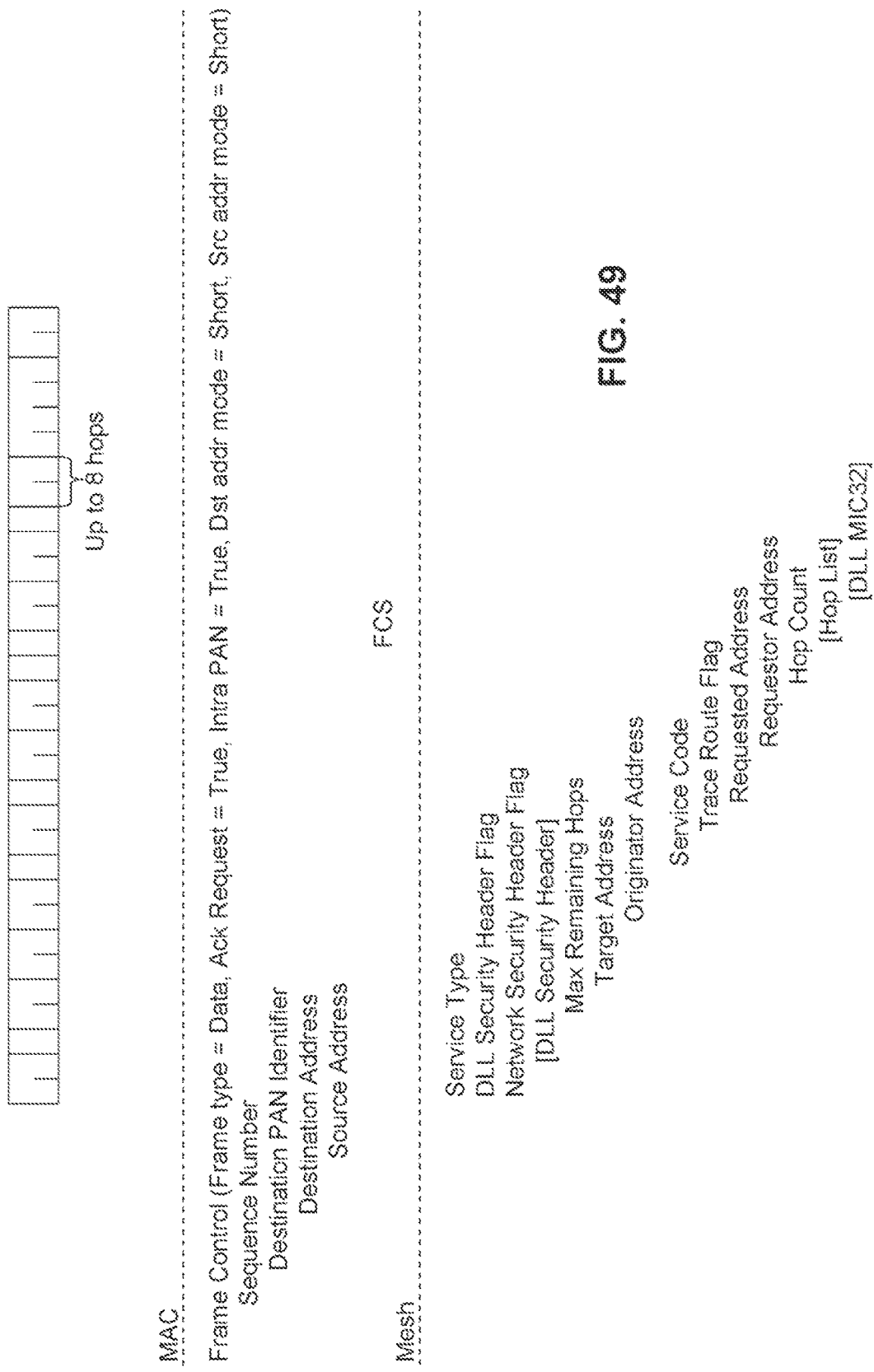
FIG. 49 shows a Frame format: Route Reply in accordance with an embodiment of the present invention.

The route reply message is sent in response to a Route Request and is given the format shown in FIG. 49.

TABLE 13

Route Reply Frame Fields

| Field Name | Data type | Description |
| --- | --- | --- |
| Common MAC layer fields | | See description herein. |
| | Unsigned 8 bits | See sub fields below: |
| Service Type | Bits 6-4 | Set to 1 |
| DLL Security Header Flag | Bool 1 | Set when the DLL Security Header follows this octet |
| Network Security Header Flag | Bool 0 | Reset, no Network Security Header follows |
| [DLL Security Header] | Unsigned 16 bits | See description herein. |
| Max Remaining Hops | Unsigned 8 bits | See description herein. |
| Target Address | Binary 2 octets | Same as Requestor Address. |
| Originator Address | Binary 2 octets | Same as Requested Address. |
| Service Code | Unsigned 8 bits | Set to 2. |
| | Unsigned 8 bits | See sub fields below: |
| Trace Route Flag | Bool 0 | Return the same value as the Trace Route Flag received in the Route Request. |
| Requested Address | Binary 2 octets | Node for which a route have been requested. |
| Requestor Address | Binary 2 octets | Originator of the Route Request. |
| Hop Count | Unsigned 8 bits | Number of hop between the Requestor Node and the Requested Node. Set to 1 if the Requestor Node is a neighbor of the Requested Node |
| [Hop List] | Array of Binary 2 octets | Address of each Node routing this message. The size of this list is Hop Count minus one. Present if the Trace Route Flag is set. |
| [DLL MIC32] | Binary 4 octets | See description herein. |

Figure 50:
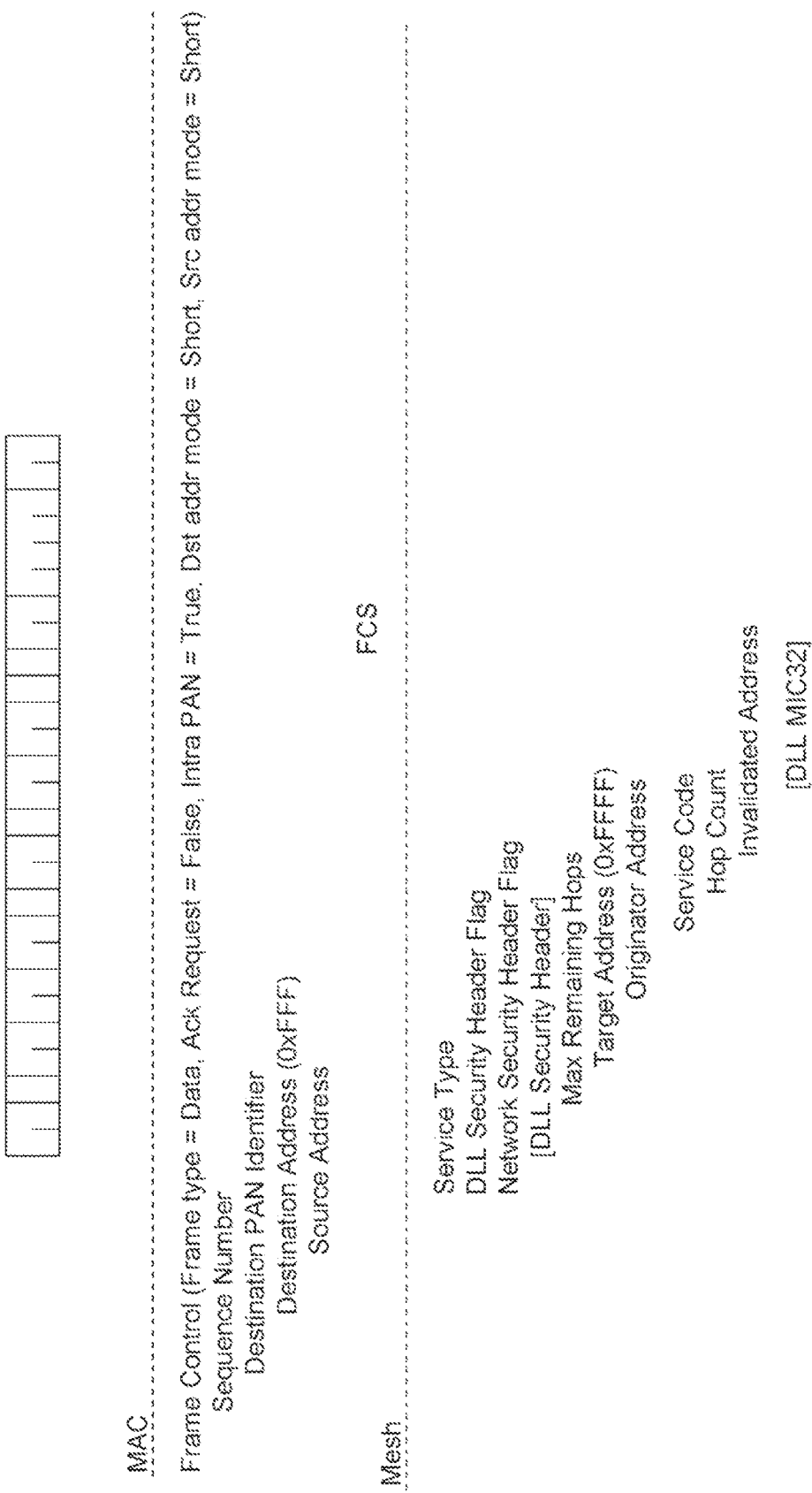
FIG. 50 shows a Frame format: Route Error in accordance with an embodiment of the present invention.

The route error message is sent out to inform surrounding Nodes that a route to a destination has fail and need to be invalidated. This message is sent as a broadcast frame with Hop Count set to 1. Each Node receiving this message, re-broadcast the Route Error if its route table shows that other Nodes use this Node as a route to the destination and must therefore be informed of the invalid route. The route error message format is shown in FIG. 50.

TABLE 14

Route Error Frame Fields

| Field Name | Data type | Description |
|---|---|---|
| Common MAC layer fields | | See description herein. |
| | Unsigned 8 bits | See sub fields below: |
| Service Type | Bits 6-4 | Set to 1 |
| DLL Security Header Flag | Bool 1 | Set when the DLL Security Header follows this octet |
| Network Security Header Flag | Bool 0 | Reset, no Network Security Header follows |
| [DLL Security Header] | Unsigned 16 bits | See description herein. |
| Max Remaining Hops | Unsigned 8 bits | See description herein. |
| Target Address | Binary 2 octets | Broadcast address (0xFFFF) |
| Originator Address | Binary 2 octets | Address of the Node generating this message. |
| Service Code | Unsigned 8 bits | Set to 3. |
| Hop Count | Unsigned 8 bits | Set to 0x01 |
| Invalidated address | Binary 2 octets | Short |
| [DLL MIC32]s | Binary 4 octets | See description herein. |

Figure 51:
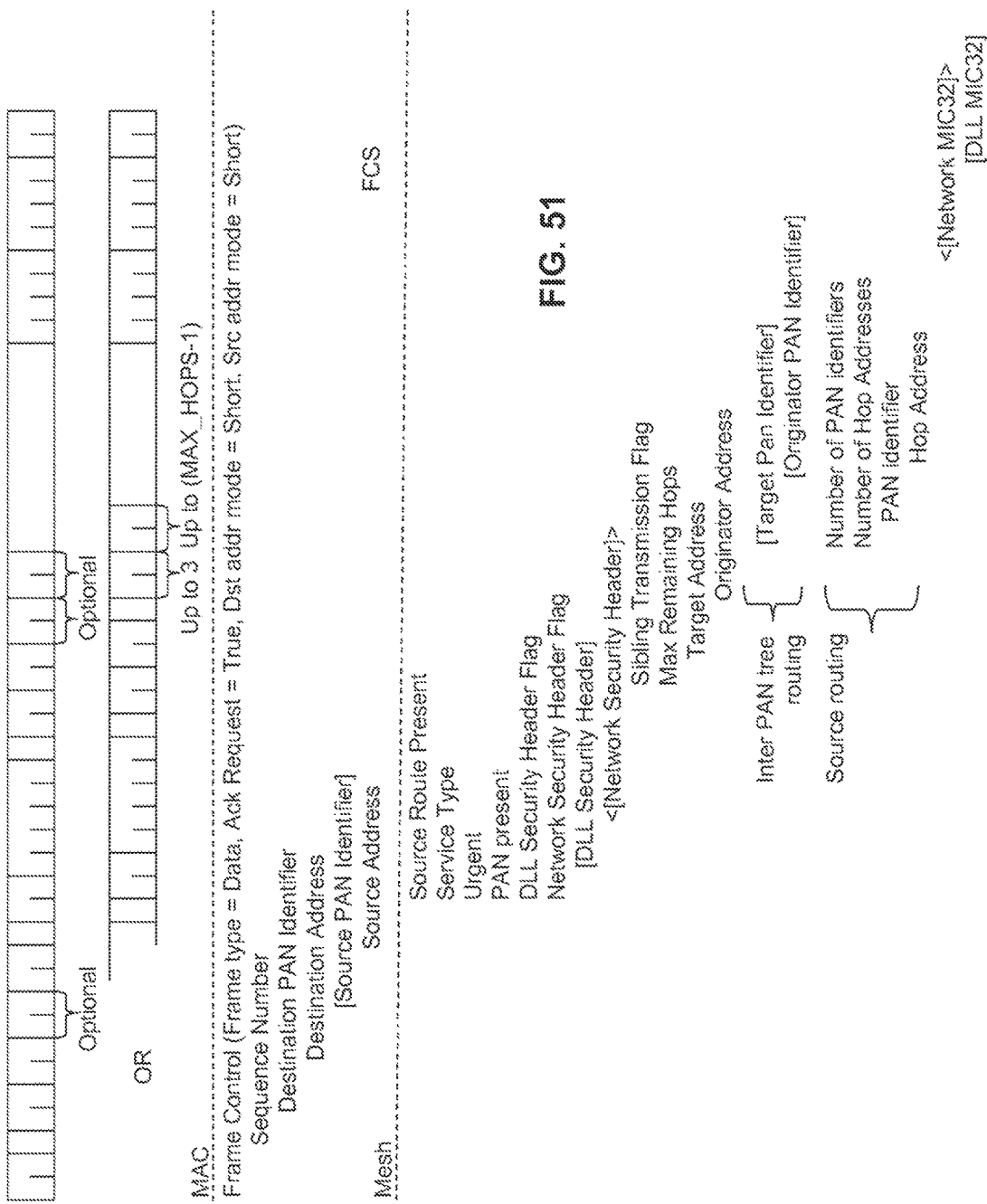
FIG. 51 shows a Frame format: Common routed message format in accordance with an embodiment of the present invention.

All messages described within this subsection share the same MAC header and Mesh header prefix format. This common portion of the message is shown in FIG. 51.

TABLE 15

Common Routed Message Frame Fields

| Field Name | Data type | Description |
|---|---|---|
| Common MAC layer fields | | See description herein. |
| | Unsigned 8 bits | See sub fields below: |
| Source Route Present | Bool 7 | See description herein. |
| Service Type | Bits 6-4 | Set to 2. |
| Urgent | Bool 3 | See description herein. |
| PAN present | Bool 2 | See description herein. |
| DLL Security Header Flag | Bool 1 | See description herein. |
| Network Security Header Flag | Bool 0 | See description herein. |
| [DLL Security Header] | Unsigned 16 bits | See description herein. |
| [Network Security Header] | Unsigned 40 bits | See description herein. |
| | Unsigned 8 bits | See sub fields below: |
| Sibling Transmission | Bool 7 | See description herein. |
| Max Remaining Hops | Unsigned bits 0-6 | See description herein. |
| Target Address | Binary 2 octets | See description herein. |
| Originator Address | Binary 2 octets | See description herein. |
| [Target PAN Identifier] | Binary 2 octets | See description herein. |
| [Originator PAN Identifier] | Binary 2 octets | See description herein. |
| | Unsigned 8 bits | |
| [Number of PAN identifiers] | Bits 7-6 | See description herein. |
| [Number of Hops Addresses] | Bits 3-0 | See description herein. |
| [PAN Identifier] | Binary 2 octets | See description herein. |
| [Hop Address] | Binary 2 octets | See description herein. |
| Specific message fields | | |
| [Network MIC32] | Binary 4 octets | See description herein. |
| [DLL MIC32] | Binary 4 octets | See description herein. |

Figure 52:
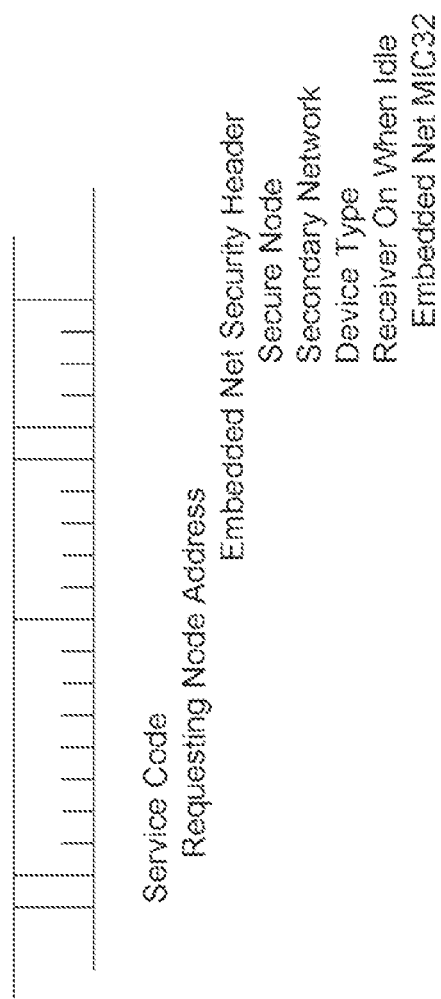
FIG. 52 shows a Frame format: Association Confirmation Request in accordance with an embodiment of the present invention.

The association confirmation request message is sent to the Coordinator by a Router when an "Association Request" is received from a Node requesting an association. The association request message format is shown in FIG. 52.

TABLE 16

Association Confirmation Request Frame Fields

| Field Name | Data type | Description |
|---|---|---|
| Common routed message format | | See description herein. |
| Service Code | Unsigned 8 bits | Set to 0. |
| Requesting Node Address | Binary 8 octets | Long address of the Node requesting the association. |
| Embedded Association request information | | |
| Embedded Net Security | Binary 5 octets | Network Security Header of the embedded Association Request, included only for secure association. Enabled only if "DLL Security Header Flag" and/or "Network Security Header Flag" are set. |
| | Unsigned 8 bits | Association information of the embedded Association request, see sub fields below: |
| Secure Node | Bool 0 | When reset, the device is not configured to associate to a secure network and the Embedded Net Security Header and Embedded Net MIC32 should not be processed. This option is possible only when the entire network is configured insecure. |
| Secondary Network | Bool 1 | Set when the Node is already associated to a network and want to create secondary association with neighbor networks to allow overlapping network communications. |
| Device Type | Bool 2 | Reset when the device is a Router and set when the device is an End Device. |
| Receiver On When Idle | Bool 3 | Set if the End device does not disable its receiver to conserve power during idle periods. This field can be reset only if the Device Type is set. |
| Embedded Net MIC32 | | Network MIC32 of the embedded Association Request, included only for secure association. |

Figure 53:
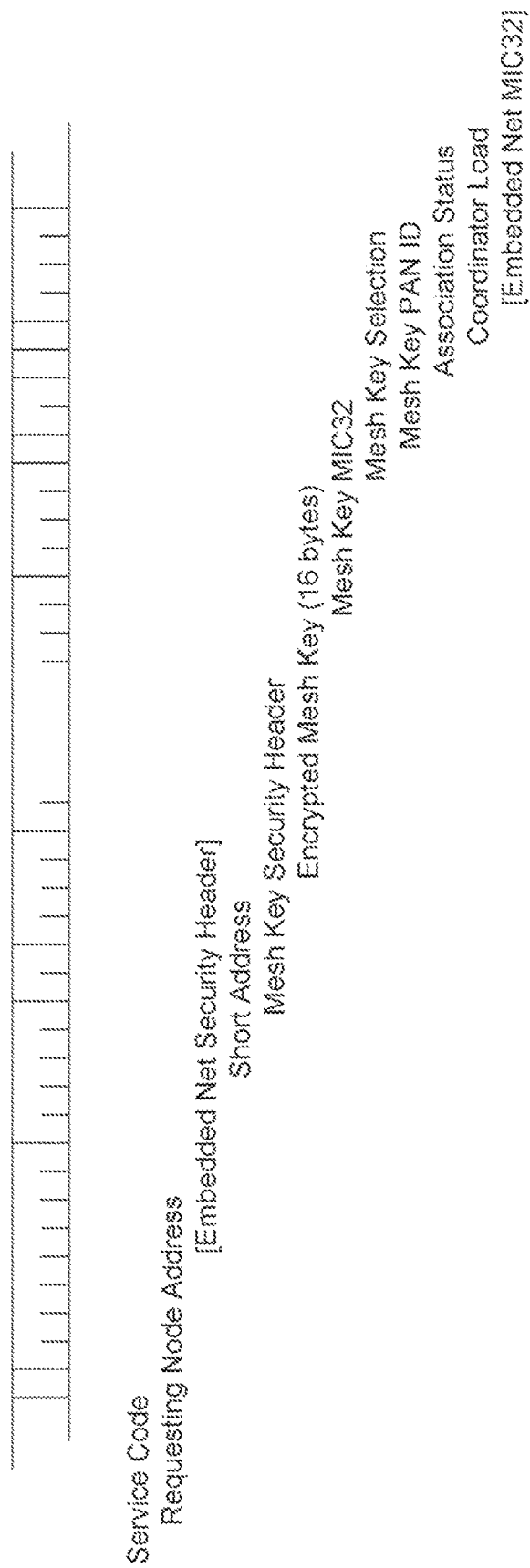
FIG. 53 shows a Frame format: Association Confirmation Response in accordance with an embodiment of the present invention.

The association confirmation response message is returned by the Coordinator to a Router in response to an Association Confirmation Request. The association confirmation response message format is shown in FIG. 53.

TABLE 17

Association Confirmation Response Frame Fields

| Field Name | Data type | Description |
|---|---|---|
| Common routed message format | | See description herein. |
| Service Code | Unsigned 8 bits | Set to 1. |
| Requesting Node Address | Binary 8 octets | Long address of the Node requesting the association. |
| Embedded Association Response information | | |
| [Embedded Net Security Header] | Unsigned 5 octets | Network Security Header of the embedded Association Response. Enabled only if "DLL Security Header Flag" and/or "Network Security Header Flag" are set. |
| Short Address | Binary 2 octets | If the Coordinator was not able to associate this device to its PAN, this field is set to 0xFFFF, and the association status field shall contain the reason for the failure. If the Coordinator was able to associate the device to its PAN, this field contains the short address assigned to that device. |

TABLE 17-continued

Association Confirmation Response Frame Fields

| Field Name | Data type | Description |
| --- | --- | --- |
| Mesh Key Security Header | Unsigned 5 octets | For the write operation, this field is the security information and has the same format as the Network Security Header that contains the nonce and key information used to encrypt the Encrypted Mesh Key. |
| Encrypted Mesh Key | Binary 16 octets | Mesh Key encrypted with the Node Key used for the Embedded Network Security Header. The Mesh Key is encrypted using the algorithm in IEEE 802.15.4-2006 section B.4 and the specified Node Key. |
| Mesh Key MIC32 | Binary 4 octets | Message Integrity check of the Mesh Key Security Header and the plain text Mesh Key. The MIC is calculated using the algorithm in IEEE 802.15.4-2006 section B.4 and the specified Node Key. |
| | Unsigned 8 bits | See sub fields below: |
| Reserved | Bits 7-4 | Set to 0 |
| Mesh Key Selection | Bits 3-0 | 2 = Mesh Key 1 3 = Mesh Key 0 All other values reserved |
| Mesh Key PAN ID | Binary 2 octets | PAN ID associated with the Mesh Key |
| Association Status | Unsigned 8 bits | 0x00 = Association successful. 0x01 = PAN at capacity. 0x02 = PAN access denied. |
| Coordinator Load | Unsigned 8 bits | Measure of the number of Nodes already associated to the network, relative to router capacity. The value 100% means full and no further associations are accepted. |
| [Embedded Net MIC32] | Binary 4 octets | Network MIC32 of the embedded Association Response. |

The Keep Alive Initiate message is sent by the Coordinator to request that a Node initiate immediately its Keep Alive Request. This message is optional and used by the Coordinator to control the flow and distribution of Checkpoint messages. Independently of this optional message, Nodes autonomously initiate their Checkpoint process by sending a Keep Alive Request after each CHECKPOINT_PERIOD. To control the flow of messages, the Coordinator must send a Keep Alive Initiate prior to the expiration of this period. WARNING This request is sent using source routing, Routers routing this message shall not create a temporary route. This allows the following Keep Alive Request to trace current tree route from this Node. The Keep Alive Initiate message format is shown in FIG. 54.

TABLE 18

Keep Alive Initiate Frame Fields

| Field Name | Data type | Description |
| --- | --- | --- |
| Common routed message format | | See description herein. |
| Service Code | Unsigned 8 bits | Set to 3. |
| MAC Address | Binary 8 octets | IEEE 802.15.4 EUI64 address (8-octets) of the targeted Node. Used to validate if the Node receiving this message is the Node expected. If a mismatch is detected, the Node does not return its Keep Alive Request. |
| Information To | Unsigned 8 bits | Specify which information will be reported in the next Keep Alive Request. |

The Keep Alive Request message is sent periodically to the Coordinator to maintain the Node association. The Keep Alive Request frame format is shown is FIG. 55.

TABLE 19

Keep Alive Request Frame Fields

| Field Name | Data type | Description |
| --- | --- | --- |
| Common routed message format | | See description herein. |
| Service Code | Unsigned 8 bits | Set to 4. |
| | Unsigned 8 bits | See sub fields below: |
| Secure Node | Bool 0 | When reset, the device is not configured for a secure network and all key information provided below shall be ignored. |
| Secondary Network | Bool 1 | Set if this Message is sent to the Coordinator of secondary network. |
| Device Type | Bool 2 | Reset when the device is a Router and set when the device is an End Device. |
| Receiver On When Idle | Bool 3 | Set if the End device does not disable its receiver to conserve power during idle periods. This field can be reset only if the Device Type is set. |
| Information Reported | Bit 7-4 | Identifier of the optional information reported by the Node within the current Keep Alive Request. 0 = Trace Route 1 = Multicast group address Send by End Devices supporting group address to update its Parent. 2 = Neighbor information This information is useful for Network Management. Can be used by the Coordinator and the Head End to compute routes, find weak region on the mesh network, and evaluate route diversity. 3 = Statistic This information is useful for Network Management. |
| Keep Alive Period | Unsigned 8 bits | Period in units of 1 min. The reporting Node generates autonomously a Keep Alive Request at the specified periodicity. The Coordinator, at its option, may send a Keep Alive Initiate before the expiration of this period to control the time distribution of Keep Alive Requests of Nodes within the network. |

TABLE 19-continued

Keep Alive Request Frame Fields

| Field Name | Data type | Description |
| --- | --- | --- |
| MAC Address | Binary 8 octets | IEEE 802.15.4 EUI64 address (8-octets) of this Node. Used to validate if the Node sending this message is the Node expected. If a mismatch is detected, the Coordinator does not return a Keep Alive Response, but waits for the Node to re-associate. |
| | Unsigned 8 bits | Reports the current state of the encryption key writes. See fields below: |
| Reserved | Bit 7 | Set to 0 |
| SMIB Write Toggle | Bit 6 | Bit toggled each time the SMIB parameter table is written. |
| Node Key-1 Write Toggle | Bit 5 | Bit toggled each time that Node Key-1 is updated. |
| Node Key-0 Write Toggle | Bit 4 | Bit toggled each time that Node Key-0 is updated. |
| Mesh Key-1 Write Toggle | Bit 3 | Bit toggled each time that Mesh Key-1 is updated. |
| Mesh Key-0 Write Toggle | Bit 2 | Bit toggled each time that Mesh Key-0 is updated. |
| Maintenance Key-1 Write Toggle | Bit 1 | Bit toggled each time that Maintenance Key-1 is updated. |
| Maintenance Key-0 Write Toggle | Bit 0 | Bit toggled each time that Maintenance Key-0 is updated. |
| | Unsigned 8 bits | Reports the current keys used for transmission. See fields below: |
| Current Node Key | Bit 5 | Node Key used when sending 1 = Node Key-1 0 = Node Key-0 |
| Current Mesh Key | Bit 4 | Mesh Key used when sending 1 = Mesh Key-1 0 = Mesh Key-0 |
| Current Maintenance Key | Bit 3 | Mesh Key used when sending 1 = Maintenance Key-1, 0 = Maintenance Key-0 |
| Secondary Node Key Allowed | Bool 2 | Set when frames may be authenticated via either Node key. Reset when only frames authenticated using the Node key specified by the Current Node Key ID are accepted. |
| Secondary Mesh Key Allowed | Bool 1 | Set when frames may be authenticated via either Mesh key. Reset when only frames authenticated using the Mesh key specified by the Current Mesh Key ID are accepted |
| Secondary Maintenance Key Allowed | Bool 0 | Set when frames may be authenticated via either Maintenance key. Reset when only frames authenticated using the Node key specified by the Current Maintenance Key ID are accepted |

The following describes the different extensions to this basic frame format. Transmission of these extensions follows these rules, which are listed in order of priority:

The Trace Route extension is transmitted with the first Keep Alive sent after a Node associates with a Coordinator, and by default when no other extension needs to be transmitted.

The Multicast Group Addresses extension is transmitted by End Devices with the first Keep Alive Response sent after each Parent change.

The Statistics extension is transmitted once a day with the first Keep Alive sent after midnight local time.

The Neighbors extension is transmitted once every 4 hours.

The optional Trace Route extension is shown in FIG. 56.

TABLE 20

Keep Alive Request: Optional Trace Route Frame Fields

| Field Name | Data type | Description |
| --- | --- | --- |
| Number of Hops | Unsigned 8 bits | Number of entries within the Hop list. This list contains an entry for each Node routing this message. |
| | Array of . . . | Repeating two-component list |
| Hop PAN identifier | Binary 2 octets | PAN identifier associated to this Hop list entry. |
| Hop Addresses | Binary 2 octets | Short address associated to this Hop list entry. |

This extension is not authenticated by the Network MIC-32 since the Number of Hops value is incremented and a PAN identifier and short address is appended at each hop.

The optional Multicast Group Addresses extension is shown in FIG. 57.

TABLE 21

Keep Alive Request: Optional Multicast Group Addresses Frame Fields

| Field Name | Data type | Description |
| --- | --- | --- |
| Number Of Group Addresses | Unsigned 8 bits | Number of Group Address fields. |
| Group Addresses | Array of Binary 2 octets | Group addresses are used during multicast to target a group of Nodes. This list corresponds to the groups for which the originator of this message is member. This information is captured by the first Router when the value of Receiver On When Idle is False. In this context, the Router mesh cashed messages targeted to one of these groups until the End Device will wakeup to retrieve this information. This list can also be useful to the Coordinator. |

The optional Neighbors extension is shown in FIG. 58.

TABLE 22

Keep Alive Request: Optional Neighbors Frame Fields

| Field Name | Data type | Description |
| --- | --- | --- |
| Number Of Neighbors | Unsigned 8 bits | Number of entry in the Neighbors list. This list contain the Parents in order of their Preferred Route Ratio (The preferred route is always at index 0) |
| | Array of . . . | Repeating multi-component list |

TABLE 22-continued

Keep Alive Request: Optional Neighbors Frame Fields

| Field Name | Data type | Description |
|---|---|---|
| Neighbor Address | Binary 2 octets | See description herein. |
| Neighbor PAN Identifier | Binary 2 octets | See description herein. |
| RSSI rx | Signed 8 bits | See description herein. |
| RSSI tx | Signed 8 bits | See description herein. |
| LQI rx | Unsigned 8 bits | See description herein. |
| LQI tx | Unsigned 8 bits | See description herein. |
| Avg LQI | Unsigned 8 bits | Average of the LQI value of each hop between the current Node and the Coordinator through this Neighbor using the preferred parent within the specified network tree. The LQI for each hop corresponds to the worst LQI recorded (LQI rx and LQI tx) for this hop. |
| | Unsigned 8 bits | |
| Number of Hops | Bits 4-7 | Number of hops between the current Node and the Coordinator through this Neighbor using the preferred parent within the specified network tree. |
| LQI Class | Bit 2-3 | LQI class on the link between the current Node and this Neighbor based on the worst LQI recorded (LQI rx and LQI tx) for this link. |
| Min LQI Class | Bit 0-1 | Minimum of all LQI class for each hop between the current Node and the Coordinator through this Neighbor using the preferred parent within the specified network tree. |
| Transmission success rate | Unsigned 8 bits | See description herein. |

The optional Statistics extension is shown in FIG. 59.

TABLE 23

Keep Alive Request: Optional Statistics Frame Fields

| Field Name | Data type | Description |
|---|---|---|
| Number Of Statistics | Unsigned 8 bits | Number of Statistic Code and Statistic Count pairs present in this message. |
| Statistic Count Format | Unsigned 8 bits Bit 7 | 0 = The Statistic Count is 16 bits<br>1 = The Statistic Count is 32 bits |
| Statistic Code | Bits 6-0 | Identifier assigned to the statistic as defined in the Statistics codes in 6.7.5.11. New statistics can be added by assigning them new identifiers and including them in the list. Statistics can be deprecated simply by removing them from the list. |
| Statistic Count | Unsigned integer 16 or 32; see specific Statistic Count Format | Actual count of the specific statistic identified by the Statistic Code. |

TABLE 24

Statistics Codes

| Code | Label | Description | Size (bits) |
|---|---|---|---|
| | Association process | | |
| 0 | Number of association processes initiated | Number of times this Node has initiated an association process | 16 |
| 1 | Number of association processes successful | From the Number of association processes initiated, how many were successful | 16 |
| 2 | Number of re-associations | Number of times the Node has switched networks because of a significant improvement | 16 |
| | Route Discovery process | | |
| 3 | Number of route discovery processes initiated | Number of times this Node has initiated a route discovery process | 16 |
| 4 | Number of route discovery processes successful | From the Number of route discovery processes initiated, how many were successful | 16 |
| | Checkpoint process | | |
| 5 | Number of Keep Alive Initiate frames received | Number of Keep Alive Initiate frames received by this Node. | 16 |
| 6 | Number of Keep Alive Request frames initiated | Number of Keep Alive Request frames initiated by this Node. | 16 |
| 7 | Number of Keep Alive Response frames received | Number of Keep Alive Response frames received by this Node. | 16 |
| | Outage/Restoration Reporting process | | |
| 8 | Number of power outages | Number of power outages recorded by this Node. | 16 |
| 9 | Number of successful power outage notifications | From the Number of power outages, how many were reported and acknowledged successfully | 16 |
| 10 | Number of successful power restoration notifications | From the Number of power outages, how many restorations were reported and acknowledged successfully | 16 |

TABLE 24-continued

Statistics Codes

| Code | Label | Description | Size (bits) |
|---|---|---|---|
| 11 | Power outage notification delay | Interval (in seconds) elapsed between the outage and the acknowledgment of the notification | 16 |
| 12 | Power restoration notification delay | Interval (in seconds) elapsed between the restoration and the acknowledgment of the notification | 16 |

Ping process

| Code | Label | Description | Size (bits) |
|---|---|---|---|
| 13 | Number of Ping Requests initiated | Number of Ping Requests initiated by this Node. | 16 |
| 14 | Number of Ping Responses received | Number of Ping Responses received by this Node. | 16 |

Route Establishment process

| Code | Label | Description | Size (bits) |
|---|---|---|---|
| 15 | Number of Route establishment Requests originated | Number of Route establishment Requests originated by this Node. | 16 |
| 16 | Number of Route establishment Responses received | Number of Route establishment Responses received by this Node. | 16 |

Forwarding Service Message process

| Code | Label | Description | Size (bits) |
|---|---|---|---|
| 17 | Number of Service Requests sent | Number of Service Requests initiated by this Node. | 16 |
| 18 | Number of Service Requests received | Number of Service Requests received by this Node. | 16 |
| 19 | Number of Service Forwarding Requests sent | Number of Service Requests received and forwarded to the requested service provider. | 16 |
| 20 | Number of Service Forwarding Responses received | Number of Service Responses forwarded to a requesting Node. | 16 |

Transmission performance

| Code | Label | Description | Size (bits) |
|---|---|---|---|
| 21 | Number of data frames received | Number of Data transfer frames received by this Node. | 32 |
| 22 | Number of data frames originated | Number of Data transfer frames originated by this Node. | 32 |
| 23 | Number of data frame failures | From the Number of data frames initiated, how many have not been transmitted successfully at the MAC level. | 32 |
| 24 | Number of broadcast data frames | Number of Multicast frames initiated by this Node. | 32 |
| 25 | Number of control frames received | Number of frames, excluding Data transfer and Multicast frames, received by this Node. | 32 |
| 26 | Number of control frames originated | Number of frames, excluding Data transfer and Multicast frames, originated by this Node. | 32 |
| 27 | Number of control frame failures | From the Number of control frames originated, how many have not been transmitted successfully at the MAC level. | 32 |
| 28 | Number of broadcast control frames | Number of control frames broadcast by this Node. | 32 |
| 29 | Number of received local messages | Number of Point to Point messages received by this Node. | 32 |
| 30 | Number of originated local messages | Number of Point to Point messages originated by this Node. | 32 |
| 31 | Number of local message failures | From the Number of originated local messages, how many have not been transmitted successfully at the MAC level. | 32 |
| 32 | Number of broadcast local frames | Number of local broadcasts originated by this Node. | 32 |
| 33 | Number of routed frames | Number of data and control frames routed by this Node. | 32 |
| 34 | Number of routed frame failures | From the Number of routed frames, how many have not been transmitted successfully at the MAC level. | 32 |
| 35 | Number of frames re-broadcast | Number of data and control frames re-broadcast by this Node. | 32 |

Radio performance

| Code | Label | Description | Size (bits) |
|---|---|---|---|
| 36 | Number of channel access failures | Number of times the radio has returned a Channel Access failure during a transmission attempt. | 16 |
| 37 | Number of buffer overflows | Number of times a frame was not transmitted, routed or received because of a lack of available buffer space | 16 |
| 38 | Number of MAC retries | Number of retries at the MAC level when sending a frame. When excessive, this may be evidence of high noise or a jamming attack. | 32 |
| 39 | Number of FCS errors | Number of frames received with an invalid MAC CRC (called an FCS in IEEE 802.15.4). | 32 |

End Device

| Code | Label | Description | Size (bits) |
|---|---|---|---|
| 40 | Number of Children | Number of End Devices using this Router to send and receive messages. | 16 |
| 41 | Maximum number of Children | Maximum number of End Devices in the End Device Table that use this Router to send and receive messages. | 16 |

TABLE 24-continued

Statistics Codes

| Code | Label | Description | Size (bits) |
|---|---|---|---|
| 42 | Number of pending frames | Total number of frames pended for delayed retrieval by Sleeping End Devices | 16 |
| 43 | Number of frames forwarded from | Total number of frame received from End Devices | 16 |
| 44 | Number of frames forwarded to | Total Number of frame forwarded to End Devices | 16 |
| 45 | Number of frames never forwarded | Total number of frames never delivered to the targeted End Device | 16 |
| 46 | Number of forwarding buffer overflows | Number of data frames sent to an End Device and dropped by the routing device because of a lack of store and forward buffers. | 16 |
| 47 | Number of Parent changes | Numbers of times the End Device has changed Parents by sending a Keep Alive to a different Router of its primary or any secondary network. | 16 |
| | | Security | |
| 48 | Total number of security events | Number of security related events. Each specific event is totalized by the following statistics. | 32 |
| 49 | Number of key write operations | Number of times a Key has been written | 16 |
| 50 | Number of DLL MIC errors | Number of times a frame is received with a valid CRC (FCS) but an invalid DLL MIC. If this rate is high enough, it may be evidence of an attack | 16 |
| 51 | Number of Network MIC errors | Number of times a frame is received with a valid CRC (FCS), a valid DLL MIC but an invalid Network MIC. This may be evidence of an insider attack. | 16 |
| 52 | Number of DLL nonce count error | Number of time a frame is received with a valid CRC (FCS) and valid DLL MIC but with a nonce older than expected. This implies a duplicate or replayed frame. | 16 |
| 53 | Number of Network nonce count error | Number of time a frame is received with a valid FCS, a valid DLL MIC and a valid Network MIC but with a non-reflected nonce. This implies a duplicate or replayed frame. | 16 |
| 54 | Number of times a Security header is missing | Number of times a frame or frame is received without Security when security is expected. | 16 |
| 55 | Number of Message format errors | Number of times a frame or frame is received with invalid content such as an invalid length or an invalid field value. | 16 |
| | | Reset | |
| 56 | Total number of resets | Total number of MCU reset. This counter is in fact the summation of the Number of illegal Op Code resets, the number of watchdog resets and the number of physical resets. | 16 |
| 57 | Number of illegal Op Code resets | Total number of MCU reset caused by the execution of an illegal Op Code. It is important to note that these resets is also a consequence of these resets: MAC supervisor resets, serial port resets and serial port busy resets. | 16 |
| 58 | Number of watchdog resets | Total number of MCU reset caused by the watchdog. | 16 |
| 59 | Number of physical resets | Total Number of MCU reset caused by the reset pin. | 16 |
| 60 | Worst stack usage | Indicate the minimum number of bytes that remains for stack, since the last radio reprogramming. | 16 |
| 61 | Current stack usage | Indicate the minimum number of bytes that remains for stack, since the last reset. | 16 |
| 62 | Number of MAC supervisor resets | Number of times the MAC supervisor did a reset of the MAC layer after inference of a lockup at that layer. Generate also an "illegal Op Code reset". | 16 |
| 63 | Number of serial port resets | Total number of MCU reset requested using the serial protocol.. Generate also an "illegal Op Code reset". | 16 |
| 64 | Number of serial port busy resets | Total number of MCU reset caused by a lock of the serial port. Generate also an "illegal Op Code reset". | 16 |
| 65 | Number of tree optimization | Total number of preferred parent changed. | 16 |
| 66 | Number of local tree repair | Total number of tree repair used | 16 |
| 67 | Number of frame drop, TTL expired | Total number of frame drop caused by TTL expired | 16 |

The Keep Alive Response message is sent by the Coordinator in response to a Keep Alive Request. The Keep Alive Response frame format is shown in FIG. 60.

TABLE 25

Keep Alive Response Frame Fields

| Field Name | Data type | Description |
| --- | --- | --- |
| Common routed message format | | See description herein. |
| Service Code | Unsigned 8 bits | Set to 5. |
| Coordinator Load | Unsigned 8 bits | Measure of the number of Nodes already associated to the network, relative to router capacity. The value 100% means full and no further associations are accepted. |
| MAC Address | Binary 8 octets | IEEE 802.15.4 EUI64 address (8-octets) of the targeted Node. Only Keep Alive Responses with a valid MAC address are processed. The Node initiates a re-association process if it doesn't receive a valid Keep Alive Response for more than CHECKPOINT_MAX_ATTEMPTS consecutive Keep Alive Requests. |
| Parameter List | Unsigned 8 bits | List of Parameter ID and Parameter Data pairs. The number of parameters in the list is limited by the space available in the frame. The list always ends with a Parameter ID set to 0, without accompanying data. |

The Keep Alive Response parameter list member: current time frame format is shown in FIG. 61.

TABLE 26

Keep Alive Response: Parameter list member: Current time Format Fields

| Field Name | Data type | Description |
| --- | --- | --- |
| Parameter ID | Unsigned 8 bits | Set to 1. |
| Current minute | Unsigned 32 bits | Date and time of the current UTC minute. This field is a 32-bit unsigned integer containing the number of minutes since 1970 UTC. |
| Current second | Unsigned 8 bits | This field is an 8-bit unsigned integer containing the number of seconds in the current minute. |
| Correction ratio | Unsigned 8 bits | Rate in hundredths of one percent at which the time should be corrected. For example, the value 10 represents a correction rate of $1/10$ of 1%, which represents a correction of 3.6 seconds per hour. |
| Time zone offset | Signed 16 bits | Signed number of minutes to add to the received UTC time to obtain the standard localized time. |
| DST offset | Unsigned 8 bits | Number of additional minutes to add to the standard localized time to obtain the current localized time. |
| Next DST change | Unsigned 32 bits | Date and time of the next DST change. This field uses the same encoding as the Current minute field. |
| Next DST offset | Unsigned 8 bits | The offset to use as DST offset after the Next DST change. |

The Keep Alive Response parameter list member: statistics frame format is shown in FIG. 62.

TABLE 27

Keep Alive Response: Parameter list member: Statistics Format Fields

| Field Name | Data type | Description |
| --- | --- | --- |
| Parameter ID | Unsigned 8 bits | Set to 2. |
| Statistic Reported | Unsigned 16-octets | Powerset controlling which statistics are reported. For example, bit 5 is set to request reporting of the statistic corresponding to Statistic Code 5. This field is optional and included only when an update is requested. |

The Keep Alive Response parameter list member: SMIB parameter update frame format is shown in FIG. 63.

TABLE 28

Keep Alive Response: Parameter list member: SMIB parameter update Format Fields

| Field Name | Data type | Description |
| --- | --- | --- |
| Parameter ID | Unsigned 8 bits | Set to 3. |
| SMIB parameter ID | Unsigned 8 bits | Identifier of the SMIB parameter to be updated. See section 8.10 for the list of SMIB parameter ID. |
| SMIB parameter Value | Unsigned 8 bits | New value assigned to the SMIB parameter. |

Figure 64:
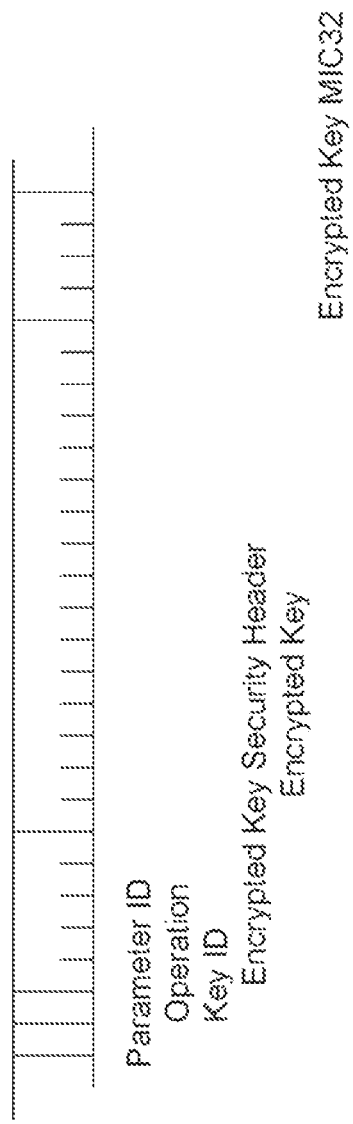
FIG. 64 shows a Frame format: Keep Alive Response: Parameter list member: Write-Switch-Deactivate Key in accordance with an embodiment of the present invention.

The Keep Alive Response parameter list member: Write-Switch-Deactivate Key frame format is shown in FIG. 64.

TABLE 29

Keep Alive Response: Parameter list member: Write-Switch-Deactivate Key Format Fields

| Field Name | Data type | Description |
| --- | --- | --- |
| Parameter ID | Unsigned 8 bits | Set to 4. |
| | Unsigned 8 bits | See sub fields below: |
| Reserved | Bits 7-6 | Set to 0x00 |
| Operation | Bits 5-4 | 0x00 = Write the key specified by the Key ID 0x01 = Switch transmissions to the key specified by the Key ID 0x10 = Deactivate reception using the key specified by the Key ID 0x11 = reserved |
| Key ID | Bit 3-0 | 0 = Node Key-1 1 = Node Key-0 2 = Mesh Key-1 3 = Mesh Key-0 4 = Maintenance Key-1 5 = Maintenance Key-0 In all key writes and deactivations, the Node shall validate that the Selected Key is not the key currently in use as the transmit key. |
| Encrypted Key Security Header | Unsigned 5 octets | For the write operation, this field is the security information and has the same format as the Network Security Header that contains the nonce and key information used to encrypt the Encrypted Key. For the other operations this field is set to 0x00 00 00 00 00 |
| Encrypted Key | Unsigned 16 octets | For the write operation this is the key to be written, encrypted using the Node Key indicated in the Encrypted Key Security Header. For the other operations this field is set to all 0s. The key is encrypted using the algorithm in IEEE 802.15.4-2006 section B.4 and the specified encryption key. |

TABLE 29-continued

Keep Alive Response: Parameter list member: Write-Switch-Deactivate Key Format Fields

| Field Name | Data type | Description |
|---|---|---|
| Encrypted Key MIC32 | Binary 4 octets | Message Integrity check of the Encrypted Key Security Header and the plain text key. The MIC is calculated using the algorithm in IEEE 802.15.4-2006 section B.4 and the specified authentication key. |

Operations on the Mesh Key are associated with the Mesh Key Table entry for the Coordinator sending the Keep Alive Response message. The Write-Switch-Deactivate Key parameter list member may be occurring multiple times in a message.

Figure 65:
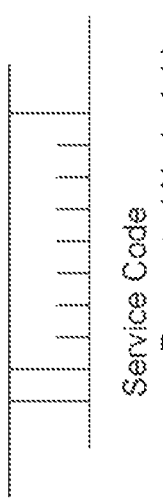
FIG. 65 shows a Frame format: Route Establishment Request in accordance with an embodiment of the present invention.

The Route Establishment Request message is used by a Node to request from the Coordinator a route to a target Node for peer to peer communication using source routing. The Route Establishment Request message frame format is shown in FIG. 65.

TABLE 30

Route Establishment Request Format Fields

| Field Name | Data type | Description |
|---|---|---|
| Common routed message format | | See description herein. |
| Service Code | Unsigned 8 bits | Set to 6. |
| Requested Node Address | Binary 8 octets | IEEE 802.15.4 long address of the target Node for which a route is requested. |

Figure 66:
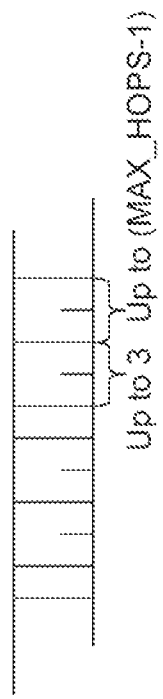
FIG. 66 shows a Frame format: Route Establishment Response in accordance with an embodiment of the present invention.

The Route Establishment Response message format shown in FIG. 66 is sent by the Coordinator in response to a Route Establishment Request.

TABLE 31

Route Establishment Response Format Fields

| Field Name | Data type | Description |
|---|---|---|
| Common routed message format | | See description herein. |
| Service Code | Unsigned 8 bits | Set to 7. |
| Target Address | Binary 2 octets | See description herein. |
| Originator Address | Binary 2 octets | See description herein. |
| | Unsigned 8 bits | See sub fields below: |
| Number Of PAN identifiers | Bits 5-4 | See description herein. |
| Number of Hops Addresses | Bits 3-0 | See description herein. |
| PAN identifiers | Up to 3 element array Binary 2 octets | See description herein. |
| Hop Addresses | Up to (MAX_HOPS-1) element array Binary 2 octets | See description herein. |

Figure 67:
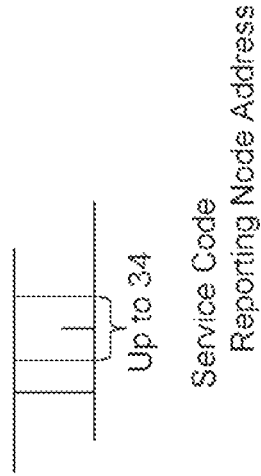
FIG. 67 shows a Frame format: Power Event Report in accordance with an embodiment of the present invention.

The Power Event Report message is sent by Nodes to notify of a power outage or power restoration condition and the frame format is shown in FIG. 67.

TABLE 32

Power Event Report Frame Fields

| Field Name | Data type | Description |
|---|---|---|
| Common routed message format | | See description herein. |
| Service Code | Unsigned 8 bits | Set to 8 for notifications. Set to 9 for acknowledgments. |
| Reporting Source Route Node Address List | Array of Binary 2 octets | List of addresses of all devices forwarding a power outage or a power restoration report. In a request Bit 15: Power state Set to one if the Node currently has power. Set to zero if the Node currently is in outage. Bits 14-0: device's short address, where Bit 14 is set to zero for Router Nodes and to one for Leaf Nodes |

Figure 68:
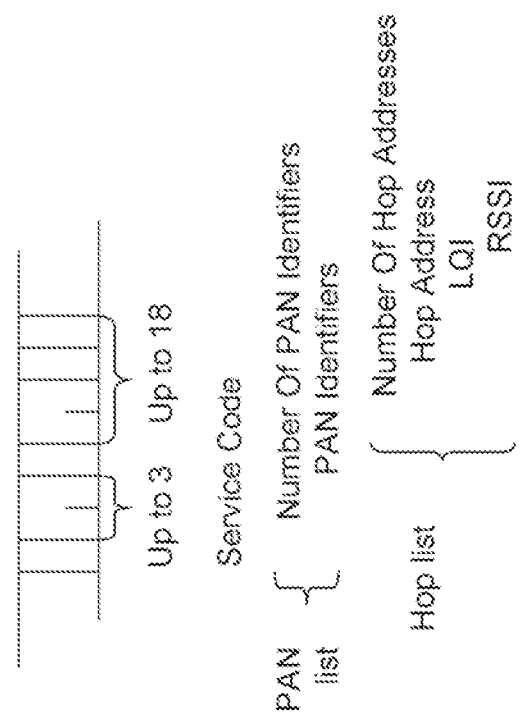
FIG. 68 shows a Frame format: Ping in accordance with an embodiment of the present invention.

The ping message is used to test mesh communication during quality assessment (QA) or when the network is deployed. The ping message frame format is shown in FIG. 68.

TABLE 33

Ping Frame Fields

| Field Name | Data type | Description |
|---|---|---|
| Common routed message format | | See description herein. |
| Service Code | Unsigned 8 bits | Set to 10 for Ping Request. Set to 11 for Ping Response. |
| Number of PAN identifiers | Bits 7-6 | Defines the number of entries in the PAN identifiers field. |
| PAN Identifiers | Array of up to 3 Binary 2 octets | List of Network identifiers. This list is referenced by bits 15-14 of the different addresses within the Hop Address list. |
| Number of Hop Addresses | Unsigned 8 bits | Actual number of entries in the hop list. This number is increased each time this frame is received during the round trip between the originator and the target and back to the originator. |
| | Array of . . . | the following three items: |
| Hop Address | Binary 2 octets | Address of Node receiving this frame including the target Node and, on return, the Originator Nodes |
| LQI | Unsigned 8 bits | LQI recorded at the specified address when receiving this message. |
| RSSI | Unsigned 8 bits | RSSI recorded at the specified address when receiving this message. |

Figure 69:
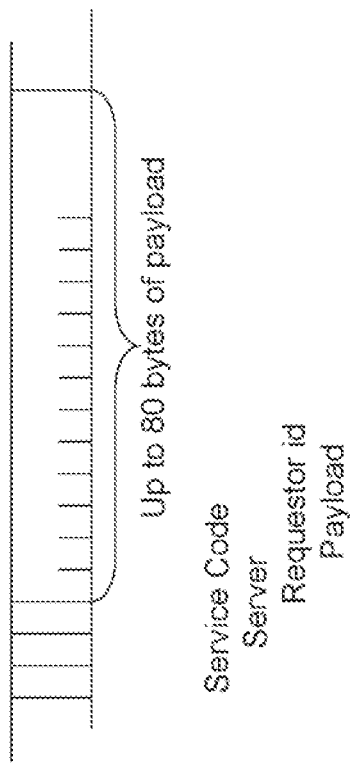
FIG. 69 shows a Frame format: Service Forwarding in accordance with an embodiment of the present invention.

The Service Forwarding message is used by the Router servicing a Service Request to send service messages to and from the Coordinator. The Service Forwarding message frame format is shown in FIG. 69.

TABLE 34

Service Forwarding Frame Fields

| Field Name | Data type | Description |
|---|---|---|
| Common routed message format | | See description herein. |
| Service Code | Unsigned 8 bits | Set to 12 for Service Forwarding Request. Set to 13 for Service Forwarding Response. |
| Server | Unsigned 8 bits | 0 = ANSI C12 Commissioning Host |

TABLE 34-continued

Service Forwarding Frame Fields

| Field Name | Data type | Description |
|---|---|---|
| Requestor id | Unsigned 8 bits | Temporary identifier assigned by the originating Router to the requesting Node. This identifier is required if the originating Router is capable of simultaneously servicing Service Requests from multiple Nodes. |

Figure 70:
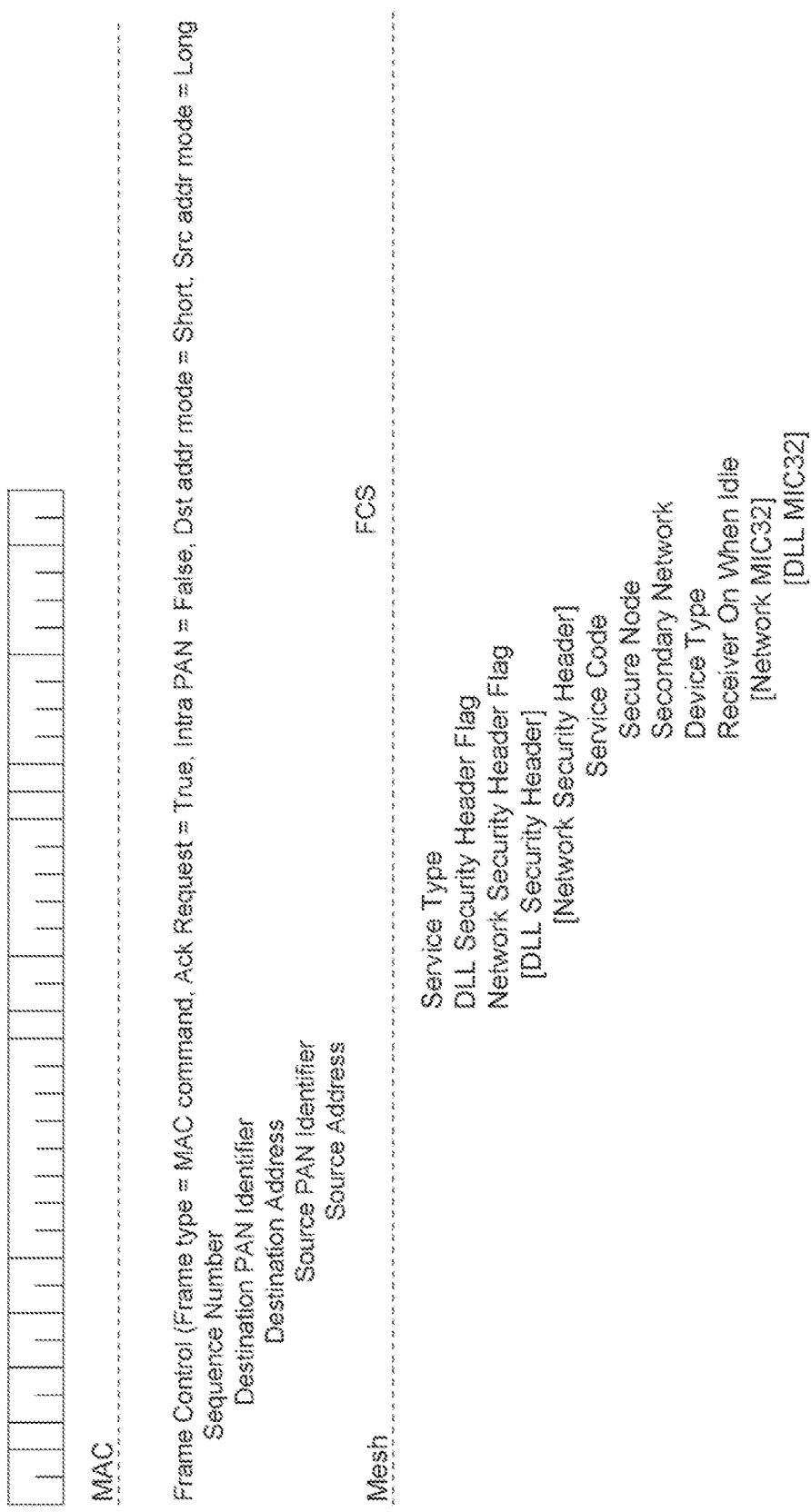
FIG. 70 shows a Frame format: Association Request in accordance with an embodiment of the present invention.

The Association Request message is sent by a Node to Router in its neighborhood to request an association to the identified mesh network. The Association Request message frame format is shown in FIG. 70.

TABLE 35

Association Request Frame Fields

| Field Name | Data type | Description |
|---|---|---|
| Common MAC layer fields | | See description herein. |
| | Unsigned 8 bits | See subfields below: |
| Service Type | Bits 6-4 | Set to 3. |
| DLL Security Header Flag | Bool 1 | Set when the DLL Security Header and DLL MIC32 are present |
| Network Security Header Flag | Bool 0 | Set when the Network Security Header is present |
| [DLL Security Header] | Unsigned 16 bits | See description herein. |
| [Network Security Header] | Unsigned 40 bits | See description herein. |
| Service Code | Unsigned 8 bits | Set to 0. |
| | Unsigned 8 bits | See sub fields below: |
| Secure Node | Bool 0 | See description herein. |
| Secondary Network | Bool 1 | See description herein. |
| Device Type | Bool 2 | See description herein. |
| Receiver On When Idle | Bool 3 | See description herein. |
| [Network MIC32] | Binary 4 octets | See description herein. |
| [DLL MIC32] | Binary 4 octets | See description herein. |

Figure 71:
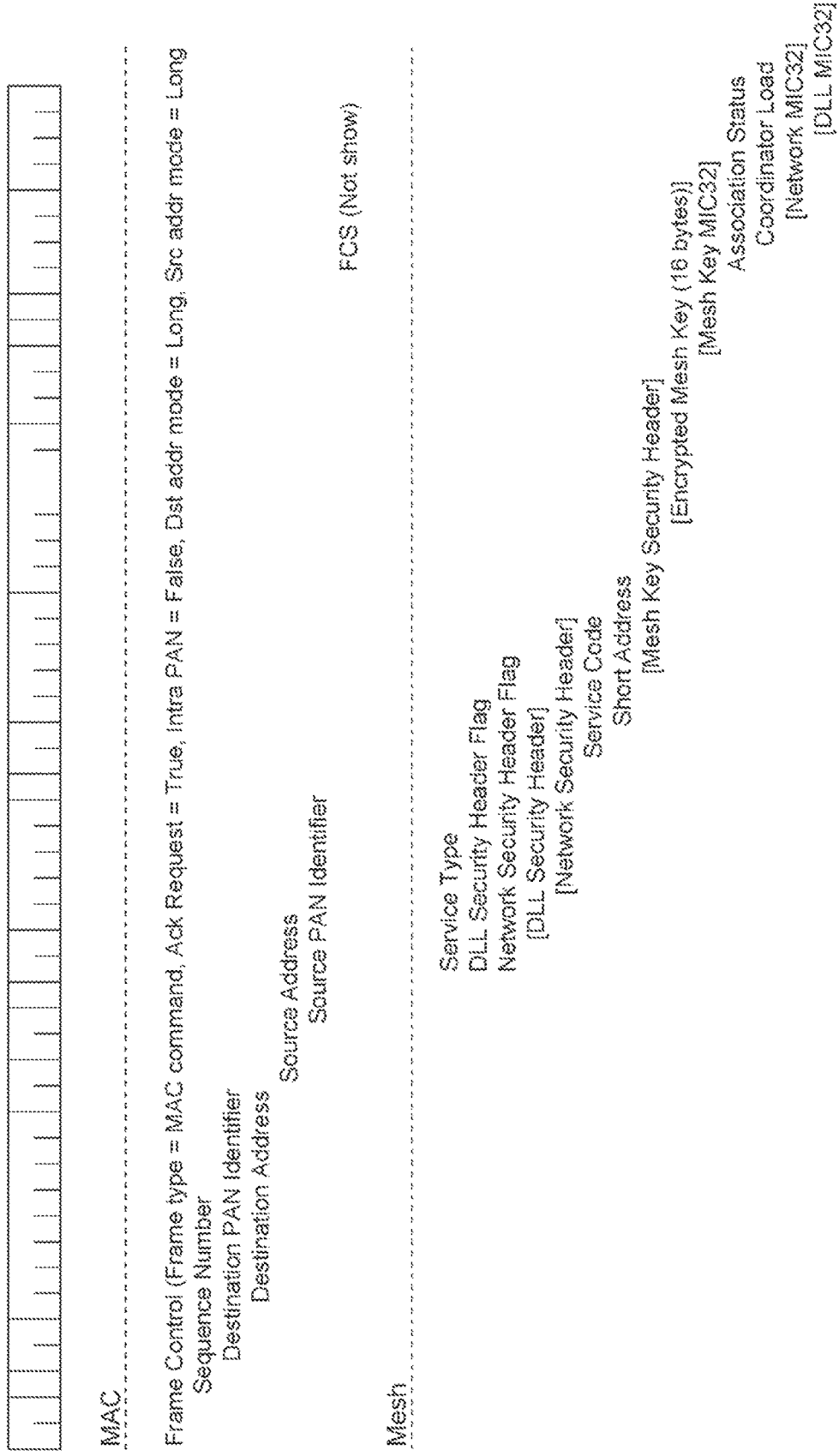
FIG. 71 shows a Frame format: Association Response in accordance with an embodiment of the present invention.

An Association Response message is returned by a Router to a Node in response to an Association Request. An Association Response message frame format is shown in FIG. 71.

TABLE 36

Association Response Frame Fields

| Field Name | Data type | Description |
|---|---|---|
| Common MAC layer fields | | See description herein. |
| | Unsigned 8 bits | See subfields below: |
| Service Type | Bits 6-4 | Set to 3. |
| DLL Security Header Flag | Bool 1 | Set when the DLL Security Header and DLL MIC32 are present |
| Network Security Header Flag | Bool 0 | Set when the Network Security Header is present |
| [DLL Security Header] | Unsigned 16 bits | See description herein. |
| [Network Security Header] | Unsigned 40 bits | See description herein. |

TABLE 36-continued

Association Response Frame Fields

| Field Name | Data type | Description |
|---|---|---|
| Service Code | Unsigned 8 bits | Set to 1. |
| Short Address | Binary 2 octets | If the Coordinator was not able to associate this device to its PAN, this field is set to 0xFFFF, and the association status field contains the reason for the failure. If the Coordinator was able to associate the device to its PAN, this field contains the short address assigned to that device. |
| [Mesh Key Security Header] | Unsigned 5 octets | This header, the Encrypted Mesh Key and the Mesh Key MIC32 fields are transferred from the Association Confirmation Response frame if one exists. |
| [Encrypted Mesh Key] | Binary 16 octets | This Encrypted Key is passed though from the Association Confirmation Response message. The Mesh Key is encrypted using the algorithm in IEEE 802.15.4-2006 section B.4 and the specified Node Key. |
| [Mesh Key MIC32] | Binary 4 octets | Message Integrity check of the Mesh Key Security Header and the plain text Mesh Key. The MIC is calculated using the algorithm in IEEE 802.15.4-2006 section B.4 and the specified Node Key. |
| | Unsigned 8 bits | |
| Reserved | Bits 7-4 | Set to 0 |
| Mesh Key Selection | Bits 3-0 | 2 = Mesh Key 1 3 = Mesh Key 0 All other values reserved |
| Mesh Key PAN ID | Binary 2 octets | PAN ID associated with the Mesh Key |
| Association Status | Unsigned 8 bits | 0x00 = Association successful. 0x01 = PAN at capacity. 0x02 = PAN access denied. |
| Coordinator Load | Unsigned 8 bits | Measure of the number of Nodes already associated to the network, relative to router capacity. The value 100% means full and no further associations are accepted. |
| [Network MIC32] | Binary 4 octets | See description herein. |
| [DLL MIC32] | Binary 4 octets | See description herein. |

Figure 72:
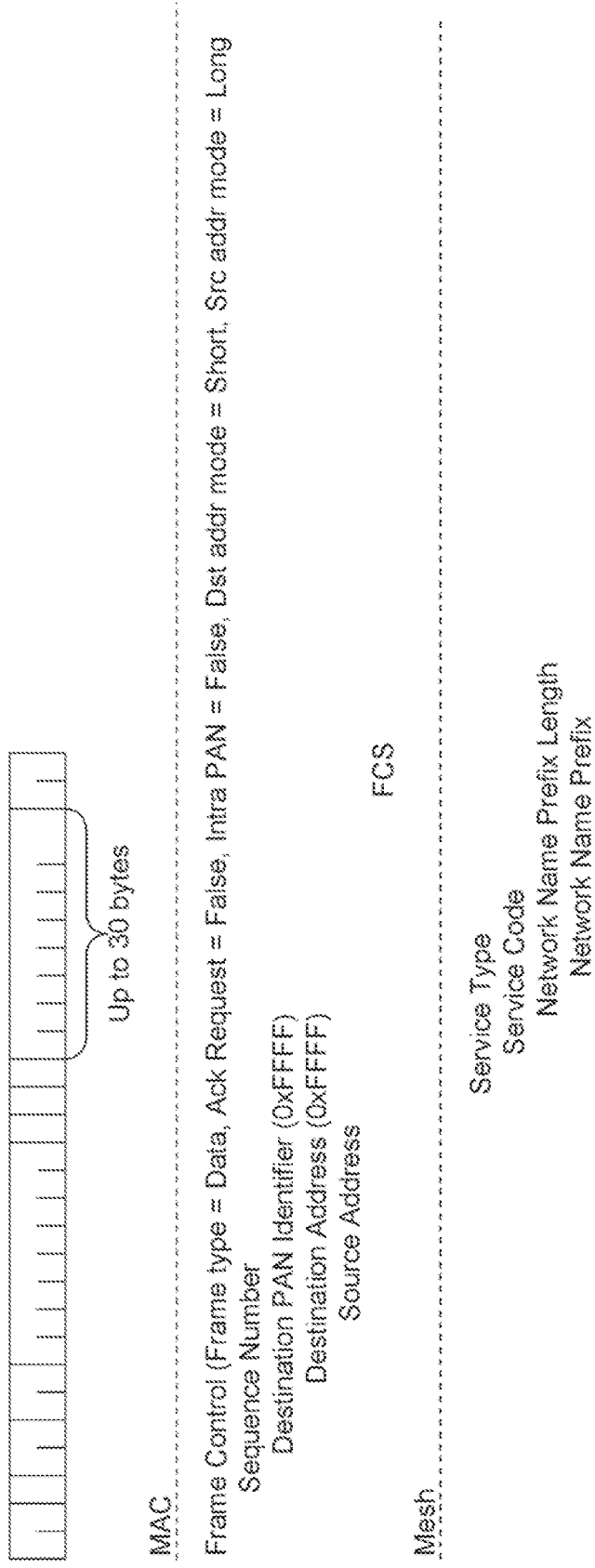
FIG. 72 shows a Frame format: Neighbor Info Request, originator is not a network member, in accordance with an embodiment of the present invention.
Figure 73:
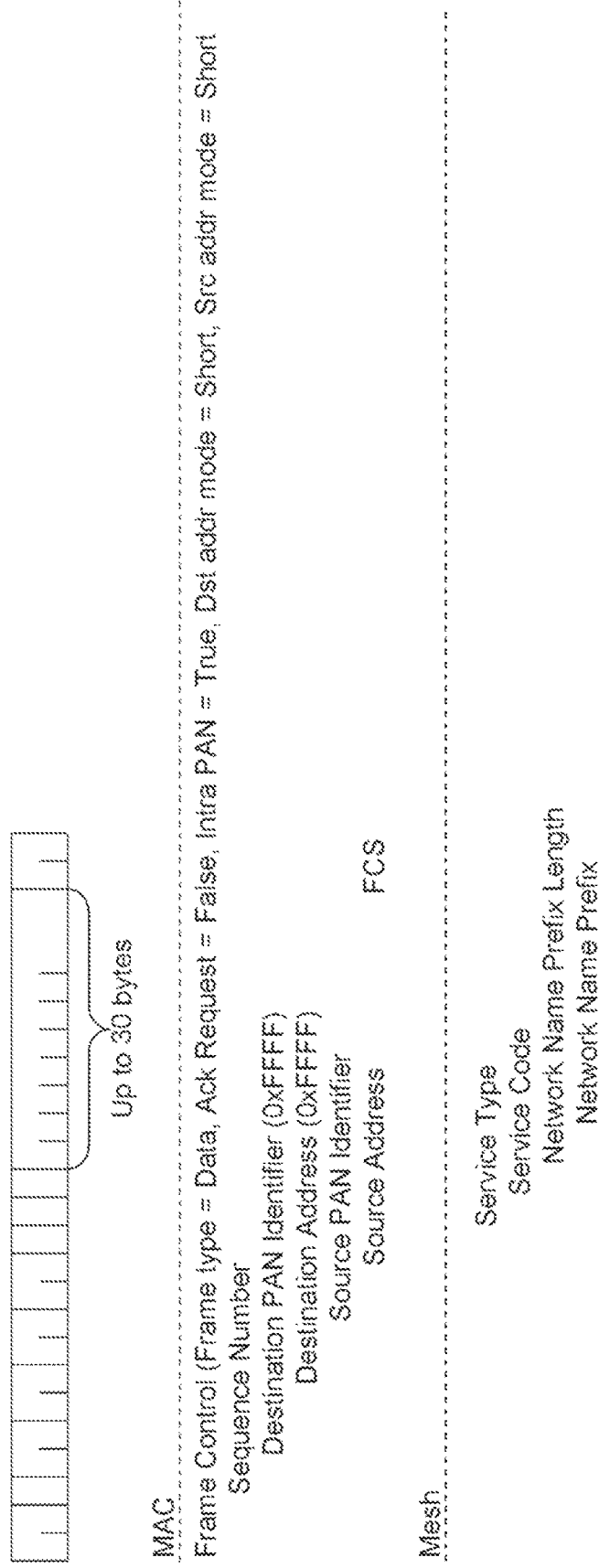
FIG. 73 shows a Frame format: Neighbor Info Request, originator is a network member, in accordance with an embodiment of the present invention.

The Neighbor Info Request message is broadcast to get information about neighbor Routers. The frame format shown in FIG. 72 is used when the originator of the message is not a network member. The frame format shown in FIG. 73 is used when the originator of the message is a network member.

TABLE 37

Neighbor Info Request Frame Fields

| Field Name | Data type | Description |
|---|---|---|
| Common MAC layer fields | Unsigned 8 bits | See description herein. |
| | Unsigned 8 bits | See subfields below: |
| Service Type | Bits 6-4 | Set to 3. |
| Service Code | Unsigned 8 bits | Set to 2. |
| Network Name Prefix Length | Unsigned 8 bits | Size in number of octets of the Network Name Prefix field. |
| Network Name Prefix | String | Only Node members of a network whose name starts with this string return Neighbor Info Response frames. |

Figure 74:
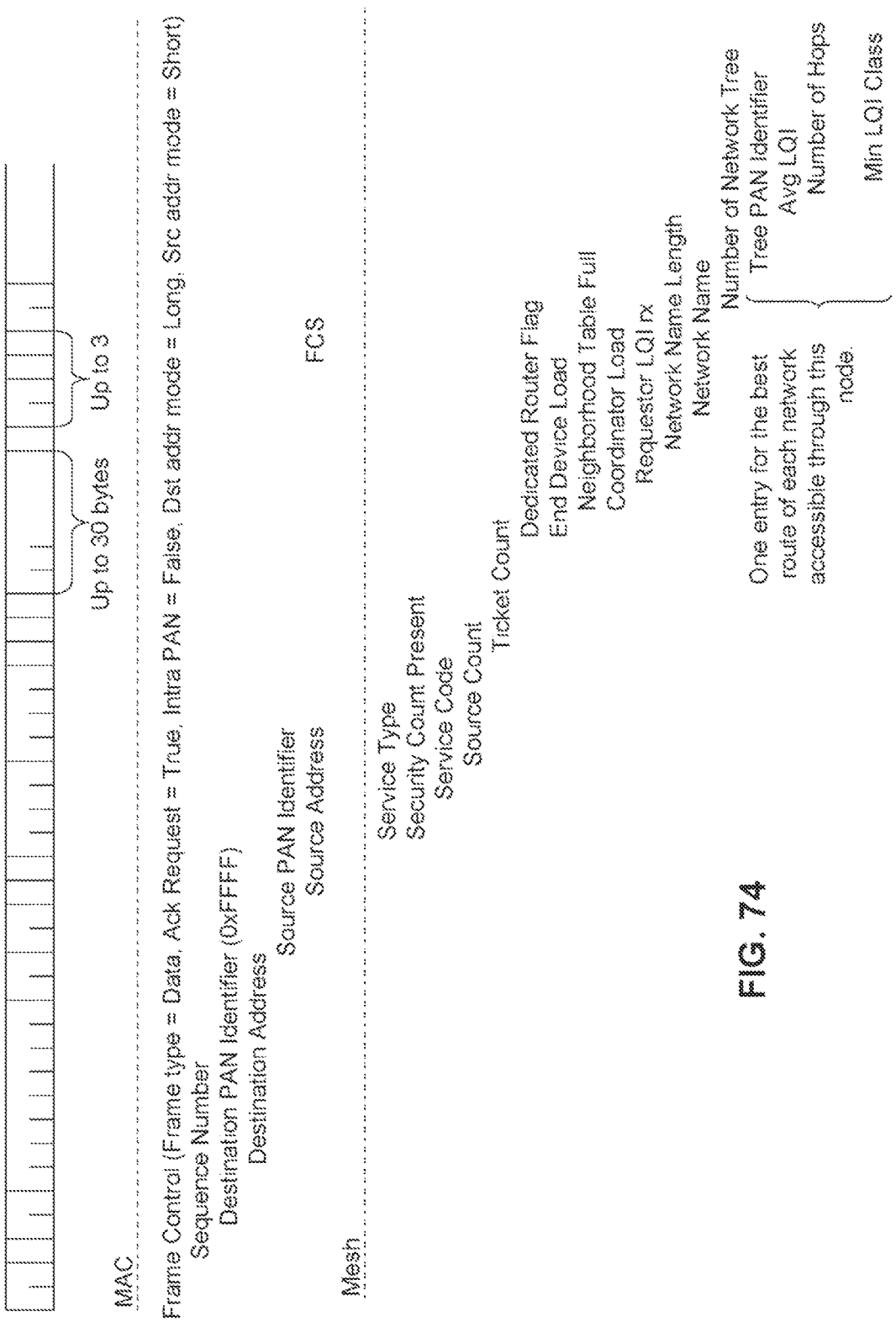
FIG. 74 shows a Frame format: Neighbor Info Response, originator is not a network member, in accordance with an embodiment of the present invention.
Figure 75:
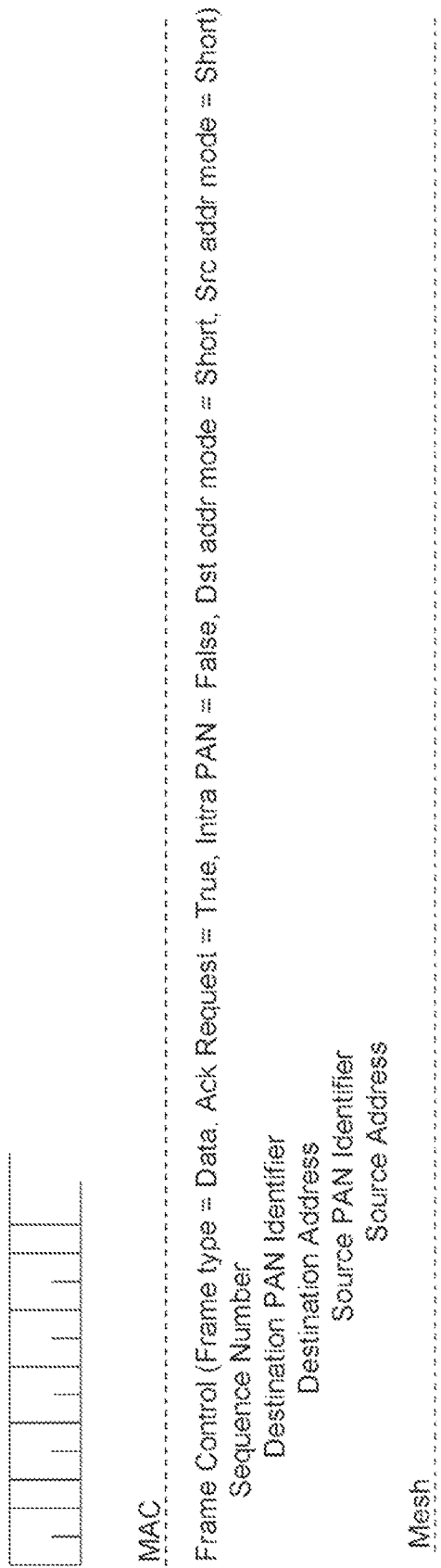
FIG. 75 shows a Frame format: Neighbor Info Response, originator is a network member, in accordance with an embodiment of the present invention.

The Neighbor Info Response message is sent by each neighbor Router when a Neighbor Info Request is broadcast. This message contains the network name and Coordinator load of the responding neighbor, the quality of the requesting Node's signal as received by this neighbor, and the list tree position of this neighbor on different network trees. The Neighbor Info Response message frame format for an non-network originator is shown in FIG. 74. The Neighbor Info Response message frame format for an in-network originator is shown in FIG. 75.

Figure 76:
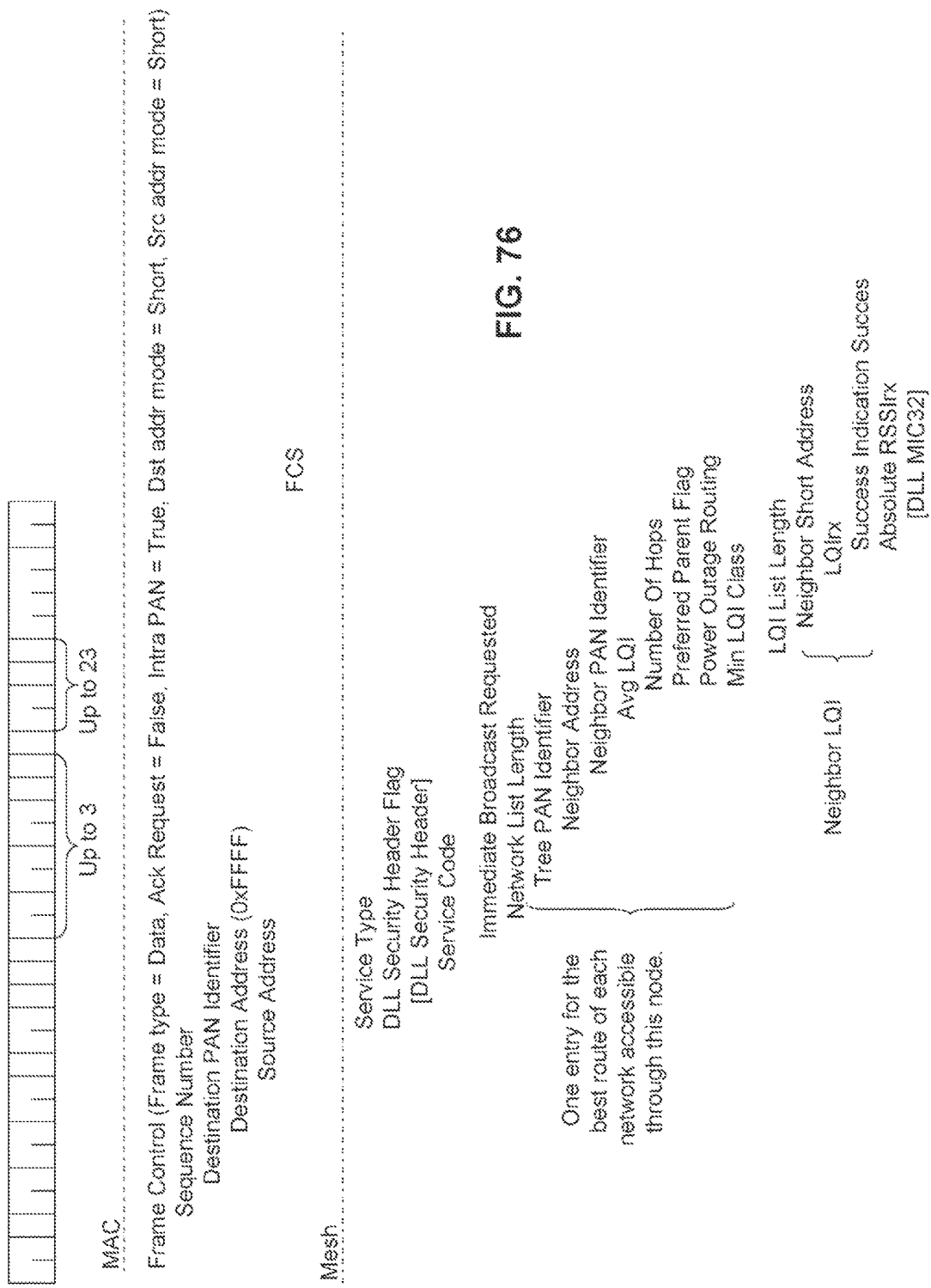
FIG. 76 shows a Frame format: Neighbors Exchange in accordance with an embodiment of the present invention.

The Neighbors Exchange message is broadcast locally by each Node and used to maintain the neighborhood information and to optimize the network tree. The Neighbors Exchange message frame format is shown in FIG. 76.

TABLE 38

Neighbor Info Response Frame Fields

| Field Name | Data type | Description |
|---|---|---|
| Common MAC layer fields | | See description herein. |
| | Unsigned 8 bits | See subfields below: |
| Service Type | Bits 6-4 | Set to 3. |
| Security Count Present | Bool 2 | Set when Source Count and Ticket Count are present. |
| Service Code | Unsigned 8 bits | Set to 3. |
| Source Count | Binary 5 octets | DLL Security nonce count to be used to validate secure messages from this device. The value received in a message from this source must be greater than this value. The resulting database value is updated each time a valid message is received. |
| Ticket Count | Binary 5 octets | DLL Security nonce count to be used to send secure messages to this device. This value is pre-incremented before each transmission. |
| | Unsigned 8 bits | See sub fields below: |
| Dedicated Router Flag | Bit 7 | Set when this Node is a Dedicated Router. This value is used to compute the association ratio. It is also used by a Dedicated Router to validate that it associates directly only with a Coordinator or another Dedicated Router. |
| End Device Load | Bits 6-0, range 0-100 | Measure of the number of End Device which are already Children of this Router, relative to router capacity. The value 100% means full and no further End Device are accepted. |
| | Unsigned 8 bits | See sub fields below: |
| Neighborhood Table Full | Bool 7 | When set, this Router can't be used as an Association Router because it neighborhood table is already full with direct Parents and Children. |
| Coordinator Load | Bits 6-0, range 0-100 | Measure of the number of Nodes already associated to the network, relative to router capacity. The value 100% means full and no further associations are accepted. |
| Requestor LQI rx | Unsigned 8 bits | Link Quality Indicator of messages received from the requesting Node. |
| Network Name Length | Unsigned 8 bits | Size in number of octets of the Network Name field. |
| Network Name | String | Name assigned to the network on which this Node is associated. |
| Number of Network Trees | Unsigned 8 bits | Number of network tree descriptions available in the following list. |
| | Array of . . . | the following fields |
| Tree PAN Identifier | Binary 2 octets | See description herein. |
| Avg LQI | Unsigned 8 bits | See description herein. |
| | Unsigned 8 bits | See sub fields below: |
| Number of Hops | Bits 7-4 | See description herein. |
| Power Outage Routing | Bool 2 | See description herein. |
| Min LQI Class | Bits 1-0 | See description herein. |

TABLE 39

Neighbors Exchange Frame Fields

| Field Name | Data type | Description |
|---|---|---|
| Common MAC layer fields | | See description herein. |
| | Unsigned 8 bits | See subfields below: |
| Service Type | Bits 6-4 | Set to 3. |
| DLL Security Header Flag | Bool 1 | Set when the DLL Security Header and DLL MIC32 are present |
| [DLL Security Header] | Unsigned 16 bits | See description herein. |
| Service Code | Unsigned 8 bits | Set to 4. |
| | Unsigned 8 bits | See subfields below: |
| Immediate Broadcast Requested | Bool 7 | Set when the originator of the message needs to get information from neighbors in a short interval of time. When set, recipients send their Neighbors Exchange message using a pseudo-randomly chosen delay within NEIGHBOR_EX_RND_PERIOD. This feature is used by Nodes participating in overlapping networks. |
| reserved | Bits 0 to 6 | |
| Network List Length | Unsigned 8 bits | Number of entries in the following list. |
| Network List | | |
| Tree PAN Identifier | Binary 2 octets | See description herein. |
| Neighbor Address | Binary 2 octets | See description herein. |
| Neighbor PAN Identifier | Binary 2 octets | See description herein. |
| Avg LQI | Unsigned 8 bits | See description herein. |
| | Unsigned 8 bits | See subfields below: |
| Number of Hops | Bits 7-4 | See description herein. |
| Preferred Parent Flag | Bool 3 | See description herein. |
| Power Outage Routing | Bool 2 | See description herein. |
| Min LQI Class | Bits 1-0 | See description herein. |
| LQI List Length | Unsigned 8 bits | Number of entries in the LQI list below. |

LQI List This list use the space remaining in the frame and contains 23 entries when the Network List contain one entry, 20 when the Network List contain 2 entries and 17 when the Network List contain 3 entries.

| | | |
|---|---|---|
| Neighbor Short Address | Binary 2 octets | Address of the neighbor for which the LQI is reported. |
| LQI rx | Unsigned 8 bits | Link Quality measured by this neighbor when receiving messages from the current Node, averaged over time. |
| Success Indication | Bool 7 | Set to 1 if the last Neighbor Exchange of this neighbor was received successfully. Used to calculate TX success rate. |
| Absolute RSSI rx | Bits 6-0 | Absolute Received Signal Strength Indicator measured by this neighbor when receiving messages from the current Node. Must be multiply by −1 to obtain the value in dBm. |

TABLE 39-continued

Neighbors Exchange Frame Fields

| Field Name | Data type | Description |
|---|---|---|
| [DLL MIC32] | Binary 4 octets | See description herein. |

Figure 77:
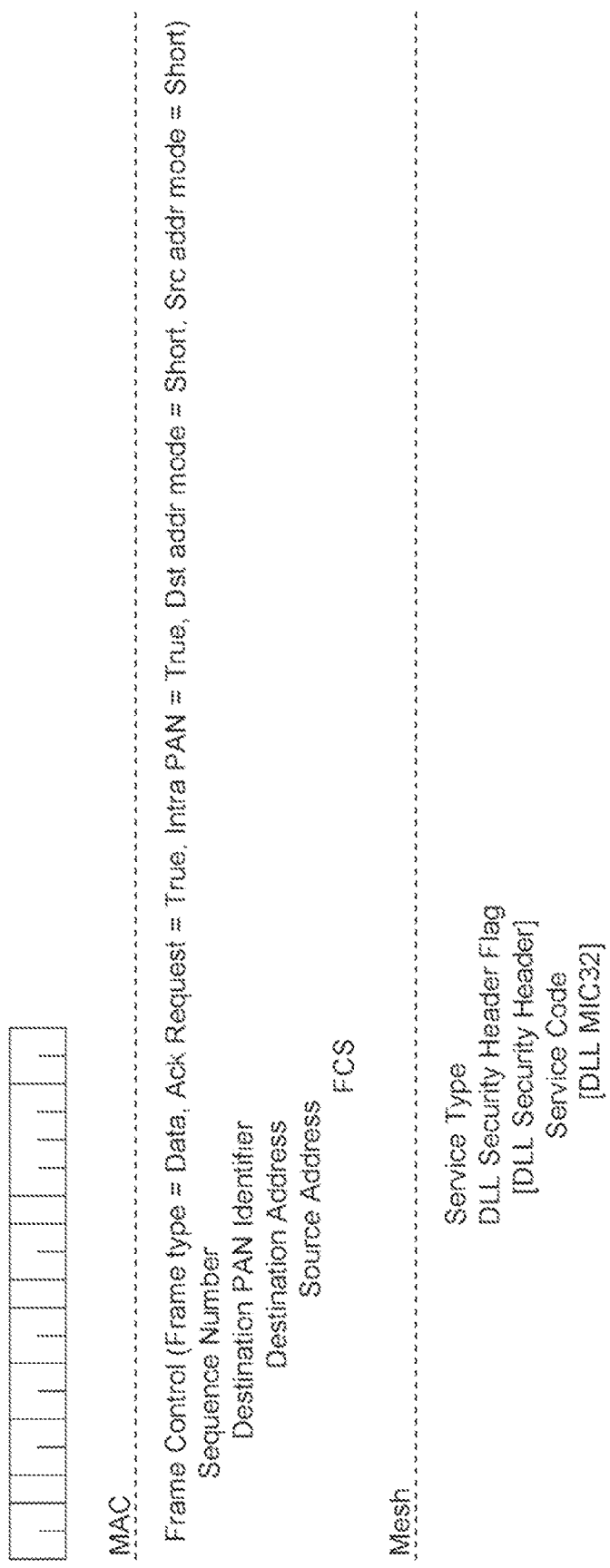
FIG. 77 shows a Frame format: End Device Data Request in accordance with an embodiment of the present invention.

The End Device Data Request message is used by an End Device to request pending data messages from its Parent. The End Device Data Request message frame format is shown in FIG. 77.

TABLE 40

End Device Data Request Frame Fields

| Field Name | Data type | Description |
|---|---|---|
| Common MAC layer fields | | See description herein. |
| | Unsigned 8 bits | See subfields below: |
| Service Type | Bits 6-4 | Set to 3. |
| DLL Security Header Flag | Bool 1 | Set when the DLL Security Header and DLL MIC32 are present |
| [DLL Security Header] | Unsigned 16 bits | See description herein. |
| Service Code | Unsigned 8 bits | Set to 5 |
| [DLL MIC32] | Binary 4 octets | See description herein. |

Figure 78:
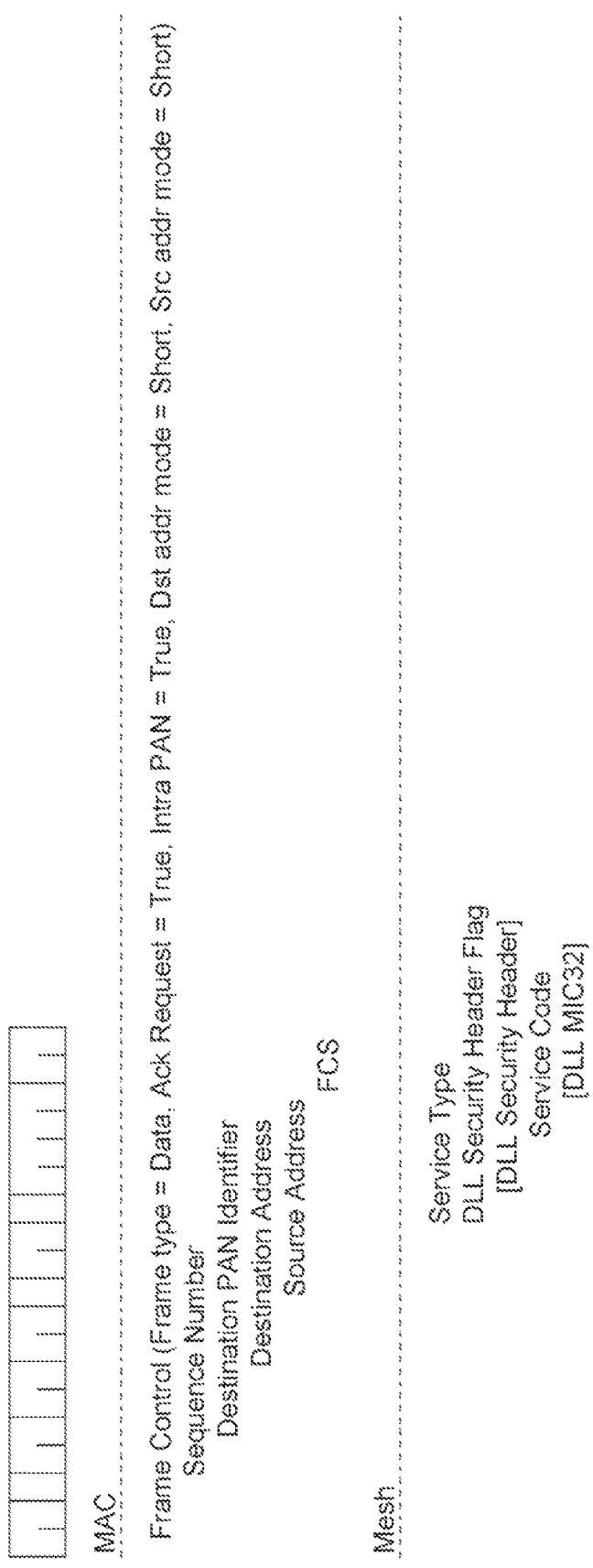
FIG. 78 shows a Frame format: End Device Data Request in accordance with an embodiment of the present invention.

The End Device Data Response message is used in response to an End Device Request to indicate the presence or not of pending data. The End Device Data Response message frame format is shown in FIG. 78.

TABLE 41

End Device Data Response Frame Fields

| Field Name | Data type | Description |
|---|---|---|
| Common MAC layer fields | | See description herein. |
| | Unsigned 8 bits | See subfields below: |
| Service Type | Bits 6-4 | Set to 3. |
| DLL Security Header Flag | Bool 1 | Set when the DLL Security Header and DLL MIC32 are present |
| [DLL Security Header] | Unsigned 16 bits | See description herein. |
| Service Code | Unsigned 8 bits | Set to 6 |
| Data Pending | Unsigned 8 bits | 0 = No data pending<br>1 = Pending data |
| [DLL MIC32] | Binary 4 octets | See description herein. |

Figure 79:
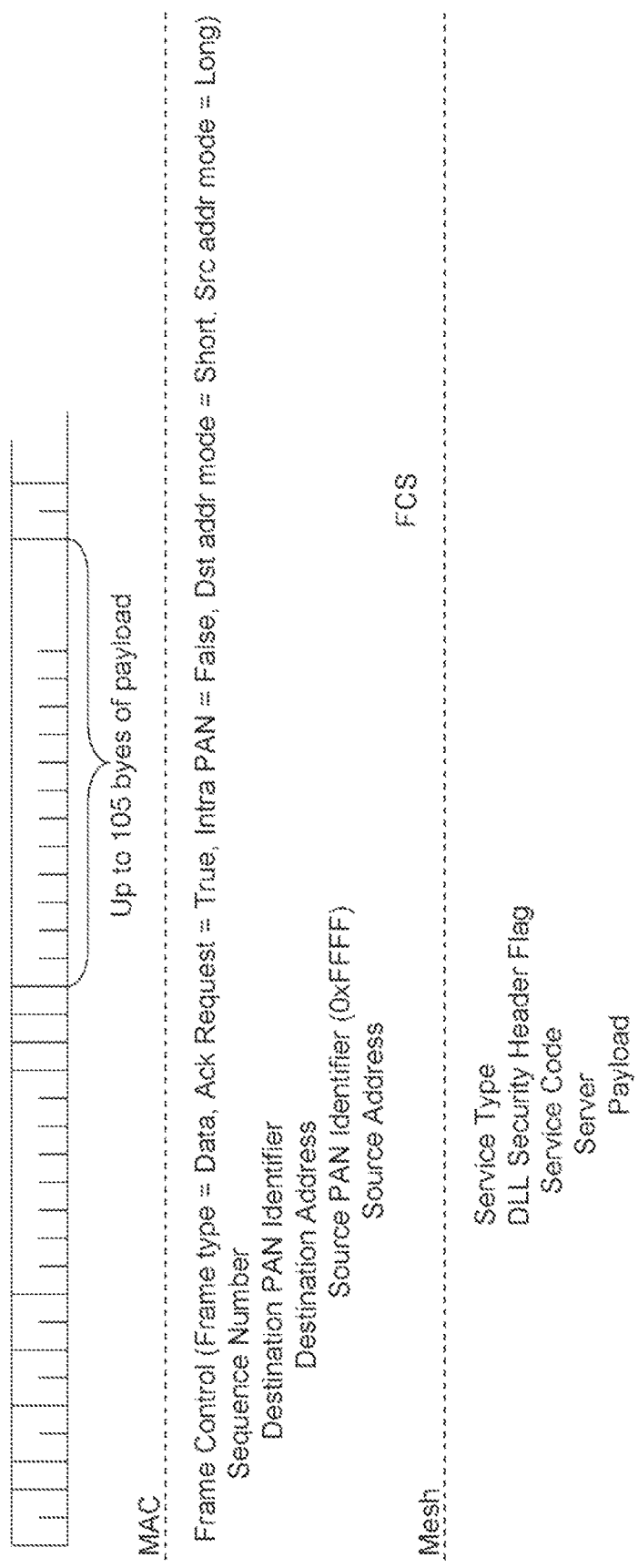
FIG. 79 shows a Frame format: Service Request Request in accordance with an embodiment of the present invention.
Figure 80:
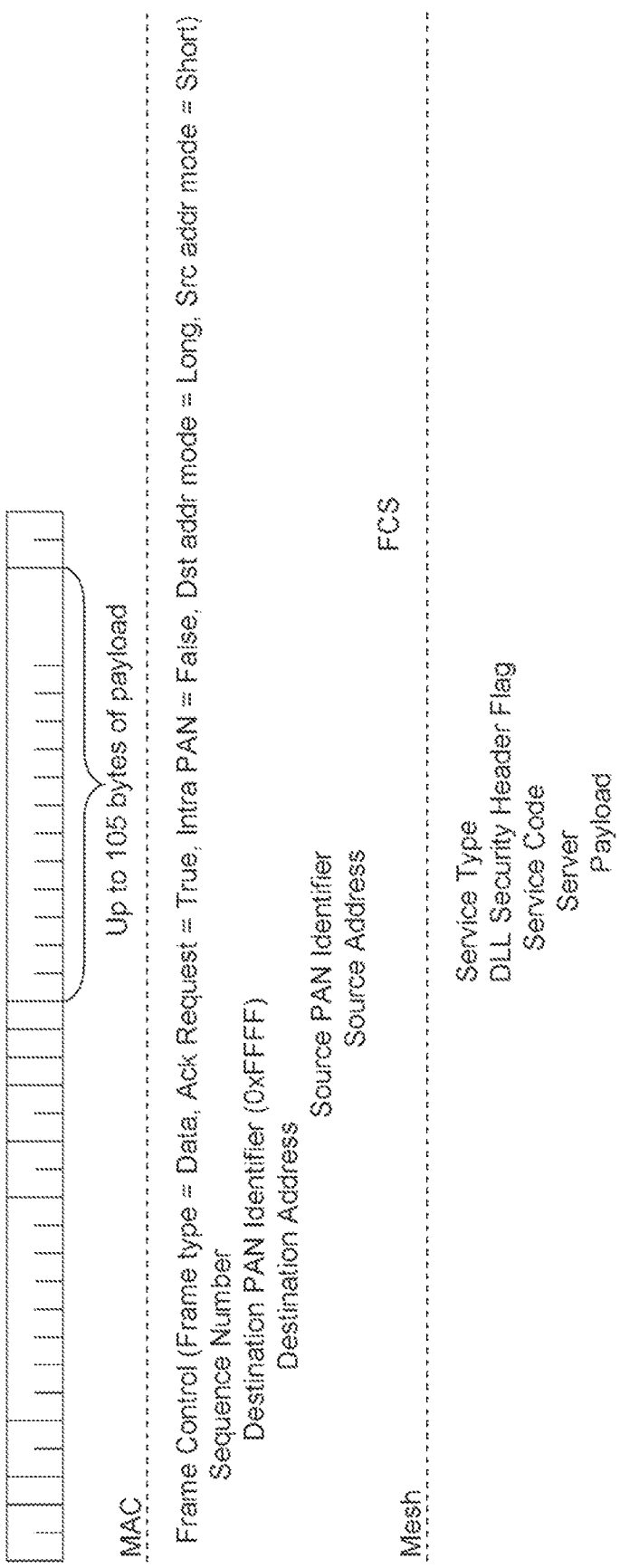
FIG. 80 shows a Frame format: Service Request Response in accordance with an embodiment of the present invention.

The Service Request message is used by a device non-member of the network to communicate with a specific service such as the commissioning service. The Router used as a proxy is responsible for limiting the flow of messages to provide protection from denial of service attacks. See the Forwarding Service Messages for more detail. The Service Request message frame format is shown in FIG. 79. The Service Request Response frame format is shown in FIG. 80.

TABLE 42

Service Request Frame Fields

| Field Name | Data type | Description |
|---|---|---|
| Common MAC layer fields | | See description herein. |
| | Unsigned 8 bits | See subfields below: |
| Service Type | Bits 6-4 | Set to 3. |
| DLL Security Header | Bool 1 | Set to 0. The DLL Security Header and DLL MIC32 is not present |
| Service Code | Unsigned 8 bits | Set to 7. |
| Server | Unsigned 8 bits | 0 = ANSI C12 Commissioning Host |
| Payload | Multi-octet | Up to the maximum frame length permitted by IEEE 802.15.4. |

Figure 81:
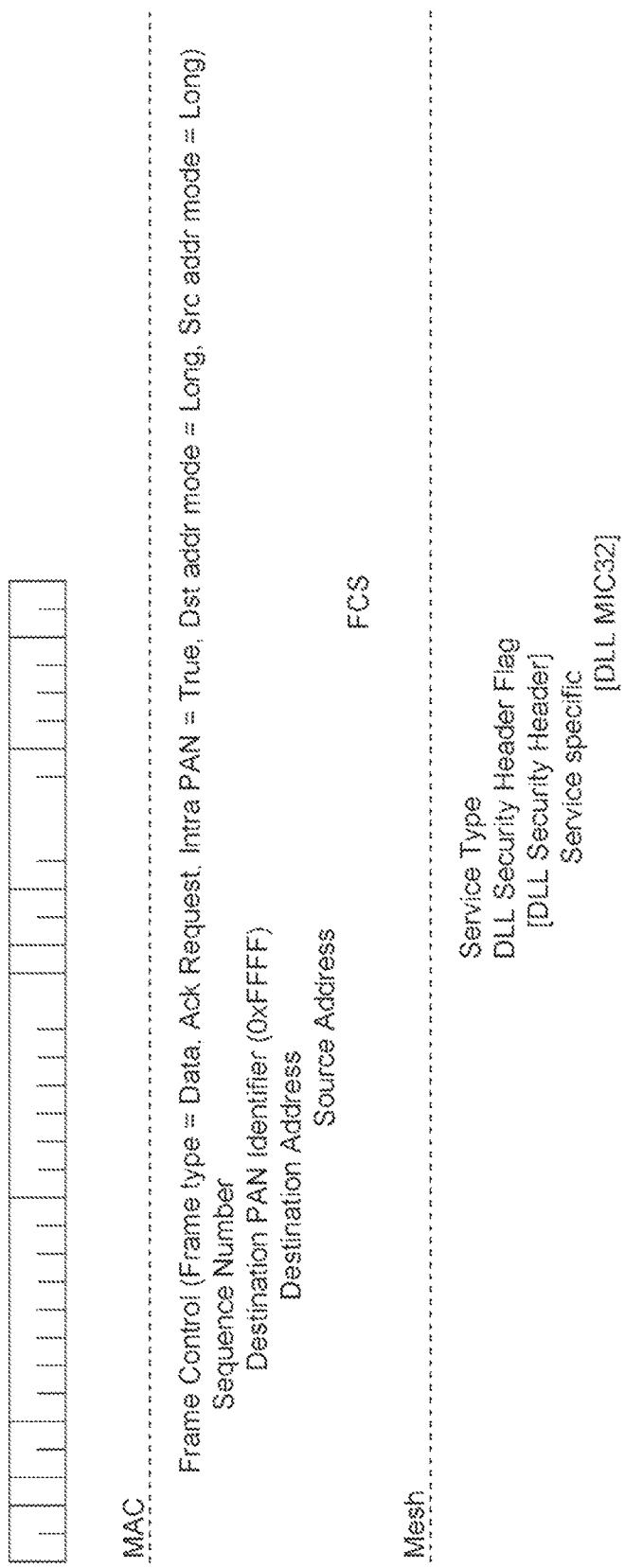
FIG. 81 shows a Frame format: Common point-to-point messaging in accordance with an embodiment of the present invention.

The common frame format for most point to point messages is shown in FIG. 81.

TABLE 43

Common point to point messaging Frame Fields

| Field Name | Data type | Description |
|---|---|---|
| Common MAC layer fields | | See description herein. |
| | Unsigned 8 bits | See subfields below: |
| Service Type | Bits 6-4 | Set to 5. |
| DLL Security Header Flag | Bool 1 | Set when the DLL Security Header and DLL MIC32 are present |
| [DLL Security Header] | Unsigned 16 bits | See description herein. |
| See the different message specific contents in the following. | | |
| [DLL MIC32] | Binary 4 octets | See description herein. |

Figure 82:
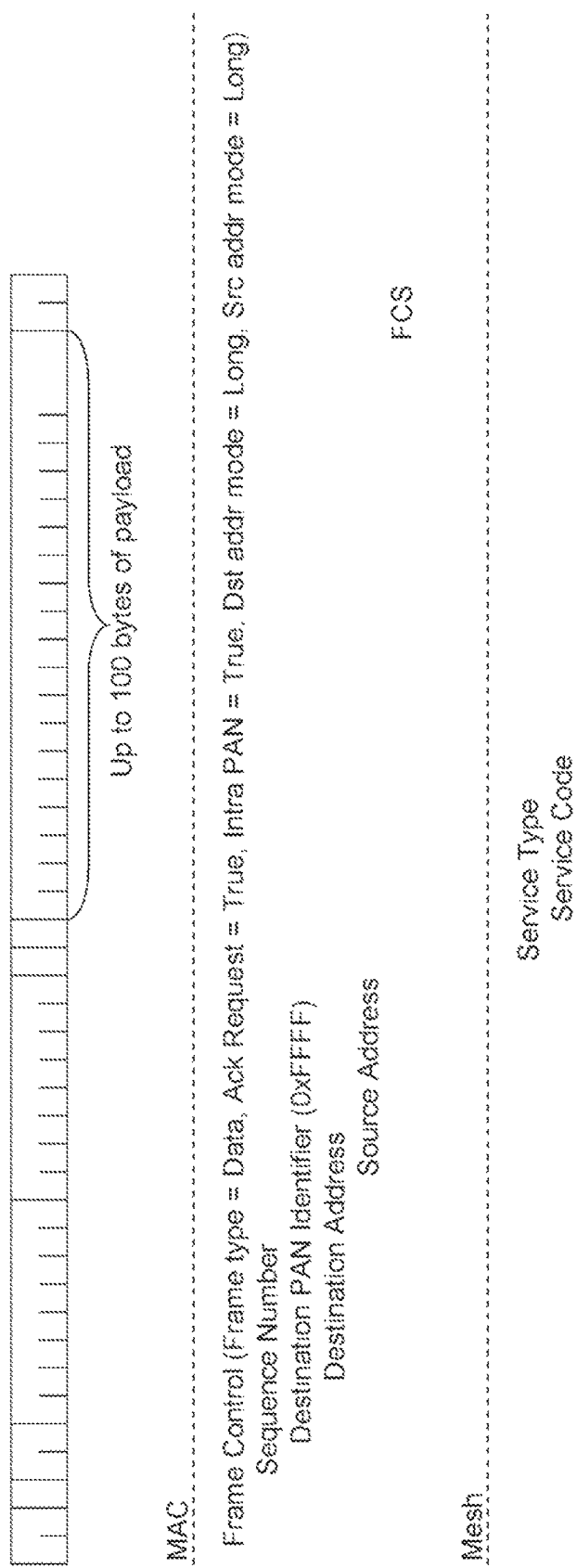
FIG. 82 shows a Frame format: Local Data Transfer in accordance with an embodiment of the present invention.

The Local Data Transfer message is used to transport upper layers information for a point to point communication. The Local Data Transfer message frame format is shown in FIG. 82.

TABLE 44

Local Data Transfer Frame Fields

| Field Name | Data type | Description |
|---|---|---|
| Common MAC layer fields | | See description herein. |
| | Unsigned 8 bits | See subfields below: |
| Service Type | Bits 6-4 | Set to 5. |
| Service Code | Unsigned 8 bits | Set to 0. |
| Payload | Multi-octet | Upper layer information. |

The Frame Reception Rate Test Init messages are used to compute the Frame Reception Rate. This function is provided mainly in support of radio manufacturing. A test is initiated by sending a Frame Reception Rate Test Init frames, follow by one or a multitude of Frame Reception Rate Test Data frames, followed by an optional Frame Reception Rate Test End frame. The target Node responds to the Frame Reception Rate Test End frame with a Frame Reception Rate Test Result frame. When a Frame Reception Rate Test Result is not received, the originator can retry by sending one or more Frame Reception Rate Test End frames. The Frame Reception Rate Test Init message frame format is shown in FIG. 83.

TABLE 45

Frame Reception Rate Test Init Frame Fields

| Field Name | Data type | Description |
|---|---|---|
| Common p2p message format | | See description herein. |
| Service Code | Unsigned 8 bits | Set to 1. |
| Sequence Number | Unsigned 8 bits | Set to 0. |
| Count | Unsigned 8 bits | Number of Frame Reception Rate Test Data frames to be transmitted. |
| Length | Unsigned 8 bits | Size of the Frame Reception Rate Test Data frame requested or sent. This size shall match the value of the Frame Length of that Frame Reception Rate Test Data frame as defined in the Physical layer of IEEE 802.15.4, which includes all MAC headers and the CRC (FCS0 trailer |
| Mode | Unsigned 8 bits | 0 = Acknowledgment and retries disabled 1 = Acknowledgment and retries enabled |

The frame format for the Frame Reception Rate Test Data is shown in FIG. 84.

TABLE 46

Frame Reception Rate Test Data Frame Fields

| Field Name | Data type | Description |
|---|---|---|
| Common p2p message format | | See description herein. |
| Service Code | Unsigned 8 bits | Set to 2. |
| Sequence Number | Unsigned 8 bits | Pre-incremented before each transmission. |
| Count | Unsigned 8 bits | Duplicate of the value sent in the Frame Reception Rate Test Init frame. |
| Length | Unsigned 8 bits | Duplicate of the value sent in the Frame Reception Rate Test Init frame. |
| Mode | Unsigned 8 bits | Duplicate of the value sent in the Frame Reception Rate Test Init frame. |
| Padding | Unsigned 8 bits | Octets added to the Frame Reception Rate Test Data frame to adjust its size to the dimension requested by the initiating Frame Reception Rate Test Init frame's Length field. |

The frame format for the Frame Reception Rate Test End is shown in FIG. 85.

TABLE 47

Frame Reception Rate Test End Frame Fields

| Field Name | Data type | Description |
|---|---|---|
| Common p2p message format | | See description herein. |
| Service Code | Unsigned 8 bits | Set to 3. |

The frame format for the Frame Reception Rate Test Result is shown in FIG. 86.

TABLE 48

Frame Reception Rate Test Result Frame Fields

| Field Name | Data type | Description |
|---|---|---|
| Common p2p message format | | See description herein. |
| Service Code | Unsigned 8 bits | Set to 4. |
| Number Of Frame Received | Unsigned 8 bits | Number of frames received since the last Frame Reception Rate Test Init frame. |
| Average RSS | Signed 8 bits | Average RSS of all the frames received since the last Frame Reception Rate Test Init frame. |

Figure 87:
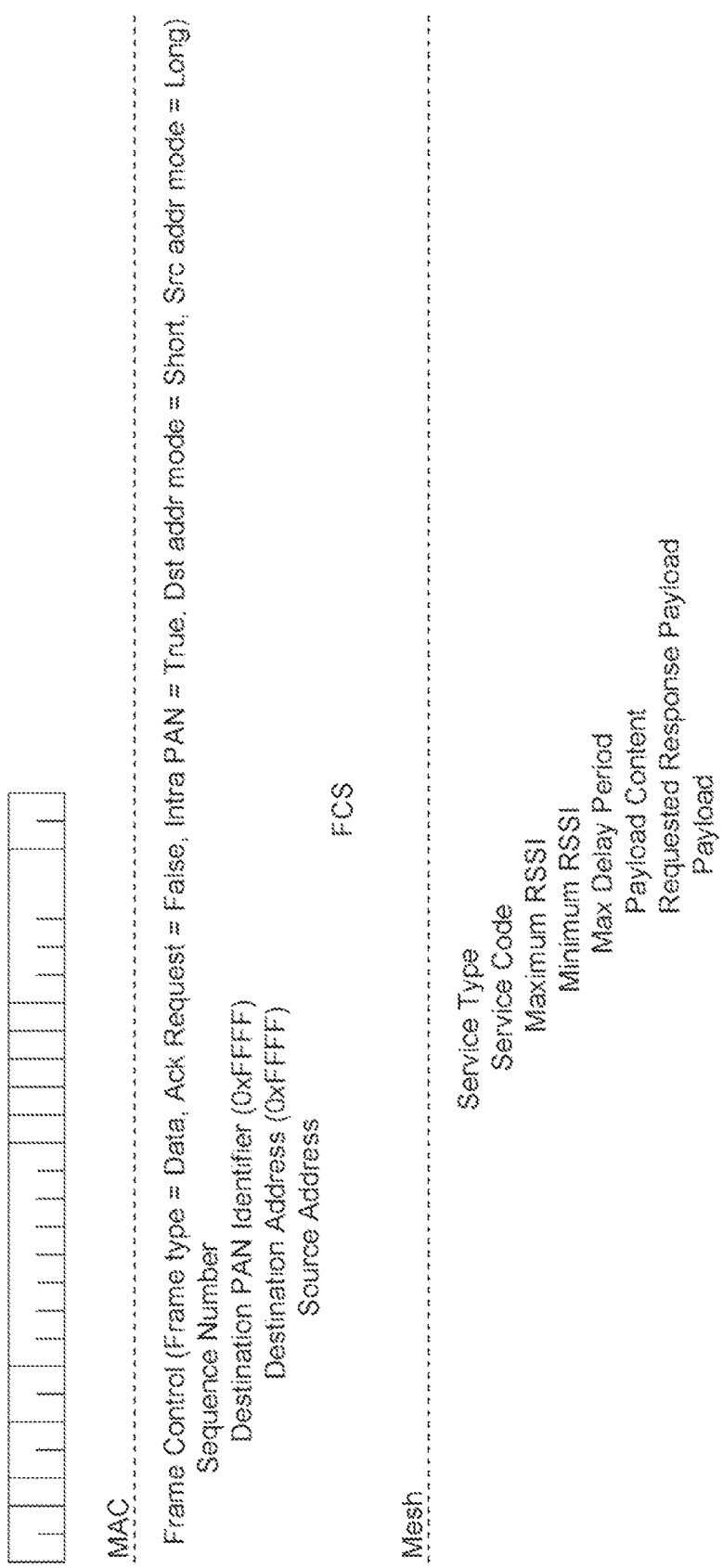
FIG. 87 shows a Frame format: Local Broadcast Request in accordance with an embodiment of the present invention.

The Local Broadcast Request message is used to retrieve a list of local devices. The Local Broadcast Request message frame format is shown in FIG. 87.

TABLE 50

Local Broadcast Request Frame Fields

| Field Name | Data type | Description |
|---|---|---|
| Common MAC layer fields | | See description herein. |
| | Unsigned 8 bits | See subfields below: |
| Service Type | Bits 6-4 | Set to 5. |
| Service Code | Unsigned 8 bits | Set to 20. |
| Maximum RSSI | Signed 8 bits | Used to exclude devices in close proximity. A response is sent only if the RSSI measured at the reception of this message by the target device is less than the value specified. |
| Minimum RSSI | Signed 8 bits | Used to exclude too distant devices. A response is sent only if the RSSI measured at the reception of this message by the target device is greater than the value specified. |
| Max Delay Period | Unsigned 8 | Maximum delay in units of 1/10 second before a response is returned. Each target Node computes a random response delay within this period. |
| | Unsigned 8 bits | See sub fields below: |
| Payload Content | Bits 2-0 | Specifies the information included in the frame's Payload field. 0 = None 1 = None. This is a walk-by request; Respond only if supported and not already processed 2 = Network name 3 = Network name prefix 4 = Bar code 5 = Communications module serial number |
| Requested Response Payload | Bits 5-3 | Specifies the information to be included in the Local Broadcast Response. 0 = None 1 = Network name 2 = Security enable flag, Owner, Bar code id |
| Payload | Multi-octet | When present a response is sent only if a match exists with the information provided. The length of this field is defined by the remaining capacity of this frame as defined by IEEE 802.15.4 |

Figure 88:
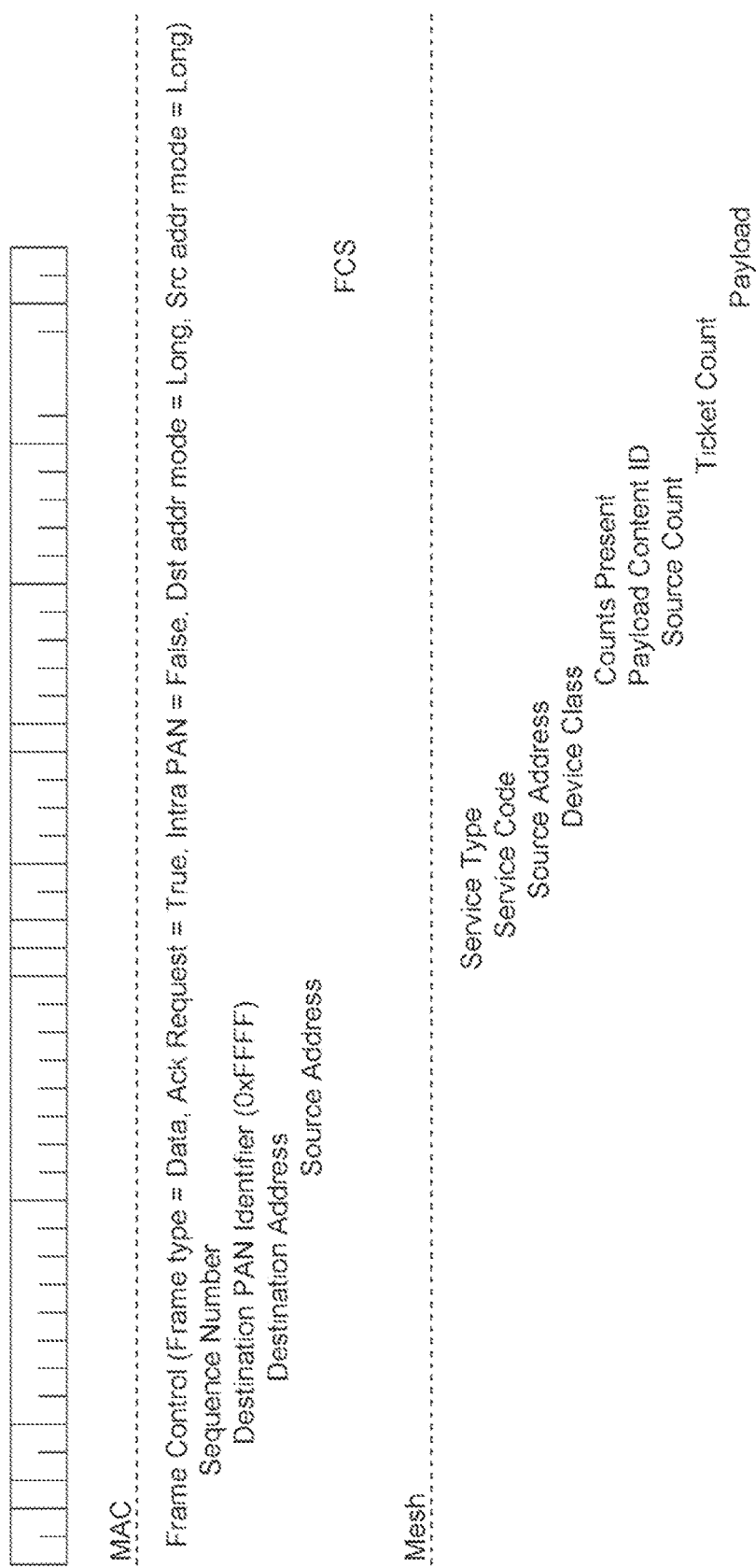
FIG. 88 shows a Frame format: Local Broadcast Response in accordance with an embodiment of the present invention.

The Local Broadcast Response message is sent by all Nodes which have received a Local Broadcast Request with matching criteria (RSSIs and Payload). The Local Broadcast Response message frame format is shown in FIG. 88.

TABLE 51

Local Broadcast Response Frame Fields

| Field Name | Data type | Description |
|---|---|---|
| Common MAC layer fields | | See description herein. |
| | Unsigned 8 bits | See subfields below: |
| Service Type | Bits 6-4 | Set to 5. |
| Service Code | Unsigned 8 bits | Set to 21. |
| Source Address | Binary 2 octets | Short address of the responding Node. |
| Device Class | Binary 4 octets | This identifier is used to load the appropriate context for this device, data model and business logic. For table driven devices, this field is equivalent to the DEVICE_CLASS field of the ANSI C12.19-2008, General Configuration Table (Table 0). |
| | Unsigned 8 bits | See sub fields below: |
| Counts Present | Bool 7 | Set when the Source Count and Ticket Count are present. These counters are required to authenticate subsequent communication. |
| Payload Content ID | Bits 3-0 | Specifies the information included at the end of this message in the Payload field: 0 = None 1 = Network name 2 = Security, Version, Owner and Bar code |
| Source Count | Binary 5 octets | DLL Security nonce count to be used to validate secured messages from this device. The value received from this source must be greater than the value received in this frame. This value is updated each time a valid frame is received. |
| Ticket Count | Binary 5 octets | DLL Security nonce count to be used to send secured messages to this device. This value is pre-incremented before each transmission. |
| Payload | Binary | The length of this field is defined by the remaining space for this frame as defined by the Physical layer. |

Within the Local Broadcast message is the Payload Content ID 1 which has the frame format shown in FIG. 89.

TABLE 52

Local Broadcast: Payload Content ID 1 Frame Fields

| Field Name | Data type | Description |
|---|---|---|
| Network name | String | Network Name assigned to this specific mesh network. |

Within the Local Broadcast message is the Payload Content ID 2 which has the frame format shown in FIG. 90.

TABLE 53

Local Broadcast: Payload Content ID 2 Frame Fields

| Field Name | Data type | Description |
|---|---|---|
| | Unsigned 8 bits | See subfields below: |
| Security Enable Flag | Bool 7 | Set if the responding device has been configured with its passwords or/and keys and subsequent communication needs to follow the security policies specified for this device. |
| | Bit 4 | Set to 1 for backward compatibility. |

TABLE 53-continued

Local Broadcast: Payload Content ID 2 Frame Fields

| Field Name | Data type | Description |
|---|---|---|
| Owner Field Length | Bits 3-0 | Number of octets of Owner field. |
| Firmware version | Unsigned 8 bits | Version of the host device. This information is used to configure the device context. |
| Firmware revision | Unsigned 8 bits | Revision of the host device. This information is used to configure the device context. |
| Owner | String | Identifier of the owner of this device - information which is used to select the proper password or keys when the Security Enable Flag is set. |
| Bar code id | String | Identifier available as a readable bar code on the device. |

Figure 91:
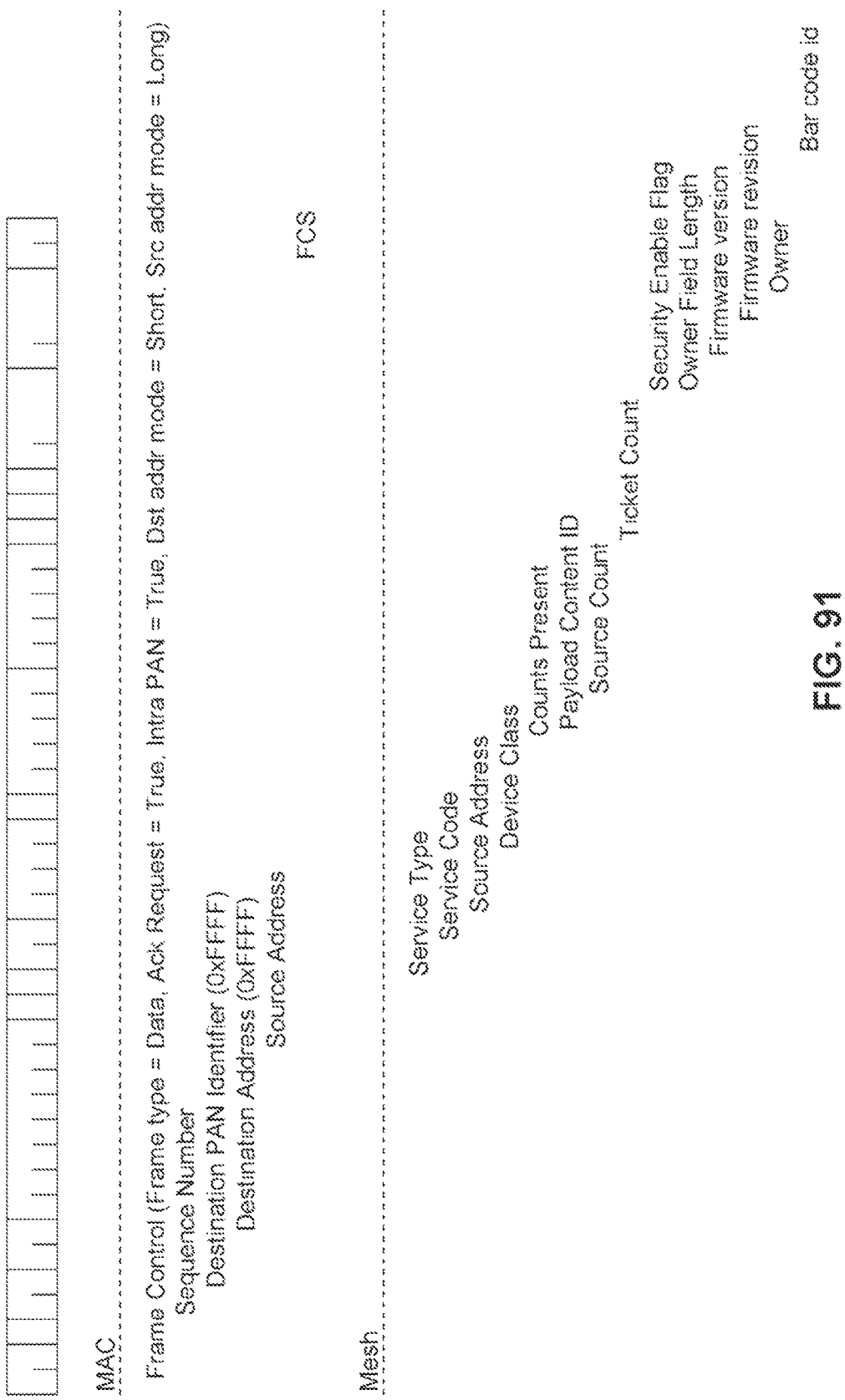
FIG. 91 shows a Frame format: End Device Node Present in accordance with an embodiment of the present invention.

The End Device Node Present message is sent by a battery operated device, e.g. a sleeping device to a wake-up device, following an impulse, such as a magnetic impulse, from a wake-up device, e.g., hand-held device. The End Device Node Present message frame format is shown in FIG. 91.

TABLE 54

End Device Node Present Frame Fields

| Field Name | Data type | Description |
|---|---|---|
| Common MAC layer fields | | See description herein. |
| | Unsigned 8 bits | See subfields below: |
| Service Type | Bits 6-4 | Set to 5. |
| Service Code | Unsigned 8 bits | Set to 22. |
| Source Address | Binary 2 octets | See description herein. |
| Device Class | Binary 4 octets | See description herein. |
| | Unsigned 8 bits | See sub fields below: |
| Counts Present | Bool 7 | See description herein. |
| Payload Content ID | Bits 3-0 | Set to 2. |
| Source Count | Binary 5 octets | See description herein. |
| Ticket Count | Binary 5 octets | See description herein. |
| | Unsigned 8 bits | See sub fields below: |
| Security Enable Flag | Bool 7 | See description herein. |
| Owner Field Length | Bits 3-0 | See description herein. |
| Firmware version | Unsigned 8 bits | See description herein. |
| Firmware revision | Unsigned 8 bits | See description herein. |
| Owner | String | See description herein. |
| Bar code id | String | See description herein. |

The Range Test Request message is used to record the signal strength (RSSI) in both directions between two Nodes. The Range Test Request message frame format is shown in FIG. 92.

TABLE 55

Range Test Request Frame Fields

| Field Name | Data type | Description |
|---|---|---|
| Common p2p message format | | See description herein. |
| Service Code | Unsigned 8 bits | Set to 30. |

The Range Test Response command is returned in response to the Range Test Request. The format is shown in FIG. 93.

TABLE 56

Range Test Response Frame Fields

| Field Name | Data type | Description |
|---|---|---|
| Common p2p message format | | See description herein. |

TABLE 56-continued

Range Test Response Frame Fields

| Field Name | Data type | Description |
| --- | --- | --- |
| Service Code | Unsigned 8 bits | Set to 31. |
| RSSI | Signed 8 bits | Received Signal Strength Indicator of the Range Test Request when received by the target Node. This field is encoded using a signed integer in dBm. |
| LQI | Unsigned 8 bits | Link Quality Indicator of the Range Test Request when received by the target Node. |

The Range Test Initiate command is used to request that a Node initiate a Range Test Request to a target Node. The Range Test Initiate command frame format is shown in FIG. 94.

TABLE 57

Range Test Initiate Frame Fields

| Field Name | Data type | Description |
| --- | --- | --- |
| Common p2p message format | | See description herein. |
| Service Code | Unsigned 8 bits | Set to 32. |
| Target Address | Binary 8 octets | Address of the target Node. |

The Range Test Result command is used in response to a request that a Node initiate the Range Test Request to a target Node. The Range Test Result command frame format is shown in FIG. 95.

TABLE 58

Range Test Result Frame Fields

| Field Name | Data type | Description |
| --- | --- | --- |
| Common p2p message format | | See description herein. |
| Service Code | Unsigned 8 bits | Set to 33. |
| Originator RSSI | Signed 8 bits | Received Signal Strength Indicator of the Range Test Request when received by the target Node. This field is encoded using a signed integer in dBm. |
| Originator LQI | Unsigned 8 bits | Link Quality Indicator of the Range Test Request when received by the target Node. |
| Target RSSI | Signed 8 bits | Received Signal Strength Indicator of the Range Test Response when received by the originator Node. This field is encoded using a signed integer in dBm. |
| Target LQI | Unsigned 8 bits | Link Quality Indicator of the Range Test Response when received by the originator Node. |

The 802.15.4 standard states the following about Link Quality Indicator ("LQI"). The LQI measurement is a characterization of the strength and/or quality of a received frame. The measurement may be implemented using receiver ED, a signal-to-noise ratio estimation, or a combination of these methods. In a preferred embodiment, transceivers, are used to measure signal strength. The LQI is calculated as follows:

$$lqi = \begin{cases} 10 + \frac{255}{77} * l & \text{for } -3 \le l \le 74 \\ 0 & \text{for } l < -3 \\ 255 & \text{for } l > 74 \end{cases} \quad \text{(Equation 1)}$$

where l is the received signal level in dB above the sensitivity level of the radio on the meter (node). The sensitivity is measured for each radio model used in the mesh network. It is defined as the signal level above ambient noise for which a frame reception rate of 99% is obtained. Measurement is done with a wired lab setup with frame lengths of 127 octets.

LQI classes group together links that have similar probability of successful transmission. Various studies on RF propagation, mostly targeting cellular market, suggest using a fade margin between 20 and 40 dB. Since the meters in the preferred embodiment are fixed and time dependent, attenuation is only caused by the movement of external obstacles (persons, vehicles).

Accordingly, a margin of 15 dB should be sufficient to have a reliable link. In other words we consider a link with a signal strength 50 dB above the sensitivity level has about the same chances of success as a link with a signal strength 15 dB above sensitivity. The limit for average links is set at 5 dB above sensitivity. Table 59 summarizes the significance of the LQI classes.

TABLE 59

LQI Class

| Class ID | LQI | Meaning |
| --- | --- | --- |
| 0 | 0 | No link |
| 1 | 1 to LQI_CLASS1_HIGH_THRESHOLD | Unreliable link |
| 2 | (LQI_CLASS1_HIGH_THRESHOLD + 1) to LQI_CLASS2_HIGH_THRESHOLD | Average link |
| 3 | (LQI_CLASS1_HIGH_THRESHOLD + 1) to 255 | Reliable link |

The Association Ratio is calculated by a Node to select which Coordinator to choose. It is a weighted sum of: the "Number of Hops" to the Coordinator (from Neighbor Info Response), the "Coordinator Load" (from Neighbor Info Response), the number of local neighbors (from the number of Neighbor Info Responses received for the selected network) and the "Min LQI Class" (maximum value from all Neighbor Info Response adjusted for last hop). Table 60 lists the weighting factors.

TABLE 60

Association Ratio Weighting Factors

| Weighting Factor Parameter | Default Weighting Factor in % | Weighted Formula Variable |
| --- | --- | --- |
| COORD_LOAD_WEIGHT | 40 | Coordinator Load |
| HOP_NUM_WEIGHT | 40 | Number of Hops |
| NUM_NEIGHBORS_WEIGHT | 10 | Number of Neighbors |
| LQI_CLASS_WEIGHT | 10 | Min LQI Class |

The Formula for the Association Ratio is:

```
IF Coordinator Load is 100%
    Ignore this network
IF Coordinator Load < 20%
    Association Ratio = COORD_LOAD_WEIGHT
```

-continued

```
ELSE
    Association Ratio = COORD_LOAD_WEIGHT *
      (1 −((Coordinator Load − 20) / 80))
IF the Dedicated Router Flag of the selected Association Router
is true
    Association Ratio += HOP_NUM_WEIGHT
ELSE
    Association Ratio += HOP_NUM_WEIGHT * (1−(Number
      of Hops)/(MAX_HOPS−1))
IF Number of Neighbors >= ASSOCIATION_NEIGHBORS
    Association Ratio += NUM_NEIGHBORS_WEIGHT
ELSE
    Association Ratio += NUM_NEIGHBORS_WEIGHT *
      (Number of Neighbors / ASSOCIATION_NEIGHBORS)
    Association Ratio += LQI_CLASS_WEIGHT * (Min LQI Class / 3)
where
    ASSOCIATION_NEIGHBORS = 5
```

The Preferred Route Ratio is computed by a Node to select within its Parents, the one that represents the optimized path to access the Coordinator. This ratio is calculated based on the neighborhood table information as received within a Neighbor Info Response or a Neighbors Exchange.

Preferred Route Ratio=Min LQI class<<12|(15−Number of Hops)<<8|Avg LQI

The preferred Router, based on this ratio, will correspond to:

For all the possible routes with the best min LQI class, select the routes with the least number of hops From this remaining list, select the one with the best Avg LQI (not used to change the preferred routers)

End Devices selects a neighboring Router based on the following criteria applied in the order indicated:

From the list of neighbors with the best LQI class (Class computed only on the link between the RFD and its neighbor) select the Routers with the lowest "Router load"

From the remaining list, select a Router with the least number of hops

From the remaining list, select the Routers with the best avg LQI

The pseudo-random delays required by Nodes for this layer are computed based on the following equation:

pseudoRandomNumber=((shortAddress&0x7F)<<6)
  XOR ((longAddress>>i)&0x7F) XOR
  ((pseudoRandomValue>>i)&0x7F)

pseudoRandomPeriod (sec)=
  pseudoRandomNumber*period/8191

Each time a pseudo-random number is generated, i=((i+1) % 8)

The pseudoRandomValue represents a value within the radio which changes over time, such as the Neighbor table checksum or the "Number of frames transmitted" statistic.

For example:
16 bitsAddress=35=0100011
longAddress=948347=11100111100001111011
pseudoRandom-
Value=3384854=1100111010011000010110
period=20 s
1th pseudoRandom period=(0100011<<6)
xor 1111011
xor 0010110
=0100010101101=2221*20/8191=5,423 s
2nd pseudoRandom period=(0100011<<6)
xor 0111101
xor 0001011
=0100011110110=2294*20/8191=5,601 s
3rd pseudoRandom period=(0100011<<6)
xor 0011110
xor 0000101
=0100011011011=2267*20/8191=5,535 s
4th pseudoRandom period=(0100011<<6)
xor 0001111
xor 1000010
=0100010001101=2189*20/8191=5,344 s The IEEE 802.15.4 short addresses are assigned sequentially by the coordinator. Six bits of this address are used to partition Nodes into 64 different groups. This number represents bits 8 to 13 of the final pseudo-random number. For example, if a network has 432 Nodes, between 6 and 7 End points will share the same 6 bits. Bit 0 to 7 of the pseudo-random number is computed based on the IEEE 802.15.4 long address and a pseudo-random value that changes over time.

The pseudo-random number generated is a number between 0 and 8191, which needs to be scaled for the appropriate range.

The following tables propose data structure definitions in support of the implementation of the SM layer discussed herein and may be adapted for each specific implementation.

TABLE 61

Global Variables

| Field Name | Data type | Description |
| --- | --- | --- |
| PAN Coordinator Load | Unsigned 8 bits | Indication of the number of Nodes actually associated to the Coordinator as reported by the last Neighbors Exchange message received from a Parent. |
| End Device Load | Unsigned 8 bits | Value maintained by each Router which represents a percentage of its maximum capacity to accept and manage End Devices. |
| Counter | Unsigned 5 octets | The DLL and Network Security nonce count used for all transmissions after the device has associated with the network. This count is stored in non-volatile memory and never reset. The value stored in this table corresponds to the next value to be used. |
| Ticket | Unsigned 5 octets | Nonce count provided to Nodes not associated to the network. This count is stored in non-volatile memory and never reset. The value stored in this table corresponds to the next ticket to be sent. |

The Mesh Key Tables stores the Mesh Key(s) used by the device. Each Mesh Key is associated with the PAN ID of the Coordinator it is used with. Mesh Keys are administered by the associated Coordinator.

TABLE 62a

Mesh Key Table

| Field Name | Data type | Description |
| --- | --- | --- |
| Mesh Key Table | Array(MAX_ASSOCIATIONS) of Mesh Key Entries | The Mesh Key Table stores the Mesh Key information associated with each Coordinator the device associates with. |
| Associated Coordinators | Unsigned 1 octet | The number of Coordinators the device has associated with. |

TABLE 62b

Mesh Key Table: Mesh Key Entry

| Field Name | Data type | Description |
|---|---|---|
| Coordinator PAN ID | Unsigned 2 octets | The PAN ID of the Coordinator associated with the Mesh Key Entry The entire Mesh Key Entry is disabled when the Transmit Mesh Key ID is disabled. |
| Mesh Key-0 | Unsigned 16 octets | In the context of the SM DLL Security, Mesh key used when the DLL Key ID is set to 0. In the context of the SM End-To-End Network Security, Mesh key used when the Network Key ID is set to 0. |
| Mesh Key-1 | Unsigned 16 octets | In the context of the SM DLL Security, Mesh key used when the DLL Key ID is set to 1. In the context of the SM End-To-End Network Security, Mesh key used when the Network Key ID is set to 1. |
| | Unsigned 8 bits | See fields below: |
| | Bits 7-5 | Reserved, set to 0 |
| Mesh Key Entry Active | Bool 4 | Set when Mesh Key Table Entry active |
| Secondary Mesh Key Allowed | Bool 3 | Set when it is allowed to accept frames authenticated using either Mesh Key. Reset when only frames authenticated using the Mesh key specified by the Transmit Mesh Key ID are accepted |
| Transmit Mesh Key ID | Bit 2 | 0 = Mesh Key-0 used for transmissions 1 = Mesh Key-1 used for transmissions |
| Mesh Key-1 Write Toggle | Bit 1 | Every update operation on a Mesh Key-1 toggles the write bit. Initialized to 0. |
| Mesh Key-0 Write Toggle | Bit 0 | Every update operation on a Mesh Key-0 toggles the write bit. Initialized to 0. |

The Node Key table stores the Node Key(s) used by the device. The SM network security process uses the Node Key Table to look up the information needed for the Network Security MIC calculation for messages between the Coordinator and devices. The information in the Node Key Table is retained during a power outage and a device reset.

TABLE 63

Node Key Table

| Field Name | Data type | Description |
|---|---|---|
| Node Key-0 | Binary, 16 octets | Node Key used when the Network Security header is present and the Network Key ID is set to 0. |
| Node Key-1 | Binary, 16 octets | Node Key used when the Network Security header is present and the Network Key ID is set to 1. |
| | Unsigned 8 bits | See fields below: |
| | Bits 7-4 | Reserved, set to 0 |
| Secondary Node Key Allowed | Bool 3 | Set when it is allowed to accept frames authenticated using either Node key. Reset when only frames authenticated using the Node key specified by the Transmit Node Key ID are accepted |
| Transmit Node Key ID | Bit 2 | 0 = Node Key-0 used for transmissions 1 = Node Key-1 used for transmissions |
| Node Key-1 Write Toggle | Bit 1 | Every update operation on a Node Key-1 toggles the write bit. Initialized to 0. |
| Node Key-0 Write Toggle | Bit 0 | Every update operation on a Node Key-0 toggles the write bit. Initialized to 0. |

The Maintenance Table stores the information used for Nodes associating with the network and for maintenance devices that access the Nodes using point-to-point messages. The information in the Maintenance Table is retained during a power outage and a device reset.

TABLE 64

Maintenance Key Table

| Field Name | Data type | Description |
|---|---|---|
| RX Source DLL Nonce Count | Binary, 5 octet | The last valid Source count valued received for the routing device and used during association or the point-to-point communication device for playback protection. This value is initiated by the Neighbor Information Response or the Local Broadcast Response |
| Ticket Count | Binary, 5 octet | Use instead of the Counter defined in the Global variables when a Node is not wet associated. This value is initiated by the Neighbor Info Response message, End Device Node Present message or the Local Broadcast Response message |
| Maintenance Key-0 | Binary, 16 octets | Maintenance Mesh key used when the DLL Key ID is set to 0. |
| Maintenance Key-1 | Binary, 16 octets | Maintenance Mesh key used when the DLL Key ID is set to 1. |
| | Unsigned 8 bits | See fields below: |
| | Bits 7-5 | Reserved, set to 0 |
| Maintenance Key-1 Receive Enabled | Bool 4 | Set when reception using Maintenance Key-1 is enabled |
| Secondary Maintenance Key Allowed | Bool 3 | Set when it is allowed to accept frames authenticated using either Maintenance key. Reset when only frames authenticated using the Maintenance key specified by the Transmit Maintenance Key ID are accepted |
| Transmit Maintenance Key ID | Bit 2 | 0 = Maintenance Key-0 used for transmissions 1 = Maintenance Key-1 used for transmissions |
| Maintenance Key-1 Write Toggle | Bit 1 | Every update operation on a Maintenance Key-1 toggles the write bit. Initialized to 0. |
| Maintenance Key-0 Write Toggle | Bit 0 | Every update operation on a Maintenance Key-0 toggles the write bit. Initialized to 0. |
| Last Maintenance Address | Binary, 8 octets | The address of the last device address to use the key. Set to zero if no access has been made. |
| Previous Maintenance Address | Binary, 8 octets | The address of the previous device to use the key. The address is always different from the Last Maintenance Address. It is set to zero if there is no previous Maintenance device. |

The Neighborhood Table data structure is maintained in each radio to keep the information about neighbor Nodes. This data structure is required to implement at least the following processes: Association. Tree Routing, Route Discovery, Neighbors Exchange. Tree Optimization, Checkpoint.

TABLE 65a

Neighborhood Table

| Field Name | Data type | Description |
|---|---|---|
| Neighborhood Table | array[MAX_NUM_NEIGHBORS] of Neighborhood Table Entry | List of neighbors |

TABLE 65b

Neighborhood Table Entries

| Field Name | Data type | Description |
|---|---|---|
| Tree PAN Identifier | Binary 2 octets | Identify the network tree for this entry. This network identifier can correspond to foreign network when the concept of overlapping network is implemented. In this context, the same neighbor can be reported multiple times within this list if associated to multiple network trees. |
| Neighbor Address | Binary 2 octets | Address of this neighbor. |
| Neighbor PAN Identifier | Binary 2 octets | Membership of this neighbor. |
| Avg LQI | Unsigned 8 bits | Average of the LQI value of each hop between this neighbor and the Coordinator using the preferred parent within the specified network tree. The LQI for each hop corresponds to the worst LQI recorded (LQI rx and LQI tx) for this hop. |
| | Unsigned 8 bits | See sub fields below: |
| Number of Hops | Bits 7-4 | Number of hops between this neighbor and the Coordinator using the preferred parent within the specified network tree. |
| LQI Class | Bool 3-2 | LQI class for the hop between the current node and this neighbor. |
| Min LQI Class | Bit 1-0 | Minimum of all LQI rx and LQI tx for each hop between this neighbor and the Coordinator using the preferred parent within the specified network tree. |
| LQI rx | Unsigned 8 bits | Average link quality measured for frames received from this neighbor. |
| LQI tx | Unsigned 8 bits | Average link quality measured for frames transmitted to this neighbor. |
| RSSI rx | Signed 8 bits | Average signal strength in dBm measured for frames received from this neighbor. |
| RSSI tx | Signed 8 bits | Average signal strength in dBm measured for frames transmitted to this neighbor. |
| | Unsigned 8 bits | See sub fields below: |
| New Entry Flag | Bool 7 | Set to true if this entry has not been sent at least once in a Neighbor Exchange message. It is not allowed to reuse an entry when this flag set to true. The intent of this flag is to give enough time to child candidates to choose the current node as preferred parent. |
| Power Outage Routing | Bool 6 | Set if this neighbor supports routing for some period of time after a power outage. |
| Remote Preferred Parent Flag | Bool 5 | Set when this neighbor reports that the current Node is its parent. |
| Preferred Parent Flag | Bool 4 | Set when this neighbor is the parent of the current Node within the specified network tree. When set to false, this Neighbor can still be used for tree routing if its Number of Hops is less or equal to the current Node. |
| Freshness | Bits 3-0 | Countdown reset at each Neighbors Exchange received from this neighbor and decremented at each Neighbors Exchange period (each time a Neighbors Exchange transmitted by the radio). When this field reach zero, the entry is considered deleted and can be reused for a different Node. |
| Preferred Route Ratio | Unsigned 16 bits | Preferred Route Ratio as defined herein. This value is adjusted up to the current Node. |
| RX Source DLL Nonce Count | Unsigned 5 octets | The last authenticated DLL full nonce count received from this neighbor. |
| Transmission success rate | Unsigned 8 bits | Success rate in percentage of the last n transmission with this neighbor The value255 means no data available for that neighbor. This value is initialized to 100 prior to the first transmission and is updated as follows: When the transmission is successful: $S = MIN(s + (s/n) + (1/n), 100)$ When the transmission fails: $S = s - (s/n)$ For either case the Neighbor Table entry is: "Transmission success rate" = ROUND(S, 0) Where S: Estimated success rate s: Last estimated success rate n: Factor to adjust the adjustment speed of the estimated average (set by default to 30) Note that the ROUND(S, 0) function rounds the S to the nearest integer and the MIN(x, y) function selects the smaller of x and y. |

When the number of Neighbors exceeds the capacity of the Neighborhood table, the goal is to keep in the table 5 best Parents/Siblings (best routes) and all nodes that set the current node as preferred Parent (avoid tree instability). We also want to give a chance to new candidates to flag the current Node as preferred Parent. This is done by including them in a round robin fashion among others entry. The radio applies the following logic when it receives a new candidate.

If the new candidate is a not a parent, replace the next entry that:
is not one of the 5 best Parents/Siblings
has not select the current Node as preferred parent
was sent at least once in a Neighbor Exchange message.

This last clause (3) allows candidates to receive the information needed to choose this node as preferred Parent. If the new candidate has flagged the current node as preferred Parent, this last condition is ignored.

If the new candidate is a Parent/Sibling:
If we have less than 5 best Parents/Sibling, use the same scheme as if it was not a parent. In last resort, replace a node that set the current Node as preferred parent using the same round robin scheme.
If we have already 5 best Parents/Sibling, replace the worst Parent/Sibling if the candidate's preferred route ratio is greater than its preferred route ratio.

The Routing table is used to maintain routes established using the Route Discovery process.

TABLE 66a

Routing Table

| Field Name | Data type | Description |
|---|---|---|
| Route Table | array[MAX_NUM_STATIC_ROUTES] of Route Table Entry | List if mesh routes |

TABLE 66b

Route Table Entry

| Field Name | Data type | Description |
|---|---|---|
| Target Address | Binary 2 octets | MAC address of target Node |
| Next Hop Address | Binary 2 octets | MAC address of the Node used to route the frame to the target Node |
| Freshness | Unsigned 8 bits | Decremented each time the table is used for another entry. Reset to 0xFF each time the entry is used. |

Freshness rules for each time the table is accessed:

```
If entry = new
    new entry Freshness = 0xFF
    For each other entry
        If entry Freshness = 0,
            entry Freshness = 0
        Else
            entry Freshness = Freshness -1
Else
    Temp_Freshness = access entry Freshness
    accessed entry Freshness = 0xFF
    For each other entry
        If entry Freshness = 0
            entry Freshness = 0
        Else
            If entry Freshness >Temp_Freshness
                entry Freshness = Freshness -1
            Else
                entry Freshness = Freshness
```

Freshness Use: The Freshness value is used when the table is full and a new entry is added. The entry with the smallest Freshness value is replaced with the new entry. If more than one entry has a value of zero, anyone can be replaced. This case only occurs if the table size is greater than 255 entries.

Every time a mesh frame is forwarded, no matter the routing method used, at the exception of the Keep Alive Initiate, the forwarding Node creates a temporary route entry to the originator in Temporary Route Take. This allows the destination Node to quickly send a reply, even if it didn't previously know the route to the originator Node. This route expires after TEMP_ROUTE_TO.

TABLE 67a

| Temporary Route Table | | |
|---|---|---|
| Field Name | Data type | Description |
| Temporary Route Table | array[MAX_NUM_TEMP_ROUTES] of Temp Route Entry | Table of temporary routes record from frames received. |

TABLE 67b

| Temporary Route Entry | | |
|---|---|---|
| Field Name | Data type | Description |
| Target Address | Binary, 2 octets | MAC address of target Node |
| Next Hop Address | Binary, 2 octets | MAC address of the Node used to route the frame to the target Node |
| Lifetime | Binary, 1 octet | Countdown in second initialized to TEMP_ROUTE_TO when the entry is created. Set to zero when the entry does not contain valid information. |

The End Device Table is used to maintain information about each End Device Child.

TABLE 68a

| End Device Table | | |
|---|---|---|
| Field Name | Data type | Description |
| End Device Table | array[MAX_NUM_END_DEVICES] of End Device Entry | Table of End Devices associated with a Router |

TABLE 68b

| End Device Entry | | |
|---|---|---|
| Field Name | Data type | Description |
| Long Address | Binary, 8 octets | EUI address of the End Device |
| Short Address | Binary, 2 octets | Assigned address of End Device (unassigned = 0x0000) |
| Communication Age | Binary, 1 octet | The UTC time at which the End Device was last communicated with. The units are in 16 minutes increments of time. |
| RX Source DLL Nonce Count | Unsigned, 5 octets | The last authenticated DLL full nonce count received from this End Device. |

Security events are provided to the upper layers for diagnostic and auditing purposes. The content of each event is described bellow.

TABLE 69

| Security Events | | |
|---|---|---|
| Field Name | Data type | Description |
| Security Event Log Control | Unsigned Integer, 1 octet | Control flags for fields present in the log Bit 7 = 1: UTC time present Bit 6 = 1: MAC source long otherwise the source PAN and short address is present Bit 5 = 1: Short address of Network originator present Bit 4 = 1: Service Code present Bits 3-1 = 1: key type: 11x = Reserved 101 = Node Key-1 100 = Node Key-0 011 = Mesh Key-1 010 = Mesh Key-0 001 = Maintenance Key-1 000 = Maintenance Key-0 Bit 0 Reserved (=0) |
| UTC Time Of Event | Unsigned Integer, 4 octets, 1 minute units | The UTC time is recorded for events by those devices supporting a UTC clock. |
| MAC Source Address | Binary, 8 octets | Records the MAC source address of the logged event message. This address is either the long address or the MAC source PAN and short address padded with 0"s in the MSB. |
| Network Originator Address | Binary, 4 octets | The Network Originator PAN and Address (optional - used only for messages with network addresses. |
| Service Type | Binary, 1 octet | Full Service Type octet from the event message. |
| Service Code | Binary, 1 octet | Service Code octet from the event message if present. |

The Source Route table is used to maintain source routes established by the Route Discovery process with the Trace Route flag bit set and through the Route Establishment process.

TABLE 70a

| Source Route Table | | |
|---|---|---|
| Field Name | Data type | Description |
| Source Route Table | array[MAX_NUM_SOURCE_ROUTES] of Source Route Table Entry | List if source routes |

TABLE 70b

Source Route Table Entry

| Field Name | Data type | Description |
|---|---|---|
| Target Address | Binary 2 octets | MAC address of target Node |
| Number of PAN identifiers | Bits 7-6 | Defines the number of entries in the PAN identifiers field. |
| Number of Hops Addresses | Bits 3-0 | Number of Addresses in Hop Addresses list. Source routing is used when the Target device is more than one hop away. Therefore the Number of hops is at least one. |
| PAN Identifiers | Array of Binary 2 octets | List of Network identifiers. Bits 15-14 of the different short addresses specified within this frame reference this list. Each short address is explicitly associated with one of the three specified PAN Identifiers, or none of them. |
| Hop Addresses | Array of Binary 2 octets | Short address of each Node responsible for routing this message. Bits 15-14 define network membership of the Node as described by the PAN identifiers field. |
| Entry Valid | Bit 0 | Set if the entry contain valid information |
| Freshness | Bits 3 to 7 | Decremented each time the table is parsed for another entry. Reset to 0x1F (31) each time the entry is used. |

Finally, the SMIB table of parameters is set forth below.

TABLE 71

SM Information Base (SMIB) Table

| ID | Parameter name | Type/units | Range | Description |
|---|---|---|---|---|
| 1 | ADDRESS_TX_ORDER | 0 or 1 | | Order of transmission of the MAC and Mesh level addresses. The standard transmission order specified by IEEE 802.15.4 is Least Significant Octet First. 0 = Least Significant Octet First 1 = Most Significant Octet First |
| 2 | ASSOCIATION_EVAL_MIN_IMPROVEMENT | unsigned integer % | 1-255 | To avoid nodes bouncing back and forth between gates at each re-evaluation, a "hysteresis" factor shall be implemented; association to a new gate (if already associated) shall only occur if the new network offers an association ratio that is equal or greater than [current association ratio × (1 + ASSOCIATION_EVAL_MIN_IMPROVEMENT)] |
| 3 | ASSOCIATION_NEIGHBORS | Unsigned Integer | 1-255 | Maximum number of neighbors used in Association Ratio algorithm |
| 4 | ASSOCIATION_EVAL_PERIOD | Unsigned integer (8 bits) 1 day | 1-255 | The spec says that the node shall periodically evaluate if "better" networks are visible. A parameter shall dictate how frequent this evaluation shall take place. |
| 5 | ASSOCIATION_RESP_TIMEOUT | Integer 100 ms | 100-25500 ms | Response timeout for the Association Request message |
| 6 | CHECKPOINT_MAX_ATTEMPTS | Unsigned Integer | 1-255 | Maximum number of Checkpoint process initiated without receiving a valid Keep Alive Response is allowed before initiating the Association process. |
| 7 | CHECKPOINT_PERIOD | Unsigned Integer 1 min | 1-255 min | Period at which a Node initiate a mandatory communication with the Coordinator. This communication always starts by the transmission of a Keep Alive Request and reception of a Keep Alive Response and is optionally follows by exchanges of application level messages. |
| 8 | COORD_LOAD_WEIGHT | Unsigned Integer 0.01 | 0-1 | Weight for Coordinator load used in Association Ratio algorithm |
| 9 | COORD_RESPONSE_TIMEOUT | Unsigned Integer 0.1 sec | 100 to 25500 ms | Timeout when waiting for a response from the Coordinator |
| 10 | DATA_REQUEST_TIMEOUT | Integer 10 ms | 10-2500 ms | Timeout used by End Devices when waiting for a response to the End Device Data Request |
| 11 | END_DEVICE_INACTIVE_TO | Integer 1 sec | 1-255 sec | Inactivity timeout used by Sleeping End Devices waiting for the initiation of a local communication |
| 12 | END_DEVICE_PERIOD | Integer 1 sec | 1-255 sec | Notification period used by Sleeping End Devices when it is in local communication mode |
| 13 | END_DEVICE_WAIT | Integer 10 ms | 10-2550 ms | Timeout used by Sleeping End Devices when waiting for an incoming frame after an End Device Node Present frame |
| 14 | HOP_NUM_WEIGHT | Unsigned Integer 0.01 | 0-1 | Weight for Number of hops to the Coordinator used in Association Ratio algorithm |

TABLE 71-continued

SM Information Base (SMIB) Table

| ID | Parameter name | Type/units | Range | Description |
|---|---|---|---|---|
| 15 | LOCAL_COM_TO | Integer 100 ms | 100-25500 ms | Inactivity timeout used by Sleeping End Devices in local communications mode |
| 16 | LQI_CLASS_WEIGHT | Unsigned Integer 0.01 | 0-1 | Weight for minimum LQI class used in Association Ratio algorithm |
| 17 | MAX_HOPS | Unsigned Integer | 15 | Maximum number of hops allowed on the mesh network |
| 18 | MAX_NUM_END_DEVICES | Unsigned Integer | 1-255 | Maximum number of entries in the End Device Table |
| 19 | MAX_NUM_END_NODES | Unsigned Integer | 1-255 | Max number of entries in the End Device Table |
| 21 | MAX_NUM_NEIGHBORS | Unsigned Integer | 1-255 | Maximum number of neighbors recorded in the Neighborhood Table |
| 22 | MAX_NUM_STATIC_ROUTES | Unsigned Integer | 1-255 | Maximum number of entries in the Route Table |
| 23 | MAX_NUM_TEMP_ROUTES | Unsigned Integer | 1-255 | Maximum number of entries in the Temporary Route Table |
| 24 | MAX_TREE_REPAIR | Unsigned Integer | 0-5 | Maximum number of time a Router using tree routing retry to transmit a frame to a different Parent Node or Sibling Node. |
| 25 | MESSAGE_RESPONSE_TO | Unsigned Integer 1 sec | 1-255 sec | Timeout for a request message to receive a response. Used to release the Network Security Header count stored until the response is received. |
| 26 | NEIGHBOR_EX_RND_PERIOD | Integer | 1-255 sec | A random delay is required before responding to a Neighbors Exchange message with the Immediate Broadcast Requested parameter set. This period represent the maximum value allowed for this random delay. |
| 27 | NEIGHBOR_EXCHANGE_PERIOD | Integer min | 1-255 min | Delay between each Neighbors Exchange |
| 28 | NEIGHBOR_INFO_RESP_TIME | Integer 10 ms | 10-2550 ms | Period used to spray Neighbor Info Response messages |
| 29 | NUM_NEIGHBORS_WEIGHT | Unsigned Integer 0.01 | 0-1 | Weight for the number of neighbors used in Association Ratio algorithm |
| 30 | OVERLAPPING_DEPTH | 0 or 1 | 0-1 | Penetration of network trees within neighbor networks. 0 = Single hop 1 = Up to MAX_HOPS |
| 31 | PO_AGGREGATION_PERIOD | Integer 1 sec | 1-255 sec | Initial period used just after a power outage or power restoration to allows aggregation of leaf Nodes event by their Parents and the reporting of the first hop Nodes. |
| 32 | PO_RECOGNITION_PERIOD | Integer 0.1 sec | 1-25.5 sec | Minimum of a power outage before sending a reel time power outage event report |
| 33 | PO_RETRY_RND_PERIOD | Integer 1 sec | 1-255 sec | Period used stray communication of Nodes reporting a power outage during retries |
| 34 | PO_RND_PERIOD | Integer 10 sec | 10-2550 sec | Period used stray communication of Nodes reporting a power outage during their first attempt |
| 35 | POWER_REPORT_WAIT | Integer 1 sec | 1-255 sec | Time allows for a Node to send is power event using tree routing. After this period, the Node try to use mesh routing to send its event |
| 36 | POWER_RESTORATION_ASSOC | Integer min | 1 to 255 min | Maximum time allows after a power restoration to successfully send a power restoration event to the Coordinator. Nodes unable to send it event within this timeout initiating an Association process. |
| 37 | PR_RETRY_RND_PERIOD | Integer 1 sec | 1-255 sec | Period used stray communication of Nodes reporting a power restoration event during retries |
| 38 | PR_RND_PERIOD | Integer 10 sec | 10-2550 sec | Period used stray communication of Nodes reporting a power restoration event during their first attempt |
| 39 | FRR_TEST_RETRY | Integer | 1 to 12 | Number of time a Frame Reception Rate Test Init, Frame Reception Rate Test End and Frame Reception Rate Test Result are retransmitted in the case of a MAC layer transmission failure. |
| 40 | RESP_SLEEP_PERIOD | Integer 1 sec | 1-255 sec | End device sleep period when it is expecting a response. |
| 41 | RESTORATION_TIMEOUT | Integer min | 1-255 min | Maximum time allowed for reporting a power restoration notification event and receives an acknowledgment. |
| 42 | ROUTE_LOST_ATTEMPTS | Integer | 1-255 | The number of consecutive times an End Device tries to send a frame through its Parent before changing Parent. |
| 43 | RREQ_RX_TIME | Integer 1 ms | 1-255 ms | The time the target of a Route Request waits to collect route data from other paths before responding. |
| 44 | RREQ_TO | Integer 10 ms | 10-2550 ms | Timeout when waiting for a Route Request after broadcasting a Route Request |

TABLE 71-continued

SM Information Base (SMIB) Table

| ID | Parameter name | Type/units | Range | Description |
|---|---|---|---|---|
| 45 | SERVICE_PERIOD | Unsigned Integer 1 sec | 0-255 sec | Period used to limits the rate at which frames can be sent using the Forwarding Service Messages process. |
| 46 | SERVICE_TO | Unsigned Integer 1 sec | 0-255 sec | Timeout that determines how long the Router and the Coordinator keep an inactive forwarding processes open |
| 47 | SLEEP_CHECK_PERIOD | Unsigned Integer 1 sec | 1-255 sec | Period at which Sleeping End Devices wakeup to check if there is a frame buffered in its Parent |
| 48 | TEMP_ROUTE_TO | Integer 10 sec | 10-2550 sec | The time a temporary route is retained |
| 49 | MAX_ASSOCIATIONS | Unsigned Integer | 1-15 Default 3 | The number of Coordinators a device can associate with. Among other things this set the number of Mesh Key entries needed for storage. |
| 50 | MAX_MF_WAIT_PERIOD | Integer 1 ms | 1-255 ms default 20 ms | Timeout receiving a buffered message following an End Device Data Request ACK with the Frame Pending bit set. |
| 51 | PING_TO | Integer 1 s | 1-255 s | Ping time out from Ping request to Ping response. |
| 52 | LQI_HIGH_FACTOR | Float | 0.00-1.00 | The factor used to update the "LQI rx" number when LQI > LQI rx in Table 2 |
| 53 | LQI_LOW_FACTOR | Float | 0.00-1.00 | The factor used to update the "LQI rx" number when LQI rx > LQI in Table 2 |
| 54 | LQI_MISSED_EX_FACTOR | Float | 0.00-1.00 | The factor used to update the "LQI rx" number in Table 2 when the Neighbor Exchange message is missed twice. |
| 55 | MAX_NUM_SOURCE_ROUTES | Unsigned Integer | 1-255 | Maximum number of entries in the Source Route Table |
| 56 | LQI_CLASS1_HIGH_THRESHOLD | Unsigned Integer | 0-255 | LQI threshold for class 1. Node with LQI between 0 and LQI_CLASS1_HIGH_THRESHOLD are categorized in class 1. |
| 57 | LQI_CLASS2_HIGH_THRESHOLD | Unsigned Integer | 0-255 | LQI threshold for class 2. Node with LQI between LQI_CLASS1_HIGH_THRESHOLD + 1 and LQI_CLASS1_HIGH_THRESHOLD] are categorized in class 2. |

The invention claimed is:

1. A process for discovering a route from a first node to a second node in a mesh network comprising:
broadcasting by the first node a route request message that is propagated across multiple nodes within the mesh network in accordance with the following process implemented within processors at the multiple nodes:
accepting a route request at a receiving node if:
(i) no previous received route request message had the same request ID; and
(ii) the route request message is received through a link with a minimum LQI class at least equal to the requested one;
identifying the receiving node as a route candidate and
(iii) if the route request message is accepted by an intermediate node, re-broadcasting the route request;
(iv) if the route request message is accepted by the second node,
sending a route reply message from the second node through the identified route candidate back to the first node to establish a static bidirectional route within the mesh network between the first node and the second node.

2. A process for upgrading a route from a first node to a second node in a mesh network further comprising:
accepting a route request at a receiving node for upgrading the route if;
a route candidate already exists for the request ID;
the request was received through a link with a minimum LQI class at least equal to the requested one; and
the request was received through a better link than the prior received one, as determined by one of the following sets of conditions:
(i) the receiving node is a neighbor, the route request is received from a neighbor and a resulting route length is shorter;
(ii) the receiving node is not a neighbor, the route request is received from a neighbor and a resulting route length is shorter or equal to existing route length;
(iii) the receiving node is not a neighbor, the route request is received from a non-neighbor and a resulting route length is shorter;
otherwise rejecting the route request.

3. A process for requesting a route from a first node to a second node within a mesh network comprising:
transmitting a route request message to a pre-determined coordinator node, wherein the route request message includes a long address for the second node;
constructing at the coordinator node a route through one or more routing nodes from the first node to the second node;
transmitting a response to the route request message to the first node including the route to the second node, wherein the route includes an assigned short address for the second node.

4. The process according to claim 3, wherein the long address is 8 octets and the short address is 2 octets.

* * * * *